US008370233B2

(12) United States Patent
Kaisermayr et al.

(10) Patent No.: US 8,370,233 B2
(45) Date of Patent: Feb. 5, 2013

(54) MANAGING CONSISTENT INTERFACES FOR BUSINESS OBJECTS ACROSS HETEROGENEOUS SYSTEMS

(75) Inventors: Martin Kaisermayr, Antibes (FR); Roman Rapp, Villeneuve-Loubet (FR); Mahesh Sastry, Bangalore (IN); Prasheel Kayal, Bangalore (IN); Manfred Wanninger, Bad Schoenborn (DE); Reshmi Sreekumar, Bangalore (IN); Mohammed Reza, Bangalore (IN); Frederik Thormaehlen, Mannheim (DE); Srirama Suraparaju, Marathalli Bangalore (IN); Joachim Gross, Altrip (DE); Manimaran Mani, Karnataka (IN); Anil Kumar K Naidu, Bangalore (IN)

(73) Assignee: SAP AG, Walldorf (DE)

( * ) Notice: Subject to any disclaimer, the term of this patent is extended or adjusted under 35 U.S.C. 154(b) by 175 days.

(21) Appl. No.: 12/060,171

(22) Filed: Mar. 31, 2008

(65) Prior Publication Data

US 2009/0248586 A1 Oct. 1, 2009

(51) Int. Cl.
*G06Q 40/00* (2012.01)

(52) U.S. Cl. .................... 705/35; 705/1; 705/8; 705/10; 705/21; 705/28; 705/29; 705/30; 705/64; 707/6; 707/100; 707/102; 709/310; 703/2; 703/7; 719/315; 719/317; 719/328; 715/526; 717/104; 370/389

(58) Field of Classification Search .................. 705/1, 8, 705/10, 21, 28, 29, 30, 35, 64; 707/6, 100, 707/102; 709/310; 703/2, 7; 719/315, 317, 719/328; 715/526; 717/104; 370/389
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

SAP Structured Entity Relationship Model (SAP-SERM) for R/3 System Release 4.0 Introduction and Index; Dec. 1998; 26 pages.

(Continued)

*Primary Examiner* — James Trammell
*Assistant Examiner* — Sanjeev Malhotra
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a cost model, a current account contract, and/or a collateral constellation business object.

2 Claims, 260 Drawing Sheets

U.S. PATENT DOCUMENTS

| | | | | |
|---|---|---|---|---|
| 5,463,555 | A | 10/1995 | Ward et al. | |
| 5,787,237 | A | 7/1998 | Reilly | |
| 5,812,987 | A | 9/1998 | Luskin et al. | |
| 5,966,695 | A | 10/1999 | Melchione et al. | |
| 5,970,465 | A | 10/1999 | Dietrich et al. | |
| 5,970,475 | A | 10/1999 | Barnes et al. | |
| 5,983,284 | A | 11/1999 | Argade | |
| 6,047,264 | A | 4/2000 | Fisher et al. | |
| 6,073,137 | A | 6/2000 | Brown et al. | |
| 6,092,196 | A | 7/2000 | Reiche | |
| 6,104,393 | A | 8/2000 | Santos-Gomez | |
| 6,115,690 | A | 9/2000 | Wong | |
| 6,125,391 | A | 9/2000 | Meltzer et al. | |
| 6,138,118 | A | 10/2000 | Koppstein et al. | |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,311,165 | B1 * | 10/2001 | Coutts et al. | 705/21 |
| 6,331,972 | B1 | 12/2001 | Harris et al. | |
| 6,332,163 | B1 | 12/2001 | Bowman-Amuah | |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,542,912 | B2 | 4/2003 | Meltzer et al. | |
| 6,591,260 | B1 | 7/2003 | Schwartzhoff et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 * | 8/2004 | Evans et al. | 703/7 |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,039,606 | B2 | 5/2006 | Hoffman et al. | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,269,569 | B2 | 9/2007 | Spira et al. | |
| 7,292,965 | B1 * | 11/2007 | Mehta et al. | 703/2 |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,574,383 | B1 | 8/2009 | Parasnis et al. | |
| 7,627,504 | B2 | 12/2009 | Brady et al. | |
| 7,634,482 | B2 | 12/2009 | Mukherjee et al. | |
| 7,788,319 | B2 | 8/2010 | Schmidt et al. | |
| 7,805,383 | B2 | 9/2010 | Veit et al. | |
| 7,853,491 | B2 | 12/2010 | Wittmer et al. | |
| 7,865,426 | B2 | 1/2011 | Volpert | |
| 7,873,965 | B2 | 1/2011 | Hayton et al. | |
| 2001/0042032 | A1 | 11/2001 | Crawshaw et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0087481 | A1 | 7/2002 | Harif | |
| 2002/0087483 | A1 | 7/2002 | Harif | |
| 2002/0099634 | A1 * | 7/2002 | Coutts et al. | 705/35 |
| 2002/0107765 | A1 | 8/2002 | Walker | |
| 2002/0112171 | A1 | 8/2002 | Ginter et al. | |
| 2002/0138318 | A1 | 9/2002 | Ellis et al. | |
| 2002/0147668 | A1 | 10/2002 | Smith et al. | |
| 2002/0152104 | A1 | 10/2002 | Ojha et al. | |
| 2002/0152145 | A1 | 10/2002 | Wanta et al. | |
| 2002/0156693 | A1 | 10/2002 | Stewart et al. | |
| 2002/0156930 | A1 * | 10/2002 | Velasquez | 709/310 |
| 2002/0157017 | A1 | 10/2002 | Mi et al. | |
| 2002/0169657 | A1 | 11/2002 | Singh et al. | |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2003/0004799 | A1 | 1/2003 | Kish | |
| 2003/0069648 | A1 | 4/2003 | Douglas et al. | |
| 2003/0086594 | A1 | 5/2003 | Gross | |
| 2003/0120502 | A1 | 6/2003 | Robb et al. | |
| 2003/0120665 | A1 * | 6/2003 | Fox et al. | 707/100 |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0195815 | A1 | 10/2003 | Li et al. | |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0220875 | A1 | 11/2003 | Lam et al. | |
| 2003/0233295 | A1 | 12/2003 | Tozawa et al. | |
| 2003/0236748 | A1 | 12/2003 | Gressel et al. | |
| 2004/0015366 | A1 * | 1/2004 | Wiseman et al. | 705/1 |
| 2004/0024662 | A1 | 2/2004 | Gray et al. | |
| 2004/0034577 | A1 * | 2/2004 | Van Hoose et al. | 705/28 |
| 2004/0039665 | A1 | 2/2004 | Ouchi | |
| 2004/0073510 | A1 | 4/2004 | Logan | |
| 2004/0083201 | A1 | 4/2004 | Sholl et al. | |
| 2004/0138942 | A1 | 7/2004 | Pearson et al. | |
| 2004/0172360 | A1 | 9/2004 | Mabrey et al. | |
| 2004/0187140 | A1 * | 9/2004 | Aigner et al. | 719/328 |
| 2004/0220910 | A1 | 11/2004 | Zang et al. | |
| 2004/0254945 | A1 | 12/2004 | Schmidt et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038744 | A1 | 2/2005 | Viijoen | |
| 2005/0049903 | A1 | 3/2005 | Raja | |
| 2005/0071262 | A1 | 3/2005 | Kobeh et al. | |
| 2005/0080640 | A1 | 4/2005 | Bhaskaran et al. | |
| 2005/0108085 | A1 * | 5/2005 | Dakar et al. | 705/10 |
| 2005/0131947 | A1 | 6/2005 | Laub et al. | |
| 2005/0159997 | A1 | 7/2005 | John | |
| 2005/0171833 | A1 | 8/2005 | Jost et al. | |
| 2005/0182639 | A1 | 8/2005 | Dale | |
| 2005/0187797 | A1 | 8/2005 | Johnson | |
| 2005/0187866 | A1 | 8/2005 | Lee | |
| 2005/0194431 | A1 | 9/2005 | Fees et al. | |
| 2005/0194439 | A1 | 9/2005 | Zuerl et al. | |
| 2005/0197849 | A1 | 9/2005 | Fotteler et al. | |
| 2005/0197851 | A1 | 9/2005 | Veit | |
| 2005/0197878 | A1 | 9/2005 | Fotteler et al. | |
| 2005/0197881 | A1 | 9/2005 | Fotteler et al. | |
| 2005/0197882 | A1 | 9/2005 | Fotteler et al. | |
| 2005/0197886 | A1 | 9/2005 | Veit | |
| 2005/0197887 | A1 | 9/2005 | Zuerl et al. | |
| 2005/0197896 | A1 | 9/2005 | Veit et al. | |
| 2005/0197897 | A1 | 9/2005 | Veit et al. | |
| 2005/0197898 | A1 | 9/2005 | Veit et al. | |
| 2005/0197899 | A1 | 9/2005 | Veit et al. | |
| 2005/0197900 | A1 | 9/2005 | Veit | |
| 2005/0197901 | A1 | 9/2005 | Veit et al. | |
| 2005/0197902 | A1 | 9/2005 | Veit | |
| 2005/0197928 | A1 | 9/2005 | Fotteler et al. | |
| 2005/0197941 | A1 | 9/2005 | Veit | |
| 2005/0210406 | A1 | 9/2005 | Biwer et al. | |
| 2005/0216321 | A1 | 9/2005 | Veit | |
| 2005/0216371 | A1 | 9/2005 | Fotteler et al. | |
| 2005/0216421 | A1 * | 9/2005 | Barry et al. | 705/64 |
| 2005/0222888 | A1 | 10/2005 | Hosoda et al. | |
| 2005/0222896 | A1 | 10/2005 | Rhyne et al. | |
| 2005/0222945 | A1 | 10/2005 | Pannicke et al. | |
| 2005/0234754 | A1 | 10/2005 | Veit | |
| 2005/0246240 | A1 | 11/2005 | Padilla | |
| 2005/0256753 | A1 | 11/2005 | Veit et al. | |
| 2006/0004934 | A1 | 1/2006 | Guldner et al. | |
| 2006/0005098 | A1 | 1/2006 | Lotz et al. | |
| 2006/0020515 | A1 | 1/2006 | Lee et al. | |
| 2006/0026586 | A1 | 2/2006 | Remmel et al. | |
| 2006/0036941 | A1 * | 2/2006 | Neil | 715/526 |
| 2006/0047574 | A1 | 3/2006 | Sundaram et al. | |
| 2006/0047598 | A1 | 3/2006 | Hansen | |
| 2006/0059005 | A1 | 3/2006 | Horn et al. | |
| 2006/0059059 | A1 | 3/2006 | Horn et al. | |

| | | | | |
|---|---|---|---|---|
| 2006/0059060 | A1 | 3/2006 | Horn et al. | |
| 2006/0069598 | A1 | 3/2006 | Schweitzer et al. | |
| 2006/0069629 | A1 | 3/2006 | Schweitzer et al. | |
| 2006/0069632 | A1 | 3/2006 | Kahn et al. | |
| 2006/0074728 | A1 | 4/2006 | Schweitzer et al. | |
| 2006/0080338 | A1 | 4/2006 | Seubert et al. | |
| 2006/0085336 | A1 | 4/2006 | Seubert et al. | |
| 2006/0085412 | A1 | 4/2006 | Johnson et al. | |
| 2006/0085450 | A1 | 4/2006 | Seubert et al. | |
| 2006/0089885 | A1 | 4/2006 | Finke et al. | |
| 2006/0095373 | A1 | 5/2006 | Venkatasubramanian et al. | |
| 2006/0184435 | A1 | 8/2006 | Mostowfi | |
| 2006/0212376 | A1 | 9/2006 | Snyder et al. | |
| 2006/0280302 | A1 | 12/2006 | Baumann et al. | |
| 2006/0282360 | A1 | 12/2006 | Kahn et al. | |
| 2007/0027742 | A1 | 2/2007 | Emuchay et al. | |
| 2007/0043583 | A1* | 2/2007 | Davulcu et al. | 705/1 |
| 2007/0078799 | A1 | 4/2007 | Huber-Buschbeck et al. | |
| 2007/0124227 | A1 | 5/2007 | Dembo et al. | |
| 2007/0129978 | A1 | 6/2007 | Shirasu et al. | |
| 2007/0150387 | A1 | 6/2007 | Seubert et al. | |
| 2007/0150836 | A1 | 6/2007 | Deggelmann et al. | |
| 2007/0156428 | A1 | 7/2007 | Brecht-Tillinger et al. | |
| 2007/0156690 | A1 | 7/2007 | Moser et al. | |
| 2007/0165622 | A1* | 7/2007 | O'Rourke et al. | 370/389 |
| 2007/0214065 | A1 | 9/2007 | Kahlon et al. | |
| 2007/0225949 | A1 | 9/2007 | Sundararajan et al. | |
| 2007/0226090 | A1* | 9/2007 | Stratton | 705/30 |
| 2007/0255639 | A1 | 11/2007 | Seifert | |
| 2007/0265860 | A1 | 11/2007 | Herrmann et al. | |
| 2007/0265862 | A1 | 11/2007 | Freund et al. | |
| 2007/0294159 | A1 | 12/2007 | Cottle | |
| 2008/0005012 | A1 | 1/2008 | Deneef | |
| 2008/0021754 | A1 | 1/2008 | Horn et al. | |
| 2008/0040243 | A1 | 2/2008 | Chang et al. | |
| 2008/0046104 | A1 | 2/2008 | Van Camp et al. | |
| 2008/0046421 | A1 | 2/2008 | Bhatia et al. | |
| 2008/0120129 | A1 | 5/2008 | Seubert et al. | |
| 2008/0120190 | A1 | 5/2008 | Joao et al. | |
| 2008/0120204 | A1 | 5/2008 | Conner et al. | |
| 2008/0133303 | A1 | 6/2008 | Singh et al. | |
| 2008/0154969 | A1 | 6/2008 | DeBie | |
| 2008/0162266 | A1 | 7/2008 | Griessmann et al. | |
| 2008/0184265 | A1* | 7/2008 | Kasi et al. | 719/317 |
| 2008/0196108 | A1 | 8/2008 | Dent et al. | |
| 2008/0215354 | A1 | 9/2008 | Halverson et al. | |
| 2008/0243578 | A1 | 10/2008 | Veit | |
| 2008/0288317 | A1* | 11/2008 | Kakar | 705/8 |
| 2009/0063287 | A1 | 3/2009 | Tribout et al. | |
| 2009/0077074 | A1* | 3/2009 | Hosokawa | 707/6 |
| 2009/0089198 | A1 | 4/2009 | Kroutik | |
| 2009/0164497 | A1* | 6/2009 | Steinmaier et al. | 707/102 |
| 2009/0192926 | A1 | 7/2009 | Tarapata | |
| 2009/0193432 | A1* | 7/2009 | McKegney et al. | 719/315 |
| 2009/0222360 | A1* | 9/2009 | Schmitt et al. | 705/29 |
| 2009/0248431 | A1 | 10/2009 | Schoknecht et al. | |
| 2009/0248547 | A1 | 10/2009 | Doenig et al. | |
| 2009/0271245 | A1 | 10/2009 | Joshi et al. | |
| 2009/0300578 | A1* | 12/2009 | Neil | 717/104 |
| 2009/0326988 | A1 | 12/2009 | Barth et al. | |
| 2010/0014510 | A1 | 1/2010 | Boreli et al. | |
| 2010/0070395 | A1 | 3/2010 | Elkeles et al. | |
| 2010/0106555 | A1 | 4/2010 | Mneimneh et al. | |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata Workshop"; http://www.omg.org/news/meetings/workshops/uml_presentations.htm.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3.

Meltzer, Bart et al.; "XML and Electronic Commerce: Enabling the Network Economy"; SIGMOD Record; ACM Press; vol. 27, No. 4; Dec. 1998; pp. 21-24.

Huhns, Michael N. et al.; "Automating Supply-Chain Mangement"; Jul. 15-19, 2002; pp. 1017-1024.

Soederstroem, Eva; "Standardising the Business Vocabulary of Standards"; SAC, Madrid, Spain; 2002; pp. 1048-1052.

Bastide, Remi et al.; "Formal Specification of CORBA Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David; "Essential Business Object Design"; Communications of the ACM; vol. 43, No. 2; Feb. 2000; pp. 117-119.

Cole, James et al.; "Extending Support for Contracts in ebXML"; IEEE; 2001; pp. 119-127.

DiNitto, Elisabetta et al.; "Deriving Executable Process Descriptions from UML"; ICSE '02; May 19-25, 2002; pp. 155-165.

Stumptner, Markus et al.; "On the Road to Behavior-Based Integration"; First Asia-Pacific Conferences on Conceptual Modelling; Dunedin, New Zealand; Jan. 2004; pp. 15-22.

Gosain, Sanjay et al.; "The Impact of Common E-Business Interfaces"; Communications of the ACM; vol. 46, No. 2; Dec. 2003; pp. 186-195.

Damodaran, Suresh; "B2B Integration over the Internet with XML—RosettaNet Successes and Challenges"; WWW2004; May 17-22, 2004; pp. 188-195.

Schulze, Wolfgang et al.; "Standardising on Workflow-Management—The OMG Workflow Management Facility"; SIGGROUP Bulletin; vol. 19, No. 1; Apr. 1998; pp. 24-30.

Sutherland, Jeff; "Business Objects in Corporate Information Systems"; ACM Computing Surveys; vol. 27, No. 2; Jun. 1995; pp. 274-276.

Arsanjani, Ali; "Developing and Integrating Enterprise Components and Services"; Communications of the ACM; vol. 45, No. 10; Oct. 2002; pp. 31-34.

Kim, Dan Jong et al.; "A Comparison of B2B E-Service Solutions"; Communications of the ACM; vol. 46, No. 12; Dec. 2003; pp. 317-324.

Hasselbring, Wilhelm; "Information System Integration"; Communications of the ACM; vol. 43, No. 6; Jun. 2000; pp. 33-38.

Khosravi, Navid et al.; "An Approach to Building Model Driven Enterprise Systems in Nebras Enterprise Framework"; OOPSLA '02: Companion of the $17^{th}$ Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; $27^{th}$ Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communication of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
He, Ning et al.; "B2B Contract Implementation Using Windows DNS"; 2001; pp. 71-79.
FSML—Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Newton's Telecom Dictionary; 18th Edition; 2002; pp. 347, 454.
"Header", Newton's Telecom Dictionary; 12th Edition, 2004; pp. 389-390.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.

Communication Pursuant to Rules 70(2) and 70a(2) EPC issued in related European Application No. 07835755.5 on Feb. 28, 2011; 6 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,804 on Apr. 28, 2011; 14 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Notice of Allowance issued in related U.S. Appl. No. 12/060,178 on Dec. 6, 2010; 4 pages.
Office Action issued in related U.S. Appl. No. 12/060,155 on May 10, 2011; 8 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Office Action issued in U.S. Appl. No. 11/864,811 on Mar. 18, 2011; 10 pages.
Notice of Allowance issued in related U.S. Appl. No. 11/864,832 on Dec. 3, 2010; 9 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages.
Office Action issued in related U.S. Appl. No. 12/334,175 on May 27, 2011; 12 pages.
Office Action issued in U.S. Appl. No. 12/147,378 on Jun. 17, 2011; 10 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/060,062 on Jul. 13, 2011; 16 pages.
Notice of Allowance issued in related U.S. Appl. No. 11/864,866 on Jul. 22, 2011; 6 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.

* cited by examiner

FIG. 27E
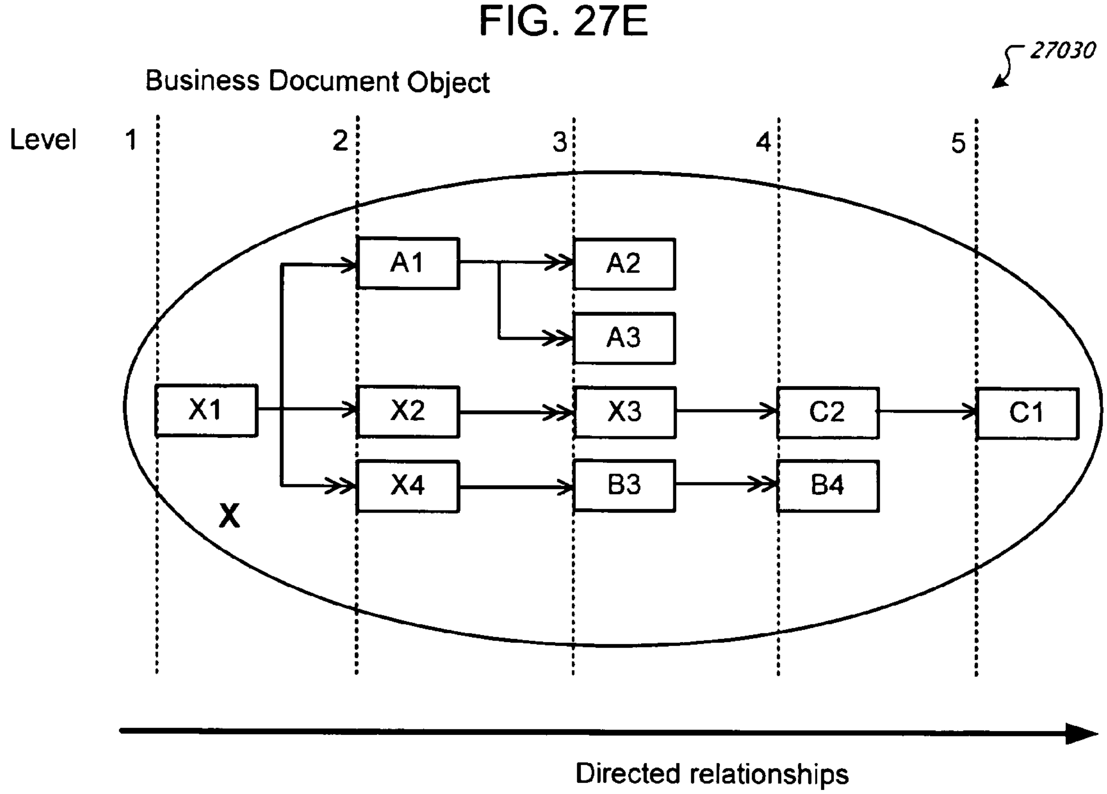
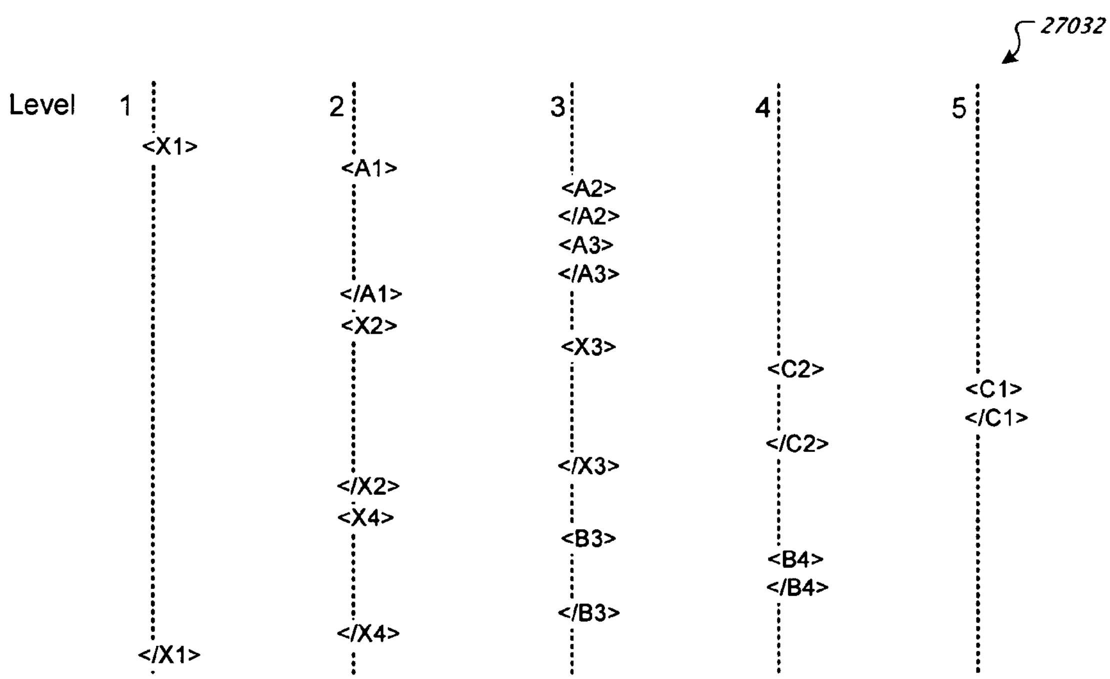

| Package | level1 | level2 | level3 | level4 | Cardinality | Data Type Name |
|---|---|---|---|---|---|---|
| CostModelCreateRequest-Message_sync 49000 | CostModelCreateRequest Message_sync 49002 | | | | | CostModelCreateRequest Message_sync 49004 |
| MessageHeader 49006 | | Message-Header 49008 | | | 0..1 49010 | BusinessDocumentMessage-Header 49012 |
| CostModel 49014 | | CostModel 49016 | | | 1 49018 | |
| | | | PropertyDefinition-ClassID 49020 | | 1 49022 | CostModelPropertyDefinition-ClassID 49024 |
| | | | StatusCode 49026 | | 0..1 49028 | CostModelStatusCode 49030 |

FIG. 49-2

| Package | level1 | level2 | level3 | level4 | Cardinality | Data Type Name |
|---|---|---|---|---|---|---|
| | | | Name 49032 | | 0..1 49034 | CostModelName 49036 |
| Property 49038 | | | Property 49040 | | 0..n 49042 | |
| | | | | ID 49044 | 1 49046 | PropertyID 49048 |
| | | | | Value 49050 | 0..1 49052 | PropertyValue 54 |

FIG. 50-1

| Package | level1 | level2 | level3 | Cardinality | Data Type Name |
|---|---|---|---|---|---|
| CostModelCreateConfirmation-Message_sync 50000 | CostModelCreateConfirmation-Message_sync 50002 | | | | CostModelCreateConfirmation Message_sync 50004 |
| MessageHeader 50006 | | Message-Header 50008 | | 0..1 50010 | BusinessDocumentMessage-Header 50012 |
| CostModel 50014 | | CostModel 50016 | | 0..1 50018 | |
| | | | UUID 50020 | 1 50022 | UUID 50024 |
| | | | ID 50026 | 1 50028 | CostModelID 50030 |

FIG. 50-2

| Package | level1 | level2 | level3 | Cardinality | Data Type Name |
|---|---|---|---|---|---|
| | | | PropertyDefinitionClassID 50032 | 1 50034 | CostModelPropertyDefinition-ClassID 50036 |
| | | | ChangeStateID 50038 | 1 50040 | ChangeStateID 50042 |
| | | | SystemAdministrativeData 50044 | 0..1 50046 | SystemAdministrativeData 50048 |
| | | | StatusCode 50050 | 0..1 50052 | CostModelStatusCode 50054 |
| | | | Name 50056 | 0..1 50058 | CostModelName 50060 |
| Log 50062 | | Log 50064 | | 1 50066 | Log 50068 |

FIG. 51-1

| Package | level1 | level2 | level3 | level4 | level5 | level6 | Cardinality | Data Type Name |
|---|---|---|---|---|---|---|---|---|
| CostModelUpdateRequestMessage_sync 51000 | CostModelUpdateRequest-Message_sync 51002 | | | | | | | CostModelUpdateRequestMessage_sync 51004 |
| Message-Header 51006 | | Message-Header 51008 | | | | | 0..1 51010 | BusinessDocumentMessageHeader 51012 |
| CostModel 51014 | | CostModel 51016 | | | | | 0..1 51018 | |
| | | | UUID 51020 | | | | 1 51022 | UUID 51024 |
| | | | PropertyDefinitionClassID 51026 | | | | 1 51028 | CostModelPropertyDefinitionClassID 51030 |

FIG. 51-2

| Package | level1 | level2 | level3 | level4 | level5 | level6 | Cardinality | Data Type Name |
|---|---|---|---|---|---|---|---|---|
| | | | ChangeStateID 51032 | | | | 1 51034 | ChangeStateID 51036 |
| | | | StatusCode 51038 | | | | 0..1 51040 | CostModelStatusCode 51042 |
| | | | Name 51044 | | | | 0..1 51046 | CostModelName 51048 |
| Property 51050 | | | Property 51052 | | | | 0..n 51054 | |
| | | | | ID 51056 | | | 1 51058 | PropertyID 51060 |
| | | | | Value 51062 | | | 0..1 51064 | PropertyValue 51066 |

FIG. 51-3

| Package | level1 | level2 | level3 | level4 | level5 | level6 | Cardinality | Data Type Name |
|---|---|---|---|---|---|---|---|---|
| Item 51068 | | | Item 51070 | | | | 0..n 51072 | |
| | | | | UUID 51074 | | | 0..1 51076 | UUID 51078 |
| | | | | CostModelProductCostEstimateUUID 51080 | | | 1 51082 | UUID 51084 |
| | | | | CostModelProductCostEstimateTypeCode 51086 | | | 1 51088 | CostModelProductCostEstimateTypeCode 51090 |
| Property 51092 | | | | Property 51094 | | | 0..n 51096 | |

FIG. 51-4

| Package | level1 | level2 | level3 | level4 | level5 | level6 | Cardinality | Data Type Name |
|---|---|---|---|---|---|---|---|---|
| | | | | | ID 51098 | | 1 51100 | PropertyID 51102 |
| | | | | | Value 51104 | | 0..1 51106 | PropertyValue 51108 |
| ProductCostEs-timate 51110 | | | ProductCostEs-timate 51112 | | | | 0..n 51114 | |
| | | | | UUID 51116 | | | 0..1 51118 | UUID 51120 |
| | | | | TypeCode 51122 | | | 1 51124 | CostModelProductCostEs-timateTypeCode 51126 |
| Property 51128 | | | | Property 51130 | | | 0..n 51132 | |

FIG. 51-5

| Package | level1 | level2 | level3 | level4 | level5 | level6 | Cardinality | Data Type Name |
|---|---|---|---|---|---|---|---|---|
| | | | | | ID 51134 | | 1 51136 | PropertyID 51138 |
| | | | | | Value 51140 | | 0..1 51142 | PropertyValue 51144 |
| Item 51146 | | | | Item 51148 | | | 0..n 51150 | |
| | | | | | UUID 51152 | | 0..1 51154 | UUID 51156 |
| | | | | | CostModelCostSour-ceUUID 51158 | | 0..1 51160 | UUID 51162 |
| | | | | | CostModelCostSour-ceTypeCode 51164 | | 0..1 51166 | CostModelCostSource TypeCode 51168 |

FIG. 51-6

| Package | level1 | level2 | level3 | level4 | level5 | level6 | Cardinality | Data Type Name |
|---|---|---|---|---|---|---|---|---|
| | | | | | CostModelProductCost-EstimateUUID 51170 | | 0..1 51172 | UUID 51174 |
| | | | | | CostModelProductCost-EstimateTypeCode 51176 | | 0..1 51178 | CostModelProductCostEs-timateTypeCode 51180 |
| Property 51182 | | | | | Property 51184 | | 0..n 51186 | |
| | | | | | | ID 51188 | 1 51190 | PropertyID 51192 |
| | | | | | | Value 51194 | 0..1 51196 | PropertyValue 51198 |

FIG. 52-1

| Package | level1 | level2 | level3 | level4 | level5 | Cardinality | Data Type Name |
|---|---|---|---|---|---|---|---|
| CostModelUpdateConfirmationMesage_sync 52000 | CostModelUpdateConfirmation Message_sync 52002 | | | | | | CostModelUpdateConfirmationMessage_sync 52004 |
| Message-Header 52006 | | MessageHeader 52008 | | | | 0..1 52010 | BusinessDocument-MessageHeader 52012 |
| CostModel 52014 | | CostModel 52016 | | | | 0..1 52018 | |
| | | | UUID 52020 | | | 1 52022 | UUID 52024 |
| | | | ID 52026 | | | 1 52028 | CostModelID 52030 |

FIG. 52-2

| Package | level1 | level2 | level3 | level4 | level5 | Cardinality | Data Type Name |
|---|---|---|---|---|---|---|---|
| | | | PropertyDefinitionClassID 52032 | | | 1 52034 | CostModelProperty-DefinitionClassID 52036 |
| | | | ChangeStateID 52038 | | | 1 52040 | ChangeStateID 52042 |
| | | | SystemAdministrativeData 52044 | | | 0..1 52046 | SystemAdministra-tiveData 52048 |
| | | | StatusCode 52050 | | | 0..1 52052 | CostModelStatus-Code 52054 |
| | | | Name 52056 | | | 0..1 52058 | CostModelName 52060 |

FIG. 52-3

| Package | level1 | level2 | level3 | level4 | level5 | Cardinality | Data Type Name |
|---|---|---|---|---|---|---|---|
| Item 52062 | | | Item 52064 | | | 0..n 52066 | |
| | | | | UUID 52068 | | 1 52070 | UUID 52072 |
| | | | | CostModelProductCostEstimateUUID 52074 | | 1 52076 | UUID 52078 |
| | | | | CostModelProductCostEstimateTypeCode 52080 | | 1 52082 | CostModelProductCostEstimateTypeCode 52084 |
| ProductCostEstimate 52086 | | | ProductCostEstimate 52088 | | | 0..n 52090 | |

FIG. 52-4

| Package | level1 | level2 | level3 | level4 | level5 | Cardinality | Data Type Name |
|---|---|---|---|---|---|---|---|
| | | | | UUID 52092 | | 1 52094 | UUID 52096 |
| | | | | ID 52098 | | 1 52100 | CostModelProductCostEstimateID 52102 |
| | | | | TypeCode 52104 | | 1 52106 | CostModelProductCostEstimateTypeCode 52108 |
| Item 52110 | | | | Item 52112 | | 0..n 52114 | |
| | | | | | UUID 52116 | 1 52118 | UUID 52120 |

FIG. 52-5

| Package | level1 | level2 | level3 | level4 | level5 | Cardinality | Data Type Name |
|---|---|---|---|---|---|---|---|
| | | | | | CostModelCost-SourceUUID 52122 | 0..1 52124 | UUID 52126 |
| | | | | | CostModelCost-SourceTypeCode 52128 | 0..1 52130 | CostModelCost-Source TypeCode 52132 |
| | | | | | CostModelPro-ductCostEstima-teUUID 52134 | 0..1 52136 | UUID 52138 |
| | | | | | CostModelPro-ductCostEstimate TypeCode 52140 | 0..1 52142 | CostModelPro-ductCostEsti-mateTypeCode 52144 |
| Log 52146 | | Log 52148 | | | | 1 52150 | Log 52152 |

FIG. 53

| Package | level1 | level2 | level3 | Cardinality | Data Type Name |
|---|---|---|---|---|---|
| CostModelCancelRequest-Message_sync 53000 | CostModelCancelRequest-Message_sync 53002 | | | | CostModelCancelRequest-Message_sync 53004 |
| MessageHeader 53006 | | MessageHeader 53008 | | 0..1 53010 | BusinessDocumentMessageHeader 53012 |
| CostModel 53014 | | CostModel 53016 | | 1 53018 | |
| | | | UUID 53020 | 1 53022 | UUID 53024 |
| | | | PropertyDefinition-ClassID 53026 | 1 53028 | CostModelPropertyDefinitionClassID 53030 |

FIG. 54-1

| Package | level1 | level2 | level3 | Cardinality | Data Type Name |
|---|---|---|---|---|---|
| CostModelCancelConfirmation-Message_sync 54000 | CostModelUpdateConfirmation Message_sync 54002 | | | | CostModelCancelConfirmation-Message_sync 54004 |
| MessageHeader 54006 | | Message-Header 54008 | | 0..1 54010 | BusinessDocumentMessage-Header 54012 |
| CostModel 54014 | | CostModel 54016 | | 0..1 54018 | |
| | | | UUID 54020 | 1 54022 | UUID 54024 |
| | | | ID 54026 | 1 54028 | CostModelID 54030 |

FIG. 54-2

| Package | level1 | level2 | level3 | Cardinality | Data Type Name |
|---|---|---|---|---|---|
| | | | PropertyDefinitionClassID 54032 | 1 54034 | CostModelPropertyDefinition-ClassID 54036 |
| | | | SystemAdministrativeData 54038 | 0..1 54040 | SystemAdministrativeData 54042 |
| | | | StatusCode 54044 | 0..1 54046 | CostModelStatusCode 54048 |
| | | | Name 54050 | 0..1 54052 | CostModelName 54054 |
| Log 54056 | | Log 54058 | | 1 54060 | Log 54062 |

FIG. 55

| Package | level1 | level2 | level3 | Cardinality | Data Type Name |
|---|---|---|---|---|---|
| CostModelByIDQueryMessage_sync 55000 | CostModelByID QueryMessage_sync 55002 | | | | CostModelByIDQueryMessage_sync 55004 |
| MessageHeader 55006 | | MessageHeader 55008 | | 0..1 55010 | BusinessDocumentMessageHeader 55012 |
| Selection 55014 | | CostModel SelectionByID 55016 | | 0..1 55018 | |
| | | | CostModelUUID 55020 | 1 55022 | UUID 55024 |
| | | | PropertyDefinition-ClassID 55026 | 1 55028 | CostModelPropertyDefinitionClassID 55030 |

FIG. 56-1

| Package | level1 | level2 | level3 | level4 | level5 | level6 | level7 | level8 | Cardinality | Data Type Name |
|---|---|---|---|---|---|---|---|---|---|---|
| CostModelByIDResponseMessage_sync 56000 | CostModel-ByID ResponseMessage_sync 56002 | | | | | | | | | CostModelByIDResponseMessage_sync 56004 |
| Message-Header 56006 | | Message-Header 56008 | | | | | | | 0..1 56010 | BusinessDocument-MessageHeader 56012 |
| CostModel 56014 | | CostModel 56016 | | | | | | | 0..1 56018 | |
| | | | UUID 56020 | | | | | | 1 56022 | UUID 56024 |
| | | | ID 56026 | | | | | | 1 56028 | CostModelID 56030 |

FIG. 56-2

| Package | level1 | level2 | level3 | level4 | level5 | level6 | level7 | level8 | Cardinality | Data Type Name |
|---|---|---|---|---|---|---|---|---|---|---|
| | | | PropertyDefinitionClassID 56032 | | | | | | 1 56034 | CostModelPropertyDefinitionClassID 56036 |
| | | | ChangeStateID 56038 | | | | | | 1 56040 | ChangeStateID 56042 |
| | | | SystemAdministrativeData 56044 | | | | | | 0..1 56046 | SystemAdministrativeData 56048 |
| | | | StatusCode 56050 | | | | | | 0..1 56052 | CostModelStatusCode 56054 |
| | | | Name 56056 | | | | | | 0..1 56058 | CostModelName 56060 |

FIG. 56-3

| Package | level1 | level2 | level3 | level4 | level5 | level6 | level7 | level8 | Cardinality | Data Type Name |
|---|---|---|---|---|---|---|---|---|---|---|
| Property 56062 | | | Property 56064 | | | | | | 0..n 56066 | |
| | | | | ID 56068 | | | | | 1 56070 | PropertyID 56072 |
| | | | | Value 56074 | | | | | 0..1 56076 | PropertyValue 56078 |
| Item 56080 | | | Item 56082 | | | | | | 0..n 56084 | |
| | | | | UUID 56086 | | | | | 1 56088 | UUID 56090 |
| | | | | CostModelPro-ductCostEstimate UUID 56092 | | | | | 1 56094 | UUID 56096 |

FIG. 56-4

| Package | level1 | level2 | level3 | level4 | level5 | level6 | level7 | level8 | Cardinality | Data Type Name |
|---|---|---|---|---|---|---|---|---|---|---|
| | | | | CostModelProductCostEstimateTypeCode 56098 | | | | | 1 56100 | CostModelProductCostEstimateTypeCode 56102 |
| Property 56104 | | | | Property 56106 | | | | | 0..n 56108 | |
| | | | | | ID 56110 | | | | 1 56112 | PropertyID 56114 |
| | | | | | Value 56116 | | | | 0..1 56118 | PropertyValue 56120 |
| ProductCostEstimate 56122 | | | ProductCostEstimate 56124 | | | | | | 0..n 56126 | |

FIG. 56-5

| Package | level1 | level2 | level3 | level4 | level5 | level6 | level7 | level8 | Cardinality | Data Type Name |
|---|---|---|---|---|---|---|---|---|---|---|
| | | | | UUID 56128 | | | | | 1 56130 | UUID 56132 |
| | | | | ID 56134 | | | | | 1 56136 | CostModelProductCostEstimateID 56138 |
| | | | | TypeCode 56140 | | | | | 1 56142 | CostModelProductCostEstimateTypeCode 56144 |
| Property 56146 | | | | Property 56148 | | | | | 0..n 56150 | |
| | | | | | ID 56152 | | | | 1 56154 | PropertyID 56156 |

FIG. 56-6

| Package | level1 | level2 | level3 | level4 | level5 | level6 | level7 | level8 | Cardinality | Data Type Name |
|---|---|---|---|---|---|---|---|---|---|---|
| | | | | | Value 56158 | | | | 0..1 56160 | PropertyValue 56162 |
| CostComponentSplit 56164 | | | | CostComponentSplit 56166 | | | | | 0..n 56168 | |
| | | | | | Category Code 56170 | | | | 1 56172 | CostComponentSplit CategoryCode 56174 |
| | | | | | TypeCode 56176 | | | | 1 56178 | CostComponentSplit TypeCode 56180 |
| Element 56182 | | | | | Element 56184 | | | | n 56186 | |

FIG. 56-7

| Package | level1 | level2 | level3 | level4 | level5 | level6 | level7 | level8 | Cardinality | Data Type Name |
|---|---|---|---|---|---|---|---|---|---|---|
| | | | | | | ID 56188 | | | 1 56190 | CostModelCostComponentElementID 56192 |
| Property 56194 | | | | | | Property 56196 | | | n 56198 | |
| | | | | | | | ID 56200 | | 1 56202 | PropertyID 56204 |
| | | | | | | | Value 56206 | | 1 56208 | PropertyValue 56210 |
| Item 56212 | | | | Item 56214 | | | | | 0..n 56216 | |
| | | | | | UUID 56218 | | | | 1 56220 | UUID 56222 |

FIG. 56-8

| Package | level1 | level2 | level3 | level4 | level5 | level6 | level7 | level8 | Cardinality | Data Type Name |
|---|---|---|---|---|---|---|---|---|---|---|
| | | | | | CostModelCost-SourceUUID 56224 | | | | 0..1 56226 | UUID 56228 |
| | | | | | CostModelCost-SourceTypeCode 56230 | | | | 0..1 56232 | CostModelCostSource TypeCode 56234 |
| | | | | | CostModelPro-ductCostEstima-teUUID 56236 | | | | 0..1 56238 | UUID 56240 |
| | | | | | CostModelPro-ductCostEstimate TypeCode 56242 | | | | 0..1 56244 | CostModelPro-ductCostEstimate TypeCode 56246 |
| Property 56248 | | | | | Property 56250 | | | | 0..n 56252 | |

FIG. 56-9

| Package | level1 | level2 | level3 | level4 | level5 | level6 | level7 | level8 | Cardinality | Data Type Name |
|---|---|---|---|---|---|---|---|---|---|---|
| | | | | | | ID 56254 | | | 1 56256 | PropertyID 56258 |
| | | | | | | Value 56260 | | | 0..1 56262 | PropertyValue 56264 |
| CostCompo-nentSplit 56266 | | | | | CostCompo-nentSplit 56268 | | | | 0..n 56270 | |
| | | | | | | Category Code 56272 | | | 1 56274 | CostComponentSplit CategoryCode 56276 |
| | | | | | | Type-Code 56278 | | | 1 56280 | CostComponentSplit TypeCode 56282 |

FIG. 56-10

| Package | level1 | level2 | level3 | level4 | level5 | level6 | level7 | level8 | Cardinality | Data Type Name |
|---|---|---|---|---|---|---|---|---|---|---|
| Element 56284 | | | | | | Element 56286 | | | n 56288 | |
| | | | | | | | ID 56290 | | 1 56292 | CostComponentElementID 56294 |
| Property 56296 | | | | | | | Property 56298 | | n 56300 | |
| | | | | | | | | ID 56302 | 1 56304 | PropertyID 56306 |
| | | | | | | | | Value 56308 | 1 56310 | PropertyValue 56312 |
| Log 56314 | | Log 56316 | | | | | | | 1 56318 | Log 56320 |

FIG. 57-1

| Package | level1 | level2 | level3 | level4 | Cardinality | Data Type Name |
|---|---|---|---|---|---|---|
| CostModelERPSimpleByElementsQueryMessage_sync 57000 | CostModelERPSimple ByElementsQuery Message_sync 57002 | | | | | CostModelERPSimple ByElementsQuery Message_sync 57004 |
| MessageHeader 57006 | | MessageHeader 57008 | | | 0..1 57010 | BusinessDocumentMessageHeader 57012 |
| Selection 57014 | | CostModelSimple SelectionBy Elements 57016 | | | 1 57018 | CostModProdCostEstERPSimpleByElementsQuerySelectionByElements 57020 |
| | | | PropertyDefinition ClassID 57022 | | 1 57024 | PropertyDefinitionClassID 57026 |
| | | | StatusCode 57028 | | 0..1 57030 | CostModelStatusCode 57032 |

FIG. 57-2

| Package | | | level1 | level2 | level3 | level4 | Cardinality | Data Type Name |
|---|---|---|---|---|---|---|---|---|
| | | Property 57034 | | | Property 57036 | | 1..n 57038 | CostModProdCostEstERPSimpleByElementsQuerySelection-ByElementsProperty 57040 |
| | | | | | | PropertyID 57042 | 1 57044 | PropertyID 57046 |
| | | | | | | PropertyValue 57048 | 0..1 57050 | PropertyValue 57052 |

FIG. 58-1

| Package | level1 | level2 | level3 | Cardinality | Data Type Name |
|---|---|---|---|---|---|
| CostModelERPSimpleByElements-ResponseMessage_sync 58000 | CostModelERPSimpleByElements-ResponseMessage_sync 58002 | | | | CostModelERPSimpleByElements-ResponseMessage_sync 58004 |
| MessageHeader 58006 | | MessageHeader 58008 | | 0..1 58010 | BusinessDocumentMessageHeader 58012 |
| CostModel 58014 | | CostModel 58016 | | 0..n 58018 | CostModProdCostEstERPSimple-ByElementsResponseCostMod 58020 |
| | | | UUID 58022 | 1 58024 | UUID 58026 |
| | | | ID 58028 | 1 58030 | CostModelID 58032 |
| | | | PropertyDefinition ClassID 58034 | 1 58036 | PropertyDefinitionClassID 58038 |

FIG. 58-2

| Package | level1 | level2 | level3 | Cardinality | Data Type Name |
|---|---|---|---|---|---|
| | | | Name 58040 | 0..1 58042 | CostModelName 58044 |
| Log 58046 | | Log 58048 | | 1 58050 | Log 58052 |

FIG. 59-1

| Package | level1 | level2 | level3 | level4 | Cardinality | Data Type Name |
|---|---|---|---|---|---|---|
| CostModelERPProductCostEstimateByProductCostEstimateElementsQueryMessage_sync 59000 | CostModelERPProductCostEstimateByProductCostEstimateElementsQueryMessage_sync 59002 | | | | | CostModelERPProductCostEstimateByProductCostEstimateElementsQueryMessage_sync 59004 |
| MessageHeader 59006 | | MessageHeader 59008 | | | 0..1 59010 | BusinessDocumentMessageHeader 59012 |
| Selection 59014 | | CostModelProductCostEstimateSelectionByElements 59016 | | | 1 59018 | CostModProdCostEstERPByProdCostEstElementsQuerySelectionByElements 59020 |
| | | | CostModelUUID 59022 | | 0..1 59024 | UUID 59026 |
| | | | PropertyDefinitionClassID 59028 | | 1 59030 | PropertyDefinitionClassID 59032 |

FIG. 59-2

| Package | level1 | level2 | level3 | level4 | Cardinality | Data Type Name |
|---|---|---|---|---|---|---|
| | | | TypeCode 59034 | | 1 59036 | CostModelProductCostEstimateTypeCode 59038 |
| ProductCostEstimateProperty 59040 | | | ProductCostEstimateProperty 59042 | | 1..n 59044 | CostModProdCostEstERPByProdCostEstElementsQueryProdCostEstProperties 59046 |
| | | | | PropertyID 59048 | 1 59050 | PropertyID 59052 |
| | | | | PropertyValue 59054 | 0..1 59056 | PropertyValue 59058 |

FIG. 60-1

| Package | level1 | level2 | level3 | level4 | Cardinality | Data Type Name |
|---|---|---|---|---|---|---|
| CostModelERPProductCostEstimateByProductCostEstimateElementsResponseMessage_sync 60000 | CostModelERPProductCostEstimateByProductCostEstimateElementsResponseMessage_sync 60002 | | | | | CostModelERPProductCostEstimateByProductCostEstimateElementsResponseMessage_sync 60004 |
| MessageHeader 60006 | | MessageHeader 60008 | | | 0..1 60010 | BusinessDocumentMessageHeader 60012 |
| | | CostModel 60014 | | | 0..n 60016 | CostModProdCostEstERPByProdCostEstElementsResponseCostMod 60018 |
| | | | UUID 60020 | | 1 60022 | UUID 60024 |
| | | | PropertyDefinitionClassID 60026 | | 1 60028 | PropertyDefinitionClassID 60030 |

FIG. 60-2

| Package | level1 | level2 | level3 | level4 | Cardinality | Data Type Name |
|---|---|---|---|---|---|---|
| | | | Name 60032 | | 0..1 60034 | CostModelName 60036 |
| CostModelProductCost-Estimate 60038 | | | ProductCostEstimate 60040 | | 1..n 60042 | CostModProdCostEstERPByProd-CostEstElementsQueryProdCostEst 60044 |
| | | | | UUID 60046 | 1 60048 | UUID 60050 |
| | | | | ID 60052 | 1 60054 | CostModelProductCostEstimateID 60056 |
| | | | | Name 60058 | 0..1 60060 | CostModelProductCostEstimateName 60062 |
| Log 60064 | | Log 60066 | | | 1 60068 | Log 60070 |

FIG. 61-1

| Package | level1 | level2 | level3 | level4 | level5 | level6 | level7 | level8 | Cardinality | Data Type Name |
|---|---|---|---|---|---|---|---|---|---|---|
| CostModelMessage 61000 | CostModel Message 61002 | | | | | | | | | CostModelMessage 61004 |
| Message-Header 61006 | | Message-Header 61008 | | | | | | | 0..1 61010 | BusinessDocumentMessage-Header 61012 |
| CostModel 61014 | | CostModel 61016 | | | | | | | 0..1 61018 | |
| | | | UUID 61020 | | | | | | 1 61022 | UUID 61024 |
| | | | ID 61026 | | | | | | 1 61028 | CostModelID 61030 |

FIG. 61-2

| Package | level1 | level2 | level3 | level4 | level5 | level6 | level7 | level8 | Cardinality | Data Type Name |
|---|---|---|---|---|---|---|---|---|---|---|
| | | | PropertyDefinitionClassID 61032 | | | | | | 1 61034 | CostModelPropertyDefinitionClassID 61036 |
| | | | ChangeStateID 61038 | | | | | | 1 61040 | ChangeStateID 61042 |
| | | | SystemAdministrativeData 61044 | | | | | | 0..1 61046 | SystemAdministrativeData 61048 |
| | | | StatusCode 61050 | | | | | | 0..1 61052 | CostModelStatusCode 61054 |
| | | | Name 61056 | | | | | | 0..1 61058 | CostModelName 61060 |
| Property 61062 | | | Property 61064 | | | | | | 0..n 61066 | |

FIG. 61-3

| Package | level1 | level2 | level3 | level4 | level5 | level6 | level7 | level8 | Cardinality | Data Type Name |
|---|---|---|---|---|---|---|---|---|---|---|
| | | | | ID 61068 | | | | | 1 61070 | PropertyID 61072 |
| | | | | Value 61074 | | | | | 0..1 61076 | PropertyValue 61078 |
| Item 61080 | | | Item 61082 | | | | | | 0..n 61084 | |
| | | | | UUID 61086 | | | | | 1 61088 | UUID 61090 |
| | | | | CostModelProductCostEstimateUUID 61092 | | | | | 1 61094 | UUID 61096 |

FIG. 61-4

| Package | level1 | level2 | level3 | level4 | level5 | level6 | level7 | level8 | Cardinality | Data Type Name |
|---|---|---|---|---|---|---|---|---|---|---|
| | | | | CostModelProductCostEstimateTypeCode 61098 | | | | | 1 61100 | CostModelProductCostEstimateTypeCode 61102 |
| Property 61104 | | | | Property 61106 | | | | | 0..n 61108 | |
| | | | | | ID 61110 | | | | 1 61112 | PropertyID 61114 |
| | | | | | Value 61116 | | | | 0..1 61118 | PropertyValue 61120 |
| ProductCostEstimate 61122 | | | ProductCostEstimate 61124 | | | | | | 0..n 61126 | |
| | | | | UUID 61128 | | | | | 1 61130 | UUID 61132 |

FIG. 61-5

| Package | level1 | level2 | level3 | level4 | level5 | level6 | level7 | level8 | Cardinality | Data Type Name |
|---|---|---|---|---|---|---|---|---|---|---|
| | | | | ID 61134 | | | | | 1 61136 | CostModelProductCostEstimateID 61138 |
| | | | | TypeCode 61140 | | | | | 1 61142 | CostModelProductCostEstimateTypeCode 61144 |
| Property 61146 | | | | Property 61148 | | | | | 0..n 61150 | |
| | | | | | ID 61152 | | | | 1 61154 | PropertyID 61156 |
| | | | | | Value 61158 | | | | 0..1 61160 | PropertyValue 61162 |

FIG. 61-6

| Package | level1 | level2 | level3 | level4 | level5 | level6 | level7 | level8 | Cardinality | Data Type Name |
|---|---|---|---|---|---|---|---|---|---|---|
| CostComponentSplit 61164 | | | | CostComponentSplit 61166 | | | | | 0..n 61168 | |
| | | | | | Category Code 61170 | | | | 1 61172 | CostComponentSplit CategoryCode 61174 |
| | | | | | TypeCode 61176 | | | | 1 61178 | CostComponentSplit TypeCode 61180 |
| Element 61182 | | | | | Element 61184 | | | | n 61186 | |
| | | | | | | ID 61188 | | | 1 61190 | CostModelCostComponentElementID 61192 |

FIG. 61-7

| Package | level1 | level2 | level3 | level4 | level5 | level6 | level7 | level8 | Cardinality | Data Type Name |
|---|---|---|---|---|---|---|---|---|---|---|
| Property 61194 | | | | | | Property 61196 | | | n 61198 | |
| | | | | | | | ID 61200 | | 1 61202 | PropertyID 61204 |
| | | | | | | | Value 61206 | | 1 61208 | PropertyValue 61210 |
| Item 61212 | | | | Item 61214 | | | | | 0..n 61216 | |
| | | | | | UUID 61218 | | | | 1 61220 | UUID 61222 |
| | | | | | CostModelCost-SourceUUID 61224 | | | | 0..1 61226 | UUID 61228 |

FIG. 61-8

| Package | level1 | level2 | level3 | level4 | level5 | level6 | level7 | level8 | Cardinality | Data Type Name |
|---|---|---|---|---|---|---|---|---|---|---|
| | | | | | CostModelCost-SourceTypeCode 61230 | | | | 0..1 61232 | CostModelCost-Source TypeCode 61234 |
| | | | | | CostModelPro-ductCostEstima-teUUID 61236 | | | | 0..1 61238 | UUID 61240 |
| | | | | | CostModelPro-ductCostEstimate TypeCode 61242 | | | | 0..1 61244 | CostModelPro-ductCostEstimate TypeCode 61246 |
| Property 61248 | | | | | Property 61250 | | | | 0..n 61252 | |
| | | | | | | ID 61254 | | | 1 61256 | PropertyID 61258 |

FIG. 61-9

| Package | level1 | level2 | level3 | level4 | level5 | level6 | level7 | level8 | Cardinality | Data Type Name |
|---|---|---|---|---|---|---|---|---|---|---|
| | | | | | | Value 61260 | | | 0..1 61262 | PropertyValue 61264 |
| CostCompo-nentSplit 61266 | | | | | CostComponentSplit 61268 | | | | 0..n 61270 | |
| | | | | | | Category Code 61272 | | | 1 61274 | CostComponentSplit CategoryCode 61276 |
| | | | | | | TypeCode 61278 | | | 1 61280 | CostComponentSplit TypeCode 61282 |
| Element 61284 | | | | | | Element 61286 | | | n 61288 | |

FIG. 61-10

| Package | level1 | level2 | level3 | level4 | level5 | level6 | level7 | level8 | Cardinality | Data Type Name |
|---|---|---|---|---|---|---|---|---|---|---|
| | | | | | | | ID 61290 | | 1 61292 | CostComponen-tElementID 61294 |
| Property 61296 | | | | | | | Property 61298 | | n 61300 | |
| | | | | | | | | ID 61302 | 1 61304 | PropertyID 61306 |
| | | | | | | | | Value 61308 | 1 61310 | PropertyValue 61312 |
| Log 61314 | | Log 61316 | | | | | | | 0..1 61318 | Log 61320 |

FIG. 79-1

| Package | level1 | level2 | level3 | level4 | Cardinality | Data Type Name |
|---|---|---|---|---|---|---|
| CurrentAccountContractCreateRequest_sync 79000 | CurrentAccountContractCreateRequestMessage_sync 79002 | | | | | CurrentAccountContractCreateRequestMessage_sync 79004 |
| MessageHeader 79006 | | MessageHeader 79008 | | | 1 79010 | BasicBusinessDocumentMessageHeader 79012 |
| CurrentAccountContract 79014 | | CurrentAccountContract 79016 | | | 1 79018 | ... |
| | | | StartDate 79020 | | 1 79022 | Date,Qualifier:Start 79024 |
| | | | UsageNote 79026 | | 1 79028 | MEDIUM_Note 79030 |

FIG. 79-2

| Package | level1 | level2 | level3 | level4 | Cardinality | Data Type Name |
|---|---|---|---|---|---|---|
| Party 79032 | | | AccountHolder-Party 79034 | | 1 79036 | BusinessTransactionDocumentParty 79038 |
| ProductInformation 79040 | | | Product 79042 | | 1 79044 | BusinessTransactionDocumentProduct 79046 |
| BankAccount 79048 | | | BankAccount 79050 | | 1 79052 | ... |
| | | | | BankAccount 79054 | 1 79056 | BusinessTransactionDocument-BankAccount 79058 |

FIG. 80-1

| Package | level1 | level2 | level3 | level4 | Cardinality | Data Type Name |
|---|---|---|---|---|---|---|
| CurrentAccountContractCreateConfirmation_sync 80000 | CurrentAccountContractCreateConfirmation_sync 80002 | | | | | CurrentAccountContractConfirmationMessage_sync 80004 |
| MessageHeader 80006 | | MessageHeader 80008 | | | 1 80010 | BasicBusinessDocumentMessageHeader 80012 |
| CurrentAccountContract 80014 | | CurrentAccountContract 80016 | | | 0..1 80018 | ... |
| | | | ID 80020 | | 1 80022 | BankAccountContractID 80024 |
| | | | StartDate 80026 | | 1 80028 | Date,Qualifier:Start 80030 |
| BankAccount 80032 | | | BankAccount 80034 | | 1 80036 | ... |

FIG. 80-2

| Package | level1 | level2 | level3 | level4 | Cardinality | Data Type Name |
|---|---|---|---|---|---|---|
| | | | | BankAccount 80038 | 1 80040 | BusinessTransactionDocumentBankAccount 80042 |
| Log 80044 | | Log 80046 | | | 1 80048 | Log 80050 |

FIG. 81-1

| Package | level1 | level2 | level3 | level4 | Cardinality | Data Type Name |
|---|---|---|---|---|---|---|
| CurrentAccountContrac-tUsageNoteChangeRe-quest_sync 81000 | CurrentAccountContrac-tUsageNoteChangeRequest-Message_sync 81002 | | | | | CurrentAccountContract-PurposeChangeRe-questMessage_sync 81004 |
| MessageHeader 81006 | | MessageHeader 81008 | | | 1 81010 | BasicBusinessDocu-mentMessageHeader 81012 |
| CurrentAccountContract 81014 | | CurrentAccount-Contract 81016 | | | 1 81018 | ... |
| | | | ID 81020 | | 1 81022 | BankAccountContractID 81024 |
| | | | UsageNote 81026 | | 1 81028 | MEDIUM_Note 81030 |

FIG. 81-2

| Package | level1 | level2 | level3 | level4 | Cardinality | Data Type Name |
|---|---|---|---|---|---|---|
| | | | ChangeValidityStart-Date 81032 | | 1 81034 | Date,Qualifier:Start 81036 |
| BankAccount 81038 | | | BankAccount 81040 | | 1 81042 | ... |
| | | | | BankAccount 81044 | 1 81046 | BusinessTransaction-DocumentBankAccount 81048 |

FIG. 82-1

| Package | level1 | level2 | level3 | level4 | Cardinality | Data Type Name |
|---|---|---|---|---|---|---|
| CurrentAccountContractUsageNoteChangeConfirmation_sync 82000 | CurrentAccountContractUsageNoteChangeConfirmationMessage_sync 82002 | | | | | CurrentAccountContractUsageNoteChangeConfirmationMessage_sync 82004 |
| MessageHeader 82006 | | MessageHeader 82008 | | | 1 82010 | BasicBusinessDocumentMessageHeader 82012 |
| CurrentAccountContract 82014 | | CurrentAccountContract 82016 | | | 0..1 82018 | ... |
| | | | ID 82020 | | 1 82022 | BusinessTransactionDocumentID 82024 |
| | | | StartDate 82026 | | 1 82028 | Date,Qualifier:Start 82030 |
| BankAccount 82032 | | | BankAccount 82034 | | 1 82036 | ... |

FIG. 82-2

| Package | level1 | level2 | level3 | level4 | Cardinality | Data Type Name |
|---|---|---|---|---|---|---|
| | | | | BankAccount 82038 | 1 82040 | BusinessTransactionDocument-BankAccount 82042 |
| Log 82044 | | Log 82046 | | | 1 82048 | Log 82050 |

FIG. 83-1

| Package | level1 | level2 | level3 | level4 | level5 | Cardinality | Data Type Name |
|---|---|---|---|---|---|---|---|
| CurrentAccountContractItem-LimitChangeRequest_sync 83000 | CurrentAccountContrac-tItemLimitChangeRe-questMessage_sync 83002 | | | | | | CurrentAccountContract-LimitsChangeRequest-Message_sync 83004 |
| MessageHeader 83006 | | MessageHeader 83008 | | | | 1 83010 | BasicBusinessDocu-mentMessageHeader 83012 |
| CurrentAccountContract 83014 | | CurrentAccount-Contract 83016 | | | | 1 83018 | ... |
| | | | ID 83020 | | | 0..1 83022 | BusinessTransaction-DocumentID 83024 |
| | | | StartDate 83026 | | | | |

FIG. 83-2

| Package | level1 | level2 | level3 | level4 | level5 | Cardinality | Data Type Name |
|---|---|---|---|---|---|---|---|
| | | | ChangeValidityStart-Date 83028 | | | 1 83030 | Date,Qualifier:ValidOn 83032 |
| | | | @itemListCompleteTransmissionIndicator 83034 | | | 1 83036 | Indicator,Qualifier:CompleteTransmission 83038 |
| BankAccount 83040 | | | BankAccount 83042 | | | 1 83044 | ... |
| | | | | BankAccount 83046 | | 1 83048 | BusinessTransaction-DocumentBankAccount 83050 |
| Item 83052 | | | Item 83054 | | | 1..n 83056 | ... |
| LimitInformation 83058 | | | | Limit 83060 | | 1 83062 | ... |

FIG. 83-3

| Package | level1 | level2 | level3 | level4 | level5 | Cardinality | Data Type Name |
|---|---|---|---|---|---|---|---|
| | | | | | ActionCode 83064 | 1 83066 | ActionCode 83068 |
| | | | | | BankAc-countLimit 83070 | 1 83072 | BankAccountLimit 83074 |

FIG. 84-1

| Package | level1 | level2 | level3 | level4 | Cardinality | Data Type Name |
|---|---|---|---|---|---|---|
| CurrentAccountContractLimitsChangeConfirmation_sync 84000 | CurrentAccountContractLimitsChangeConfirmation_sync 84002 | | | | | CurrentAccountContractConfirmationMessage_sync 84004 |
| MessageHeader 84006 | | MessageHeader 84008 | | | 1 84010 | BasicBusinessDocumentMessageHeader 84012 |
| CurrentAccountContract 84014 | | CurrentAccountContract 84016 | | | 0..1 84018 | ... |
| | | | ID 84020 | | 1 84022 | BankAccountContractID 84024 |
| | | | StartDate 84026 | | 1 84028 | Date,Qualifier:Start 84030 |
| BankAccount 84032 | | | BankAccount 84034 | | 1 84036 | ... |

FIG. 84-2

| Package | level1 | level2 | level3 | level4 | Cardinality | Data Type Name |
|---|---|---|---|---|---|---|
| | | | | BankAccount 84038 | 1 84040 | BusinessTransactionDocument-BankAccount 84042 |
| Log 84044 | | Log 84046 | | | 1 84048 | Log 84050 |

FIG. 85-1

| Package | level1 | level2 | level3 | level4 | Cardinality | Data Type Name |
|---|---|---|---|---|---|---|
| CurrentAccountContractAuthorizedDrawerPartyAssign-mentChangeRequest_sync 85000 | CurrentAccountContractAuthorizedDrawerPartyAssign-mentChangeRequest_sync 85002 | | | | | CurrentAccountContractAuthorizedDrawerPartyAssign-mentChangeRequest_sync 85004 |
| MessageHeader 85006 | | MessageHeader 85008 | | | 1 85010 | BasicBusinessDocument-MessageHeader 85012 |
| CurrentAccountContract 85014 | | CurrentAccount-Contract 85016 | | | 1 85018 | ... |
| | | | ID 85020 | | 1 85022 | BankAccountContractID 85024 |
| | | | StartDate 85026 | | 1 85028 | Date,Qualifier:Start 85030 |
| | | | ChangeValidityStartDate 85032 | | 1 85034 | Date,Qualifier:Start 85036 |

FIG. 85-2

| Package | level1 | level2 | level3 | level4 | Cardinality | Data Type Name |
|---|---|---|---|---|---|---|
| | | | @authorizedDrawerPartyListCompleteTransmissionIndicator 85038 | | 1 85040 | Indicator,Qualifier:CompleteTransmission 85042 |
| Party 85044 | | | AuthorizedDrawerParty 85046 | | 0..n 85048 | ... |
| | | | | ActionCode 85050 | 1 85052 | ActionCode 85054 |
| | | | | PartyInternalId 85056 | 1 85058 | PartyInternalId 85060 |
| BankAccount 85062 | | | BankAccount 85064 | | 1 85066 | BusinessTransactionDocumentBankAccount 85068 |
| | | | | BankAccount 85070 | 1 85072 | BusinessTransactionDocumentBankAccount 85074 |

FIG. 86-1

| Package | level1 | level2 | level3 | level4 | Cardinality | Data Type Name |
|---|---|---|---|---|---|---|
| CurrentAccountContractAuthorizedDrawerPartyAssignmentChange-Confirmation_sync 86000 | CurrentAccountContractAuthorizedDrawerPartyAssignmentChange-Confirmation_sync 86002 | | | | | CurrentAccountContractAuthorizedDrawerPartyAssignmentChange-Confirmation_sync 86004 |
| MessageHeader 86006 | | MessageHeader 86008 | | | 1 86010 | BasicBusinessDocumentMessageHeader 86012 |
| CurrentAccountContract 86014 | | CurrentAccount-Contract 86016 | | | 0..1 86018 | ... |
| | | | ID 86020 | | 1 86022 | BankAccountContractID 86024 |
| | | | StartDate 86026 | | 1 86028 | Date,Qualifier:Start 86030 |
| BankAccount 86032 | | | BankAccount 86034 | | 1 86036 | ... |

FIG. 86-2

| Package | level1 | level2 | level3 | level4 | Cardinality | Data Type Name |
|---|---|---|---|---|---|---|
| | | | | BankAccount 86038 | 1 86040 | BusinessTransactionDocument-BankAccount 86042 |
| Log 86044 | | Log 86046 | | | 1 86048 | Log 86050 |

FIG. 87-1

| Package | level1 | level2 | level3 | Cardinality | Data Type Name |
|---|---|---|---|---|---|
| CurrentAccountContractItem-LimitByElementsQuery_sync 87000 | CurrentAccountContractItemLimit-ByElementsQueryMessage_sync 87002 | | | | CurrentAccountContractItemLimit-ByElementsQueryMessage_sync 87004 |
| MessageHeader 87006 | | MessageHeader 87008 | | 1 87010 | BasicBusinessDocumentMessage-Header 87012 |
| Selection 87014 | | CurrentAccountContractLim-itsSelectionByElements 87016 | | 1 87018 | ... |
| | | | CurrentAccountCon-tractBankAccount 87020 | 1 87022 | BusinessTransactionDocument-BankAccount 87024 |
| | | | CurrentAccountCon-tractStartDate 87026 | 1 87028 | Date,Qualifier:Start 87030 |

FIG. 87-2

| Package | level1 | level2 | level3 | Cardinality | Data Type Name |
|---|---|---|---|---|---|
| | | | ValidityDate 87032 | 0..1 87034 | Date,Qualifier:Validity 87036 |

FIG. 88-1

| Package | level1 | level2 | level3 | level4 | Cardinality | Data Type Name |
|---|---|---|---|---|---|---|
| CurrentAccountContractItem-LimitByElementsResponse_sync 88000 | CurrentAccountContractItem-LimitByElementsResponse-Message_sync 88002 | | | | | CurrentAccountContractItem-LimitByElementsResponseMes-sage_sync 88004 |
| MessageHeader 88006 | | MessageHeader 88008 | | | 1 88010 | BasicBusinessDocumentMes-sageHeader 88012 |
| CurrentAccountContract 88014 | | CurrentAccount-Contract 88016 | | | 0..1 88018 | ... |
| | | | ID 88020 | | 1 88022 | BankAccountContractID 88024 |
| | | | StartDate 88026 | | 1 88028 | Date,Qualifier:Start 88030 |
| BankAccount 88032 | | | BankAccount 88034 | | 1 88036 | ... |

FIG. 88-2

| Package | level1 | level2 | level3 | level4 | Cardinality | Data Type Name |
|---|---|---|---|---|---|---|
| | | | | BankAccount 88038 | 1 88040 | BusinessTransactionDocument-BankAccount 88042 |
| Item 88044 | | | Item 88046 | | 1..n 88048 | ... |
| LimitInformation 88050 | | | | Limit 88052 | 1 88054 | BankAccountLimit 88056 |
| Log 88058 | | Log 88060 | | | 1 88062 | Log 88064 |

FIG. 89-1

| Package | level1 | level2 | level3 | Cardinality | Data Type Name |
|---|---|---|---|---|---|
| CurrentAccountContractBasicDataByElementsQuery_sync 89000 | CurrentAccountContractBasicDataByElementsQueryMessage_sync 89002 | | | | CurrentAccountContractBasicDataByElementsQueryMessage_sync 89004 |
| MessageHeader 89006 | | MessageHeader 89008 | | 1 89010 | BasicBusinessDocumentMessageHeader 89012 |
| Selection 89014 | | CurrentAccountContractBasicDataSelectionByElements 89016 | | 1 89018 | ... |
| | | | CurrentAccountContractBankAccount 89020 | 1 89022 | BusinessTransactionDocumentBankAccount 89024 |
| | | | CurrentAccountContractStartDate 89026 | 1 89028 | Date,Qualifier:Start 89030 |

FIG. 89-2

| Package | level1 | level2 | level3 | Cardinality | Data Type Name |
|---|---|---|---|---|---|
| | | | ValidityDate 89032 | 0..1 89034 | Date,Qualifier:Validity 89036 |

FIG. 90-1

| Package | level1 | level2 | level3 | level4 | Cardinality | Data Type Name |
|---|---|---|---|---|---|---|
| CurrentAccountContractBasicDataByElementsResponse_sync 90000 | CurrentAccountContractBasicDataByElementsResponseRequestMessage_sync 90002 | | | | | CurrentAccountContractBasicDataByElementsResponseMessage_sync 90004 |
| MessageHeader 90006 | | MessageHeader 90008 | | | 1 90010 | BasicBusinessDocumentMessageHeader 90012 |
| CurrentAccountContract 90014 | | CurrentAccount-Contract 90016 | | | 0..1 90018 | ... |
| | | | ID 90020 | | 1 90022 | BankAccountContractID 90024 |
| | | | StartDate 90026 | | 1 90028 | Date,Qualifier:Start 90030 |
| | | | UsageNote 90032 | | 1 90034 | MEDIUM_Note 90036 |

FIG. 90-2

| Package | level1 | level2 | level3 | level4 | Cardinality | Data Type Name |
|---|---|---|---|---|---|---|
| Party 90038 | | | Account-HolderParty 90040 | | 1 90042 | BusinessTransactionDocumentParty 90044 |
| ProductInformation 90046 | | | Product 90048 | | 1 90050 | BusinessTransactionDocumentProduct 90052 |
| BankAccount 90054 | | | BankAccount 90056 | | 1 90058 | ... |
| | | | | BankAccount 90060 | 1 90062 | BusinessTransactionDocumentBankAc-count 90064 |
| Log 90066 | | Log 90068 | | | 1 90070 | Log 90072 |

FIG. 91-1

| Package | level1 | level2 | level3 | Cardinality | Data Type Name |
|---|---|---|---|---|---|
| CurrentAccountContractAuthorizedDrawerPartyAssignmentByElementsQuery_sync 91000 | CurrentAccountContractAuthorizedDrawerPartyAssignmentByElementsQuery_sync 91002 | | | | CurrentAccountContractAuthorizedDrawerPartyAssignmentByElementsQueryMessage_sync 91004 |
| MessageHeader 91006 | | MessageHeader 91008 | | 1 91010 | BasicBusinessDocumentMessageHeader 91012 |
| Selection 91014 | | CurrentAccountContractAuthorizedDrawerPartyAssignmentSelectionbyElements 91016 | | 1 91018 | ... |
| | | | CurrentAccountContractBankAccount 91020 | 1 91022 | BusinessTransactionDocumentBankAccount 91024 |
| | | | CurrentAccountContractStartDate 91026 | 1 91028 | Date,Qualifier:Start 91030 |

FIG. 91-2

| Package | level1 | level2 | level3 | Cardinality | Data Type Name |
|---|---|---|---|---|---|
| | | | ValidityDate 91032 | 0..1 91034 | Date,Qualifier:Validity 91036 |

FIG. 92-1

| Package | level1 | level2 | level3 | level4 | Cardinality | Data Type Name |
|---|---|---|---|---|---|---|
| CurrentAccountContractAuthorizedDrawerByElementsResponse_sync 92000 | CurrentAccountContractAuthorizedDrawerByElementsResponseMessage_sync 92002 | | | | | CurrentAccountContractAuthorizedDrawerByElementsResponseMessage_sync 92004 |
| MessageHeader 92006 | | MessageHeader 92008 | | | 1 92010 | BasicBusinessDocumentMessageHeader 92012 |
| CurrentAccountContract 92014 | | CurrentAccountContract 92016 | | | 0..1 92018 | ... |
| | | | ID 92020 | | 1 92022 | BankAccountContractID 92024 |
| | | | StartDate 92026 | | 1 92028 | Date,Qualifier:Start 92030 |
| Party 92032 | | | Authorized-DrawerParty 92034 | | 0..n 92036 | ... |

FIG. 92-2

| Package | level1 | level2 | level3 | level4 | Cardinality | Data Type Name |
|---|---|---|---|---|---|---|
| | | | | AuthorizedDrawerParty 92038 | 1 92040 | BusinessTransactionDocument-Party 92042 |
| | | | | ValidityStartDate 92044 | 1 92046 | Date 92048 |
| | | | | ValidityEndDate 92050 | 1 92052 | Date 92054 |
| BankAccount 92056 | | | BankAccount 92058 | | 1 92060 | ... |
| | | | | BankAccount 92062 | 1 92064 | BusinessTransactionDocument-BankAccount 92066 |
| Log 92068 | | Log 92070 | | | 1 92072 | Log 92074 |

FIG. 93-1

| Package | level1 | level2 | level3 | Cardinality | Data Type Name |
|---|---|---|---|---|---|
| CurrentAccountContractBasicDataByBasicDataQuery_sync 93000 | CurrentAccountContractBasicDataByBasicDataQueryMessage_sync 93002 | | | | CurrentAccountContractSimplebyBasicDataQueryMessage_sync 93004 |
| MessageHeader 93006 | | MessageHeader 93008 | | 1 93010 | BasicBusinessDocumentMessageHeader 93012 |
| Selection 93014 | | CurrentAccountContractBasicDataSelectionByBasicData 93016 | | 1 93018 | ... |
| | | | CurrentAccountContractBankAccount 93020 | 0..1 93022 | BusinessTransactionDocumentBankAccount 93024 |
| | | | CurrentAccountContractStartDate 93026 | 0..1 93028 | Date,Qualifier:Start 93030 |

FIG. 93-2

| Package | level1 | level2 | level3 | Cardinality | Data Type Name |
|---|---|---|---|---|---|
| | | | ValidityDate 93032 | 0..1 93034 | Date,Qualifier:Validity 93036 |
| | | | CurrentAccountContractAccountHolderPartyInternalID 93038 | 0..1 93040 | BusinessTransactionDocumentPartyInternalID 93042 |
| | | | CurrentAccountContractProductInternalID 93044 | 0..1 93046 | BusinessTransactionDocumentProductInternalID 93048 |
| | | | CurrentAccountContractUsageNote 93050 | 0..1 93052 | MEDIUM_Note 93054 |
| | | | MaximumNumberValue 93056 | 0..1 93058 | NumberValue,Qualifier:Maximum 93060 |

FIG. 94-1

| Package | level1 | level2 | level3 | level4 | Cardinality | Data Type Name |
|---|---|---|---|---|---|---|
| CurrentAccountContractBasicDataByBasicDataResponse_sync 94000 | CurrentAccountContractBasicDataByBasicDataResponseMessage_sync 94002 | | | | | CurrentAccountContractBasicDataByBasicDataResponseMessage_sync 94004 |
| MessageHeader 94006 | | MessageHeader 94008 | | | 1 94010 | BasicBusinessDocumentMessageHeader 94012 |
| CurrentAccountContract 94014 | | CurrentAccountContract 94016 | | | 0..n 94018 | ... |
| | | | ID 94020 | | 1 94022 | BankAccountContractID 94024 |
| | | | StartDate 94026 | | 1 94028 | Date,Qualifier:Start 94030 |
| | | | UsageNote 94032 | | 1 94034 | MEDIUM_Note 94036 |

FIG. 94-2

| Package | level1 | level2 | level3 | level4 | Cardinality | Data Type Name |
|---|---|---|---|---|---|---|
| | | | MaximumNumber-Value 94038 | | 1 94040 | NumberValue,Qualifier:Maximum 94042 |
| | | | TotalNumberValue 94044 | | 1 94046 | NumberValue,Qualifier:Total 94048 |
| Party 94050 | | | AccountHolderParty 94052 | | 1 94054 | BusinessTransactionDocumentParty 94056 |
| ProductInformation 94058 | | | Product 94060 | | 1 94062 | BusinessTransactionDocumentProduct 94064 |
| BankAccount 94066 | | | BankAccount 94068 | | 1 94070 | ... |
| | | | | BankAccount 94072 | 1 94074 | BusinessTransactionDocumentBankAccount 94076 |

FIG. 94-3

| Package | level1 | level2 | level3 | level4 | Cardinality | Data Type Name |
| --- | --- | --- | --- | --- | --- | --- |
| Log 94078 | | Log 94080 | | | 1 94082 | Log 94084 |

FIG. 95-1

| Package | level1 | level2 | level3 | level4 | level5 | Cardinality | Data Type Name |
|---|---|---|---|---|---|---|---|
| CurrentAccountContractCreatedInformationMessage 95000 | CurrentAccountContractCreatedInformationMessage 95002 | | | | | | CurrentAccountContractCreatedInformationMessage 95004 |
| MessageHeader 95006 | | MessageHeader 95008 | | | | 1 95010 | BusinessDocumentMessageHeader 95012 |
| CurrentAccountContract 95014 | | CurrentAccountContract 95016 | | | | 1 95018 | CurrentAccountContractCreatedInformationMessageCurrentAccountContract 95020 |
| | | | OfferID 95022 | | | 0..1 95024 | BusinessTransactionDocumentID 95026 |
| | | | ID 95028 | | | 1 95030 | BankAccountContractID 95032 |
| | | | StartDate 95034 | | | 1 95036 | GLOBAL_DateTime 95038 |

FIG. 95-2

| Package | level1 | level2 | level3 | level4 | level5 | Cardinality | Data Type Name |
|---|---|---|---|---|---|---|---|
| | | | Currency-Code 95040 | | | 1 95042 | CurrencyCode 95044 |
| Party 95046 | | | Account-HolderParty 95048 | | | 1 95050 | BusinessTransactionDocumentParty 95052 |
| | | | AdditionalAc-countHolder-Party 95054 | | | 0..n 95056 | BusinessTransactionDocumentParty 95058 |
| ProductInformation 95060 | | | Pro-ductCategory 95062 | | | 1 95064 | BusinessTransactionDocumentProduc-tCategory 95066 |
| | | | Product 95068 | | | 1 95070 | BusinessTransactionDocumentProduct 95072 |

FIG. 95-3

| Package | | level1 | level2 | level3 | level4 | level5 | Cardinality | Data Type Name |
|---|---|---|---|---|---|---|---|---|
| BankAccount 95074 | | | | BankAccount 95076 | | | 1 95078 | BusinessTransactionDocument-BankAccount 95080 |
| Item 95082 | | | | Item 95084 | | | 1..n 95086 | CurrentAccountContractCreatedInformationMessageCurrentAccountContractItem 95088 |
| | LimitInformation 95090 | | | | BankAccountLimit 95092 | | 1 95094 | BankAccountLimit 95096 |
| | | | | | | BankAccount-LimitTypeCode 95098 | 1 95100 | BankAccountLimitTypeCode 95102 |
| | | | | | | TypeName 95104 | 0..1 95106 | MEDIUM_Name 95108 |

FIG. 95-4

| Package | | level1 | level2 | level3 | level4 | level5 | Cardinality | Data Type Name |
|---|---|---|---|---|---|---|---|---|
| | | | | | | TypeDescription 95110 | 0..1 95112 | LONG_Description 95114 |
| | | | | | | Amount 95116 | 1 95118 | Amount 95120 |
| | | | | | | ValidityStart-DateTime 95122 | 1 95124 | GLOBAL_DateTime 95126 |
| | | | | | | ValidityEnd-DateTime 95128 | 0..1 95130 | GLOBAL_DateTime 95132 |

FIG. 96-1

| Package | level1 | level2 | level3 | level4 | level5 | level6 | Cardinality | Data Type Name |
|---|---|---|---|---|---|---|---|---|
| CurrentAccountContractCreatedBulkInformation 96000 | CurrentAccountContractCreatedBulkInformationMessage 96002 | | | | | | 1 96004 | CurrentAccountContractCreatedBulkInformationMessage 96006 |
| MessageHeader 96008 | | MessageHeader 96010 | | | | | 1 96012 | BusinessDocumentMessageHeader 96014 |
| CurrentAccountContractCreatedInformationMessage 96016 | | CurrentAccountContractCreatedInformationMessage 96018 | | | | | 1..n 96020 | CurrentAccountContractCreatedInformationMessage 96022 |
| MessageHeader 96024 | | | MessageHeader 96026 | | | | 1 96028 | BusinessDocumentMessageHeader 96030 |
| CurrentAccountContract 96032 | | | CurrentAccountContract 96034 | | | | 1 96036 | CurrentAccountContractCreatedInformationMessageCurrentAccountContract 96038 |

FIG. 96-2

| Package | level1 | level2 | level3 | level4 | level5 | level6 | Cardinality | Data Type Name |
|---|---|---|---|---|---|---|---|---|
| | | | | OfferID 96040 | | | 0..1 96042 | BusinessTransactionDocumentID 96044 |
| | | | | ID 96046 | | | 1 96048 | BankAccountContractID 96050 |
| | | | | StartDate 96052 | | | 1 96054 | GLOBAL_DateTime 96056 |
| | | | | CurrencyCode 96058 | | | 1 96060 | CurrencyCode 96062 |
| Party 96064 | | | | AccountHolderParty 96066 | | | 1 96068 | BusinessTransactionDocumentParty 96070 |
| | | | | AdditionalAccountHolderParty 96072 | | | 0..n 96074 | BusinessTransactionDocumentParty 96076 |

FIG. 96-3

| Package | level1 | level2 | level3 | level4 | level5 | level6 | Cardinality | Data Type Name |
|---|---|---|---|---|---|---|---|---|
| ProductInformation 96078 | | | | ProductCategory 96080 | | | 1 96082 | BusinessTransactionDocumentProductCategory 96084 |
| | | | | Product 96086 | | | 1 96088 | BusinessTransactionDocumentProduct 96090 |
| BankAccount 96092 | | | | BankAccount 96094 | | | 1 96096 | BusinessTransactionDocumentBankAccount 96098 |
| Item 96100 | | | | Item 96102 | | | 1..n 96104 | CurrentAccountContractCreatedInformationMessageCurrentAccountContractItem 96106 |
| LimitInformation 96108 | | | | | BankAccountLimit 96110 | | 1 96112 | BankAccountLimit 96114 |

FIG. 96-4

| Package | level1 | level2 | level3 | level4 | level5 | level6 | Cardinality | Data Type Name |
|---|---|---|---|---|---|---|---|---|
| | | | | | | BankAccount-LimitTypeCode 96116 | 1 96118 | BankAccountLimitTypeCode 96120 |
| | | | | | | TypeName 96122 | 0..1 96124 | MEDIUM_Name 96126 |
| | | | | | | TypeDescription 96128 | 0..1 96130 | LONG_Description 96132 |
| | | | | | | Amount 96134 | 1 96136 | Amount 96138 |
| | | | | | | ValidityStart-DateTime 96140 | 1 96142 | GLOBAL_DateTime 96144 |
| | | | | | | ValidityEnd-DateTime 96146 | 0..1 96148 | GLOBAL_DateTime 96150 |

FIG. 97-1

| Package | level1 | level2 | level3 | level4 | Cardinality | Data Type Name |
|---|---|---|---|---|---|---|
| CurrentAccountContractReactivatedInformationMessage 97000 | CurrentAccountContractReactivatedInformationMessage 97002 | | | | | CurrentAccountContractReactivatedInformationMessage 97004 |
| MessageHeader 97006 | | MessageHeader 97008 | | | 1 97010 | BusinessDocumentMessageHeader 97012 |
| CurrentAccountContract 97014 | | CurrentAccountContract 97016 | | | 1 97018 | CurrentAccountContractReactivatedInformationMessageCurrentAccount 97020 |
| | | | ID 97022 | | 1 97024 | BankAccountContractID 97026 |
| | | | StartDate 97028 | | 1 97030 | GLOBAL_DateTime 97032 |
| | | | ChangeValidityStartDateTime 97034 | | 1 97036 | GLOBAL_DateTime 97038 |

FIG. 97-2

| Package | level1 | level2 | level3 | level4 | Cardinality | Data Type Name |
|---|---|---|---|---|---|---|
| BankAccount 97040 | | | | BankAccount 97042 | 1 97044 | BusinessTransactionDocument-BankAccount 97046 |

FIG. 98-1

| Package | level1 | level2 | level3 | level4 | level5 | Cardinality | Data Type Name |
|---|---|---|---|---|---|---|---|
| CurrentAccountContractReactivatedBulkInformationMessage 98000 | CurrentAccountContractReactivatedBulkInformationMessage 98002 | | | | | | CurrentAccountContractReactivatedBulkInformationMessage 98004 |
| MessageHeader 98006 | | MessageHeader 98008 | | | | 1 98010 | BusinessDocumentMessageHeader 98012 |
| CurrentAccountContractReactivatedInformationMessage 98014 | | CurrentAccountContractReactivatedInformationMessage 98016 | | | | 1..n 98018 | BankAccountContractReactivatedInformationMessage 98020 |
| MessageHeader 98022 | | | MessageHeader 98024 | | | 1 98026 | BusinessDocumentMessageHeader 98028 |
| CurrentAccountContract 98030 | | | CurrentAccountContract 98032 | | | 1 98034 | CurrentAccountContractReactivatedInformationMessageCurrentAccountContract 98036 |

FIG. 98-2

| Package | level1 | level2 | level3 | level4 | level5 | Cardinality | Data Type Name |
|---|---|---|---|---|---|---|---|
| | | | | ID 98038 | | 1 98040 | BankAccountContractID 98042 |
| | | | | StartDate 98044 | | 1 98046 | GLOBAL_DateTime 98048 |
| | | | | ChangeValid-ityStartDateTime 98050 | | 1 98052 | GLOBAL_DateTime 98054 |
| BankAccount 98056 | | | | | BankAccount 98058 | 1 98060 | BusinessTransactionDocu-mentBankAccount 98062 |

FIG. 99-1

| Package | level1 | level2 | level3 | level4 | Cardinality | Data Type Name |
|---|---|---|---|---|---|---|
| CurrentAccountContractCurrencyChangedInformationMessage 99000 | CurrentAccountContractCurrencyChangedInformationMessage 99002 | | | | | CurrentAccountContractCurrencyChangedInformationMessage 99004 |
| MessageHeader 99006 | | MessageHeader 99008 | | | 1 99010 | BusinessDocumentMessageHeader 99012 |
| CurrentAccountContract 99014 | | CurrentAccountContract 99016 | | | 1 99018 | CurrentAccountContractCurrencyChangedInformationMessageCurrentAccountContract 99020 |
| | | | ID 99022 | | 1 99024 | BankAccountContractID 99026 |
| | | | StartDate 99028 | | 1 99030 | Date 99032 |

FIG. 99-2

| Package | level1 | level2 | level3 | level4 | Cardinality | Data Type Name |
|---|---|---|---|---|---|---|
| | | | ChangeValidityStart-DateTIme 99034 | | 1 99036 | GLOBAL_DateTime 99038 |
| | | | CurrencyCode 99040 | | 1 99042 | CurrencyCode 99044 |
| BankAccount 99046 | | | | BankAccount 99048 | 1 99050 | BusinessTransactionDocument-BankAccount 99052 |

FIG. 100-1

| Package | level1 | level2 | level3 | level4 | level5 | Cardinality | Data Type Name |
|---|---|---|---|---|---|---|---|
| CurrentAccountContractCurrencyChangedBulkInformationMessage 100000 | CurrentAccountContractCurrencyChangedBulkInformationMessage 100002 | | | | | 1 100004 | CurrentAccountContractCurrencyChangedInformationMessages 100006 |
| MessageHeader 100008 | | MessageHeader 100010 | | | | 1 100012 | BusinessDocumentMessageHeader 100014 |
| CurrentAccountContractCurrencyChangedInformationMessage 100016 | | CurrentAccountContractCurrencyChangedInformationMessage 100018 | | | | 1..n 100020 | CurrentAccountContractCurrencyChangedInformationMessage 100022 |
| MessageHeader 100024 | | | MessageHeader 100026 | | | 1 100028 | BusinessDocumentMessageHeader 100030 |
| CurrentAccountContract 100032 | | | CurrentAccountContract 100034 | | | 1 100036 | CurrentAccountContractCurrencyChangedInformationMessageCurrentAccountContract 100038 |

FIG. 100-2

| Package | level1 | level2 | level3 | level4 | level5 | Cardinality | Data Type Name |
|---|---|---|---|---|---|---|---|
| | | | | ID 100040 | | 1 100042 | BankAccountContractID 100044 |
| | | | | StartDate 100046 | | 1 100048 | Date 100050 |
| | | | | ChangeValid-ityStartDateTIme 100052 | | 1 100054 | GLOBAL_DateTime 100056 |
| | | | | CurrencyCode 100058 | | 1 100060 | CurrencyCode 100062 |
| BankAccount 100064 | | | | | BankAc-count 100066 | 1 100068 | BusinessTransactionDocument-BankAccount 100070 |

FIG. 101-1

| Package | level1 | level2 | level3 | Cardinality | Data Type Name |
|---|---|---|---|---|---|
| CurrentAccountContractAccountHolderPartyChangedInformationMessage 101000 | CurrentAccountContractAccountHolderPartyChangedInformationMessage 101002 | | | 1 101004 | CurrentAccountContractAccountHolderPartyChangedInformationMessage 101006 |
| MessageHeader 101008 | | MessageHeader 101010 | | 1 101012 | BusinessDocumentMessageHeader 101014 |
| CurrentAccountContract 101016 | | CurrentAccount-Contract 101018 | | 1 101020 | CurrentAccountContractAccountHolderPartyChangedInformationMessageCurrentAccountContract 101022 |
| | | | ID 101024 | 1 101026 | BankAccountContractID 101028 |
| | | | StartDate 101030 | 1 101032 | Date 101034 |
| | | | ChangeValidityStart-DateTIme 101036 | 1 101038 | GLOBAl_DateTime 101040 |

FIG. 101-2

| Package | level1 | level2 | level3 | Cardinality | Data Type Name |
|---|---|---|---|---|---|
| Party 101042 | | | AccountHolderParty 101044 | 1 101046 | BusinessTransactionDocumentParty 101048 |
| BankAccount 101050 | | | BankAccount 101052 | 1 101054 | BusinessTransactionDocumentBankAccount 101056 |

FIG. 102-1

| Package | level1 | level2 | level3 | level4 | Cardinality | Data Type Name |
|---|---|---|---|---|---|---|
| CurrentAccountContractHolderPartyChanged-BulkInformationMessage 102000 | CurrentAccountContractHolderPartyChanged-BulkInformationMessage 102002 | | | | 1 102004 | CurrentAccountContractAccountHolderPartyChangedBulkInformationMessage 102006 |
| MessageHeader 102008 | | MessageHeader 102010 | | | 1 102012 | BusinessDocumentMessage-Header 102014 |
| CurrentAccountContractHolderPartyChangedInformationMessage 102016 | | CurrentAccountContractAccountHolderPartyChangedInformationMessage 102018 | | | 1..n 102020 | CurrentAccountContractAccountHolderPartyChangedInformationMessage 102022 |
| MessageHeader 102024 | | | Message-Header 102026 | | 1 102028 | BusinessDocumentMessage-Header 102030 |
| CurrentAccountContract 102032 | | | CurrentAccountContract 102034 | | 1 102036 | CurrentAccountContractAccountHolderPartyChangedInformationMessageCurrentAccountContract 102038 |

FIG. 102-2

| Package | level1 | level2 | level3 | level4 | Cardinality | Data Type Name |
|---|---|---|---|---|---|---|
| | | | | ID 102040 | 1 102042 | BankAccountContractID 102044 |
| | | | | StartDate 102046 | 1 102048 | Date 102050 |
| | | | | ChangeValid-ityStartDateTIme 102052 | 1 102054 | GLOBAl_DateTime 102056 |
| Party 102058 | | | | AccountHolderParty 102060 | 1 102062 | BusinessTransactionDocument-Party 102064 |
| | | | | AdditionalAccount-HolderParty 102066 | 0..n 102068 | BusinessTransactionDocument-Party 102070 |
| BankAccount 102072 | | | | BankAccount 102074 | 1 102076 | BusinessTransactionDocument-BankAccount 102078 |

FIG. 103-1

| Package | level1 | level2 | level3 | level4 | level5 | Cardinality | Data Type Name |
|---|---|---|---|---|---|---|---|
| CurrentAccountContractItemLimitChangedInformationMessage 103000 | CurrentAccountContractItemLimitChangedInformationMessage 103002 | | | | | 1 103004 | CurrentAccountContractsItemLimitChangedInformationMessage 103006 |
| MessageHeader 103008 | | MessageHeader 103010 | | | | 1 103012 | BusinessDocumentMessageHeader 103014 |
| BankAccountContract 103016 | | CurrentAccountContract 103018 | | | | 1 103020 | CurrentAccountContractItemLimitChangedInformationMessageCurrentAccountContract 103022 |
| | | | ID 103024 | | | 1 103026 | BankAccountContractID 103028 |
| | | | StartDate 103030 | | | 1 103032 | Date 103034 |

FIG. 103-2

| Package | | level1 | level2 | level3 | level4 | level5 | Cardinality | Data Type Name |
|---|---|---|---|---|---|---|---|---|
| BankAccount 103036 | | | | BankAccount 103038 | | | 1 103040 | BusinessTransactionDocument-BankAccount 103042 |
| Item 103044 | | | | Item 103046 | | | 1..n 103048 | CurrentAccountContractItemLimitChangedInformationMessageCurrentAccountContractItem 103050 |
| | LimitInformation 103052 | | | | BankAccount-Limit 103054 | | 1 103056 | BankAccountLimit 103058 |
| | | | | | | BankAccount-LimitTypeCode 103060 | 1 103062 | BankAccountLimitTypeCode 103064 |
| | | | | | | TypeName 103066 | 0..1 103068 | MEDIUM_Name 103070 |

FIG. 103-3

| Package | level1 | level2 | level3 | level4 | level5 | Cardinality | Data Type Name |
|---|---|---|---|---|---|---|---|
| | | | | | TypeDescription 103072 | 0..1 103074 | LONG_Description 103076 |
| | | | | | Amount 103078 | 1 103080 | Amount 103082 |
| | | | | | ValidityStart-DateTime 103084 | 1 103086 | GLOBAL_DateTime 103088 |
| | | | | | ValidityEnd-DateTime 103090 | 0..1 103092 | GLOBAL_DateTime 103094 |

FIG. 104-1

| Package | level1 | level2 | level3 | level4 | level5 | level6 | Cardinality | Data Type Name |
|---|---|---|---|---|---|---|---|---|
| CurrentAccountContractItemLimitChangedBulkInformationMessage 104000 | CurrentAccountContractItemLimitChangedBulkInformationMessage 104002 | | | | | | 1 104004 | CurrentAccountContractItemLimitChangedBulkInformationMessage 104006 |
| MessageHeader 104008 | | MessageHeader 104010 | | | | | 1 104012 | BusinessDocumentMessageHeader 104014 |
| CurrentAccountContractItemLimitChangedInformationMessage 104016 | | CurrentAccountContractItemLimitChangedInformationMessage 104018 | | | | | 1..n 104020 | CurrentAccountContractItemLimitChangedInformationMessage 104022 |
| MessageHeader 104024 | | | MessageHeader 104026 | | | | 1 104028 | BusinessDocumentMessageHeader 104030 |

FIG. 104-2

| Package | level1 | level2 | level3 | level4 | level5 | level6 | Cardinality | Data Type Name |
|---|---|---|---|---|---|---|---|---|
| BankAccountContract 104032 | | | CurrentAccountContract 104034 | | | | 1 104036 | CurrentAccountContractItemLimitChangedInformationMessageCurrentAccountContract 104038 |
| | | | | ID 104040 | | | 1 104042 | BankAccountContractID 104044 |
| | | | | StartDate 104046 | | | 1 104048 | Date 104050 |
| BankAccount 104052 | | | | BankAccount 104054 | | | 1 104056 | BusinessTransactionDocumentBankAccount 104058 |

FIG. 104-3

| Package | | level1 | level2 | level3 | level4 | level5 | level6 | Cardinality | Data Type Name |
|---|---|---|---|---|---|---|---|---|---|
| Item 104060 | | | | | Item 104062 | | | 1..n 104064 | CurrentAccountContractItemLimitChangedInformationMessageCurrentAccountContractItem 104066 |
| | LimitInformation 104068 | | | | | BankAccountLimit 104070 | | 1 104072 | BankAccountLimit 104074 |
| | | | | | | | BankAccountLimitTypeCode 104076 | 1 104078 | BankAccountLimitTypeCode 104080 |
| | | | | | | | TypeName 104082 | 0..1 104084 | MEDIUM_Name 104086 |
| | | | | | | | TypeDescription 104088 | 0..1 104090 | LONG_Description 104092 |

FIG. 104-4

| Package | level1 | level2 | level3 | level4 | level5 | level6 | Cardinality | Data Type Name |
|---|---|---|---|---|---|---|---|---|
| | | | | | | Amount 104094 | 1 104096 | Amount 104098 |
| | | | | | | ValidityStartDateTime 104100 | 1 104102 | GLOBAL_DateTime 104104 |
| | | | | | | ValidityEndDateTime 104106 | 0..1 104108 | GLOBAL_DateTime 104110 |

FIG. 105-1

| Package | level1 | level2 | level3 | Cardinality | Data Type Name |
|---|---|---|---|---|---|
| CurrentAccountContract-ProductChangedInformationMessage 105000 | CurrentAccountContract-ProductChangedInformationMessage 105002 | | | | CurrentAccountContractProductChanged-InformationMessage 105004 |
| MessageHeader 105006 | | MessageHeader 105008 | | 1 105010 | BusinessDocumentMessageHeader 105012 |
| CurrentAccountContract 105014 | | CurrentAccount-Contract 105016 | | 1 105018 | CurrentAccountContractProductChangedInformationMessageCurrentAccountContract 105020 |
| | | | ID 105022 | 1 105024 | BankAccountContractID 105026 |
| | | | StartDate 105028 | 1 105030 | Date 105032 |
| | | | ChangeValidityStartDateTime 105034 | 1 105036 | GLOBAL_DateTime 105038 |

FIG. 105-2

| Package | level1 | level2 | level3 | Cardinality | Data Type Name |
|---|---|---|---|---|---|
| ProductInformation 105040 | | | Product 105042 | 1 105044 | BusinessTransactionDocumentProduct 105046 |
| Account 105048 | | | BankAccount 105050 | 1 105052 | BusinessTransactionDocumentBankAc-count 105054 |

FIG. 106-1

| Package | level1 | level2 | level3 | level4 | Cardinality | Data Type Name |
|---|---|---|---|---|---|---|
| CurrentAccountContract-ProductChangedBulkIn-formationMessage 106000 | CurrentAccountCon-tractProductChanged-BulkInformationMessage 106002 | | | | 1 106004 | CurrentAccountContractProduc-tChangedBulkInformationMessage 106006 |
| MessageHeader 106008 | | MessageHeader 106010 | | | 1 106012 | BusinessDocumentMessageHeader 106014 |
| CurrentAccountCon-tractProductChangedIn-formationMessage 106016 | | CurrentAccountCon-tractProduc-tChangedInformation 106018 | | | 1..n 106020 | CurrentAccountContractProduc-tChangedInformationMessage 106022 |
| MessageHeader 106024 | | | Message-Header 106026 | | 1 106028 | BusinessDocumentMessageHeader 106030 |
| CurrentAccountCon-tract 106032 | | | CurrentAc-countContract 106034 | | 1 106036 | CurrentAccountContractProductChangedInformationMessageCurrentAccount-Contract 106038 |

FIG. 106-2

| Package | level1 | level2 | level3 | level4 | Cardinality | Data Type Name |
|---|---|---|---|---|---|---|
| | | | | ID 106040 | 1 106042 | BankAccountContractID 106044 |
| | | | | StartDate 106046 | 1 106048 | Date 106050 |
| | | | | ChangeValid-ityStartDateTime 106052 | 1 106054 | GLOBAL_DateTime 106056 |
| ProductInformation 106058 | | | | Product 106060 | 1 106062 | BusinessTransactionDocumentProduct 106064 |
| Account 106066 | | | | BankAccount 106068 | 1 106070 | BusinessTransactionDocument-BankAccount 106072 |

FIG. 107-1

| Package | level1 | level2 | level3 | Cardinality | Data Type Name |
|---|---|---|---|---|---|
| CurrentAccountContractCancelledInformationMessage 107000 | CurrentAccountContractCancelledInformationMessage 107002 | | | 1 107004 | CurrentAccountContractCancelledInformation-Message 107006 |
| MessageHeader 107008 | | MessageHeader 107010 | | 1 107012 | BusinessDocumentMessageHeader 107014 |
| CurrentAccountContract 107016 | | CurrentAccount-Contract 107018 | | 1 107020 | CurrentAccountContractCancelledInformationMessageCurrentAccountContract 107022 |
| | | | ID 107024 | 1 107026 | BankAccountContractID 107028 |
| | | | StartDate 107030 | 1 107032 | Date 107034 |
| | | | CancellationValidityDateTime 107036 | 1 107038 | GLOBAL_DateTime 107040 |

FIG. 107-2

| Package | level1 | level2 | level3 | Cardinality | Data Type Name |
|---|---|---|---|---|---|
| Account 107042 | | | BankAccount 107044 | 1 107046 | BusinessTransactionDocumentBankAccount 107048 |

FIG. 108-1

| Package | level1 | level2 | level3 | level4 | Cardinality | Data Type Name |
| --- | --- | --- | --- | --- | --- | --- |
| CurrentAccountContractCancelledBulkInformationMessage 108000 | CurrentAccountContractCancelledBulkInformationMessage 108002 | | | | 1 108004 | CurrentAccountContractCancelledBulkInformationMessage 108006 |
| MessageHeader 108008 | | MessageHeader 108010 | | | 1 108012 | BusinessDocumentMessageHeader 108014 |
| CurrentAccountContractCancelledInformationMessage 108016 | | CurrentAccountContractCancelledInformationMessage 108018 | | | 1..n 108020 | CurrentAccountContractCancelledInformationMessage 108022 |
| MessageHeader 108024 | | | MessageHeader 108026 | | 1 108028 | BusinessDocumentMessageHeader 108030 |
| CurrentAccountContract 108032 | | | CurrentAccountContract 108034 | | 1 108036 | CurrentAccountContractCancelledInformationMessageCurrentAccountContract 108038 |

FIG. 108-2

| Package | level1 | level2 | level3 | level4 | Cardinality | Data Type Name |
|---|---|---|---|---|---|---|
| | | | | ID 108040 | 1 108042 | BankAccountContractID 108044 |
| | | | | StartDate 108046 | 1 108048 | Date 108050 |
| | | | | Cancellation-ValidityDateTime 108052 | 1 108054 | GLOBAL_DateTime 108056 |
| Account 108058 | | | | BankAccount 108060 | 1 108062 | BusinessTransactionDocumentBankAccount 108064 |

FIG. 109-1

| Package | level1 | level2 | level3 | level4 | level5 | Cardinality | Data Type Name |
|---|---|---|---|---|---|---|---|
| CollateralConstellationRequestMessage 109000 | Collateral-Constella-tionRe-questMes-sage 109002 | | | | | | Collateral-Constella-tionRe-questMes-sage 109004 |
| MessageHeader 109006 | | Message-Header 109008 | | | | 1 109010 | Business-Document-Message-Header 109012 |
| | | | ID 109014 | | | | Business-Document-MessageID 109016 |
| | | | Creation-DateTime 109018 | | | | DateTime 109020 |
| | | | ... | | | | ... |

FIG. 109-2

| Package | | | | level1 | level2 | level3 | level4 | level5 | Cardinality | Data Type Name |
|---|---|---|---|---|---|---|---|---|---|---|
| | CollateralConstellation 109022 | | | | Collateral-Constellation 109024 | | | | 1 109026 | ndt_CollateralConstellationRequestMessageCollateralConstellation 109028 |
| | | | | | | <Element1> 109030 | | | | <GDTforElement1> 109032 |
| | | | | | | <Element2> 109034 | | | | <GDTforElement2> 109036 |
| | | | | | | | <Element2.1> 109038 | | | <GDTforElement2.1> 109040 |

FIG. 109-3

| Package | | | | level1 | level2 | level3 | level4 | level5 | Cardinality | Data Type Name |
|---|---|---|---|---|---|---|---|---|---|---|
| | | | | | | | <Element2.2> 109042 | | | <GDTforElement2.2> 109044 |
| | | CollateralAgreement 109046 | | | | CollateralAgreement 109048 | | | 0..n 109050 | ndt_CollateralConstellationRequestMessageCollateralConstellationRequestCollateralAgreement 109052 |
| | | | | | | | ID 109054 | | 0..1 109056 | IdentityID 109058 |
| | | | | | | | InternalID 109060 | | 0..1 109062 | BusinessTransactionDocumentID 109064 |

FIG. 109-4

| Package | | | | level1 | level2 | level3 | level4 | level5 | Cardinality | Data Type Name |
|---|---|---|---|---|---|---|---|---|---|---|
| | | | | | | | TypeCode 109066 | | 0..1 109068 | pdt_CollateralAgreement-TypeCode 109070 |
| | | | | | | | ValidityStart-Date 109072 | | 0..1 109074 | Date 109076 |
| | | | | | | | ValidityEnd-Date 109078 | | 0..1 109080 | Date 109082 |
| | | | | | | | Assessment-ValueAmount 109084 | | 0..1 109086 | Amount 109088 |
| | | | | | | | Assess-mentDate 109090 | | 0..1 109092 | Date 109094 |

FIG. 109-5

| Package | | | | level1 | level2 | level3 | level4 | level5 | Cardinality | Data Type Name |
|---|---|---|---|---|---|---|---|---|---|---|
| | | | | | | | Description 109096 | | 0..1 109098 | SHORT_DESCRIPTION 109100 |
| | | | | | | | WidePurposeOfDeclarationIndicator 109102 | | 0..1 109104 | Indicator 109106 |
| | | | FreeAmount 109108 | | | | FreeAmount 109110 | | 0..n 109112 | ndt_CollateralConstellationRequestMessageCollateralConstellationRequestCollateralAgreementFreeAmount 109114 |
| | | | | | | | | PortionID 109116 | 0..1 109118 | CapacitySplitID 109120 |

FIG. 109-6

| Package | | | | level1 | level2 | level3 | level4 | level5 | Cardinality | Data Type Name |
|---|---|---|---|---|---|---|---|---|---|---|
| | | | | | | | | RiskMethod-Code 109122 | 0..1 109124 | RiskLevel-Code 109126 |
| | | | | | | | | Amount 109128 | 0..1 109130 | Amount 109132 |
| | | | LandCharge 109134 | | | | LandCharge 109136 | | 0..1 109138 | ndt_CollateralConstellationRequestMessageCollater-alConstella-tionRequest-CollateralA-greement-LandCharge 109140 |
| | | <Package2> 109142 | | | | <Entity3> 109144 | | | | ... |
| | | | | | | | <Element1> 109146 | | | ... |

FIG. 109-7

| Package | | | | level1 | level2 | level3 | level4 | level5 | Cardinality | Data Type Name |
|---|---|---|---|---|---|---|---|---|---|---|
| | | | | | | | <Element2> 109148 | | | ... |
| | | | | | | | | Collectivity-Indicator 109150 | 0..1 109152 | Indicator 109154 |
| | | | | | | | | CertificateEx-istIndicator 109156 | 0..1 109158 | Indicator 109160 |
| | | | | | | | | CertificateID 109162 | 0..1 109164 | Business-Transaction-DocumentID 109166 |
| | | | | | | | | RegisterRe-cordSerialID 109168 | 0..1 109170 | SerialID 109172 |

FIG. 109-8

| Package | | | | level1 | level2 | level3 | level4 | level5 | Cardinality | Data Type Name |
|---|---|---|---|---|---|---|---|---|---|---|
| | | | | | | | | InterestRate-Percent 109174 | 0..1 109176 | Percentage 109178 |
| | | | | | | | | InterestIncedentalPay-mentPercent 109180 | 0..1 109182 | Percentage 109184 |
| | | | | | | | | InterestPay-mentFre-quencyNum-berValue 109186 | 0..1 109188 | NumberValue 109190 |
| | | | | | | | | InterestPay-mentFre-quencyCode 109192 | 0..1 109194 | InterestPay-mentFre-quencyCode 109196 |

FIG. 109-9

| Package | | | | level1 | level2 | level3 | level4 | level5 | Cardinality | Data Type Name |
|---|---|---|---|---|---|---|---|---|---|---|
| | | | | | | | | InterestCal-culation-StartDate 109198 | 0..1 109200 | Date 109202 |
| | | | | | | | | InterestCapi-talisa-tionYearsNumberValue 109204 | 0..1 109206 | NumberValue 109208 |
| | | RealEstate 109210 | | | | RealEs-tateObject 109212 | | | 0..n 109214 | ndt_CollateralConstellationRequestMes-sageCollat-eralConstel-lationRealEs-tateObject 109216 |
| | | | | | | | ID 109218 | | 0..1 109220 | Business-Transaction-DocumentID 109222 |

FIG. 109-10

| Package | | | | level1 | level2 | level3 | level4 | level5 | Cardinality | Data Type Name |
|---|---|---|---|---|---|---|---|---|---|---|
| | | | | | | | InternalID 109224 | | 0..1 109226 | Business-Transaction-DocumentID 109228 |
| | | | | | | | Category-Code 109230 | | 0..1 109232 | pdt_RealEstateObjectCategoryCode 109234 |
| | | | | | | | TypeCode 109236 | | 0..1 109238 | pdt_RealEstateObjectTypeCode 109240 |
| | | | | | | | Utilization-Code 109242 | | 0..1 109244 | pdt_RealEstateObjectUtili-zationCode 109246 |

FIG. 109-11

| Package | | | | level1 | level2 | level3 | level4 | level5 | Cardinality | Data Type Name |
|---|---|---|---|---|---|---|---|---|---|---|
| | | | | | | | Description 109248 | | 0..1 109250 | SHORT_DESCRIPTION 109252 |
| | | | | | | | MarketValueAmount 109254 | | 0..1 109256 | Amount 109258 |
| | | | | | | | NominalValueAmount 109260 | | 0..1 109262 | Amount 109264 |
| | | | | | | | UnusedValueAmount 109266 | | 0..1 109268 | Amount 109270 |
| | | | | | | | LendingRatePercent 109272 | | 0..1 109274 | Percent 109276 |

FIG. 109-12

| Package | | | | level1 | level2 | level3 | level4 | level5 | Cardinality | Data Type Name |
|---|---|---|---|---|---|---|---|---|---|---|
| | | | | | | | LendingAmount 109278 | | 0..1 109280 | Amount 109282 |
| | | | | | | | LendingLimitAmount 109284 | | 0..1 109286 | Amount 109288 |
| | | | | | | | LendingRangeAmount 109290 | | 0..1 109292 | Amount 109294 |
| | | | | | | | SafetyDiscountCode 109296 | | 0..1 109298 | pdt_RealEstateObjectSafetyDiscountCode 109300 |
| | | | | | | | SafetyDiscountPercent 109302 | | 0..1 109304 | Percent 109306 |

FIG. 109-13

| Package | | | | level1 | level2 | level3 | level4 | level5 | Cardinality | Data Type Name |
|---|---|---|---|---|---|---|---|---|---|---|
| | | | | | | | SafetyDiscountAmount 109308 | | 0..1 109310 | Amount 109312 |
| | | | Address 109314 | | | | Address 109316 | | 0..1 109318 | ndt_CollateralConstellationRequestMessageCollateralConstellationRealEstateObjectAddress 109320 |
| | | | | | | | | Address 109322 | 0..1 109324 | PhysicalAddress 109326 |

FIG. 109-14

| Package | | | | level1 | level2 | level3 | level4 | level5 | Cardinality | Data Type Name |
|---|---|---|---|---|---|---|---|---|---|---|
| | | | Location 109328 | | | | Location 109330 | | 0..1 109332 | ndt_CollateralConstellationRequestMessageCollateralConstellationRealEstateObjectLocation 109334 |
| | | | | | | | | MacroLocationCode 109336 | 0..1 109338 | pdt_RealEstateObjectLocationCode 109340 |
| | | | | | | | | MicroLocationCode 109342 | 0..1 109344 | pdt_RealEstateObjectLocationCode 109346 |

FIG. 109-15

| Package | | | | level1 | level2 | level3 | level4 | level5 | Cardinality | Data Type Name |
|---|---|---|---|---|---|---|---|---|---|---|
| | | | | | | | | TransportConnectionCode 109348 | 0..1 109350 | pdt_RealEstateObjectTransportConnectionCode 109352 |
| | | | | | | | | EnvironmentalConditionCode 109354 | 0..1 109356 | pdt_RealEstateObjectEnvironmentalConditionCode 109358 |
| | | | | | | | | FloodZoneIndicator 109360 | 0..1 109362 | Indicator 109364 |
| | | | | | | | | EarthQuakeZoneIndicator 109366 | 0..1 109368 | Indicator 109370 |

FIG. 109-16

| Package | | | | level1 | level2 | level3 | level4 | level5 | Cardinality | Data Type Name |
|---|---|---|---|---|---|---|---|---|---|---|
| | | | | | | | | Architec-turalConser-vation-AreaIndicator 109372 | 0..1 109374 | Indicator 109376 |
| | | | | | | | | Historic-SiteIndicator 109378 | 0..1 109380 | Indicator 109382 |
| | | | | | | | | ValueImpair-ingFactorsIn-dicator 109384 | 0..1 109386 | Indicator 109388 |
| | | | | | | | | ValueImpair-ingFactorDe-scription 109390 | 0..1 109392 | SHORT_DESCRIPTION 109394 |

FIG. 109-17

| Package | | | | level1 | level2 | level3 | level4 | level5 | Cardinality | Data Type Name |
|---|---|---|---|---|---|---|---|---|---|---|
| | | | Land 109396 | | | | Land 109398 | | 0..1 109400 | ndt_CollateralConstellationRequestMessageCollateralConstellationRealEstateObjectLand 109402 |
| | | | | | | | | LandAreaMeasure 109404 | 0..1 109406 | Measure 109408 |
| | | | | | | | | RentedLandAreaMeasure 109410 | 0..1 109412 | Measure 109414 |
| | | | | | | | | LandCostAmount 109416 | 0..1 109418 | Amount 109420 |

FIG. 109-18

| Package | | | | level1 | level2 | level3 | level4 | level5 | Cardinality | Data Type Name |
|---|---|---|---|---|---|---|---|---|---|---|
| | | | | | | | | LandCost-BaseCode 109422 | 0..1 109424 | pdt_RealEstateObject-LandCost-BaseCode 109426 |
| | | | | | | | | Develop-mentLand-CostAmount 109428 | 0..1 109430 | Amount 109432 |
| | | | | | | | | Develop-mentLand-CostBase-Code 109434 | 0..1 109436 | pdt_RealEstateObject-LandCost-BaseCode 109438 |
| | | | | | | | | Additional-LandCostA-mount 109440 | 0..1 109442 | Amount 109444 |

FIG. 109-19

| Package | | | | level1 | level2 | level3 | level4 | level5 | Cardinality | Data Type Name |
|---|---|---|---|---|---|---|---|---|---|---|
| | | | | | | | | Additional-LandCost-BaseCode 109446 | 0..1 109448 | pdt_RealEstateObject-LandCost-BaseCode 109450 |
| | | | Building 109452 | | | | Building 109454 | | 0..1 109456 | ndt_CollateralConstellationRequestMes-sageCollat-eralConstel-lationRealEs-tateOb-jectBuilding 109458 |
| | | | | | | | | Usab-leAreaMeas-ure 109460 | 0..1 109462 | Measure 109464 |
| | | | | | | | | UsableVolumeMeasure 109466 | 0..1 109468 | Measure 109470 |

FIG. 109-20

| Package | | | | level1 | level2 | level3 | level4 | level5 | Cardinality | Data Type Name |
|---|---|---|---|---|---|---|---|---|---|---|
| | | | | | | | | Residential-AreaMeasure 109472 | 0..1 109474 | Measure 109476 |
| | | | | | | | | SecondaryAreaMeasure 109478 | 0..1 109480 | Measure 109482 |
| | | | | | | | | Other-AreaMeasure 109484 | 0..1 109486 | Measure 109488 |
| | | | | | | | | NumberOf-Building-PartsNumberValue 109490 | 0..1 109492 | NumberValue 109494 |

FIG. 109-21

| Package | | | | level1 | level2 | level3 | level4 | level5 | Cardinality | Data Type Name |
|---|---|---|---|---|---|---|---|---|---|---|
| | | | OwnerParty 109496 | | | | OwnerParty 109498 | | 0..n 109500 | ndt_CollateralConstellationRequestMessageCollateralConstellationRealEstateObjectOwnerParty 109502 |
| | | | | | | | | ID 109504 | 0..1 109506 | Business-Transaction-DocumentID 109508 |
| | | | | | | | | Function-Code 109510 | 0..1 109512 | pdt_RealEstateObjectOwnerFunctionCode 109514 |
| | | | | | | | | Ownership-Numerator-NumberValue 109516 | 0..1 109518 | NumberValue 109520 |

FIG. 109-22

| Package | | | | level1 | level2 | level3 | level4 | level5 | Cardinality | Data Type Name |
|---|---|---|---|---|---|---|---|---|---|---|
| | | | | | | | | Ownership-Denomina-torNumber-Value 109522 | 0..1 109524 | NumberValue 109526 |
| | | | | | | | | Ownership-StartDate 109528 | 0..1 109530 | Date 109532 |
| | | | | | | | | Owner-shipEndDate 109534 | 0..1 109536 | Date 109538 |
| | | Receivable 109540 | | | | Receivable 109542 | | | 0..1 109544 | ndt_CollateralConstella-tionRe-questMes-sageCollat-eralConstel-lationReceiv-able 109546 |

FIG. 109-23

| Package | | | | level1 | level2 | level3 | level4 | level5 | Cardinality | Data Type Name |
|---|---|---|---|---|---|---|---|---|---|---|
| | | | | | | | ID 109548 | | 0..1 109550 | Business-Transaction-DocumentId 109552 |
| | | Charge 109554 | | | | Charge 109556 | | | 0..n 109558 | ndt_CollateralConstellationRequestMessageCollateralConstellationCharge 109560 |
| | | | | | | | ID 109562 | | 0..1 109564 | Business-Transaction-DocumentID 109566 |
| | | | | | | | RealEstateObjectReferenceID 109568 | | 0..1 109570 | Business-Transaction-DocumentID 109572 |

FIG. 109-24

| Package | | | | level1 | level2 | level3 | level4 | level5 | Cardinality | Data Type Name |
|---|---|---|---|---|---|---|---|---|---|---|
| | | | | | | | CollateralA-greemen-tReferenceID 109574 | | 0..1 109576 | Business-Transaction-DocumentID 109578 |
| | | | | | | | Description 109580 | | 0..1 109582 | SHORT_DESCRIPTION 109584 |
| | | | | | | | RankingOr-derNumber-Value 109586 | | 0..1 109588 | NumberValue 109590 |
| | | | | | | | Se-quenceNum-berValue 109592 | | 0..1 109594 | NumberValue 109596 |
| | | | | | | | Registration-Number 109598 | | 0..1 109600 | Business-Transaction-DocumentID 109602 |

FIG. 109-25

| Package | | | | level1 | level2 | level3 | level4 | level5 | Cardinality | Data Type Name |
|---|---|---|---|---|---|---|---|---|---|---|
| | | | | | | | Registration-Date 109604 | | 0..1 109606 | Date 109608 |
| | | | | | | | AssetAmount 109610 | | 0..1 109612 | Amount 109614 |
| | | | | | | | AssetPercent 109616 | | 0..1 109618 | Percent 109620 |
| | | Scope 109622 | | | | Scope 109624 | | | 0..n 109626 | ndt_CollateralConstellationRequestMessageCollateralConstellationScope 109628 |
| | | | | | | | ID 109630 | | 0..1 109632 | Business-Transaction-DocumentID 109634 |

FIG. 109-26

| Package | | | | level1 | level2 | level3 | level4 | level5 | Cardinality | Data Type Name |
|---|---|---|---|---|---|---|---|---|---|---|
| | | | | | | | CollateralA-greemen-tReferenceID 109636 | | 0..1 109638 | Business-Transaction-DocumentID 109640 |
| | | | | | | | Validity-FromDate 109642 | | 0..1 109644 | Date 109646 |
| | | | | | | | ValidityTo-Date 109648 | | 0..1 109650 | Date 109652 |
| | | | | | | | Receivable-Collateraliza-tionPriori-tyNumber-Value 109654 | | 0..1 109656 | NumberValue 109658 |

FIG. 109-27

| Package | | | | level1 | level2 | level3 | level4 | level5 | Cardinality | Data Type Name |
|---|---|---|---|---|---|---|---|---|---|---|
| | | | | | | | AgreementRankingClassNumberValue 109660 | | 0..1 109662 | NumberValue 109664 |
| | | | | | | | SecuredReceivableAmount 109666 | | 0..1 109668 | Amount 109670 |
| | | | | | | | SecuredReceivablePercent 109672 | | 0..1 109674 | Percent 109676 |

FIG. 110-1

| Package | level1 | level2 | level3 | level4 | level5 | level6 | level7 | Cardinality | Data Type Name |
|---|---|---|---|---|---|---|---|---|---|
| CollateralConstellationConfirmation 110000 | Collateral-Constella-tionConfir-mation 110002 | | | | | | | | Collateral-Constella-tionRe-questMes-sage109004 110004 |
| MessageHeader 110006 | | Message-Header 110008 | | | | | | | |
| | | | ID 110010 | | | | | 1 110012 | |
| | | | Creation-DateTime 110014 | | | | | 1 110016 | |
| | | | ... | | | | | | |

FIG. 110-2

| Package | | | | level1 | level2 | level3 | level4 | level5 | level6 | level7 | Cardinality | Data Type Name |
|---|---|---|---|---|---|---|---|---|---|---|---|---|
| | CollateralConstellation 110020 | | | | Collateral-Constella-tion 110022 | | | | | | 1 110024 | ndt_CollateralConstel-lationCon-firmation-Message-Collateral-Constella-tion 110026 |
| | | | | | | <Ele-ment1> 110028 | | | | | ... | |
| | | | | | | <Ele-ment2> 110030 | | | | | ... | |
| | | | | | | | <Ele-ment2.1> 110032 | | | | ... | |

FIG. 110-3

| Package | | | | level1 | level2 | level3 | level4 | level5 | level6 | level7 | Cardinality | Data Type Name |
|---|---|---|---|---|---|---|---|---|---|---|---|---|
| | | | | | | | <Element2.2> 110034 | | | | ... | |
| | | | | | | ID 110036 | | | | | 1 110038 | ndt_CollateralConstellationConfirmationMessageCollateralConstellation 110040 |
| | | | | | | Receivable 110042 | | | | | 1 110044 | BusinessTransactionDocumentID 110046 |
| | | | | | | | ID 110048 | | | | 1 110050 | |

FIG. 110-4

| Package | | | | level1 | level2 | level3 | level4 | level5 | level6 | level7 | Cardinality | Data Type Name |
|---|---|---|---|---|---|---|---|---|---|---|---|---|
| | | | | | | | Referen-celD 110052 | | | | 1..n 110054 | Business-Transac-tionDocu-mentID 110056 |
| | | | | | | RealEstate 110058 | | | | | 1..n 110060 | Business-Transac-tionDocu-mentID 110062 |
| | | | | | | | ID 110064 | | | | 1..n 110066 | |
| | | | | | | | Referen-celD 110068 | | | | 1..n 110070 | Business-Transac-tionDocu-mentID 110072 |

FIG. 110-5

| Package | | | | level1 | level2 | level3 | level4 | level5 | level6 | level7 | Cardinality | Data Type Name |
|---|---|---|---|---|---|---|---|---|---|---|---|---|
| | | | | | | CollateralAgreement 110074 | | | | | 1..n 110076 | BusinessTransactionDocumentID 110078 |
| | | | | | | | ID 110080 | | | | 1..n 110082 | |
| | | | | | | | ReferenceID 110084 | | | | 1..n 110086 | BusinessTransactionDocumentID 110088 |
| | | | | | | Charge 110090 | | | | | 1..n 110092 | BusinessTransactionDocumentID 110094 |

FIG. 110-6

| Package | | | | level1 | level2 | level3 | level4 | level5 | level6 | level7 | Cardinality | Data Type Name |
|---|---|---|---|---|---|---|---|---|---|---|---|---|
| | | | | | | | ID 110096 | | | | 1..n 110098 | |
| | | | | | | | ReferenceID 110100 | | | | 1..n 110102 | BusinessTransactionDocumentID 110104 |
| | | | | | | Scope 110106 | | | | | 1..n 110108 | BusinessTransactionDocumentID 110110 |
| | | | | | | | ID 110112 | | | | 1..n 110114 | |
| | | | | | | | ReferenceID 110116 | | | | 1..n 110118 | BusinessTransactionDocumentID 110120 |

FIG. 110-7

| Package | | | | level1 | level2 | level3 | level4 | level5 | level6 | level7 | Cardinality | Data Type Name |
|---|---|---|---|---|---|---|---|---|---|---|---|---|
| | | | | | | | | | | | 1..n 110122 | Business-Transac-tionDocu-mentID 110124 |
| | | | Log 110126 | | log 110128 | | | | | | 1 110130 | Log 110132 |
| | | | | | | | | <En-tity3.1.1> 110134 | | | ... | |
| | | | | | | | | <En-tity3.1.2> 110136 | | | ... | |
| | | | | | | | | | @<Attribute1> 110138 | | ... | |

FIG. 110-8

| Package | | | | level1 | level2 | level3 | level4 | level5 | level6 | level7 | Cardinality | Data Type Name |
|---|---|---|---|---|---|---|---|---|---|---|---|---|
| | | | | | | | | | <Ele-ment2> 110140 | | ... | |
| | | | | | | | | | | @<Attribut 1> 110142 | ... | |

FIG. 111-1

| Package | | level1 | level2 | level3 | level4 | level5 | Cardi-nality | Data Type Name |
|---|---|---|---|---|---|---|---|---|
| CollateralAgreementByPartyResponse 111000 | | CollateralA-greement-ByPartyRe-sponse 111002 | | | | | | CollateralA-greement-ByPartyRe-sponse 111004 |
| | MessageHeader 111006 | | Message-Header 111008 | | | | 1 111010 | Business-Document-Message-Header 111012 |
| | | | | ID 111014 | | | | Business-Document-MessageID 111016 |
| | | | | Creation-DateTime 111018 | | | | DateTime 111020 |
| | | | | ... | | | | ... |

FIG. 111-2

| Package | | | | | level1 | level2 | level3 | level4 | level5 | Cardinality | Data Type Name |
|---|---|---|---|---|---|---|---|---|---|---|---|
| | CollateralConstellation 111022 | | | | | CollateralConstellation 111024 | | | | 1 111026 | ndt_CollateralConstellationRequestMessageCollateralConstellation 111028 |
| | | | | | | | <Element1> 111030 | | | | <GDTforElement1> 111032 |
| | | | | | | | <Element2> 111034 | | | | <GDTforElement2> 111036 |
| | | | | | | | | <Element2.1> 111038 | | | <GDTforElement2.1> 111040 |
| | | | | | | | | <Element2.2> 111042 | | | <GDTforElement2.2> 111044 |

FIG. 111-3

| Package | | | | | level1 | level2 | level3 | level4 | level5 | Cardinality | Data Type Name |
|---|---|---|---|---|---|---|---|---|---|---|---|
| | | CollateralAgreementByParty 111046 | | | | | CollateralAgreementByParty 111048 | | | 0..n 111050 | t_CollateralAgreementByPartyResponseMessageCollateralAgreementByParty 111052 |
| | | | | | | | | | CollectivityIndicator 111054 | 0..1 111056 | Indicator 111058 |
| | | | | | | | | | CertificateExistIndicator 111060 | 0..1 111062 | Indicator 111064 |
| | | | | | | | | | CertificateId 111066 | 0..1 111068 | BusinessTransactionDocumentID 111070 |

FIG. 111-4

| Package | | | | | level1 | level2 | level3 | level4 | level5 | Cardi-nality | Data Type Name |
|---|---|---|---|---|---|---|---|---|---|---|---|
| | | | | | | | | | RegisterRecordSerialId 111072 | 0..1 111074 | SerialId 111076 |
| | | | | | | | | | InterestRatePercent 111078 | 0..1 111080 | Percentage 111082 |
| | | | | | | | | | InterestIncedentalPaymentPercent 111084 | 0..1 111086 | Percentage 111088 |
| | | | | | | | | | InterestPaymentFrequencyNumberValue 111090 | 0..1 111092 | NumberValue 111094 |

FIG. 111-5

| Package | | | | | level1 | level2 | level3 | level4 | level5 | Cardinality | Data Type Name |
|---|---|---|---|---|---|---|---|---|---|---|---|
| | | | | | | | | | Interest-Payment-Frequency-Code 111096 | 0..1 111098 | Interest-Payment-Frequency-Code 111100 |
| | | | | | | | | | Interest-Calcula-tionStart-Date 111102 | 0..1 111104 | Date 111106 |
| | | | | | | | | | Interest-Capitalisa-tionYearsNumberValue 111108 | 0..1 111110 | Number-Value 111112 |
| | | | RealEstateObject 111114 | | | | RealEs-tateobject 111116 | | | 0..n 111118 | ndt_CollateralAgree-mentByPar-tyRespon-seMes-sageReal-EstateOb-ject 111120 |

FIG. 111-6

| Package | | | | | level1 | level2 | level3 | level4 | level5 | Cardi-nality | Data Type Name |
|---|---|---|---|---|---|---|---|---|---|---|---|
| | | | | | | | | ID 111122 | | 0..1 111124 | Business-Transac-tionDocu-mentID 111126 |
| | | | | | | | | InternalID 111128 | | 0..1 111130 | Business-Transac-tionDocu-mentID 111132 |
| | | | | | | | | Category-Code 111134 | | 0..1 111136 | pdt_RealEstateOb-jectCate-goryCode 111138 |
| | | | | | | | | TypeCode 111140 | | 0..1 111142 | pdt_RealEstateOb-jectType-Code 111144 |

FIG. 111-7

| Package | | | | | level1 | level2 | level3 | level4 | level5 | Cardi-nality | Data Type Name |
|---|---|---|---|---|---|---|---|---|---|---|---|
| | | | | | | | | Utilization-Code 111146 | | 0..1 111148 | pdt_RealEstateObjectU-tilization-Code 111150 |
| | | | | | | | | Description 111152 | | 0..1 111154 | SHORT_DESCRIPTION 111156 |
| | | | | | | | | MarketVal-ueAmount 111158 | | 0..1 111160 | Amount 111162 |
| | | | | | | | | Nominal-ValueA-mount 111164 | | 0..1 111166 | Amount 111168 |
| | | | | | | | | UnusedVal-ueAmount 111170 | | 0..1 111172 | Amount 111174 |

FIG. 111-8

| Package | | | | | level1 | level2 | level3 | level4 | level5 | Cardi-nality | Data Type Name |
|---|---|---|---|---|---|---|---|---|---|---|---|
| | | | | | | | | Lendin-gRatePer-cent 111176 | | 0..1 111178 | Percent 111180 |
| | | | | | | | | LendingA-mount 111182 | | 0..1 111184 | Amount 111186 |
| | | | | | | | | Lend-ingLimitA-mount 111188 | | 0..1 111190 | Amount 111192 |
| | | | | | | | | Lendin-gRangeA-mount 111194 | | 0..1 111196 | Amount 111198 |
| | | | | | | | | SafetyDis-countCode 111200 | | 0..1 111202 | pdt_RealEstateObject-SafetyDis-countCode 111204 |

FIG. 111-9

| Package | | | | | level1 | level2 | level3 | level4 | level5 | Cardinality | Data Type Name |
|---|---|---|---|---|---|---|---|---|---|---|---|
| | | | | | | | | SafetyDiscountPercent 111206 | | 0..1 111208 | Percent 111210 |
| | | | | | | | | SafetyDiscountAmount 111212 | | 0..1 111214 | Amount 111216 |
| | | | | Address 111218 | | | | Address 111220 | | 0..1 111222 | ndt_CollateralConstellationRequestMessageCollateralConstellationRealEstateObjectAddress 111224 |
| | | | | | | | | | Address 111226 | 0..1 111228 | PhysicalAddress 111230 |

FIG. 111-10

| Package | | | | | level1 | level2 | level3 | level4 | level5 | Cardi-nality | Data Type Name |
|---|---|---|---|---|---|---|---|---|---|---|---|
| | | | | Location 111232 | | | | Location 111234 | | 0..1 111236 | ndt_CollateralConstellationRequestMessageCollateralConstellationRealEstateObjectLocation 111238 |
| | | | | | | | | | MacroLocationCode 111240 | 0..1 111242 | pdt_RealEstateObjectLocationCode 111244 |
| | | | | | | | | | MicroLocationCode 111246 | 0..1 111248 | pdt_RealEstateObjectLocationCode 111250 |

FIG. 111-11

| Package | | | | | level1 | level2 | level3 | level4 | level5 | Cardinality | Data Type Name |
|---|---|---|---|---|---|---|---|---|---|---|---|
| | | | | | | | | | TransportConnectionCode 111252 | 0..1 111254 | pdt_RealEstateObjectTransportConnectionCode 111256 |
| | | | | | | | | | EnvironmentalConditionCode 111258 | 0..1 111260 | pdt_RealEstateObjectEnvironmentalConditionCode 111262 |
| | | | | | | | | | FloodZoneIndicator 111264 | 0..1 111266 | Indicator 111268 |
| | | | | | | | | | EarthQuakeZoneIndicator 111270 | 0..1 111272 | Indicator 111274 |

FIG. 111-12

| Package | | | | | level1 | level2 | level3 | level4 | level5 | Cardinality | Data Type Name |
|---|---|---|---|---|---|---|---|---|---|---|---|
| | | | | | | | | | ArchitecturalConservationAreaIndicator 111276 | 0..1 111278 | Indicator 111280 |
| | | | | | | | | | HistoricSiteIndicator 111282 | 0..1 111284 | Indicator 111286 |
| | | | | | | | | | ValueImpairingFactorsIndicator 111288 | 0..1 111290 | Indicator 111292 |
| | | | | | | | | | ValueImpairingFactorDescription 111294 | 0..1 111296 | SHORT_DESCRIPTION 111298 |

FIG. 111-13

| Package | | | | | level1 | level2 | level3 | level4 | level5 | Cardi-nality | Data Type Name |
|---|---|---|---|---|---|---|---|---|---|---|---|
| | | | | Land 111300 | | | | Land 111302 | | 0..1 111304 | ndt_CollateralConstellationRequestMessageCollateralConstellationRealEstateObjectLand 111306 |
| | | | | | | | | | LandAreaMeasure 111308 | 0..1 111310 | Measure 111312 |
| | | | | | | | | | RentedLandAreaMeasure 111314 | 0..1 111316 | Measure 111318 |
| | | | | | | | | | LandCostAmount 111320 | 0..1 111322 | Amount 111324 |

FIG. 111-14

| Package | | | | | level1 | level2 | level3 | level4 | level5 | Cardinality | Data Type Name |
|---|---|---|---|---|---|---|---|---|---|---|---|
| | | | | | | | | | LandCost-BaseCode 111326 | 0..1 111328 | pdt_RealEstateObject-LandCost-BaseCode 111330 |
| | | | | | | | | | Develop-mentLand-CostAmount 111332 | 0..1 111334 | Amount 111336 |
| | | | | | | | | | Develop-mentLand-CostBase-Code 111338 | 0..1 111340 | pdt_RealEstateObject-LandCost-BaseCode 111342 |
| | | | | | | | | | Additional-Land-CostAmount 111344 | 0..1 111346 | Amount 111348 |

FIG. 111-15

| Package | | | | | level1 | level2 | level3 | level4 | level5 | Cardi-nality | Data Type Name |
|---|---|---|---|---|---|---|---|---|---|---|---|
| | | | | | | | | | Additional-LandCost-BaseCode 111350 | 0..1 111352 | pdt_RealEstateObject-LandCost-BaseCode 111354 |
| | | | | Building 111356 | | | | Building 111358 | | 0..1 111360 | ndt_CollateralConstellationRe-questMes-sageCollat-eralConstel-lationReal-EstateOb-jectBuilding 111362 |
| | | | | | | | | | Usab-leAreaMeasure 111364 | 0..1 111366 | Measure 111368 |
| | | | | | | | | | UsableVolumeMeasure 111370 | 0..1 111372 | Measure 111374 |

FIG. 111-16

| Package | | | | | level1 | level2 | level3 | level4 | level5 | Cardi-nality | Data Type Name |
|---|---|---|---|---|---|---|---|---|---|---|---|
| | | | | | | | | | ResidentialAreaMeasure 111376 | 0..1 111378 | Measure 111380 |
| | | | | | | | | | SecondaryAreaMeasure 111382 | 0..1 111384 | Measure 111386 |
| | | | | | | | | | OtherAreaMeasure 111388 | 0..1 111390 | Measure 111392 |
| | | | | | | | | | NumberOfBuildingPartsNumberValue 111394 | 0..1 111396 | NumberValue 111398 |

FIG. 111-17

| Package | | | | | level1 | level2 | level3 | level4 | level5 | Cardi-nality | Data Type Name |
|---|---|---|---|---|---|---|---|---|---|---|---|
| | | | | OwnerParty 111400 | | | | OwnerParty 111402 | | 0..n 111404 | ndt_CollateralConstellationRequestMessage-Collateral-Constella-tionRealEs-tateObjec-tOwnerParty 111406 |
| | | | | | | | | | ID 111408 | 0..1 111410 | Business-Transac-tionDocu-mentID 111412 |
| | | | | | | | | | Function-Code 111414 | 0..1 111416 | pdt_RealEstateObjec-tOwner-Function-Code 111418 |

FIG. 111-18

| Package | | | | | level1 | level2 | level3 | level4 | level5 | Cardinality | Data Type Name |
|---|---|---|---|---|---|---|---|---|---|---|---|
| | | | | | | | | | Ownership-Numerator-Number-Value 111420 | 0..1 111422 | Number-Value 111424 |
| | | | | | | | | | Ownership-Denominator-Number-Value 111426 | 0..1 111428 | Number-Value 111430 |
| | | | | | | | | | Ownership-StartDate 111432 | 0..1 111434 | Date 111436 |
| | | | | | | | | | Ownership-EndDate 111438 | 0..1 111440 | Date 111442 |

FIG. 111-19

| Package | | | | | level1 | level2 | level3 | level4 | level5 | Cardinality | Data Type Name |
|---|---|---|---|---|---|---|---|---|---|---|---|
| | | | | Receivable 111444 | | | Receivable 111446 | | | 0..1 111448 | ndt_CollateralConstellationRequestMessageCollateralConstellationReceivable 111450 |
| | | | | | | | | ID 111452 | | 0..1 111454 | BusinessTransactionDocumentId 111456 |
| | | | RealEstateCharge 111458 | | | | RealEstateCharge 111460 | | | 0..n 111462 | ndt_CollateralAgreementByPartyResponseMessageRealEstateCharge 111464 |

FIG. 111-20

| Package | | | | | level1 | level2 | level3 | level4 | level5 | Cardi-nality | Data Type Name |
|---|---|---|---|---|---|---|---|---|---|---|---|
| | | | | CollateralA-greement 111466 | | | | CollateralA-greement 111468 | | 0..n 111470 | ndt_CollateralAgreementByPartyRe-sponse-MessageReal-EstateChar-geCollatera-lAgreement 111472 |
| | | | | | | | | | ID 111474 | 0..1 111476 | IdentityID 111478 |
| | | | | | | | | | InternalId 111480 | 0..1 111482 | Business-Transac-tionDocu-mentID 111484 |
| | | | | | | | | | TypeCode 111486 | 0..1 111488 | pdt_CollateralAgree-mentType-Code 111490 |

FIG. 111-21

| Package | | | | | level1 | level2 | level3 | level4 | level5 | Cardi-nality | Data Type Name |
|---|---|---|---|---|---|---|---|---|---|---|---|
| | | | | | | | | | Valid-ityStartDate 111492 | 0..1 111494 | Date 111496 |
| | | | | | | | | | Valid-ityEndDate 111498 | 0..1 111500 | Date 111502 |
| | | | | | | | | | Assess-mentVal-ueAmount 111504 | 0..1 111506 | Amount 111508 |
| | | | | | | | | | Assess-mentDate 111510 | 0..1 111512 | Date 111514 |
| | | | | | | | | | Description 111516 | 0..1 111518 | SHORT_DESCRIPTION 111520 |

FIG. 111-22

| Package | | | | | level1 | level2 | level3 | level4 | level5 | Cardinality | Data Type Name |
|---|---|---|---|---|---|---|---|---|---|---|---|
| | | | | | | | | | WidePurposeOfDeclarationIndicator 111522 | 0..1 111524 | Indicator 111526 |
| | | | | Charge 111528 | | | | Charge 111530 | | 0..n 111532 | ndt_CollateralAgreementByPartyResponseMessageRealEstateChargeCharge 111534 |
| | | | | | | | | | ID 111536 | 0..1 111538 | BusinessTransactionDocumentID 111540 |
| | | | | | | | | | RealEstateObjectReferenceID 111542 | 0..1 111544 | BusinessTransactionDocumentID 111546 |

FIG. 111-23

| Package | | | | | level1 | level2 | level3 | level4 | level5 | Cardi-nality | Data Type Name |
|---|---|---|---|---|---|---|---|---|---|---|---|
| | | | | | | | | | CollateralA-greemen-tReferen-ceID 111548 | 0..1 111550 | Business-Transac-tionDocu-mentID 111552 |
| | | | | | | | | | Description 111554 | 0..1 111556 | SHORT_DESCRIPTION 111558 |
| | | | | | | | | | RankingOr-derNum-berValue 111560 | 0..1 111562 | Number-Value 111564 |
| | | | | | | | | | Se-quenceNumberValue 111566 | 0..1 111568 | Number-Value 111570 |
| | | | | | | | | | Registra-tionNumber 111572 | 0..1 111574 | Business-Transac-tionDocu-mentID 111576 |

FIG. 111-24

| Package | | | | | level1 | level2 | level3 | level4 | level5 | Cardi-nality | Data Type Name |
|---|---|---|---|---|---|---|---|---|---|---|---|
| | | | | | | | | | Registra-tionDate 111578 | 0..1 111580 | Date 111582 |
| | | | | | | | | | AssetA-mount 111584 | 0..1 111586 | Amount 111588 |
| | | | | | | | | | AssetPer-cent 111590 | 0..1 111592 | Percent 111594 |
| | | | | Log 111596 | | Log 111598 | | | | 1 111600 | Log 111602 |

MANAGING CONSISTENT INTERFACES FOR BUSINESS OBJECTS ACROSS HETEROGENEOUS SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, software creates, updates and retrieves a cost simulation consisting of cost estimates with various cost sources. The software comprises computer readable instructions embodied on tangible media. The software executes in a landscape of computer systems providing message-based services. The software invokes a cost model business object. The business object is a logically centralized, semantically disjointed object for representing the cost simulation consisting of cost estimates with various cost sources. The business object comprises data logically organized as a cost model root node, a property subordinate node, an item subordinate node and a product cost estimate subordinate node. The item node contains a property subordinate node. The product cost estimate node contains a property subordinate node, a cost component split subordinate node and an item subordinate node. The cost component split node contains an element subordinate node. The element node contains a property subordinate node. The item node contains a property subordinate node and a cost component split subordinate node. The cost component split node contains an element subordinate node. The element node contains a property subordinate node. The software initiates transmission of a message to a heterogeneous second application, executing in the environment of computer systems providing message-based services, based on the data in the cost model business object. The message comprises a cost model create request message entity, a message header package and a cost model package.

In a second aspect, software creates, updates and retrieves a cost simulation consisting of cost estimates with various cost sources. The software comprises computer readable instructions embodied on tangible media. The software executes in a landscape of computer systems providing message-based services. The software initiates transmission of a message to a heterogeneous second application, executing in the environment of computer systems providing message-based services, based on data in a cost model business object invoked by the second application. The business object is a logically centralized, semantically disjointed object for representing the cost simulation consisting of cost estimates with various cost sources. The business object comprises data logically organized as a cost model root node, a property subordinate node, an item subordinate node and a product cost estimate subordinate node. The item node contains a property subordinate node. The product cost estimate node contains a property subordinate node, a cost component split subordinate node and an item subordinate node. The cost component split node contains an element subordinate node. The element node contains a property subordinate node. The item node contains a property subordinate node and a cost component split subordinate node. The cost component split node contains an element subordinate node. The element node contains a property subordinate node. The message comprises a cost model create request message entity, a message header package and a cost model package. The software receives a second message from the second application. The second message is associated with the invoked cost model business object and is in response to the first message.

In a third aspect, a distributed system operates in a landscape of computer systems providing message-based services. The system processes business objects involving creating, updating and retrieving a cost simulation consisting of cost estimates with various cost sources. The system comprises memory and a graphical user interface remote from the memory. The memory stores a business object repository storing a plurality of business objects. Each business object is a logically centralized, semantically disjointed object of a particular business object type. At least one of the business objects represents the cost simulation consisting of cost estimates with various cost sources. The business object comprises data logically organized as a cost model root node, a property subordinate node, an item subordinate node and a product cost estimate subordinate node. The item node contains a property subordinate node. The product cost estimate node contains a property subordinate node, a cost component split subordinate node and an item subordinate node. The cost component split node contains an element subordinate node. The element node contains a property subordinate node. The item node contains a property subordinate node and a cost component split subordinate node. The cost component split node contains an element subordinate node. The element node contains a property subordinate node. The graphical user interface presents data associated with an invoked instance of the cost model business object, the interface comprising computer readable instructions embodied on tangible media.

In a fourth aspect, software creates, updates and retrieves current account contracts in multiple consumer scenarios, including credit facility contracts. The software comprises computer readable instructions embodied on tangible media. The software executes in a landscape of computer systems providing message-based services. The software invokes a current account contract business object. The business object is a logically centralized, semantically disjointed object for representing current account contracts in multiple consumer scenarios, including credit facility contracts. The business object comprises data logically organized as a current account contract root node, an account holder party subordinate node, a product information subordinate node, a bank account subordinate node and an item subordinate node. The item node contains a limit subordinate node. The software initiates transmission of a message to a heterogeneous second application, executing in the environment of computer systems providing message-based services, based on the data in the current account contract business object. The message comprises a current account contract create request message entity, a message header package and a current account contract package.

In a fifth aspect, software creates, updates and retrieves current account contracts in multiple consumer scenarios, including credit facility contracts. The software comprises computer readable instructions embodied on tangible media. The software executes in a landscape of computer systems providing message-based services. The software initiates transmission of a message to a heterogeneous second application, executing in the environment of computer systems providing message-based services, based on data in a current account contract business object invoked by the second application. The business object is a logically centralized, semantically disjointed object for representing current account contracts in multiple consumer scenarios, including credit facility contracts. The business object comprises data logically organized as a current account contract root node, an account holder party subordinate node, a product information subordinate node, a bank account subordinate node and an item subordinate node. The item node contains a limit subordinate node. The message comprises a current account contract create request message entity, a message header package and a current account contract package. The software receives a second message from the second application. The second message is associated with the invoked current account contract business object and is in response to the first message.

In a sixth aspect, a distributed system operates in a landscape of computer systems providing message-based services. The system processes business objects involving creating, updating and retrieving current account contracts in multiple consumer scenarios, including credit facility contracts. The system comprises memory and a graphical user interface remote from the memory. The memory stores a business object repository storing a plurality of business objects. Each business object is a logically centralized, semantically disjointed object of a particular business object type. At least one of the business objects is for representing current account contracts in multiple consumer scenarios, including credit facility contracts. The business object comprises data logically organized as a current account contract root node, an account holder party subordinate node, a product information subordinate node, a bank account subordinate node and an item subordinate node. The item node contains a limit subordinate node. The graphical user interface presents data associated with an invoked instance of the current account contract business object, the interface comprising computer readable instructions embodied on tangible media.

In a seventh aspect, software creates, updates and retrieves a group of multiple collateral agreements, each collateral agreement involving multiple loan contracts. The software comprises computer readable instructions embodied on tangible media. The software executes in a landscape of computer systems providing message-based services. The software invokes a collateral constellation business object. The business object is a logically centralized, semantically disjointed object that represents a group of multiple collateral agreements, each collateral agreement involving multiple loan contracts. The business object comprises data logically organized as a collateral constellation root node, a collateral agreement subordinate node, a real estate subordinate node, a receivable subordinate node, a charge subordinate node and a scope subordinate node. The collateral agreement node contains a free amount subordinate node and a land charge subordinate node. The real estate node contains an address subordinate node, a location subordinate node, a land subordinate node, a building subordinate node and an owner party subordinate node. The software initiates transmission of a message to a heterogeneous second application, executing in the environment of computer systems providing message-based services, based on the data in the collateral constellation business object. The message comprises a collateral constellation request message entity, a message header package and a collateral constellation package.

In an eighth aspect, software creates, updates and retrieves a group of multiple collateral agreements, each collateral agreement involving multiple loan contracts. The software comprises computer readable instructions embodied on tangible media. The software executes in a landscape of computer systems providing message-based services. The software initiates transmission of a message to a heterogeneous second application, executing in the environment of computer systems providing message-based services, based on data in a collateral constellation business object invoked by the second application. The business object is a logically centralized, semantically disjointed object that represents a group of multiple collateral agreements, each collateral agreement involving multiple loan contracts. The business object comprises data logically organized as a collateral constellation root node, a collateral agreement subordinate node, a real estate subordinate node, a receivable subordinate node, a charge subordinate node and a scope subordinate node. The collateral agreement node contains a free amount subordinate node and a land charge subordinate node. The real estate node contains an address subordinate node, a location subordinate node, a land subordinate node, a building subordinate node and an owner party subordinate node. The message comprises a collateral constellation request message entity, a message header package and a collateral constellation package. The software receives a second message from the second application. The second message is associated with the invoked collateral constellation business object and is in response to the first message.

In a ninth aspect, a distributed system operates in a landscape of computer systems providing message-based services. The system processes business objects involving creating, updating and retrieving a group of multiple collateral agreements, each collateral agreement involving multiple loan contracts. The system comprises memory and a graphical user interface remote from the memory. The memory stores a business object repository storing a plurality of business objects. Each business object is a logically centralized, semantically disjointed object of a particular business object type. At least one of the business objects is for that represents a group of multiple collateral agreements, each collateral agreement involving multiple loan contracts. The business object comprises data logically organized as a collateral constellation root node, a collateral agreement subordinate node, a real estate subordinate node, a receivable subordinate node, a charge subordinate node and a scope subordinate node. The collateral agreement node contains a free amount subordinate node and a land charge subordinate node. The real estate node contains an address subordinate node, a location subordinate node, a land subordinate node, a building subordinate node and an owner party subordinate node. The graphical user interface presents data associated with an invoked instance of the collateral constellation business object, the interface comprising computer readable instructions embodied on tangible media.

BRIEF DESCRIPTION OF THE DRAWINGS

FIGS. 27A-E depict a hierarchization process in accordance with methods and systems consistent with the subject matter described herein.

FIGS. 35-1 through 35-6 show an exemplary CostModelMessage_sync Message Data Type.

FIGS. 42-1 through 42-6 show an exemplary CostModelByIDResponseMessage_sync Message Data Type.

FIGS. 48-1 through 48-6 show an exemplary CostModelMessage Message Data Type.

FIGS. 49-1 through 49-2 show an exemplary CostModelCreateRequestMessage_sync Element Structure.

FIGS. 50-1 through 50-2 show an exemplary CostModelCreateConfirmationMessage_sync Element Structure.

FIGS. 51-1 through 51-6 show an exemplary CostModelUpdateRequestMessage_sync Element Structure.

FIGS. 52-1 through 52-5 show an exemplary CostModelUpdateConfirmationMessage_sync Element Structure.

FIG. 53 shows an exemplary CostModelCancelRequestMessage_sync Element Structure.

FIGS. 54-1 through 54-2 show an exemplary CostModelCancelConfirmationMessage_sync Element Structure.

FIG. 55 shows an exemplary CostModelByIDQuery_sync Element Structure.

FIGS. 56-1 through 56-10 show an exemplary CostModelByIDResponseMessage_sync Element Structure.

FIGS. 57-1 through 57-2 show an exemplary CostModelERPSimpleByElementsQueryMessage_sync Element Structure.

FIGS. 58-1 through 58-2 show an exemplary CostModelERPSimpleByElementsResponseMessage_sync Element Structure.

FIGS. 59-1 through 59-2 show an exemplary CostModelERPProductCostEstimateByProductCostEstimateElementsQueryMessag_sync Element Structure.

FIGS. 60-1 through 60-2 show an exemplary CostModelERPProductCostEstimateByProductCostEstimateElementResponseMessage_sync Element Structure.

FIGS. 61-1 through 61-10 show an exemplary CostModelMessage Element Structure.

FIGS. 79-1 through 79-2 show an exemplary CurrentAccountContractCreateRequest_sync Element Structure.

FIGS. 80-1 through 80-2 show an exemplary CurrentAccountContractCreateConfirmation_sync Element Structure.

FIGS. 81-1 through 81-2 show an exemplary CurrentAccountContractUsageNoteChangeRequest_sync Element Structure.

FIGS. 82-1 through 82-2 show an exemplary CurrentAccountContractUsageNoteChangeConfirmation_sync Element Structure.

FIGS. 83-1 through 83-3 show an exemplary CurrentAccountContractItemLimitChangeRequest_sync Element Structure.

FIGS. 84-1 through 84-2 show an exemplary CurrentAccountContractLimitsChangeConfirmation_sync Element Structure.

FIGS. 85-1 through 85-2 show an exemplary CurrentAccountContractAuthorizedDrawerPartyAssignmentChangeRequest_sync Element Structure.

FIGS. 86-1 through 86-2 show an exemplary CurrentAccountContractAuthorizedDrawerPartyAssignmentChangeConfirmation_sync Element Structure.

FIGS. 87-1 through 87-2 show an exemplary CurrentAccountContractItemLimitByElementsQuery_sync Element Structure.

FIGS. 88-1 through 88-2 show an exemplary CurrentAccountContractItemLimitByElementsResponse_sync Element Structure.

FIGS. 89-1 through 89-2 show an exemplary CurrentAccountContractBasicDataByElementsQuery_sync Element Structure.

FIGS. 90-1 through 90-2 show an exemplary CurrentAccountContractBasicDataByElementsResponse_sync Element Structure.

FIGS. 91-1 through 91-2 show an exemplary CurrentAccountContractAuthorizedDrawerPartyAssignmentByElementsQuery_sync Element Structure.

FIGS. 92-1 through 92-2 show an exemplary CurrentAccountContractAuthorizedDrawerByElementsResponse_sync Element Structure.

FIGS. 93-1 through 93-2 show an exemplary CurrentAccountContractBasicDataByBasicDataQuery_sync Element Structure.

FIGS. 94-1 through 94-3 show an exemplary CurrentAccountContractBasicDataByBasicDataResponse_sync Element Structure.

FIGS. 95-1 through 95-4 show an exemplary CurrentAccountContractCreatedInformationMessage Element Structure.

FIGS. 96-1 through 96-4 show an exemplary CurrentAccountContractCreatedBulkInformation Element Structure.

FIGS. 97-1 through 97-2 show an exemplary CurrentAccountContractReactivatedInformationMessage Element Structure.

FIGS. 98-1 through 98-2 show an exemplary CurrentAccountContractReactivatedBulkInformationMessage Element Structure.

FIGS. 99-1 through 99-2 show an exemplary CurrentAccountContractCurrencyChangedInformationMessage Element Structure.

FIGS. 100-1 through 100-2 show an exemplary CurrentAccountContractCurrencyChangedBulkInformationMessage Element Structure.

FIGS. 101-1 through 101-2 show an exemplary CurrentAccountContractAccountHolderPartyChangedInformationMessage Element Structure.

FIGS. 102-1 through 102-2 show an exemplary CurrentAccountContractAccountHolderPartyChangedBulkInformationMessage Element Structure.

FIGS. 103-1 through 103-3 show an exemplary CurrentAccountContractItemLimitChangedInformationMessage Element Structure.

FIGS. 104-1 through 104-4 show an exemplary CurrentAccountContractItemLimitChangedBulkInformationMessage Element Structure.

FIGS. 105-1 through 105-2 show an exemplary CurrentAccountContractProductChangedInformationMessage Element Structure.

FIGS. 106-1 through 106-2 show an exemplary CurrentAccountContractProductChangedBulkInformationMessage Element Structure.

FIGS. 107-1 through 107-2 show an exemplary CurrentAccountContractCancelledInformationMessage Element Structure.

FIGS. 108-1 through 108-2 show an exemplary CurrentAccountContractCancelledBulkInformationMessage Element Structure.

FIGS. 109-1 through 109-27 show an exemplary CollateralConstellationRequestMessage Element Structure.

FIGS. 110-1 through 1 10-8 show an exemplary CollateralConstellationConfirmation Element Structure.

FIGS. 111-1 through 111-24 show an exemplary CollateralAgreementByPartyResponse Element Structure.

DETAILED DESCRIPTION

Overview

Figure 1:
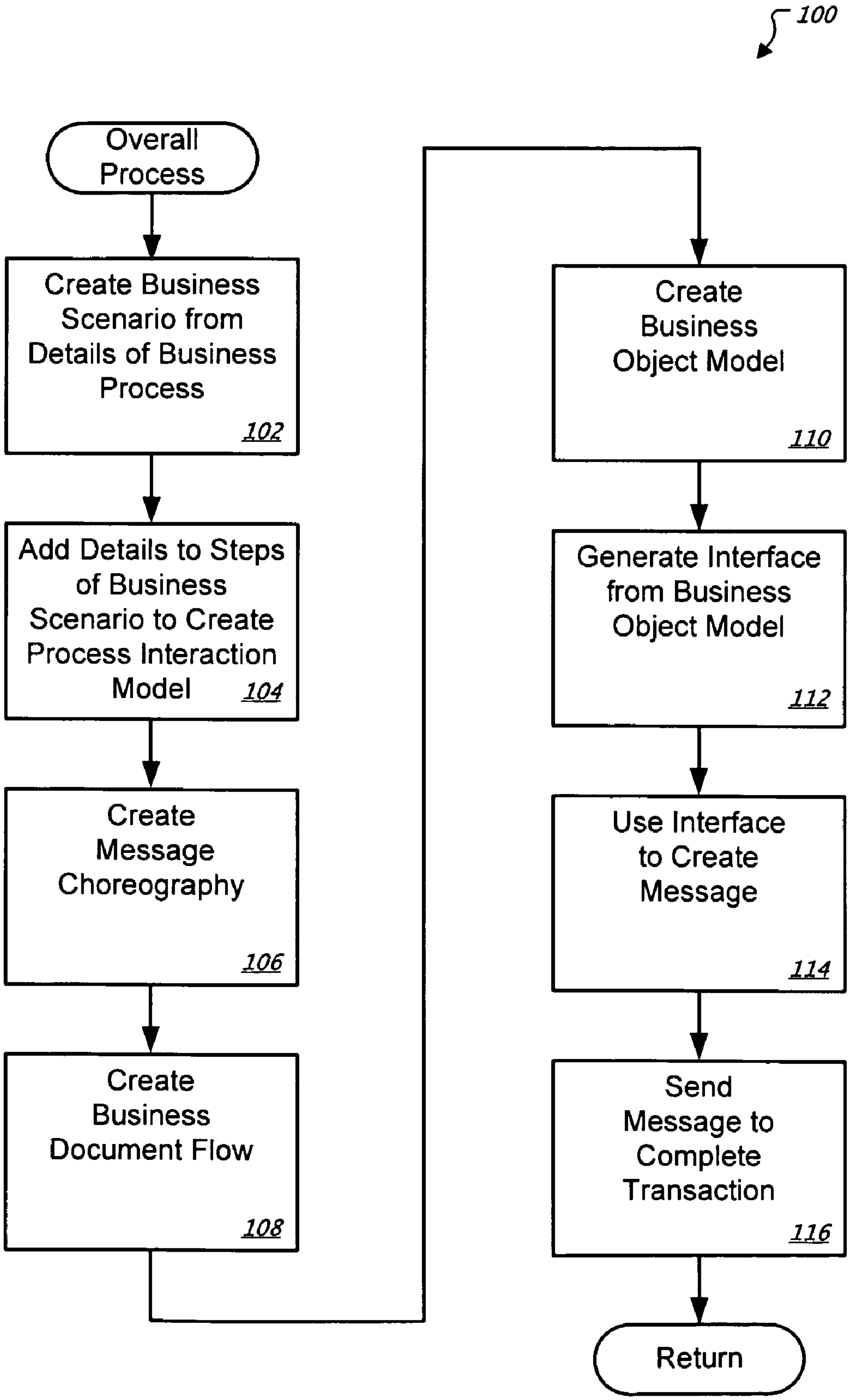
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
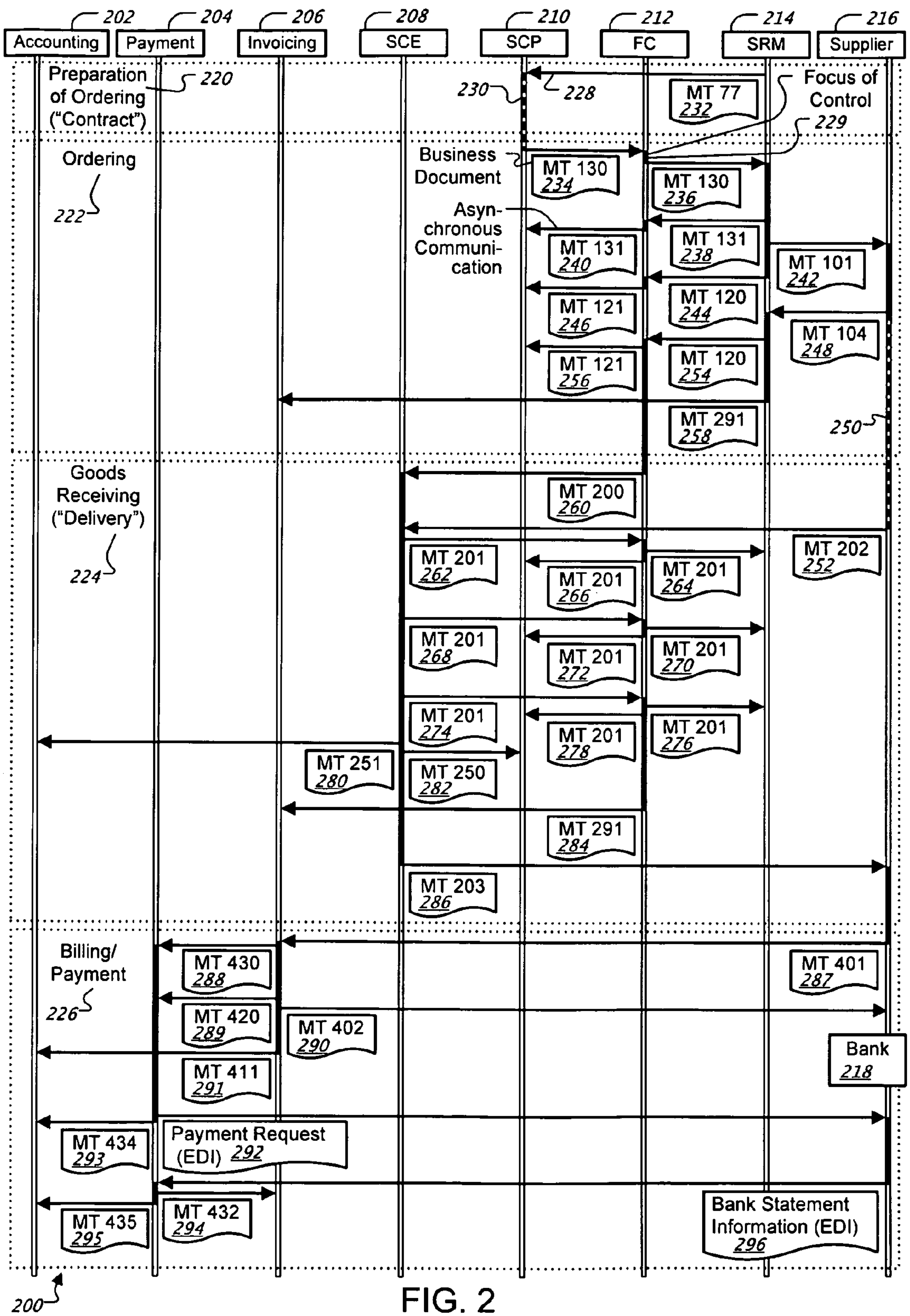
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
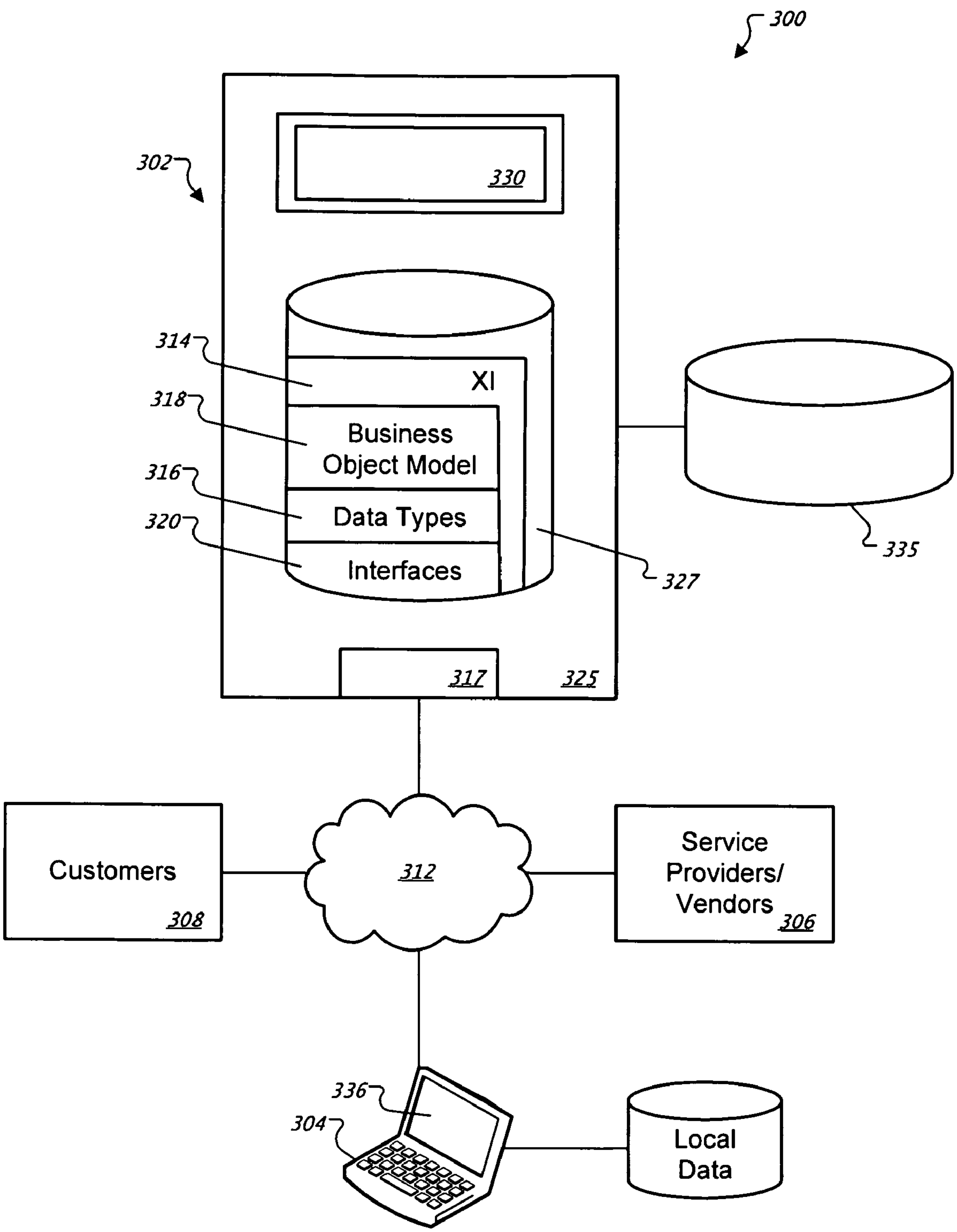
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)TM and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
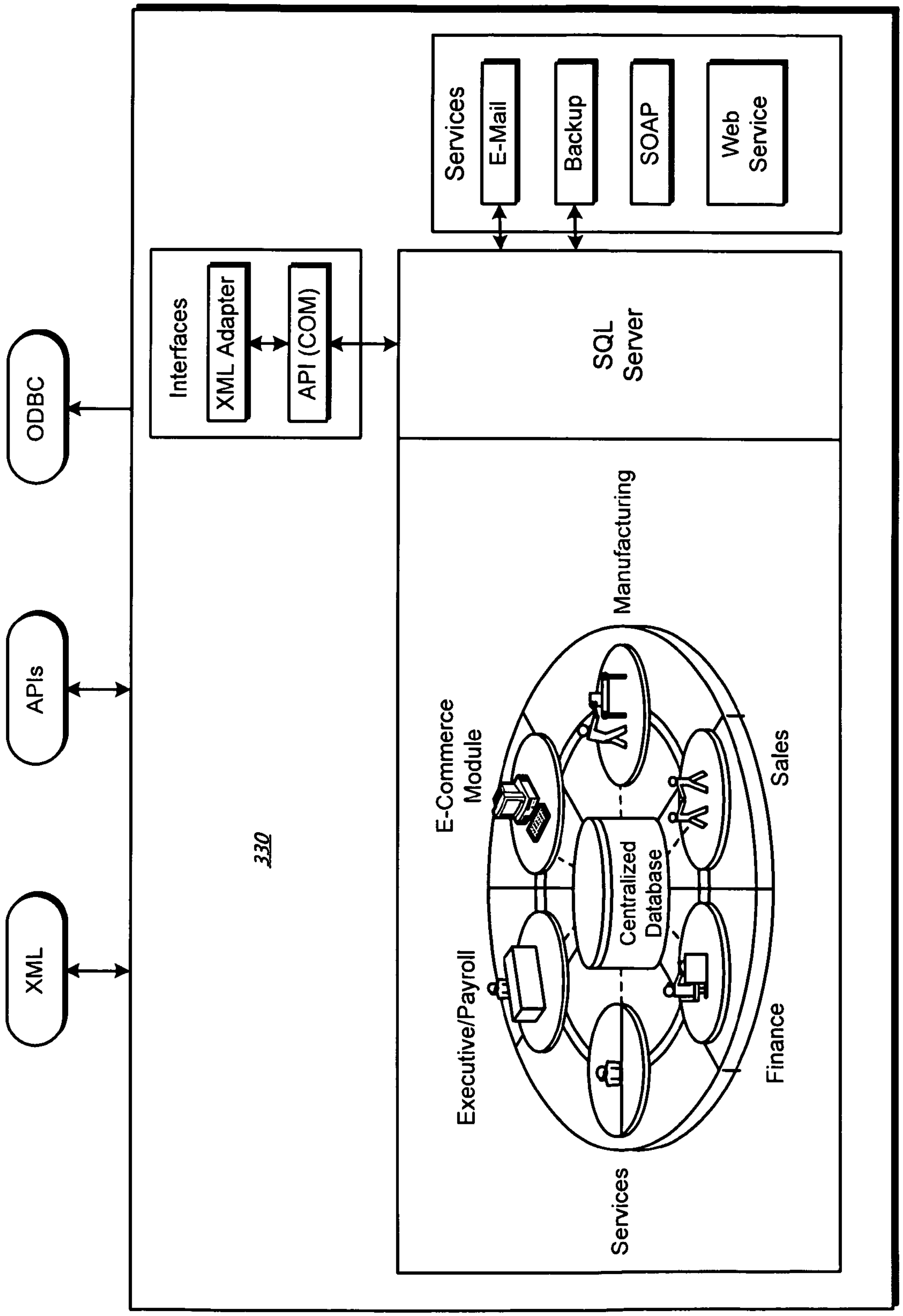
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
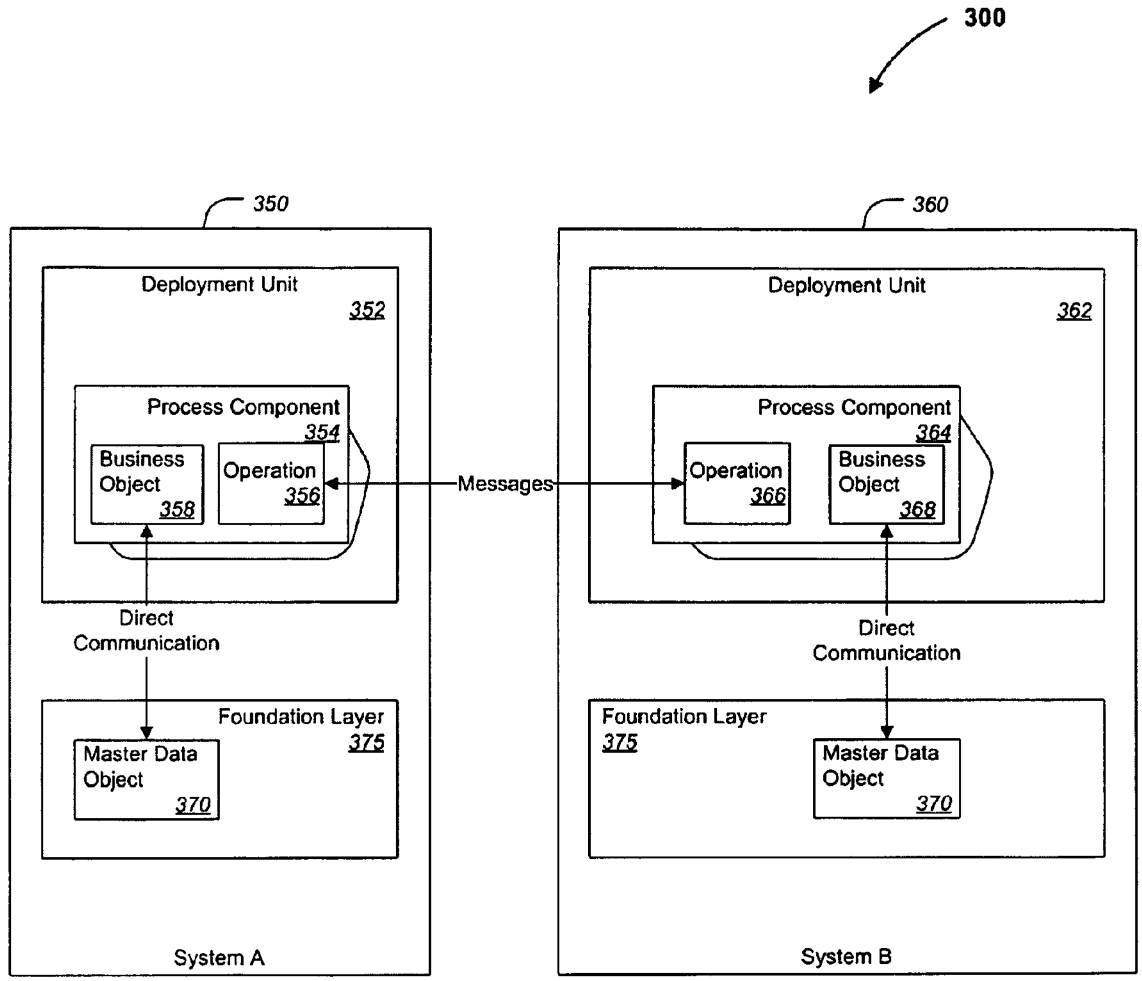

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
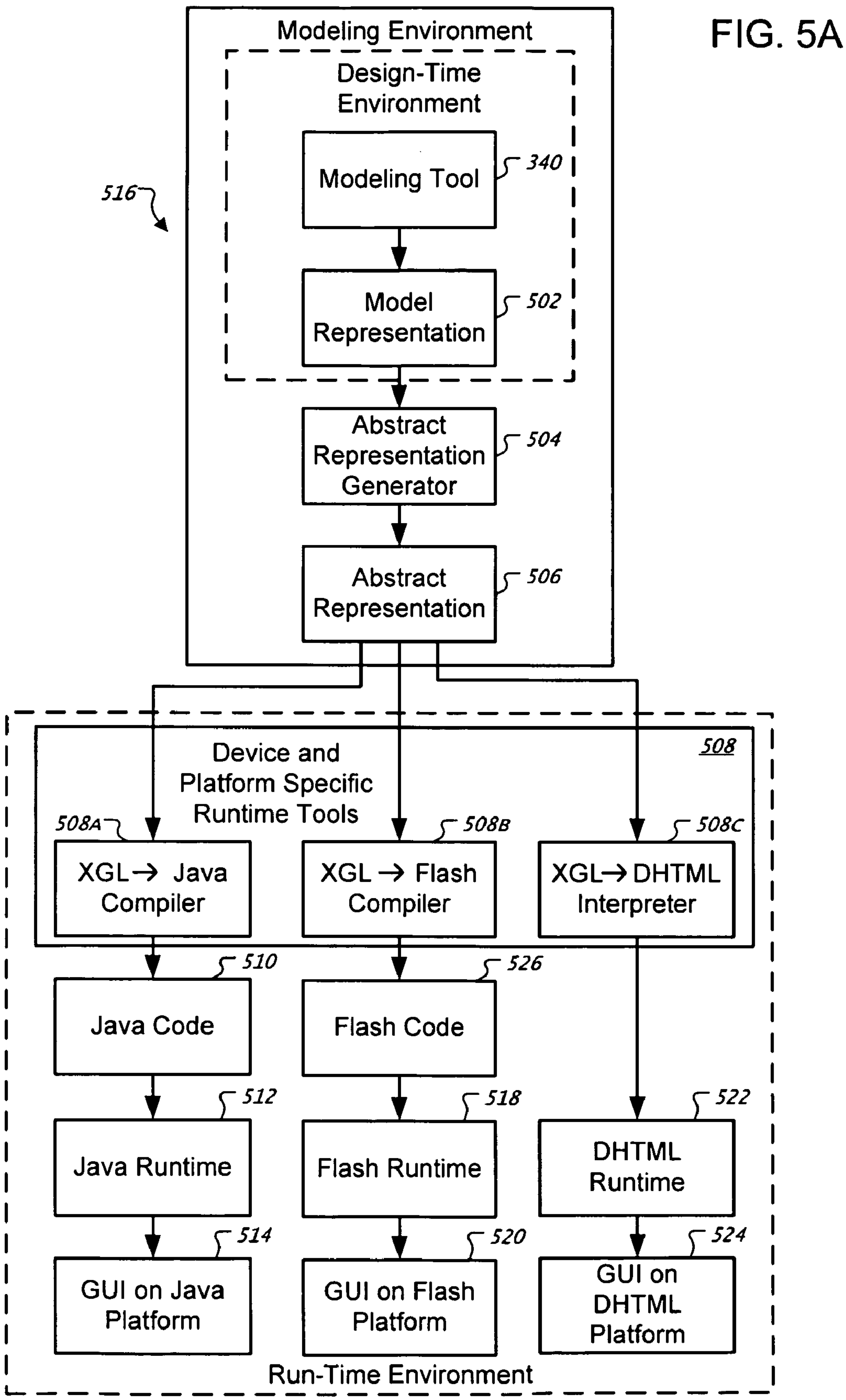
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
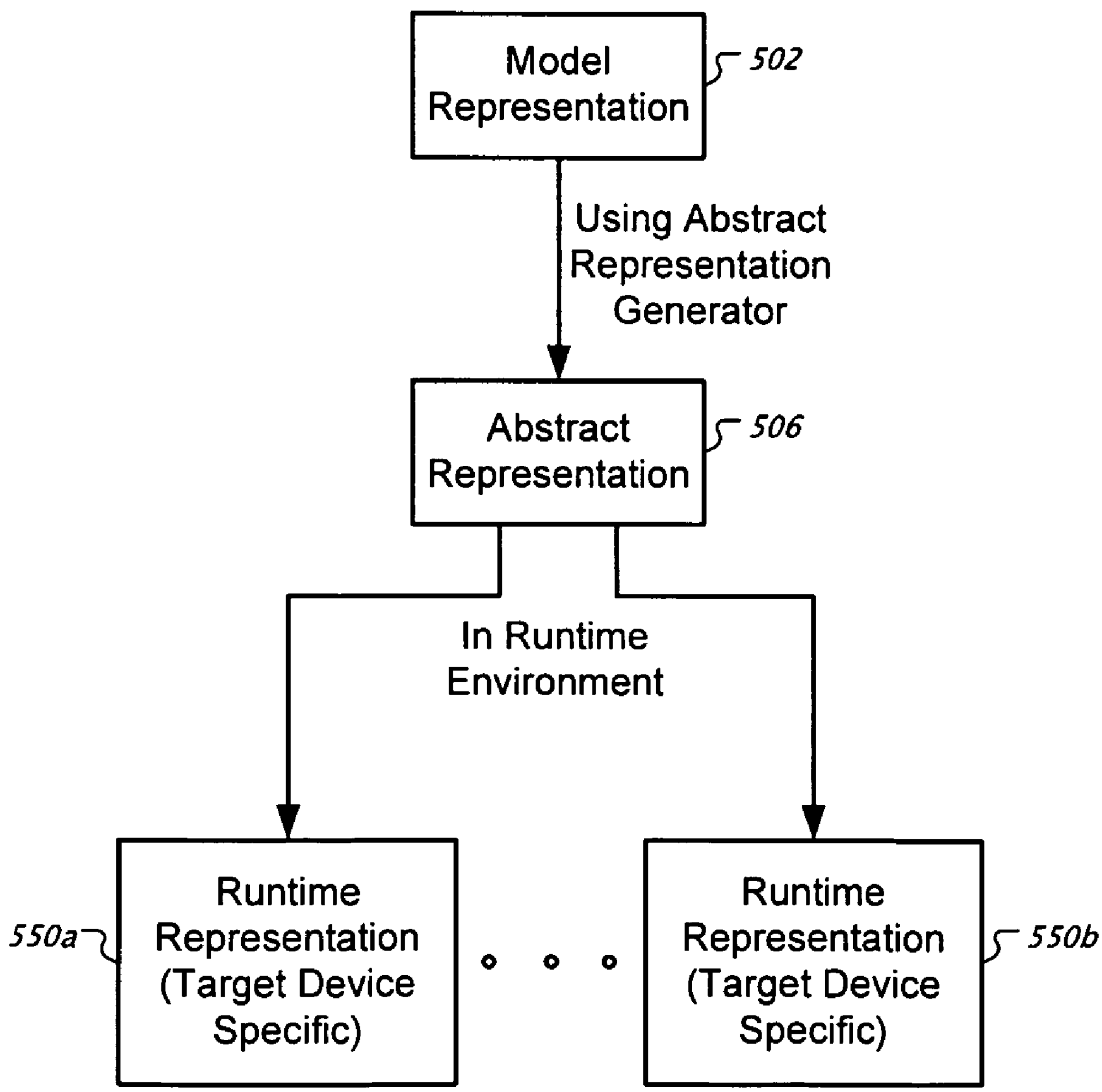
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

Message Overview

To perform an end-to-end business transaction, consistent interfaces are used to create business documents that are sent within messages between heterogeneous programs or modules.

Message Categories

Figure 6:
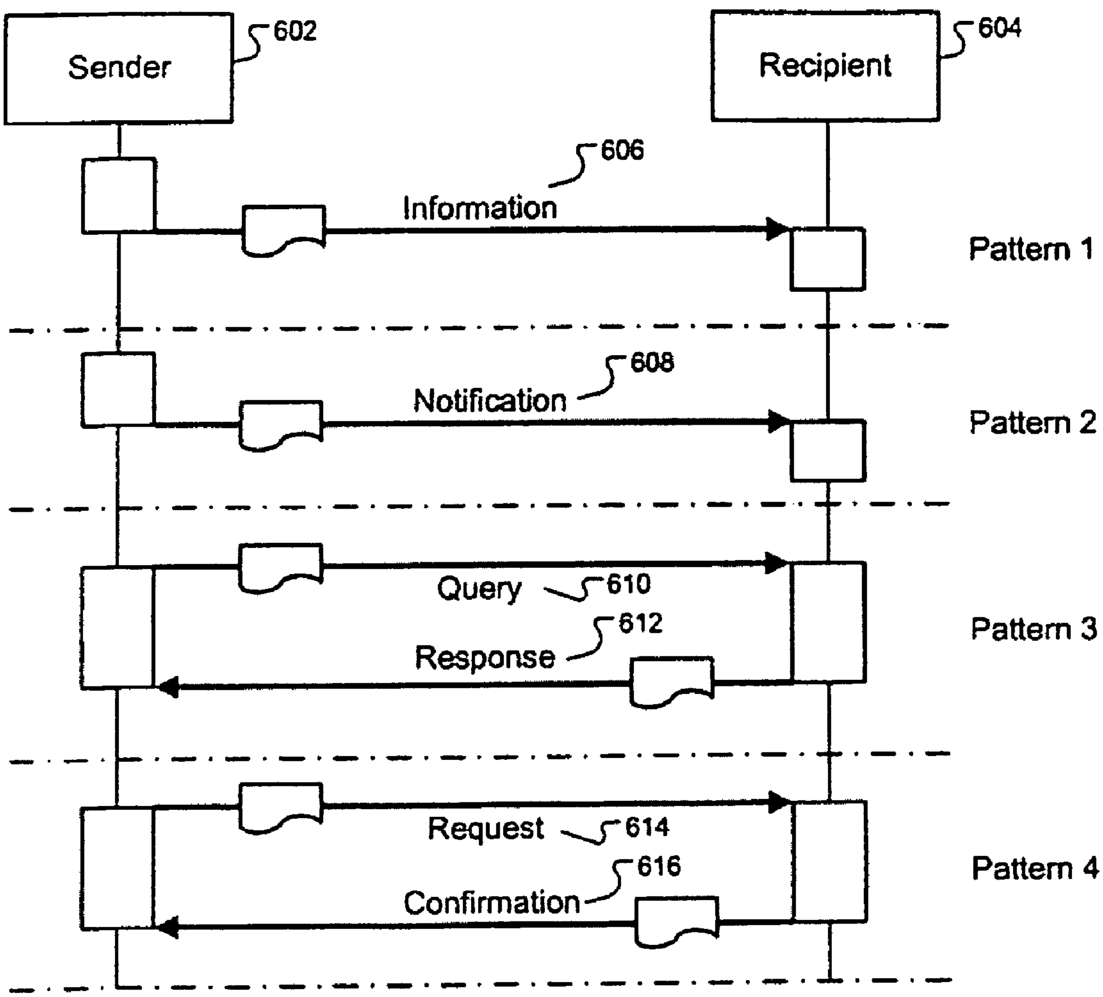
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

Packages

Packages group the entities in the business object model and the resulting interfaces into groups of semantically associated information. Packages also may include "sub"-packages, i.e., the packages may be nested.

Figure 7:
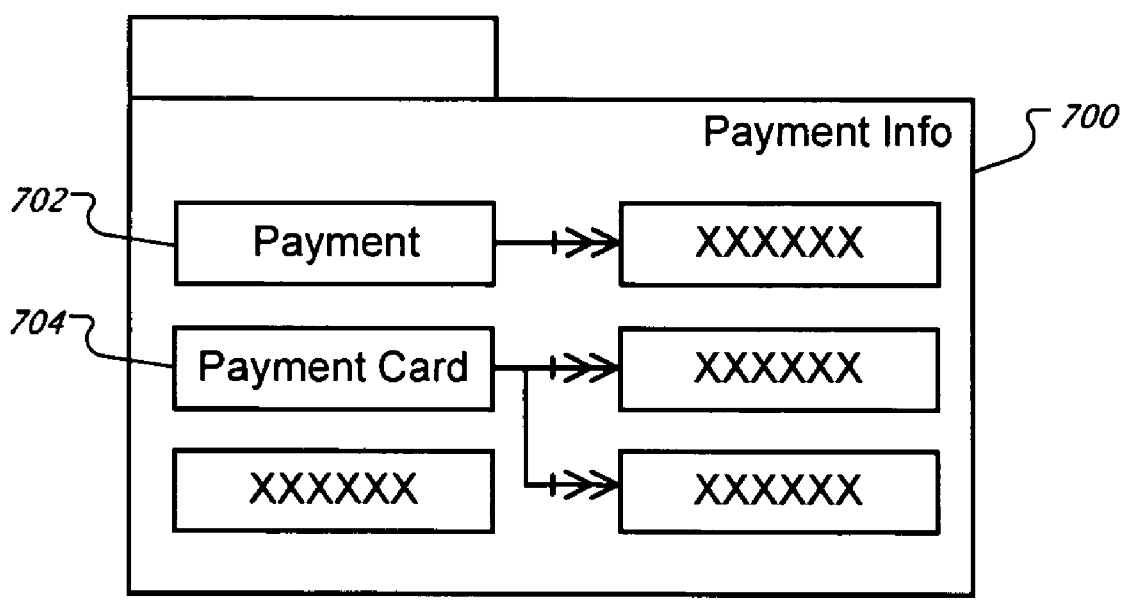
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
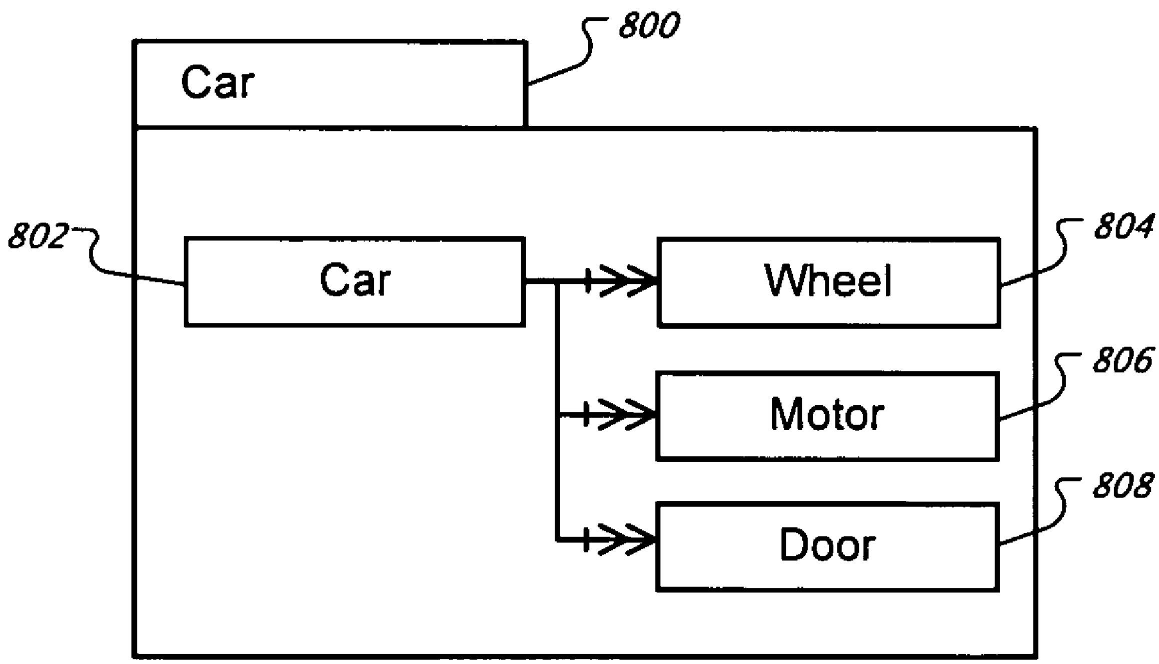
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
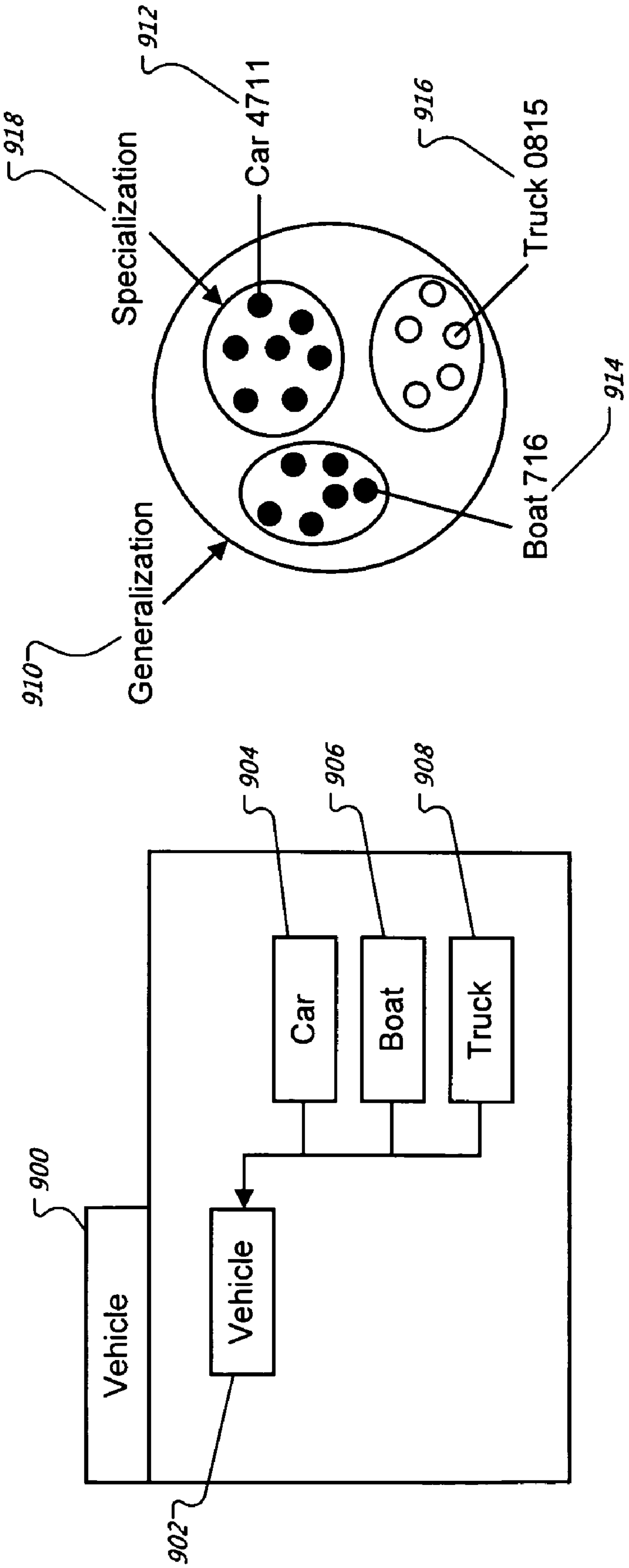
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
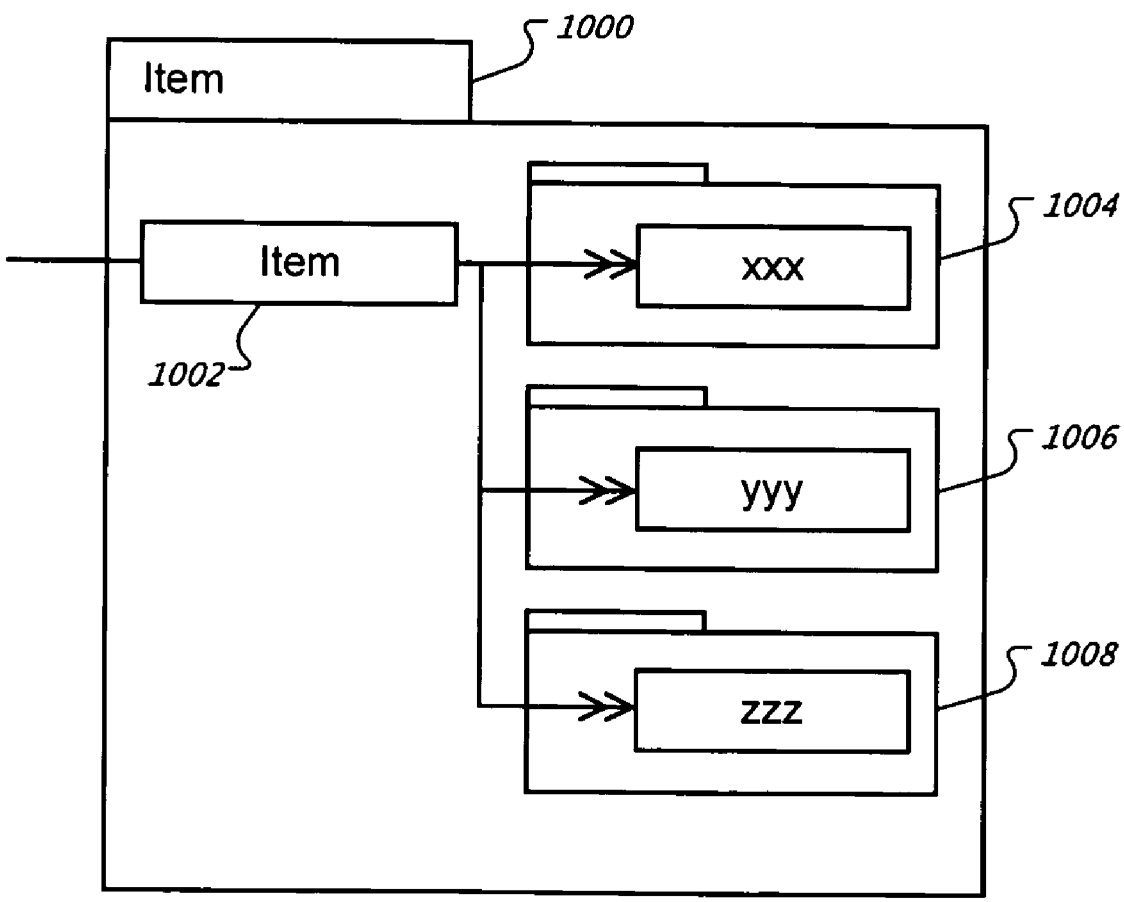
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
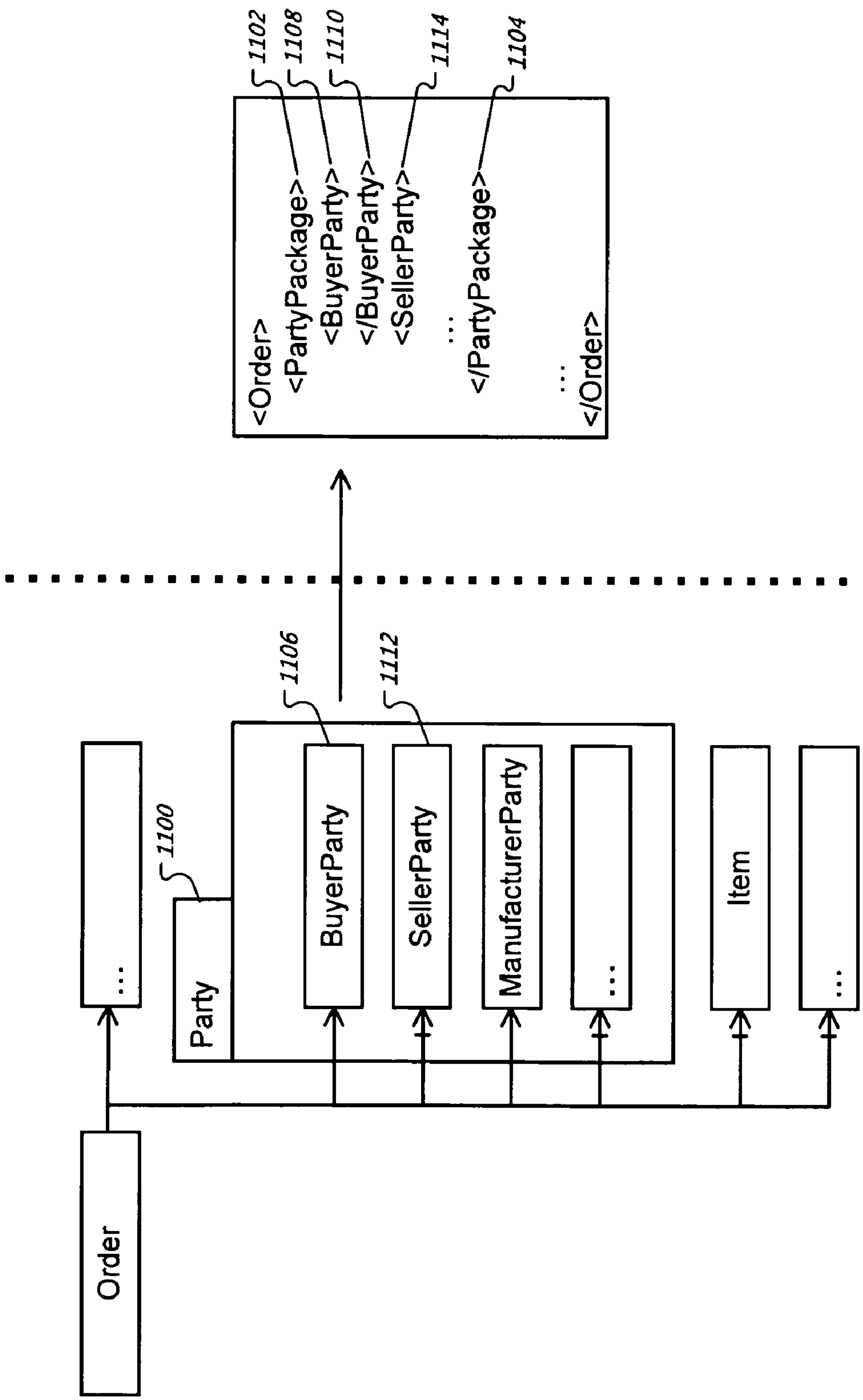
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

Relationships

Relationships describe the interdependencies of the entities in the business object model, and are thus an integral part of the business object model.

Cardinality of Relationships

Figure 12:
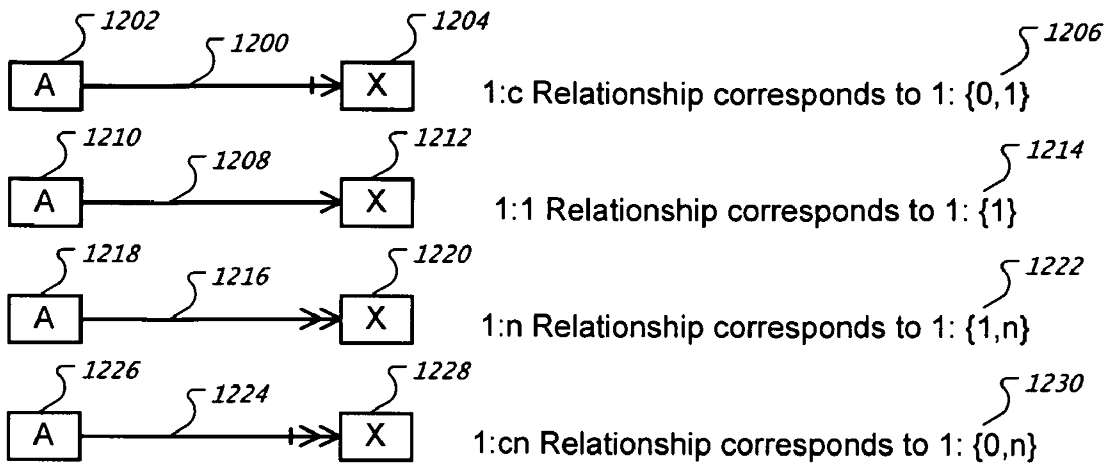
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

Types of Relationships

Composition

Figure 13:
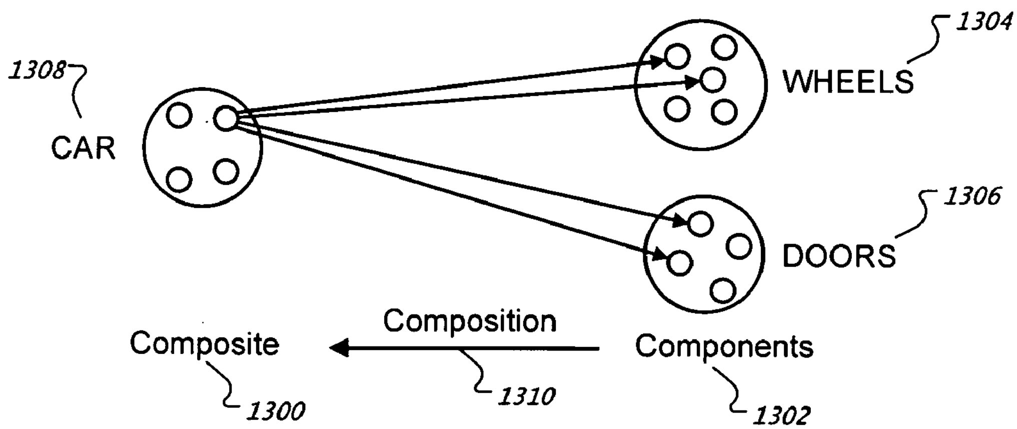
FIG. 13 depicts an example of a composition in accordance with methods and systems consistent with the subject matter described herein.
Figure 14:
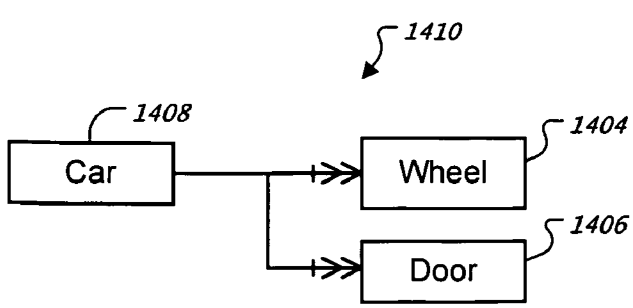
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

Aggregation

Figure 15:
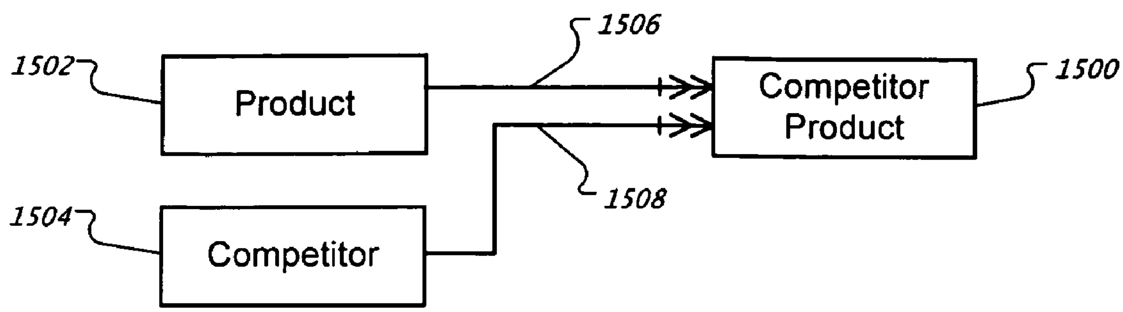
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

Association

Figure 16:
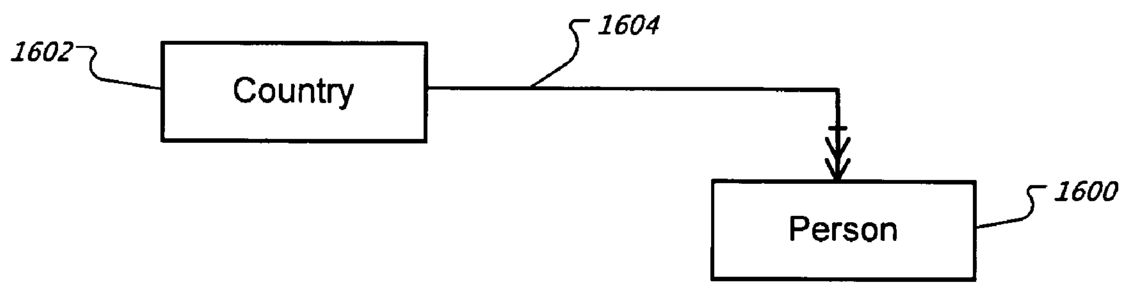
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

Specialization

Figure 17:
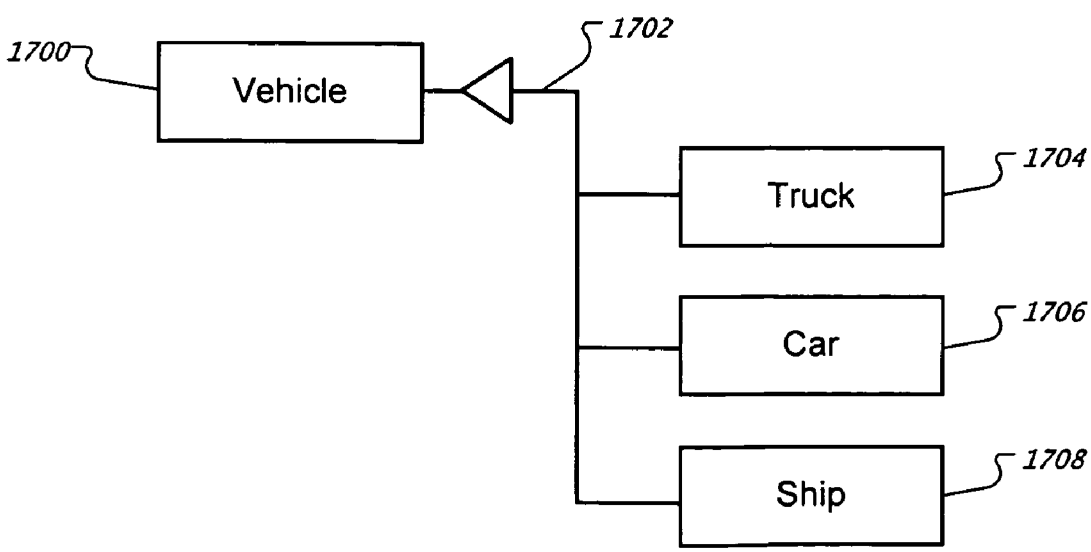
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
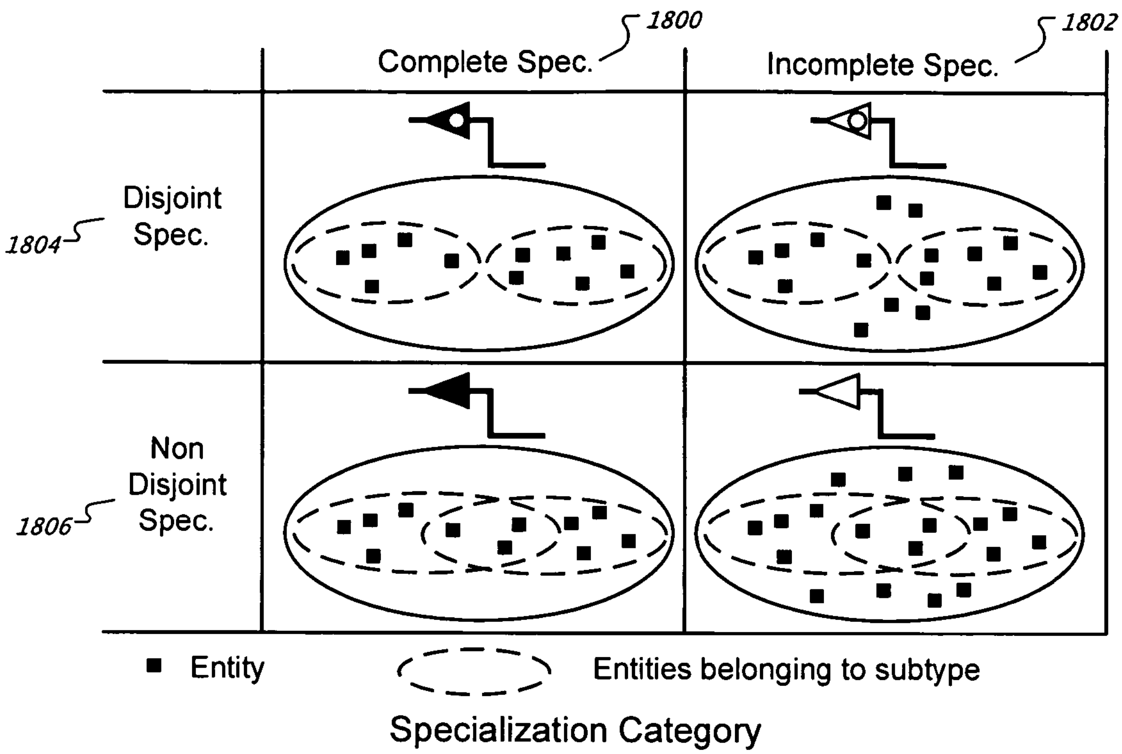
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

Structural Patterns

Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

Hierarchy

Figure 19:
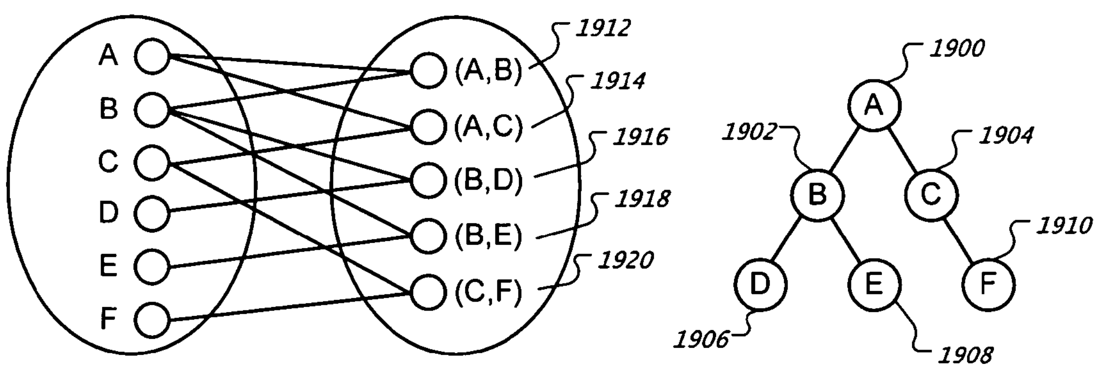
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
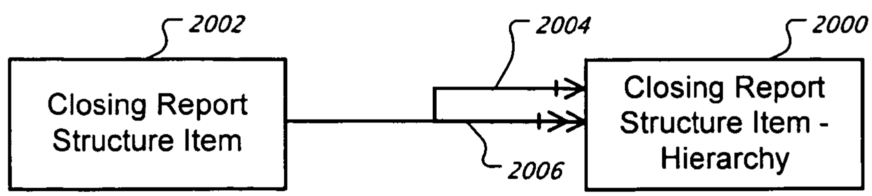
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

Creation of the Business Object Model

Figure 21A:
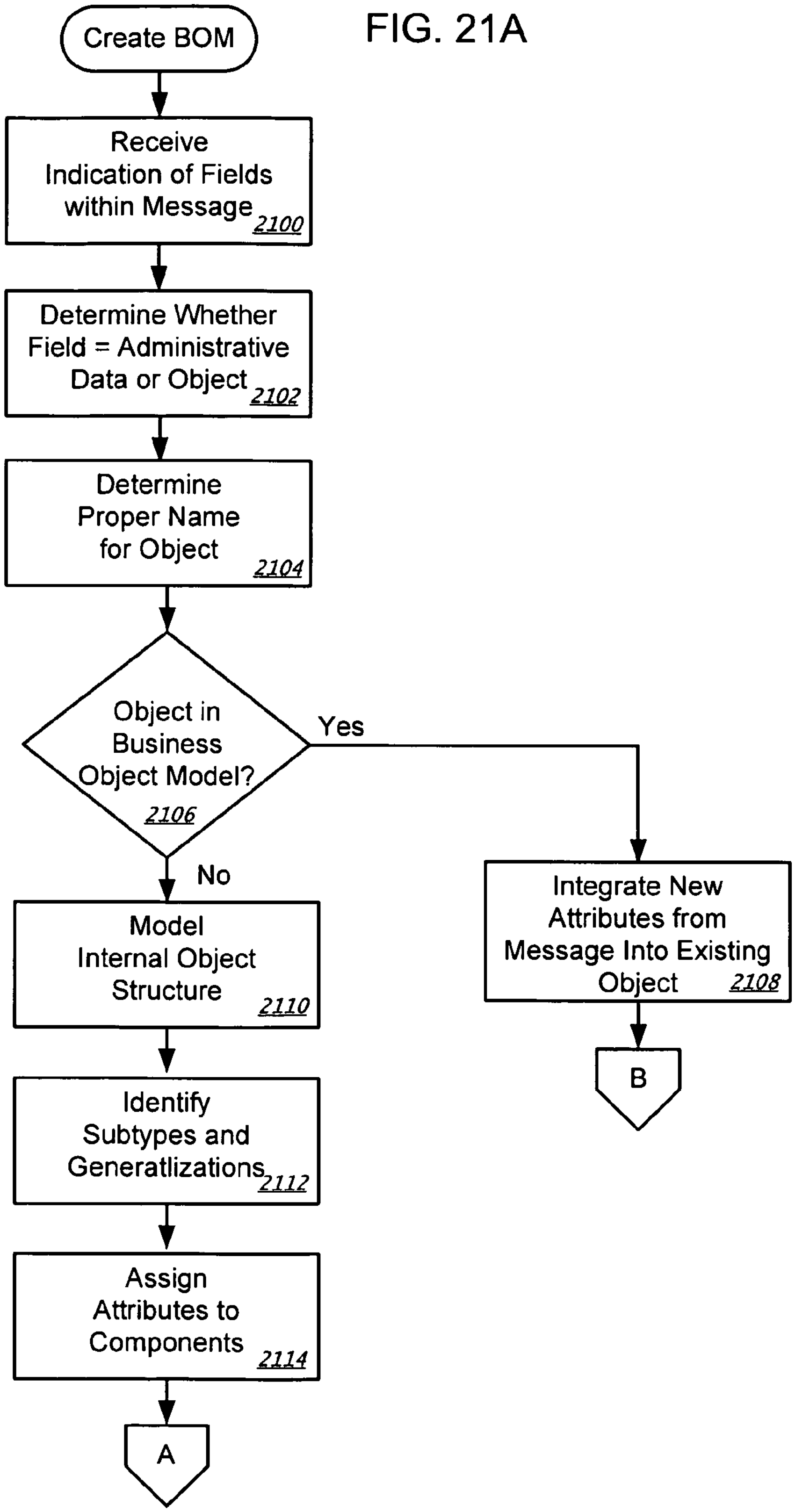
FIGS. 21A-B depict a flow diagram of the steps performed to create a business object model in accordance with methods and systems consistent with the subject matter described herein.
Figure 21B:
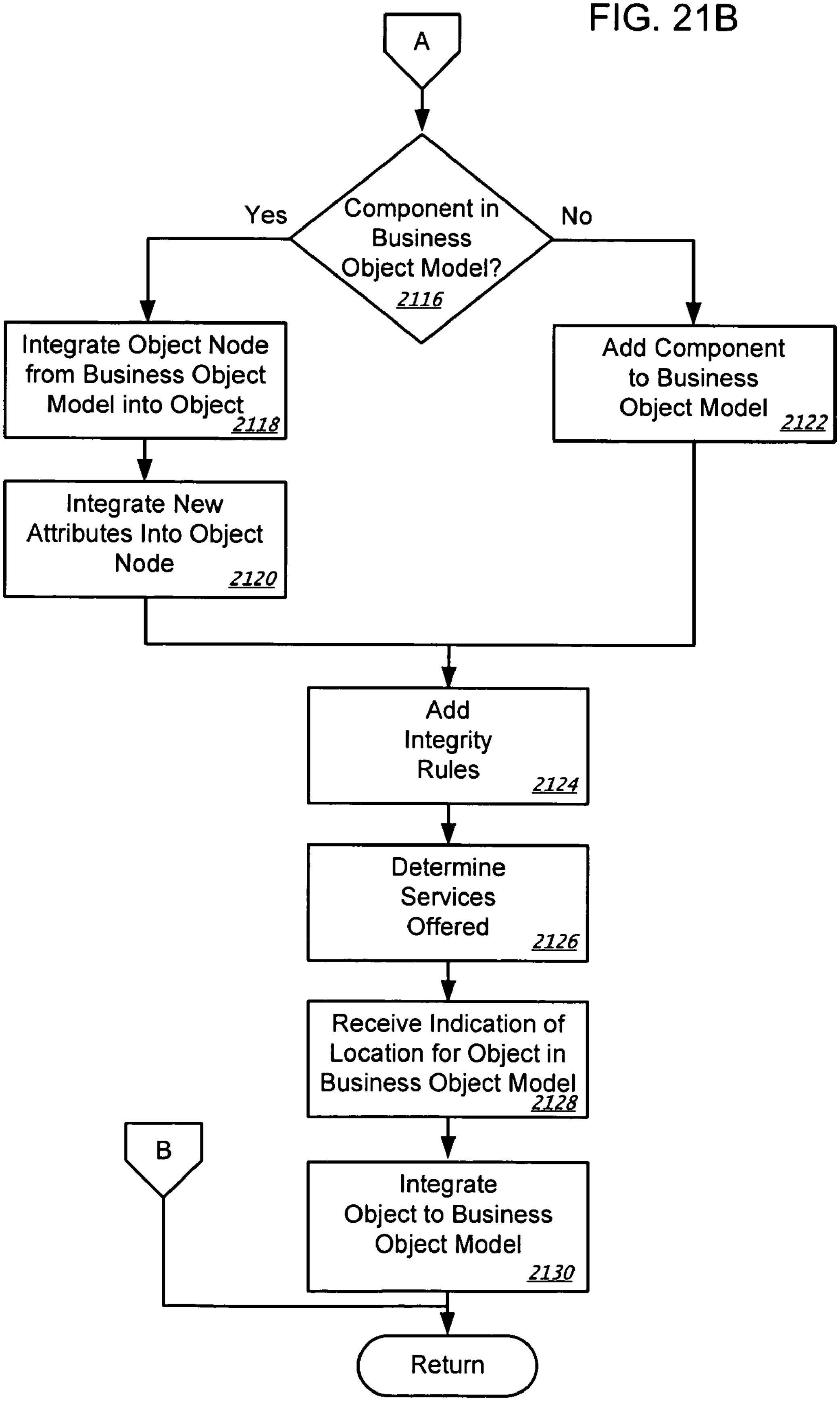

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |

-continued

| | |
|---|---|
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | |
| ItemSellerAddress | |
| ItemLocation | |

-continued

| |
|---|
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase Order | |
| AdditionalID | | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | Delivery-Terms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobilNumber | | |
| Facsimile | | |
| Email | | |
| ItemSeller | | Seller |
| ItemSellerAddress | | |
| ItemLocation | | Location |
| ItemLocationType | | |
| ItemDeliveryItemGroupID | | |
| ItemDeliveryPriority | | |
| ItemDeliveryCondition | | |
| ItemTransferLocation | | |
| ItemNumberofPartial Delivery | | |
| ItemQuantityTolerance | | |
| ItemMaximumLeadTime | | |

-continued

| | |
|---|---|
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| Purchase-Order | | | | 1 |
| | Buyer | | | 0..1 |
| | | Address | | 0..1 |
| | | ContactPerson | | 0..1 |
| | | | Address | 0..1 |
| | Seller | | | 0..1 |
| | Location | | | 0..1 |
| | | Address | | 0..1 |
| | DeliveryTerms | | | 0..1 |
| | | Incoterms | | 0..1 |
| | | PartialDelivery | | 0..1 |
| | | QuantityTolerance | | 0..1 |
| | | Transport | | 0..1 |
| | CashDiscount | | | 0..1 |

-continued

| | | | | |
|---|---|---|---|---|
| | Terms | | | |
| | | MaximumCashDiscount | | 0..1 |
| | | NormalCashDiscount | | 0..1 |
| | PaymentForm | | | 0..1 |
| | | PaymentCard | | 0..1 |
| | Attachment | | | 0..n |
| | Description | | | 0..1 |
| | Confirmation Description | | | 0..1 |
| | Item | | | 0..n |
| | | HierarchyRelationship | | 0..1 |
| | | Product | | 0..1 |
| | | ProductCategory | | 0..1 |
| | | Price | | 0..1 |
| | | | NetunitPrice | 0..1 |
| | | ConfirmedPrice | | 0..1 |
| | | | NetunitPrice | 0..1 |
| | | Buyer | | 0..1 |
| | | Seller | | 0..1 |
| | | Location | | 0..1 |
| | | DeliveryTerms | | 0..1 |
| | | Attachment | | 0..n |
| | | Description | | 0..1 |
| | | ConfirmationDescription | | 0..1 |
| | | ScheduleLine | | 0..n |
| | | | Delivery-Period | 1 |
| | | ConfirmedScheduleLine | | 0..n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0..1 |
| | | | Address | | 0..1 |
| | | | ContactPerson | | 0..1 |
| | | | | Address | 0..1 |
| | | SellerParty | | | 0..1 |
| | Location | | | | |
| | | ShipToLocation | | | 0..1 |
| | | | Address | | 0..1 |
| | | ShipFromLocation | | | 0..1 |
| | | | Address | | 0..1 |
| | DeliveryTerms | | | | 0..1 |
| | | Incoterms | | | 0..1 |
| | | PartialDelivery | | | 0..1 |
| | | QuantityTolerance | | | 0..1 |
| | | Transport | | | 0..1 |
| | CashDiscount Terms | | | | 0..1 |
| | | MaximumCash Discount | | | 0..1 |
| | | NormalCashDiscount | | | 0..1 |
| | PaymentForm | | | | 0..1 |
| | | PaymentCard | | | 0..1 |
| | Attachment | | | | 0..n |

-continued

| | | | |
|---|---|---|---|
| Description | | | 0..1 |
| Confirmation Description | | | 0..1 |
| Item | | | 0..n |
| | HierarchyRelationship | | 0..1 |
| | Product | | 0..1 |
| | ProductCategory | | 0..1 |
| | Price | | 0..1 |
| | | NetunitPrice | 0..1 |
| | ConfirmedPrice | | 0..1 |
| | | NetunitPrice | 0..1 |
| | Party | | |
| | | BuyerParty | 0..1 |
| | | SellerParty | 0..1 |
| | Location | | |
| | | ShipTo Location | 0..1 |
| | | ShipFrom Location | 0..1 |
| | DeliveryTerms | | 0..1 |
| | Attachment | | 0..n |
| | Description | | 0..1 |
| | Confirmation Description | | 0..1 |
| | ScheduleLine | | 0..n |
| | | Delivery Period | 1 |
| | ConfirmedScheduleLine | | 0..n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0..1 |
| | BuyerPosting DateTime | | | 0..1 |
| | BuyerLast ChangeDate Time | | | 0..1 |
| | SellerPosting DateTime | | | 0..1 |
| | SellerLast ChangeDate Time | | | 0..1 |
| | Acceptance StatusCode | | | 0..1 |
| | Note | | | 0..1 |
| | ItemList Complete Transmission Indicator | | | 0..1 |
| | BuyerParty | | | 0..1 |
| | | StandardID | | 0..n |
| | | BuyerID | | 0..1 |
| | | SellerID | | 0..1 |
| | | Address | | 0..1 |
| | | ContactPerson | | 0..1 |
| | | | BuyerID | 0..1 |
| | | | SellerID | 0..1 |
| | | | Address | 0..1 |
| | SellerParty | | | 0..1 |
| | Product RecipientParty | | | 0..1 |
| | VendorParty | | | 0..1 |
| | Manufacturer Party | | | 0..1 |
| | BillToParty | | | 0..1 |
| | PayerParty | | | 0..1 |
| | CarrierParty | | | 0..1 |
| | ShipTo Location | | | 0..1 |

-continued

| | | |
|---|---|---|
| | StandardID | 0..n |
| | BuyerID | 0..1 |
| | SellerID | 0..1 |
| | Address | 0..1 |
| ShipFrom Location | | 0..1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |

-continued

| | |
|---|---|
| ShipToLocation<br>ShipFromLocation | ID |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

Structure of the Business Object Model

The business object model, which serves as the basis for the process of generating consistent interfaces, includes the elements contained within the interfaces. These elements are arranged in a hierarchical structure within the business object model.

Interfaces Derived from Business Object Model

Figure 27A:
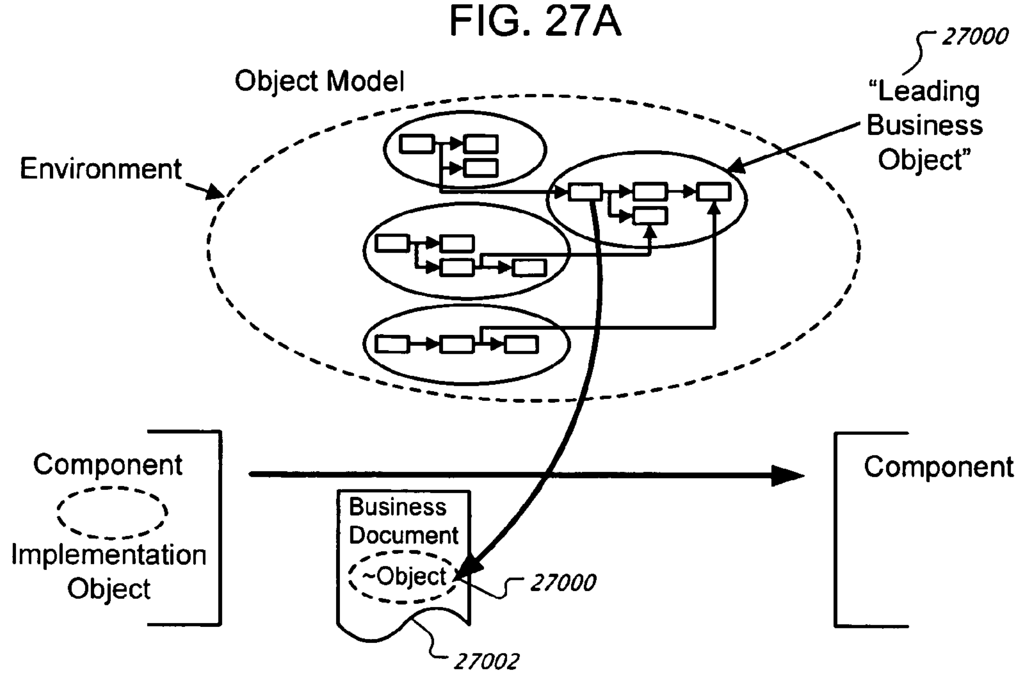

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
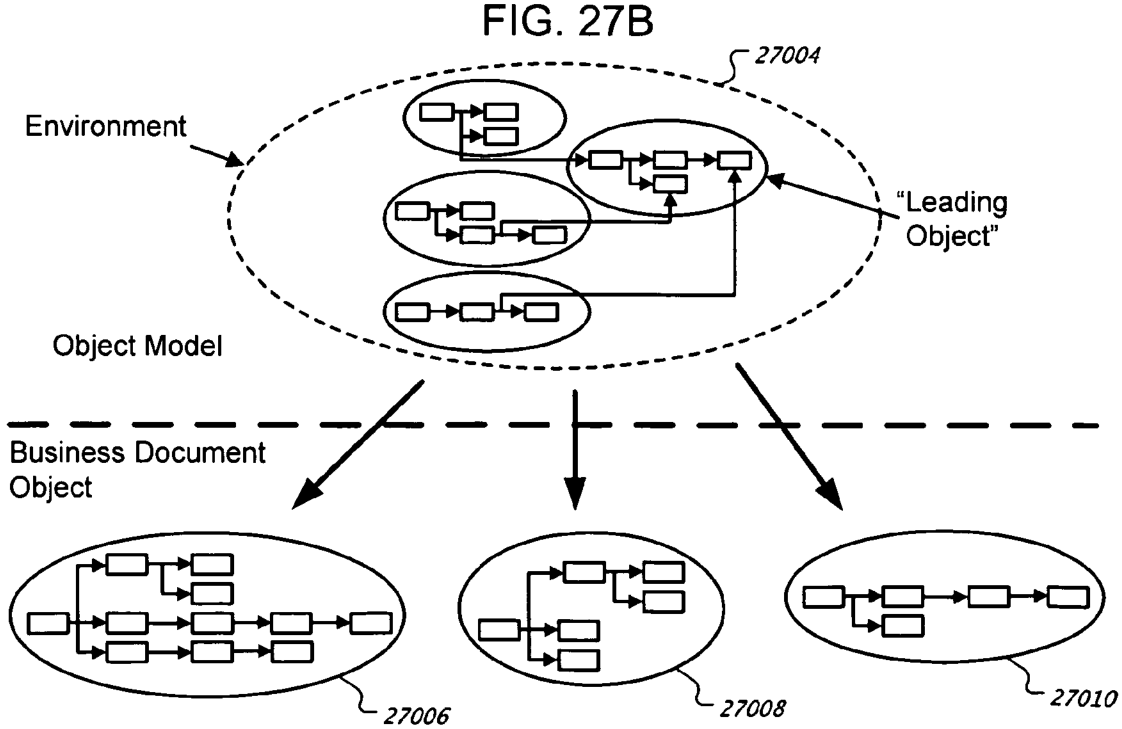

As illustrated in FIG. 27B, several business document objects 27006, 27008, and 27010 as overlapping views may be derived for a given leading object 27004. Each business document object results from the object model by hierarchization.

Figure 27C:
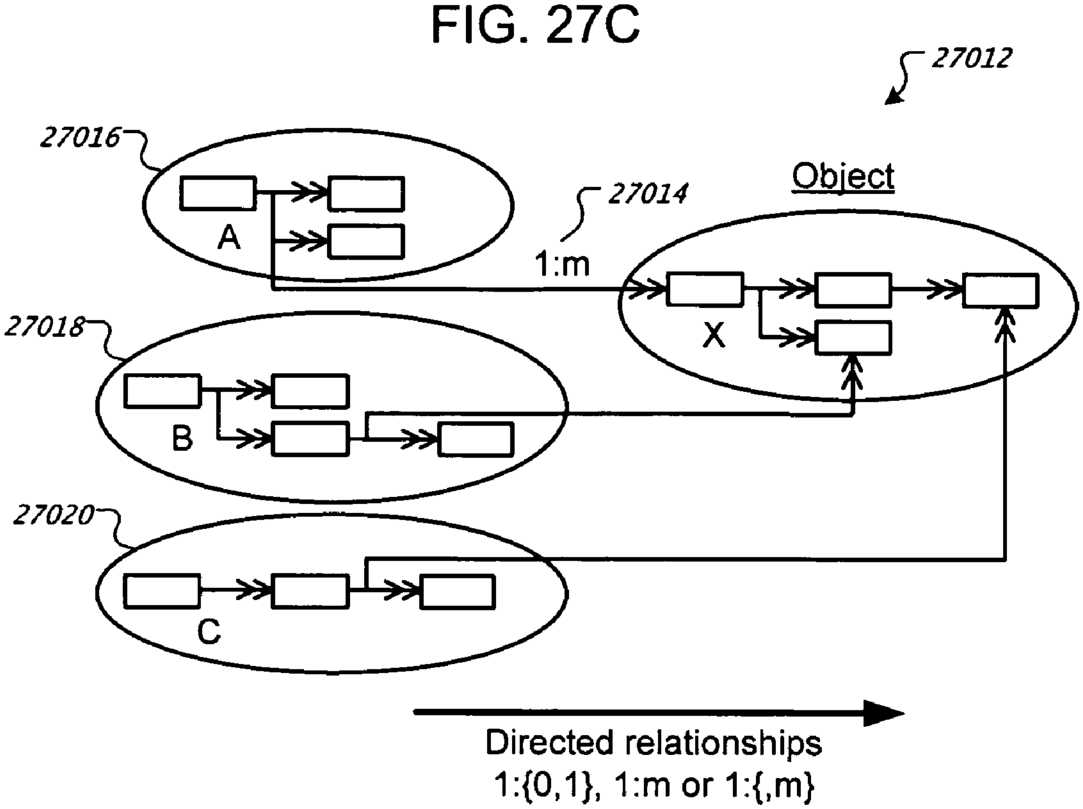

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
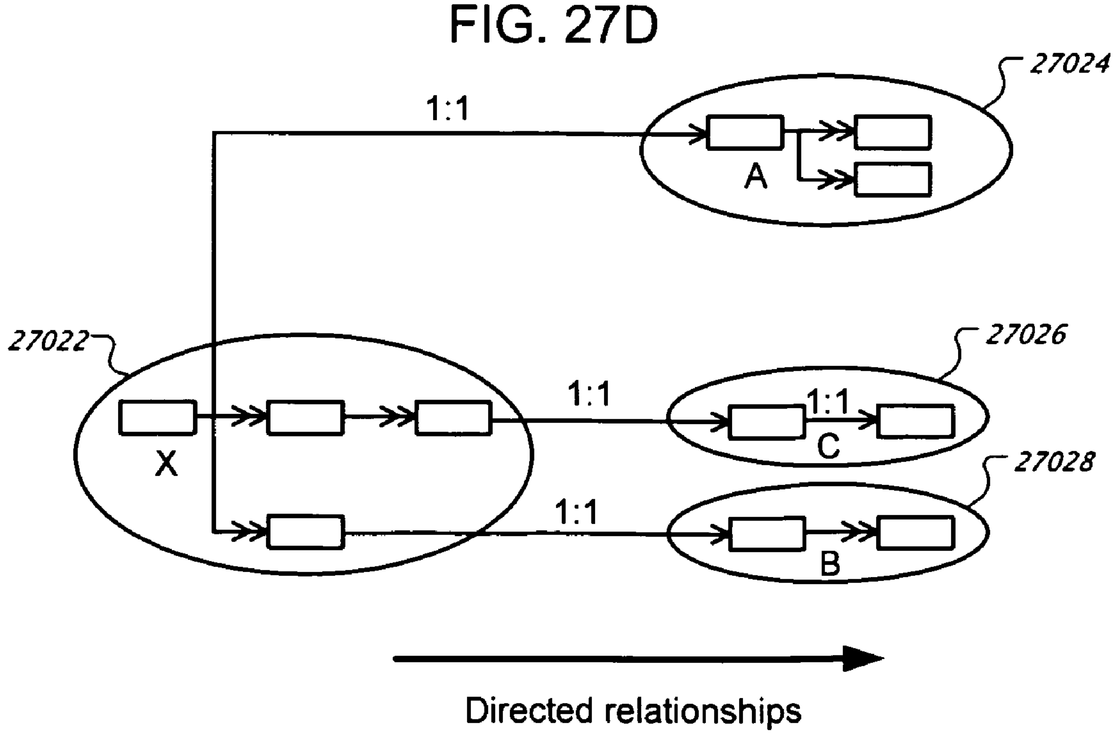

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but BI is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object.

The cardinalities of the business document object nodes and elements are adopted identically or more restrictively to the business document object.

An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix).

Party nodes of the business object are modeled as explicit entities for each party role in the business document object. These nodes are given the name <Prefix><Party Role>Party, for example, BuyerParty, ItemBuyerParty.

BTDReference nodes are modeled as separate entities for each reference type in the business document object. These nodes are given the name <Qualifier><BO><Node>Reference, for example SalesOrderReference, OriginSalesOrderReference, SalesOrderItemReference.

A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types.

Elements are typed by GDTs according to their business objects.

Aggregated levels are typed with message type specific data types (Intermediate Data Types), with their names being built according to the corresponding paths in the message type structure.

The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An Invoice- Confirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
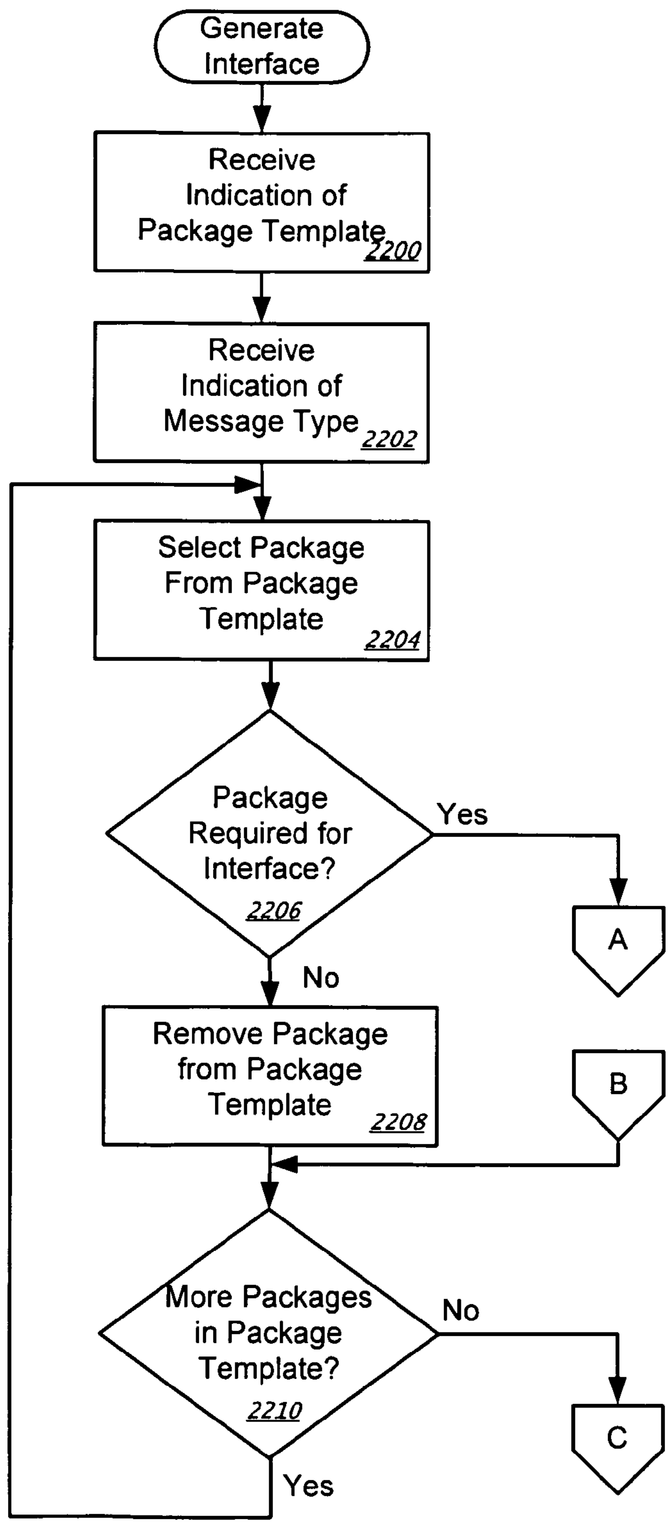
FIGS. 22A-F depict a flow diagram of the steps performed to generate an interface from the business object model in accordance with methods and systems consistent with the subject matter described herein.
Figure 22B:
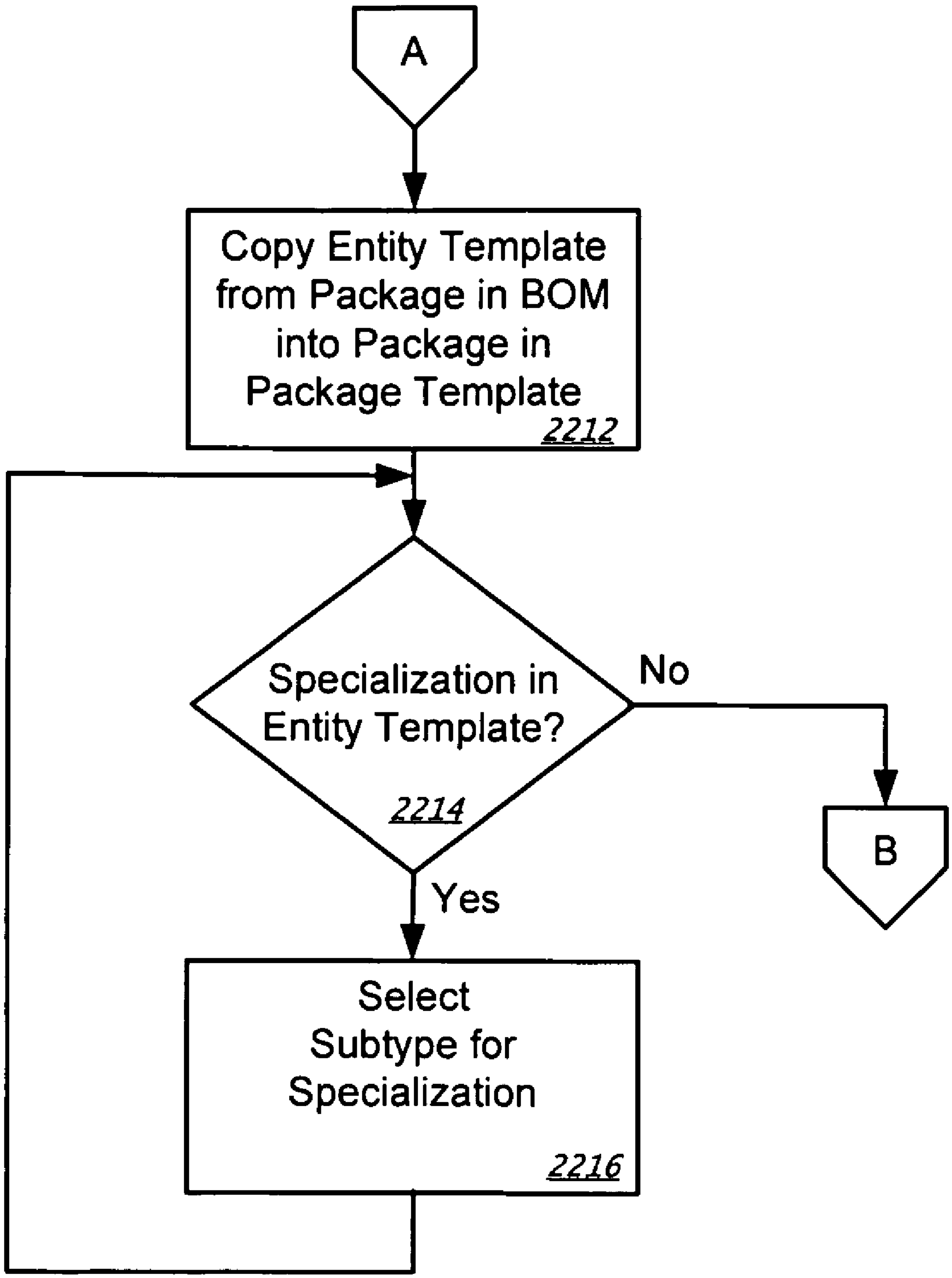
Figure 22C:
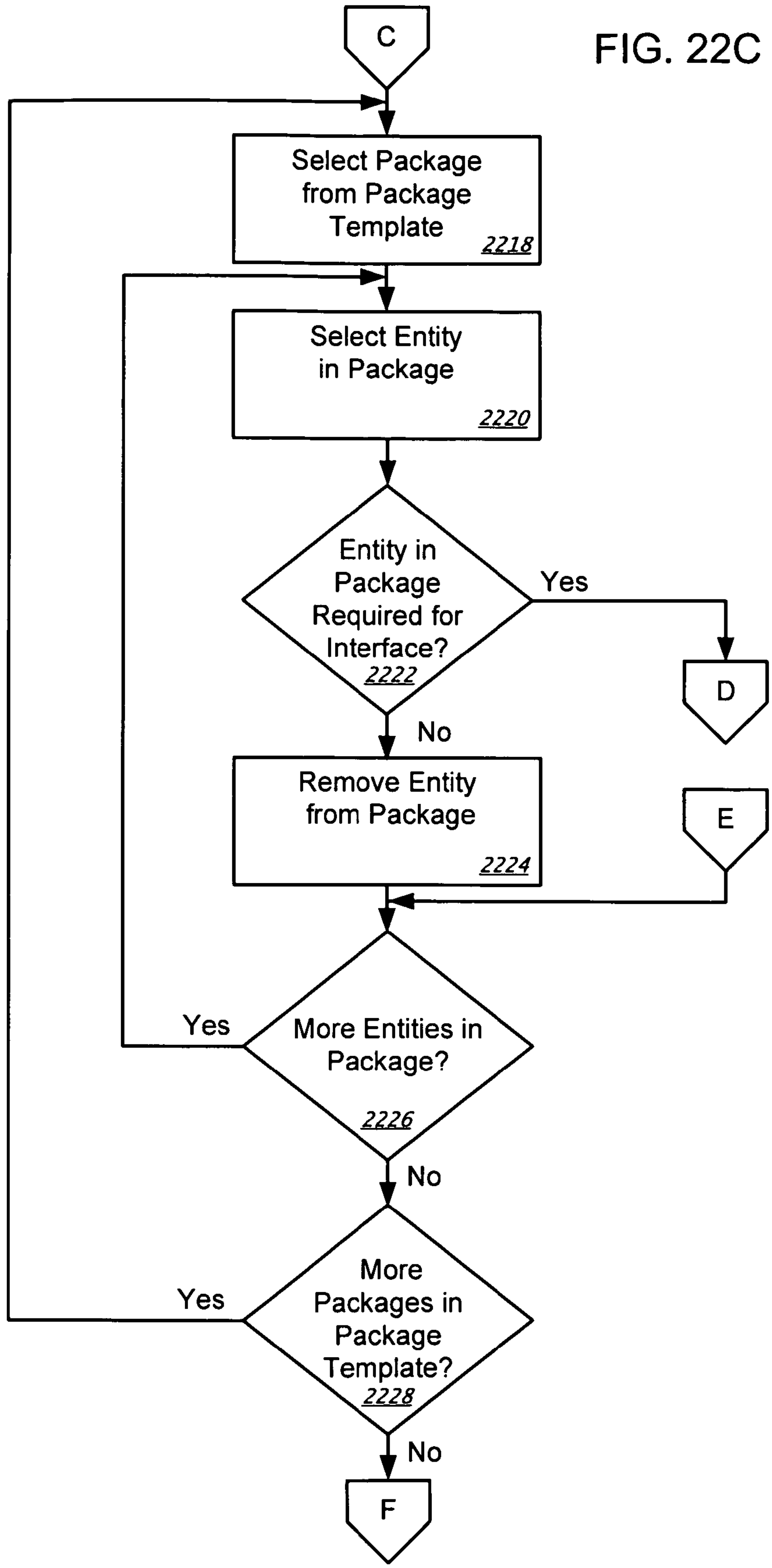

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
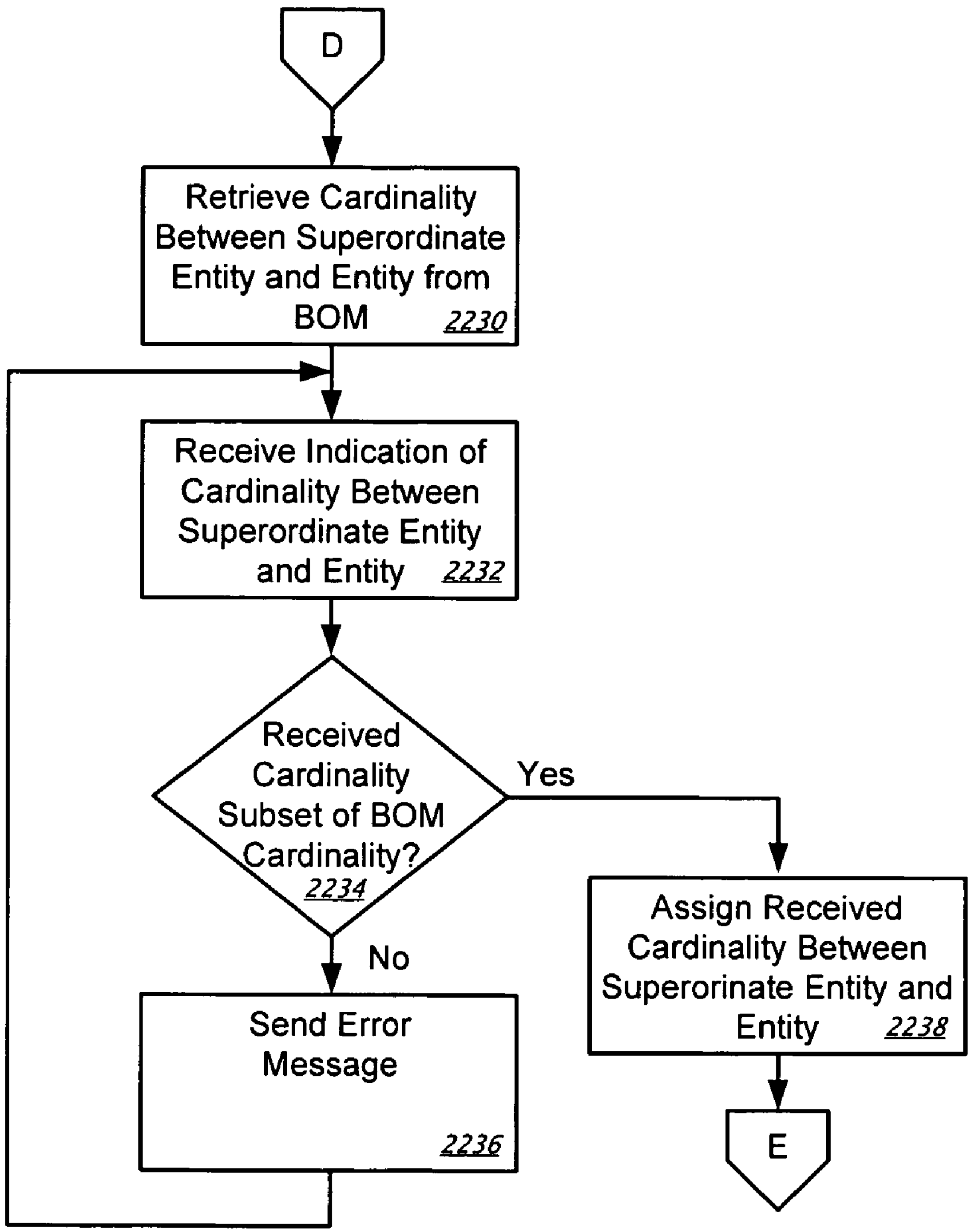

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
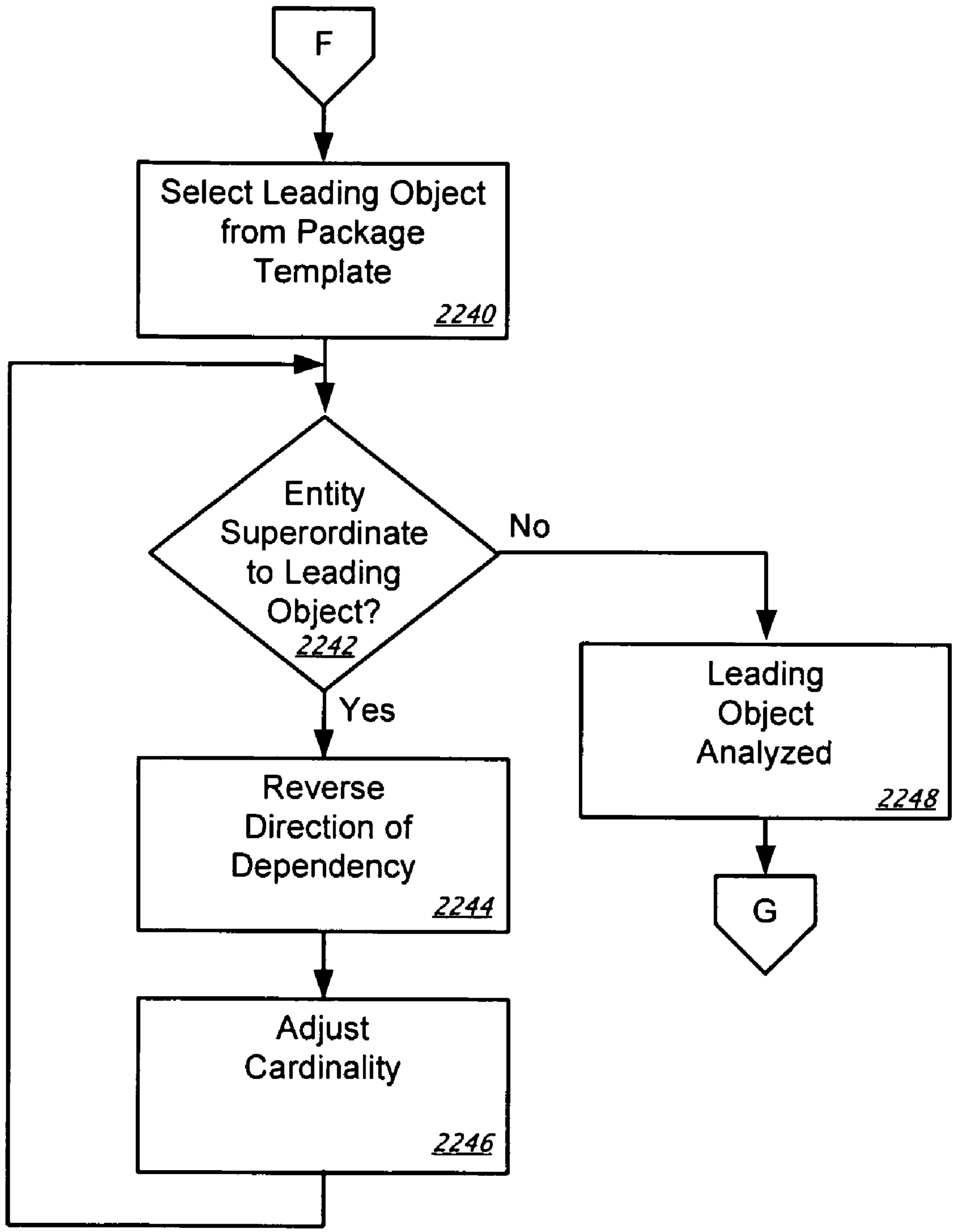

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
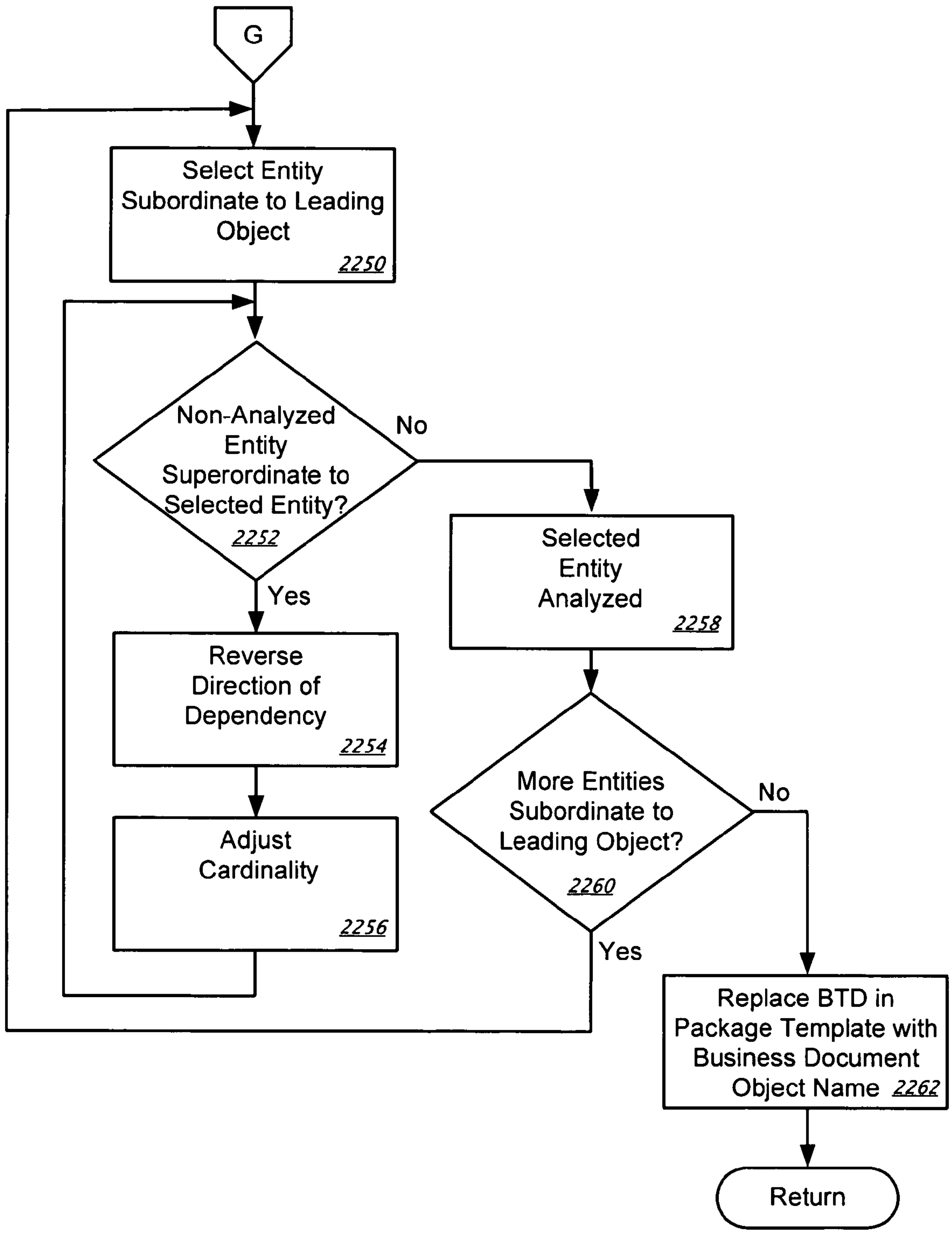

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

Use of an Interface

Figure 23:
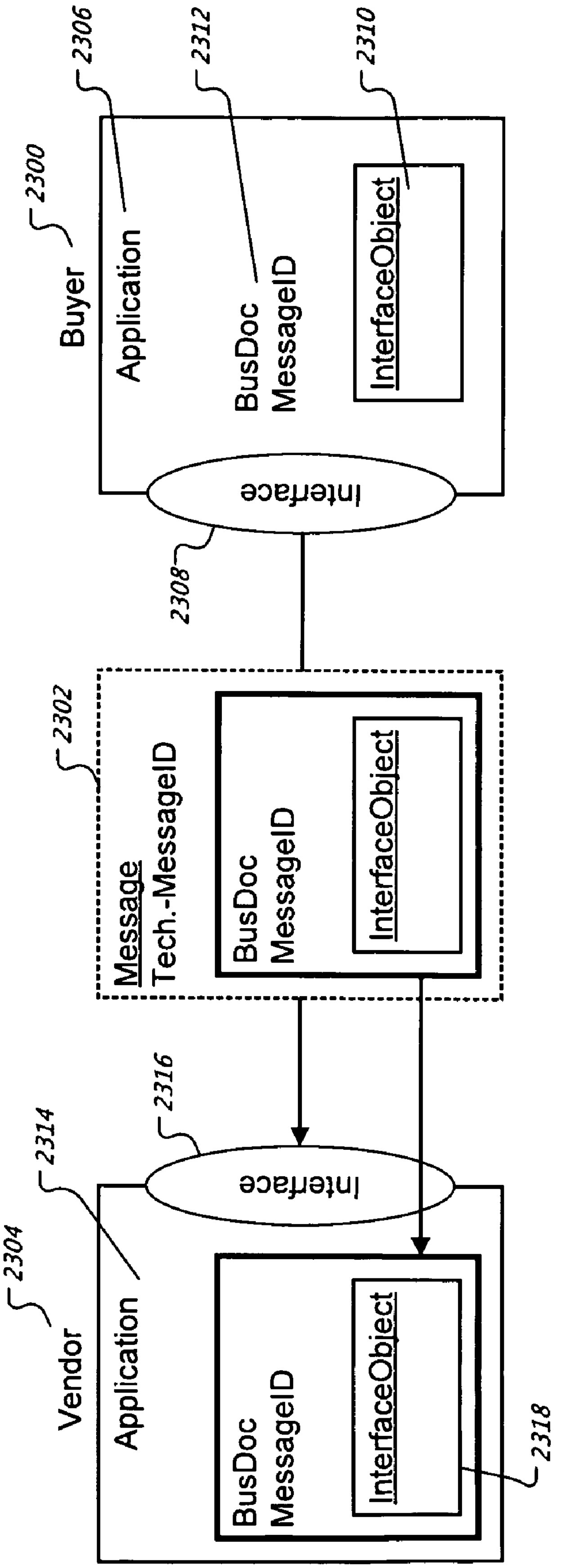
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
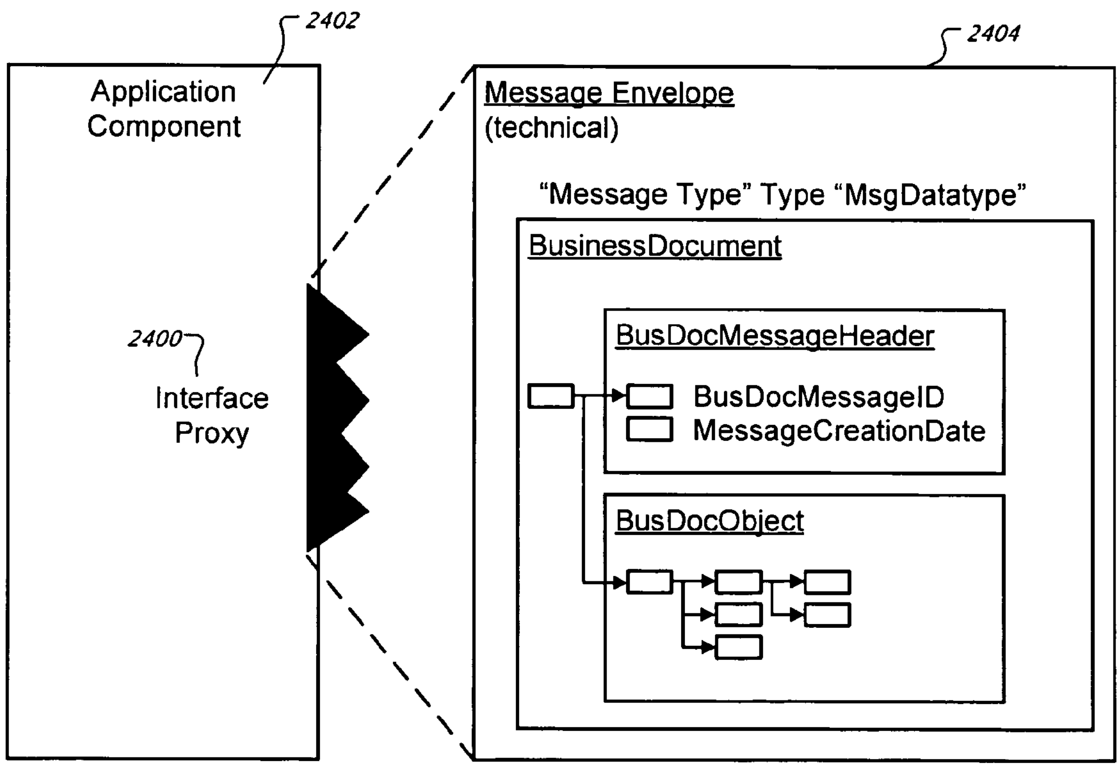
FIG. 24 depicts an interface proxy in accordance with methods and systems consistent with the subject matter described herein.
Figure 25:
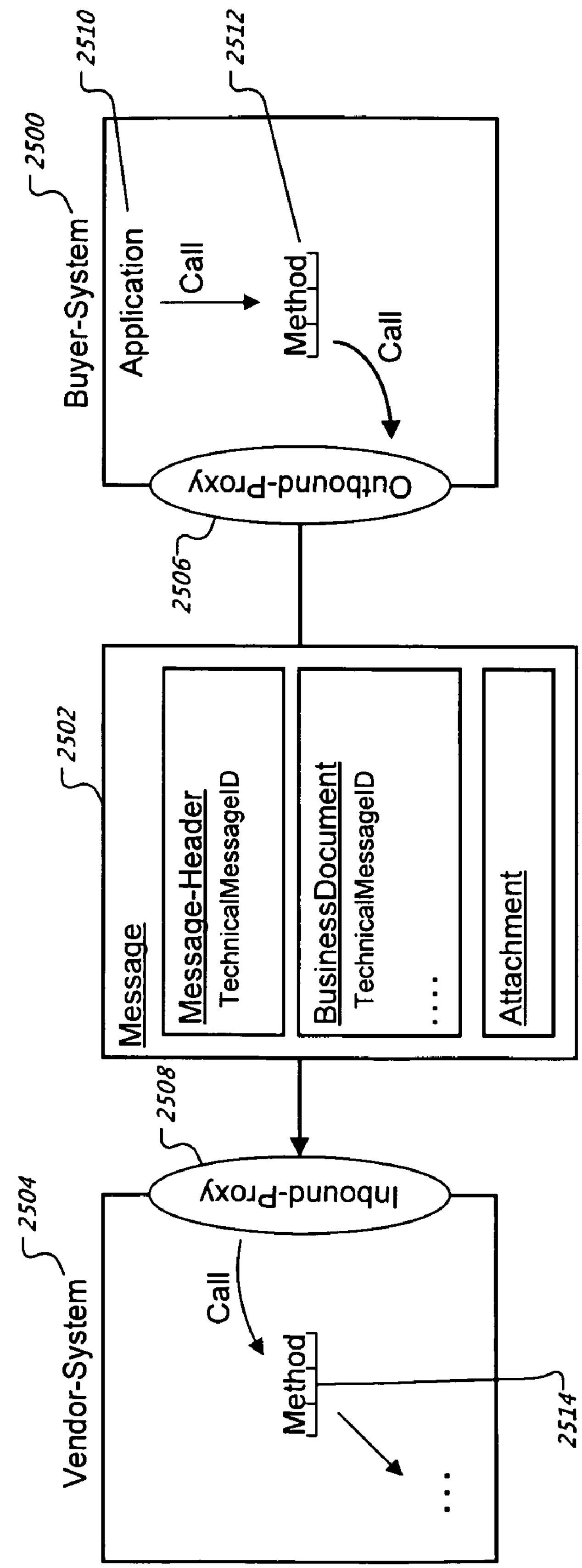
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
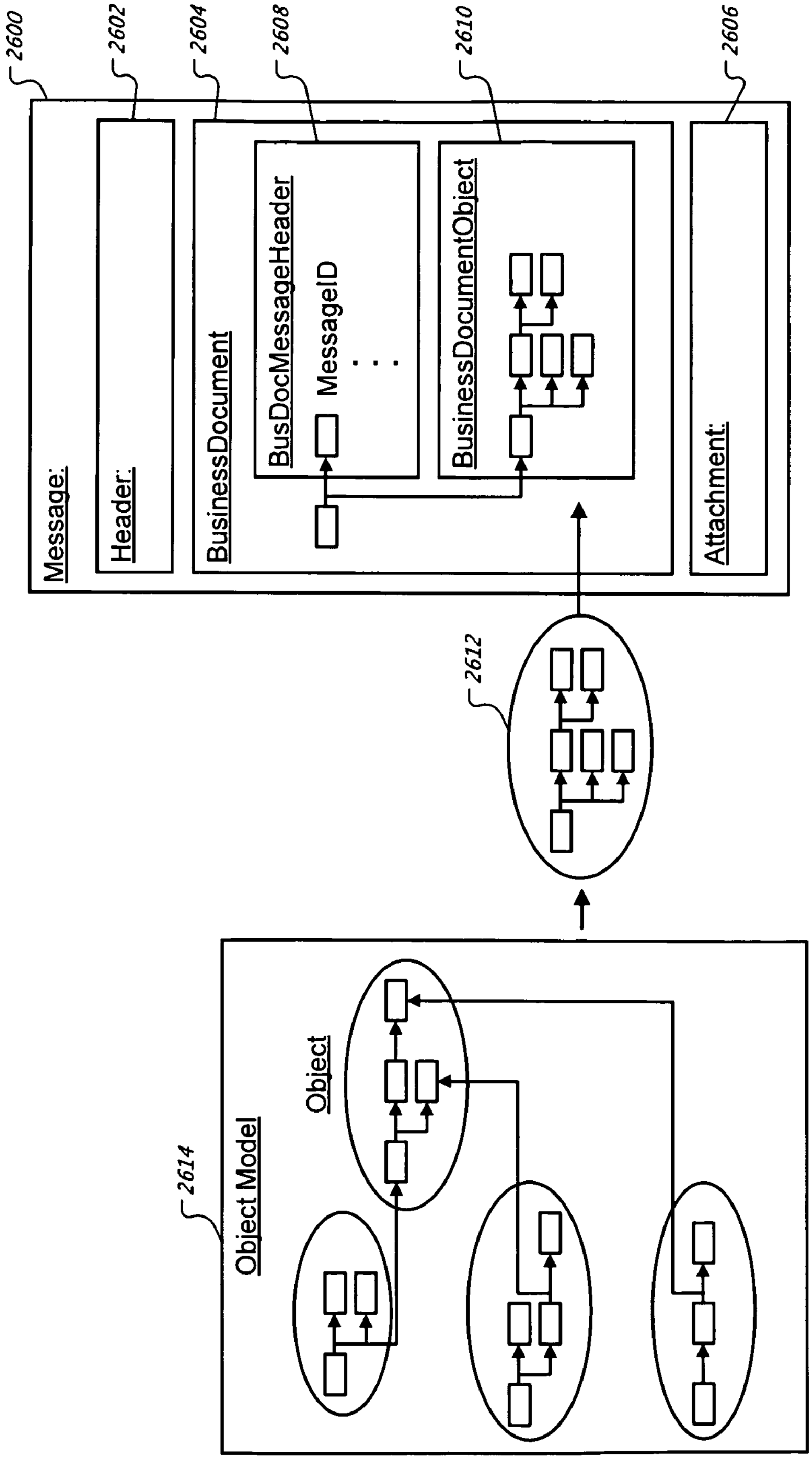
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
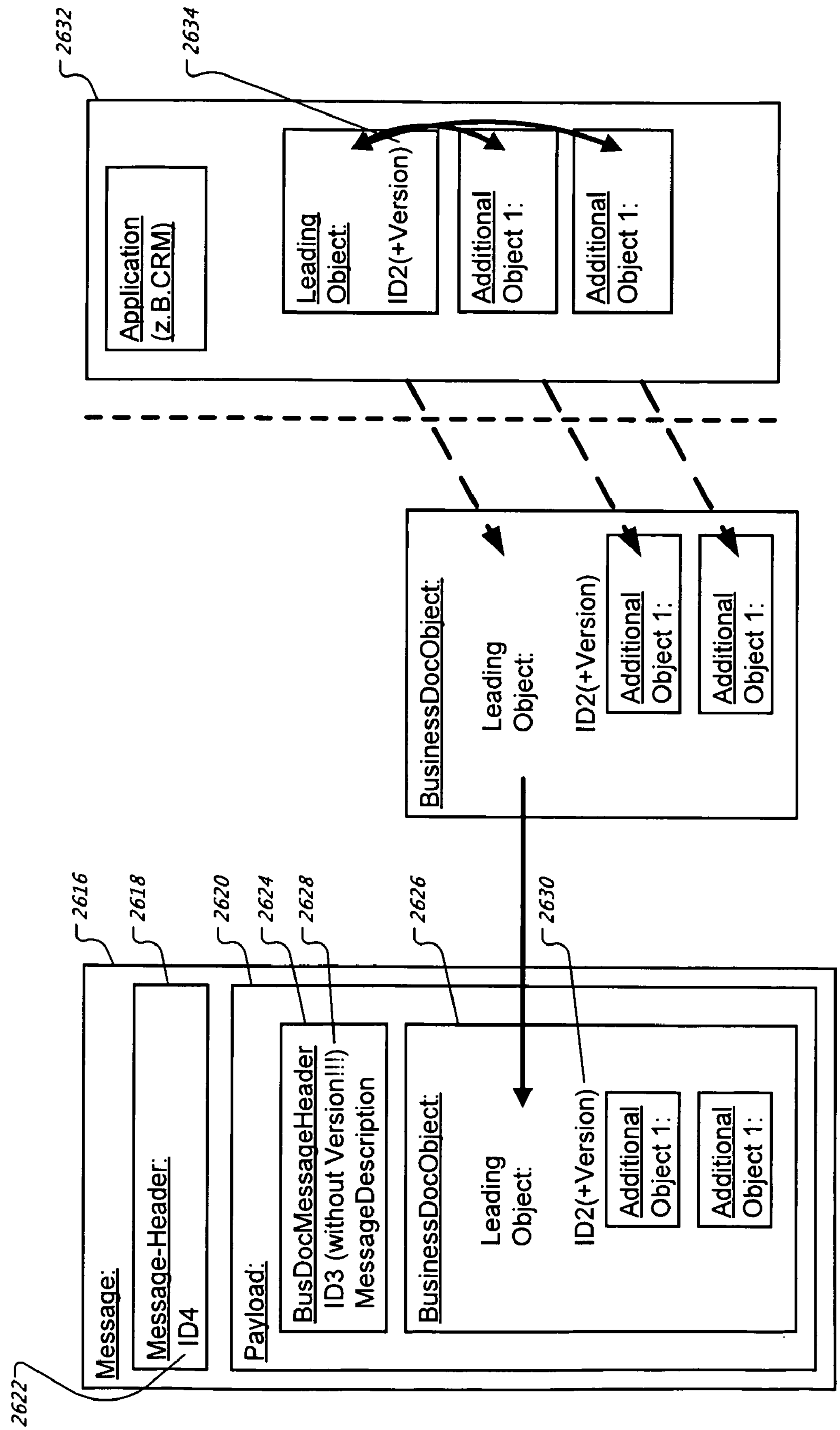
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
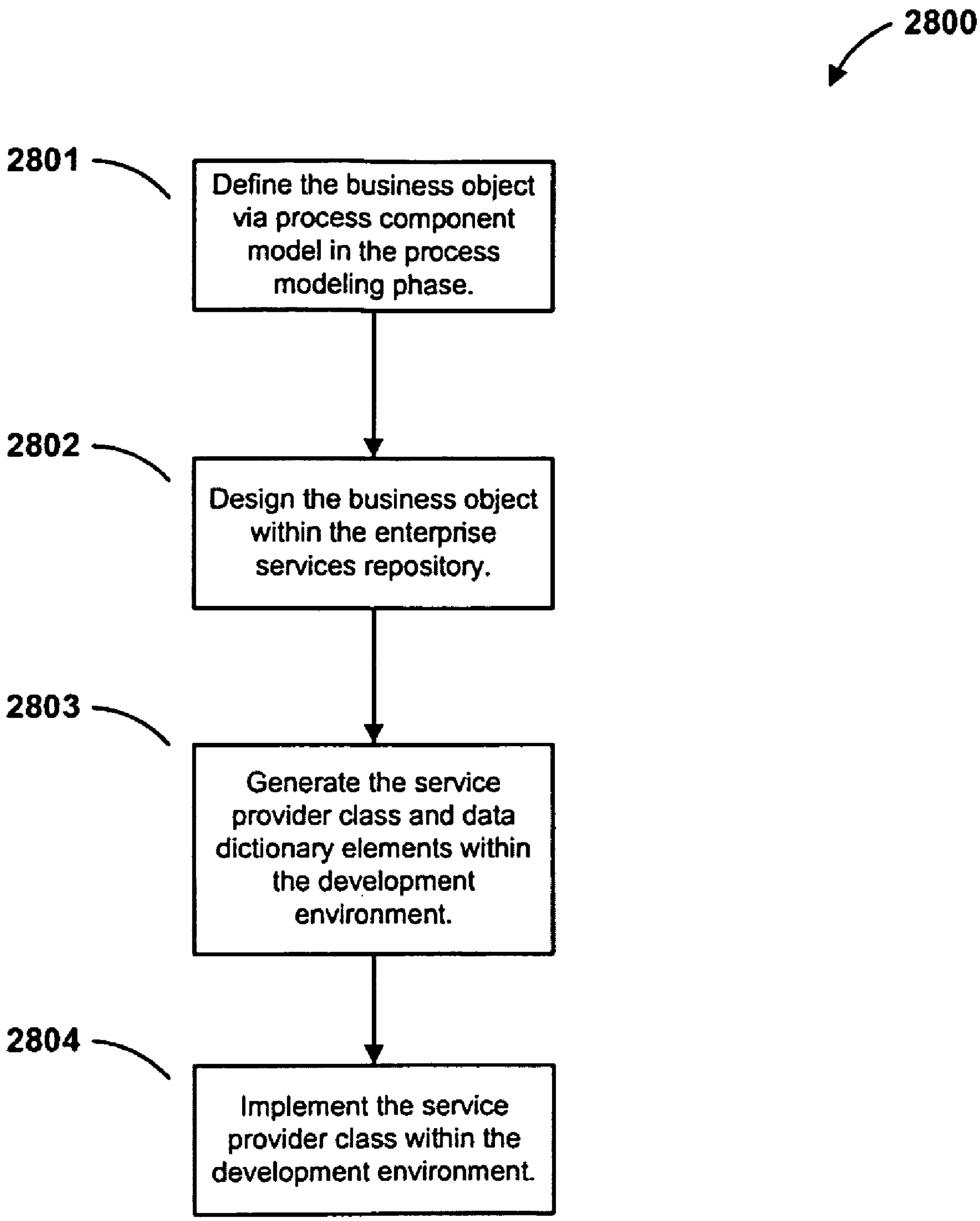
FIG. 28 illustrates an example method for service enabling in accordance with one embodiment of the present disclosure.
Figure 29:
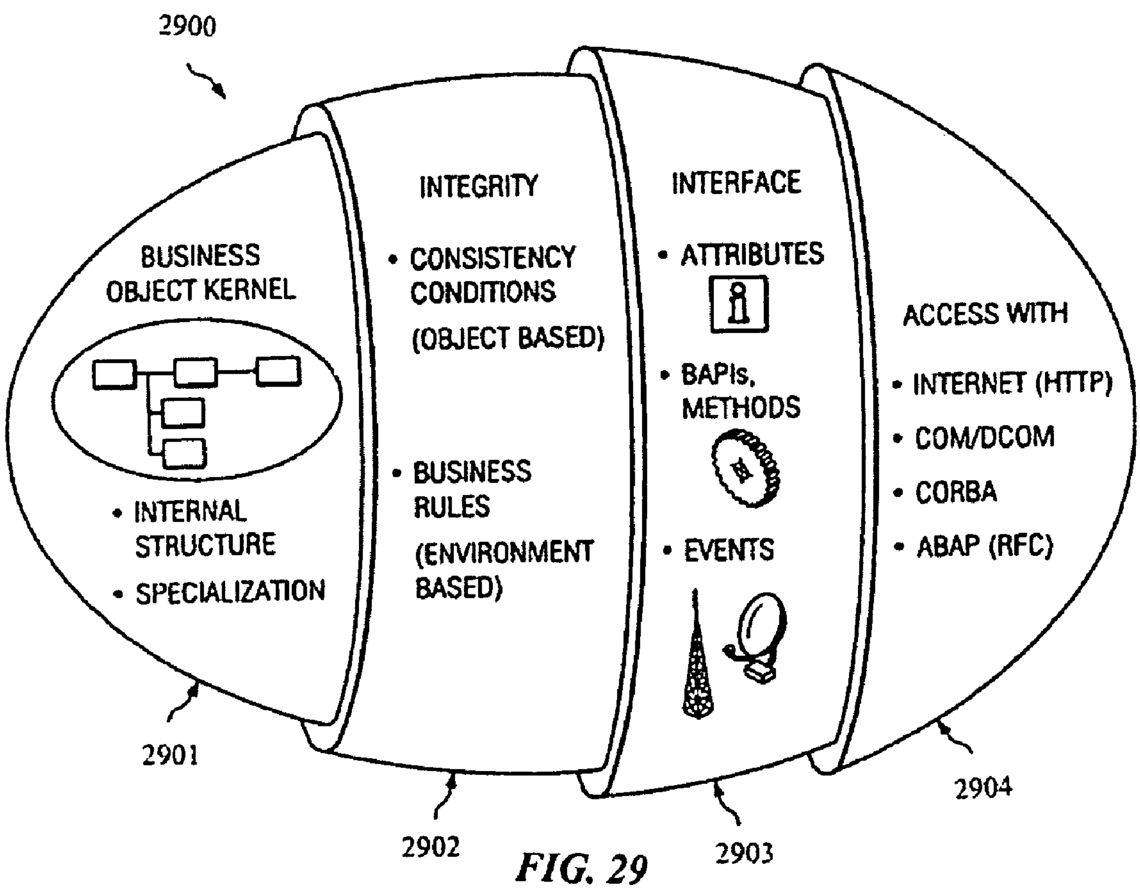
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
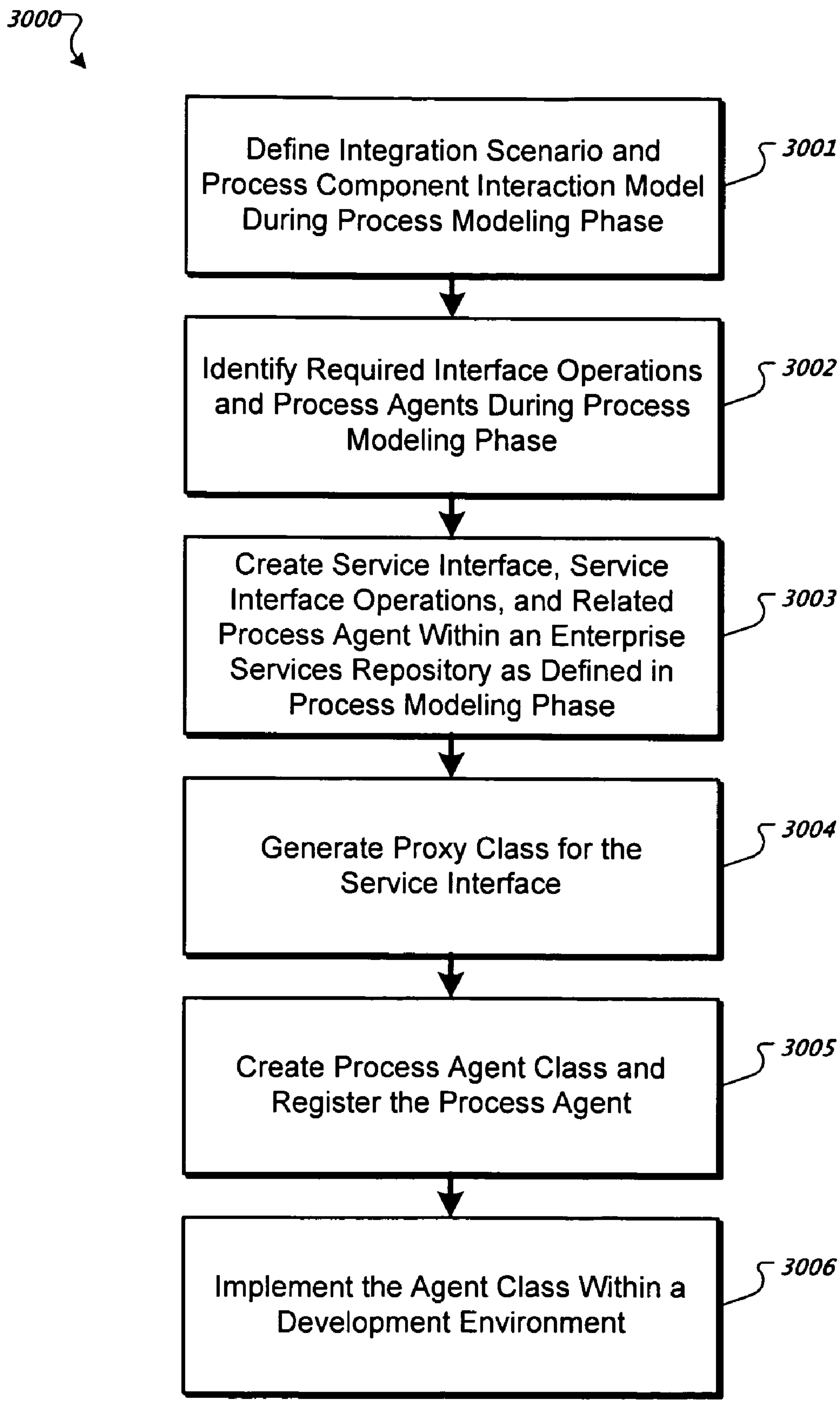
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
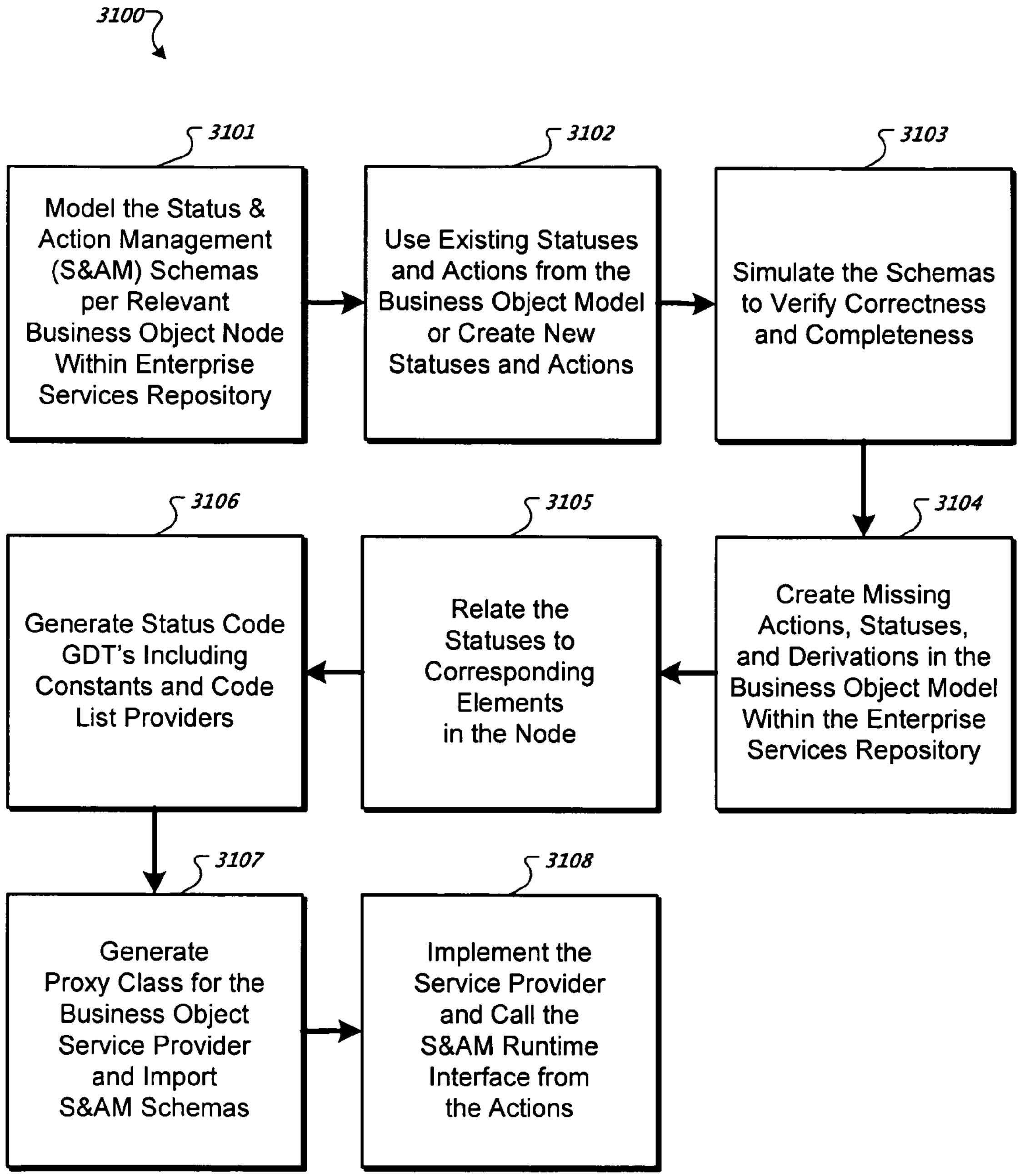
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

CostModel Interfaces

Figure 32:
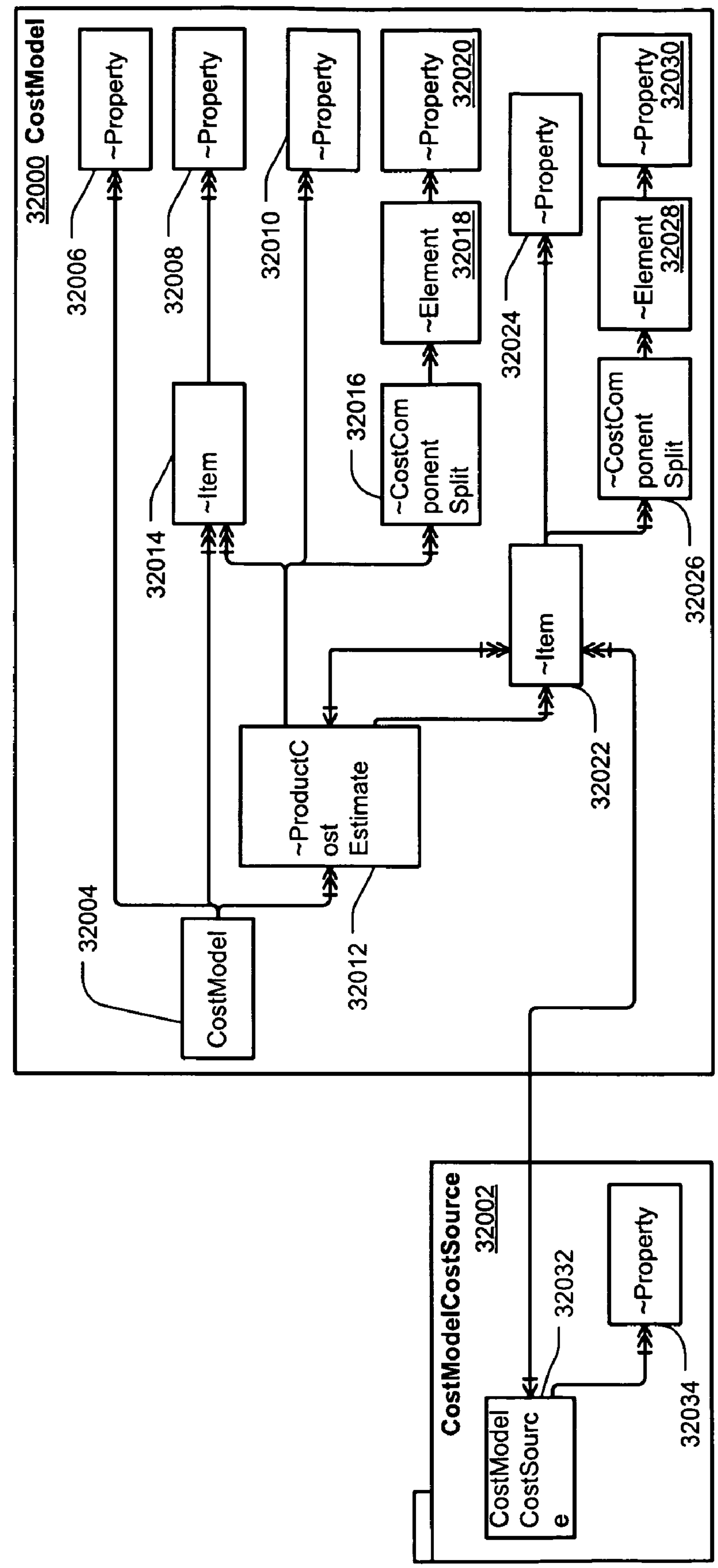
FIG. 32 shows an exemplary CostModel Object Model.

FIG. 32 illustrates an example CostModel business object model ABC000. Specifically, this model depicts interactions among various components of the CostModel, as well as external components that interact with the CostModel (shown here as 32002 and 32032 through 32034).

A Cost Model 32004 represents the cost simulation consisting of cost estimates with various cost sources such as resources, activities, and overhead cost surcharges. The CostModel 32004 groups information on all entities that contribute to the costs of an existing product or a product in the design phase. A CostModelProperty 32006 can be a specific property of a CostModel 32004 and its value. A CostModelItem 32014 represents an item of a CostModel 32004. It is related to a product the costs of which can be simulated within the CostModel 32004 for different production quantities. This product is represented by the CostModelProductCostEstimate 32012 the CostModelItem 32014 refers to. A CostModelItemProperty 32008 can be a specific property of a CostModelItem 32014 and its value. A CostModelProductCostEstimate 32012 is an estimate of the costs of a product or a semi-finished product within a CostModel 32004. A CostModelProductCostEstimateProperty 32010 can be a specific property of a CostModelProductCostEstimate 32012 and its value. A CostModelProductEstimateCostComponentSplit 32016 is a split of values related to a CostModelProductCostEstimate 32012 according to cost components. A CostModelProductCostEstimateCostComponentSplitElement 32018 includes information on the values related to a CostModelProductCostEstimate 32012 for a specific cost component. A CostModelProductCostEstimateCostComponentSplitElementProperty 32020 can be a specific property related to a CostModelProductCostEstimate 32012, i.e. a cost component or a cumulative value. A CostModelProductCostEstimateItem 32022 is an item of a CostModelProductCostEstimate 32012. It represents an entity that contributes to the total costs of the CostModelProductCostEstimate 32012. A CostModelProductCostEstimateItemProperty 32024 can be a specific property of a CostModelProductCostEstimateItem 32022 and its value. A CostModelProductEstimateCostComponentSplit 32026 is a split of the values related to a CostModelProductCostEstimateItem 32022 according to cost components. A CostModelProductCostEstimateItemCostComponentSplitElement 32028 includes information on the values related to a CostModelProductCostEstimateItem 32022 for a specific cost component. A CostModelProductCostEstimateCostItemComponentSplitElementProperty 32030 can be a specific property related to a CostModelProductCostEstimateItem 32022, i.e. a cost component or a key value.

Figure 33:
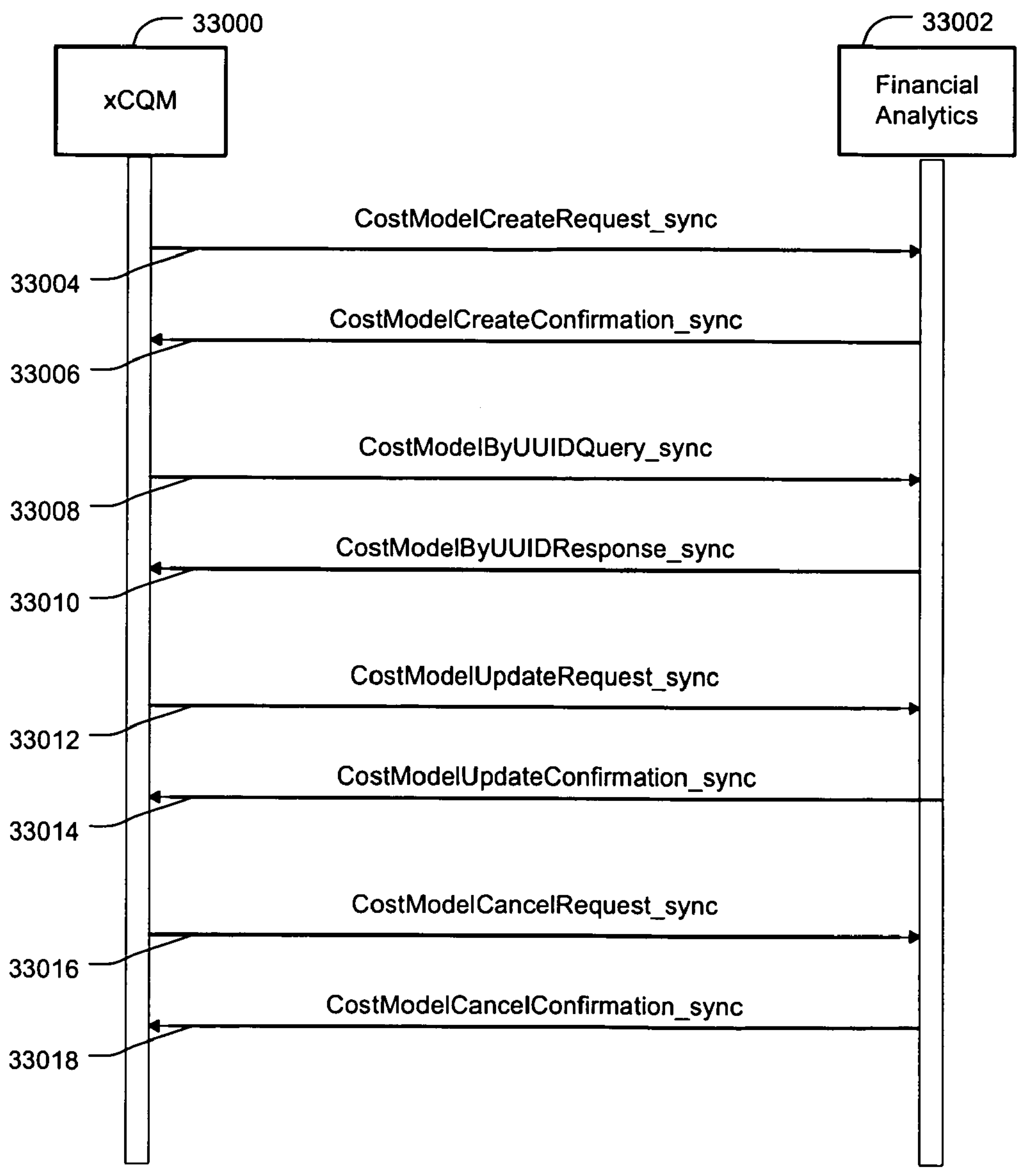
FIG. 33 shows an exemplary CostModel Message Choreography.

The message choreography of FIG. 33 describes a possible logical sequence of messages that can be used to realize a CostModel business scenario.

An "xCQM" system 33000 can request the creation of a cost model using a CostModelCreateRequest_sync message 33004 as shown, for example, in FIG. 33. A "Financial Analysis" system 33002 can confirm the request using a CostModelCreateConfirmation_sync message 33006 as shown, for example, in FIG. 33.

The "xCQM" system 33000 can query a cost model by UUID using a CostModelByUUIDQuery_sync message 33008 as shown, for example, in FIG. 33. The "Financial Analysis" system 33002 can respond to the query using a CostModelByUUIDResponse_sync message 33010 as shown, for example, in FIG. 33.

The "xCQM" system 33000 can request the update of a cost model using a CostModelUpdateRequest_sync message 33012 as shown, for example, in FIG. 33. The "Financial Analysis" system 33002 can confirm the request using a CostModelUpdateConfirmation_sync message 33014 as shown, for example, in FIG. 33.

The "xCQM" system 33000 can request the cancellation of a cost model using a CostModelCancelRequest_sync message 33016 as shown, for example, in FIG. 33. The "Financial Analysis" system 33002 can confirm the request using a CostModelCancelConfirmation_sync message 33018 as shown, for example, in FIG. 33.

Figure 34:
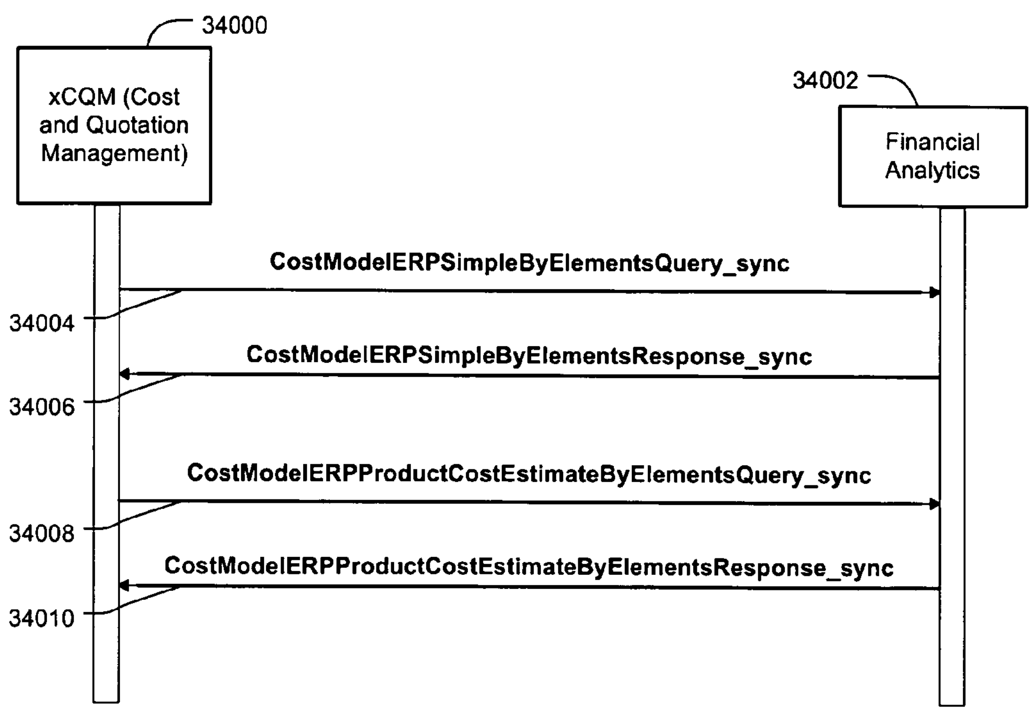
FIG. 34 shows an exemplary CostModel Message Choreography.

The message choreography of FIG. 34 describes another possible logical sequence of messages that can be used to realize a CostModel business scenario.

An "xCQM (Cost and Quotation Management)" system 34000 can query a cost model by elements using a CostModelERPSimpleByElementsQuery_sync message 34004 as shown, for example, in FIG. 34. A "Financial Analysis" system 34002 can respond to the query using a CostModelERPSimpleByElementsResponse_sync message 34006 as shown, for example, in FIG. 34.

The "xCQM (Cost and Quotation Management)" system 34000 can query cost model product cost estimates using a CostModelERPProductCostEstimateByElementsQuery_sync message 34008 as shown, for example, in FIG. 34. The "Financial Analysis" system 34002 can respond to the query using a CostModelERPProductCostEstimateByElementsResponse_sync message 34010 as shown, for example, in FIG. 34.

In the context of the composite Product Cost Model with Product Design Cost Estimate, the interface Manage CostModel provides service operations to create and edit cost models and to retrieve cost model data including cost component splits. The CostModel interface can perform various operations, namely a CostModelERPSimpleByElementsQueryResponse_sync, a CostModelERPProductCostEstimateByElementsQueryResponse_sync The message types for CostModel can include CostModelCreateRequest_sync, CostModelCreateConfirmation_sync, CostModelUpdateRequest_sync, CostModelUpdateConfirmation_sync, CostModelCancelRequest_sync, CostModelCancelConfirmation_sync, CostModelByIDQuery_sync, and CostModelByIDResponse_sync.

A CostModelCreateRequest_sync is a request to Financial Analytics to create a CostModel. The structure of the message type CostModelCreateRequest_sync is specified by the message data type CostModelCreateRequestMessage_sync, which is derived from the message data type CostModelMessage_sync.

A CostModelCreateConfirmation_sync is a confirmation to a CostModelCreateRequest_sync. The structure of the message type CostModelCreateConfirmation_sync is specified by the message data type CostModelCreateConfirmationMessage_sync, which is derived from the message data type CostModelMessage_sync.

A CostModelUpdateRequest_sync is a request to Financial Analytics to update a CostModel. The structure of the message type CostModelUpdateRequest_sync is specified by the message data type CostModelUpdateRequest Message_sync, which is derived from the message data type CostModelMessage_sync.

A CostModelUpdateConfirmation_sync is a confirmation to a CostModelUpdateRequest_sync. The structure of the message type CostModelUpdateConfirmation_sync is specified by the message data type CostModelUpdateConfirmationMessage_sync, which is derived from the message data type CostModelMessage_sync.

A CostModelCancelRequest_sync is a request to Financial Analytics to cancel a CostModel. The structure of the message type CostModelCancelRequest_sync is specified by the message data type CostModelCancelRequestMessage_sync, which is derived from the message data type CostModelMessage_sync.

A CostModelCancelConfirmation_sync is a confirmation to a CostModelCancelRequest_sync. The structure of the message type CostModelCancelConfirmation_sync is specified by the message data type CostModelCancelConfirmationMessage_sync, which is derived from the message data type CostModelMessage_sync.

A CostModelByIDQuery_sync is a request for a CostModel. The structure of the message type CostModelByIDQuery_sync is specified by the message data type CostModelByIDQueryMessage_sync.

A CostModelByIDResponse_sync is the response to a CostModelByIDQuery_sync. The structure of the message type CostModelByIDResponse_sync is specified by the message data type CostModelByIDResponseMessage_sync, which is derived from the message data type CostModelMessage_sync.

The interfaces for CostModel can include CostModelCreateRequestConfirmation_In, CostModelUpdateRequestConfirmation_In, CostModelCancelRequestConfirmation_In, and CostModelByIDQueryResponse_In.

Figures 1, 35:
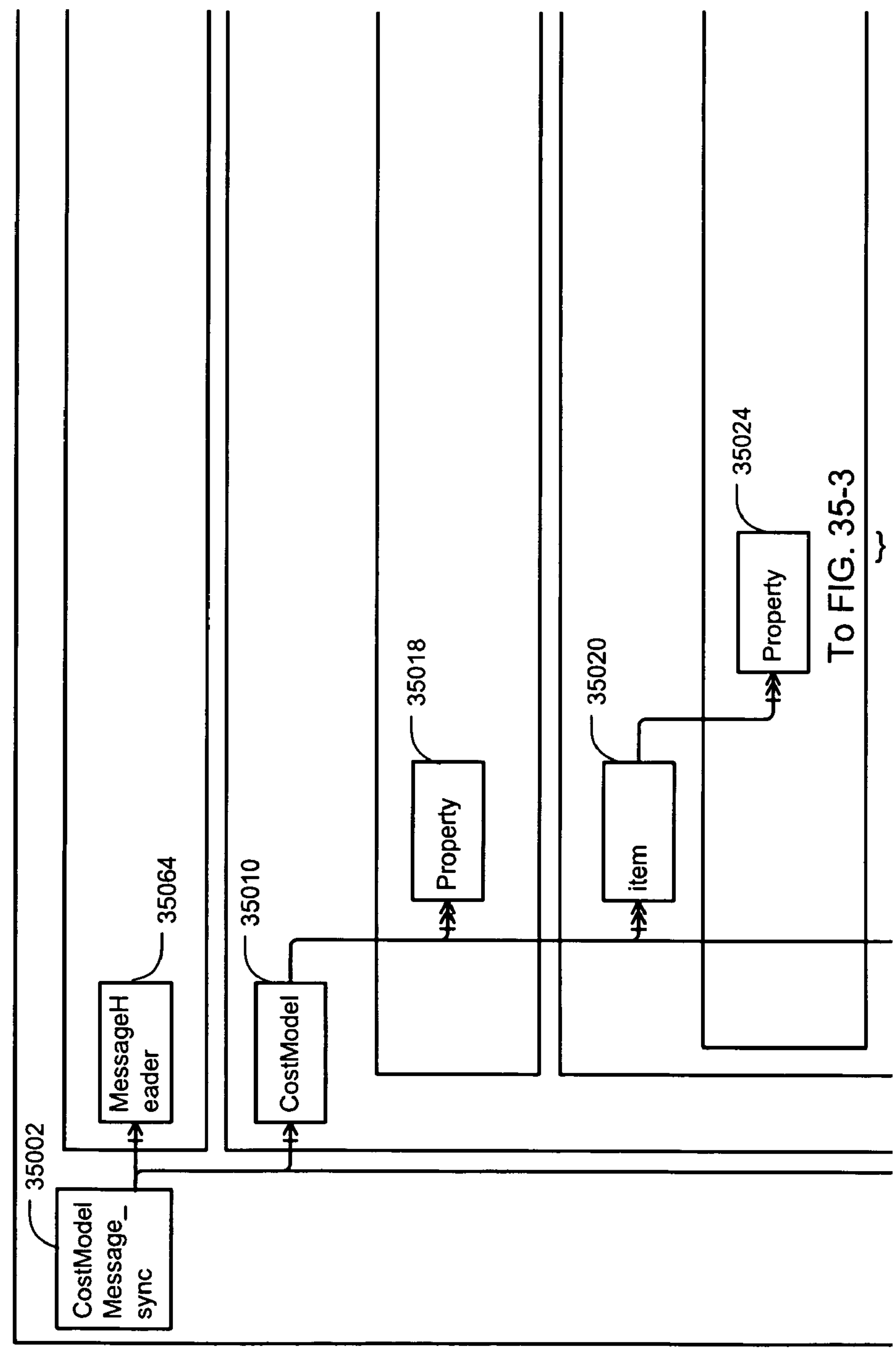
Figures 2, 35:
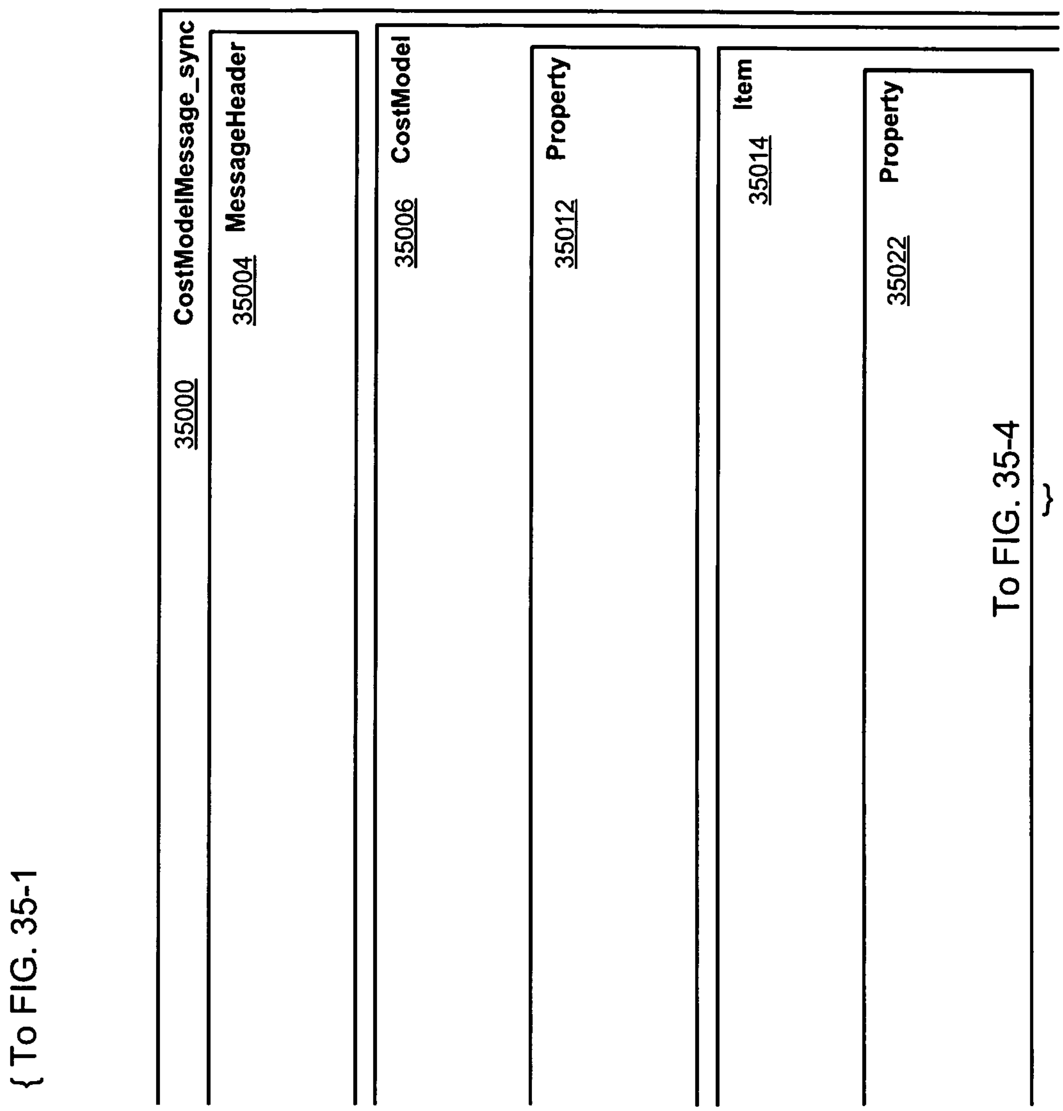

FIGS. 35-1 to 35-6 illustrate one example logical configuration of CostModelMessage_sync message 35000. Specifically, these figures depict the arrangement and hierarchy of various components such as one or more levels of packages, entities, and datatypes, shown here as 35000 through 35066. As described above, packages may be used to represent hierarchy levels. Entities are discrete business elements that are used during a business transaction. Data types are used to type object entities and interfaces with a structure. For example, CostModelMessage_sync message 35000 includes, among other things, CostModel 35006. Accordingly, heterogeneous applications may communicate using this consistent message configured as such.

Figure 36:
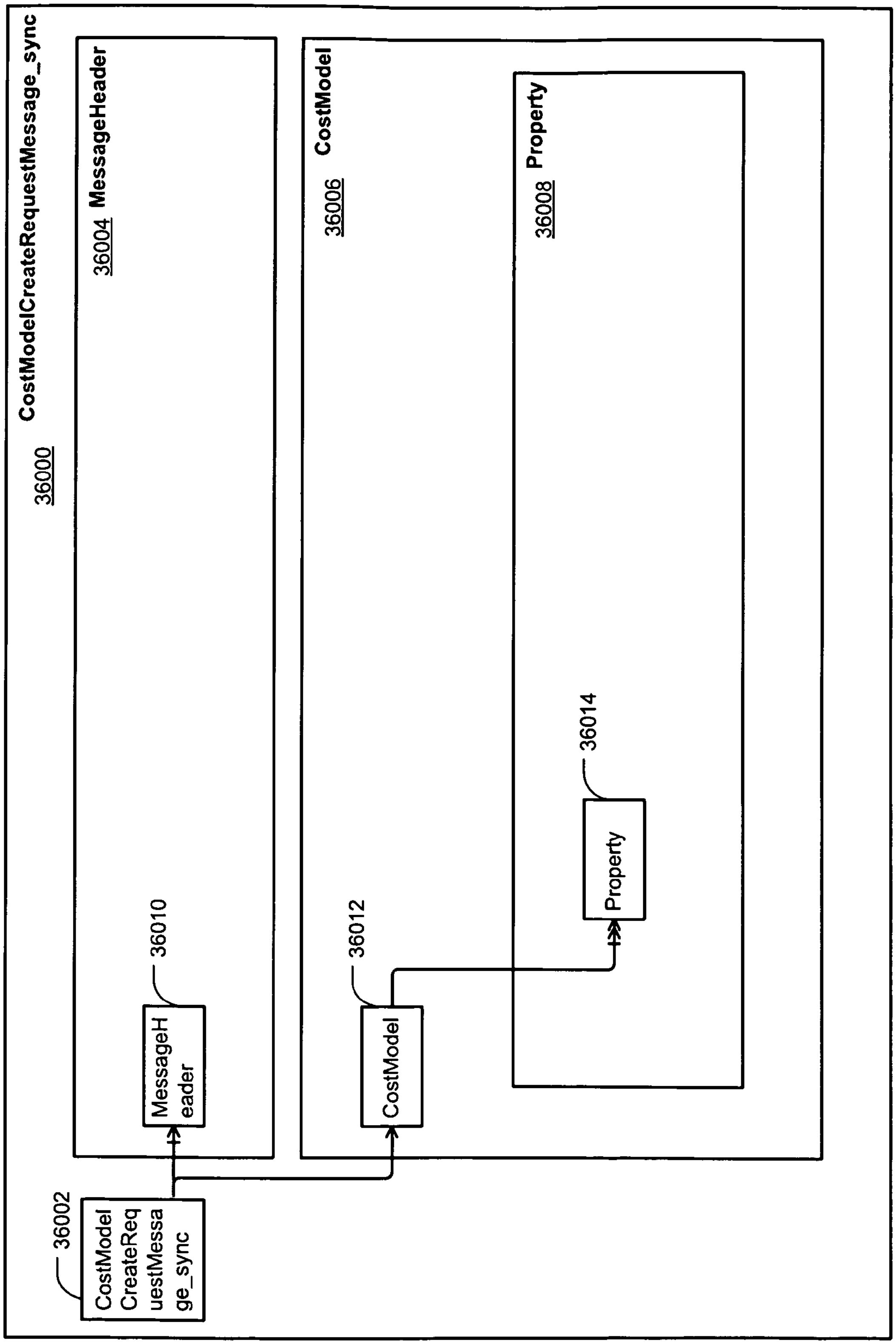
FIG. 36 shows an exemplary CostModelCreateRequestMessage_sync Message Data Type.

Additionally, FIG. 36 illustrates one example logical configuration of CostModelCreateRequestMessage_sync message 36000. Specifically, this figure depicts the arrangement and hierarchy of various components such as one or more levels of packages, entities, and datatypes, shown here as 36000 through 36014. As described above, packages may be used to represent hierarchy levels. Entities are discrete business elements that are used during a business transaction. Data types are used to type object entities and interfaces with a structure. For example, CostModelCreateRequestMessage_sync message 36000 includes, among other things, Cost- Model 36006. Accordingly, heterogeneous applications may communicate using this consistent message configured as such.

Figure 37:
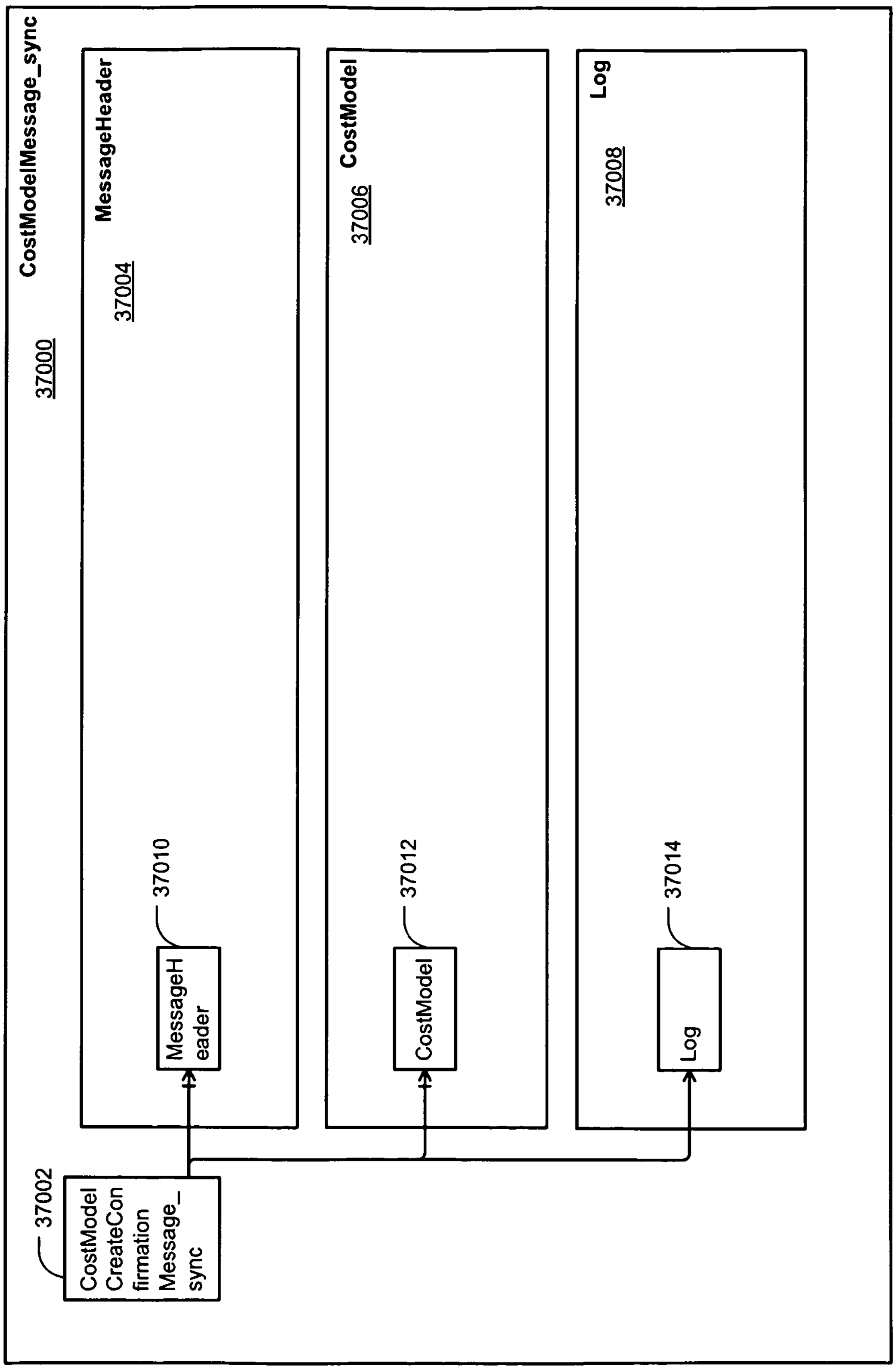
FIG. 37 shows an exemplary CostModelCreateConfirmationMessage_sync Message Data Type.

Additionally, FIG. 37 illustrates one example logical configuration of CostModelMessage_sync message 37000. Specifically, this figure depicts the arrangement and hierarchy of various components such as one or more levels of packages, entities, and datatypes, shown here as 37000 through 37014. As described above, packages may be used to represent hierarchy levels. Entities are discrete business elements that are used during a business transaction. Data types are used to type object entities and interfaces with a structure. For example, CostModelMessage_sync message 37000 includes, among other things, CostModel 37006. Accordingly, heterogeneous applications may communicate using this consistent message configured as such.

Figure 38:
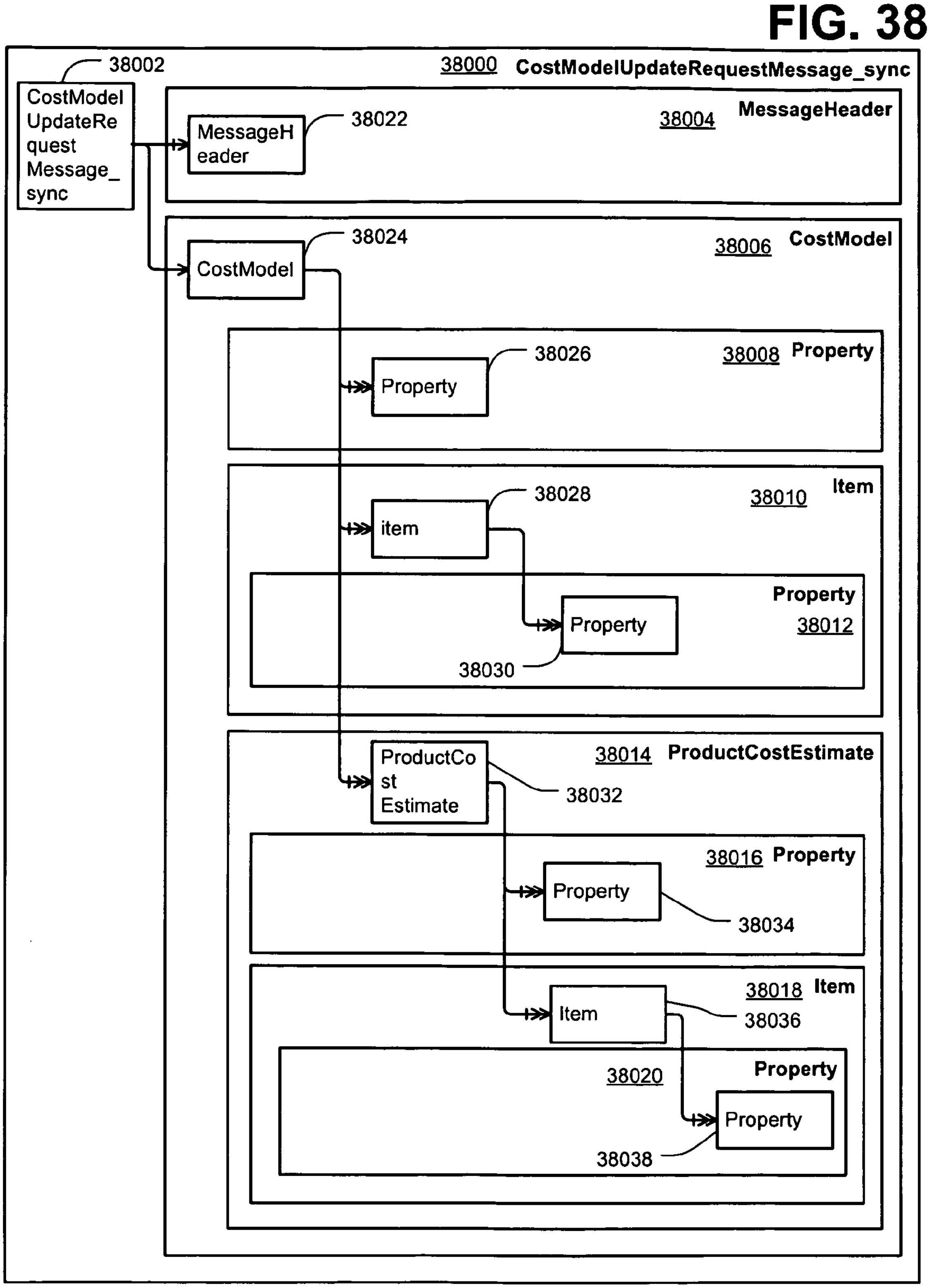
FIG. 38 shows an exemplary CostModelUpdateRequestMessage_sync Message Data Type.

Additionally, FIG. 38 illustrates one example logical configuration of CostModelUpdateRequestMessage_sync message 38000. Specifically, this figure depicts the arrangement and hierarchy of various components such as one or more levels of packages, entities, and datatypes, shown here as 38000 through 38038. As described above, packages may be used to represent hierarchy levels. Entities are discrete business elements that are used during a business transaction. Data types are used to type object entities and interfaces with a structure. For example, CostModelUpdateRequestMessage_sync message 38000 includes, among other things, CostModel 38006. Accordingly, heterogeneous applications may communicate using this consistent message configured as such.

Figure 39:
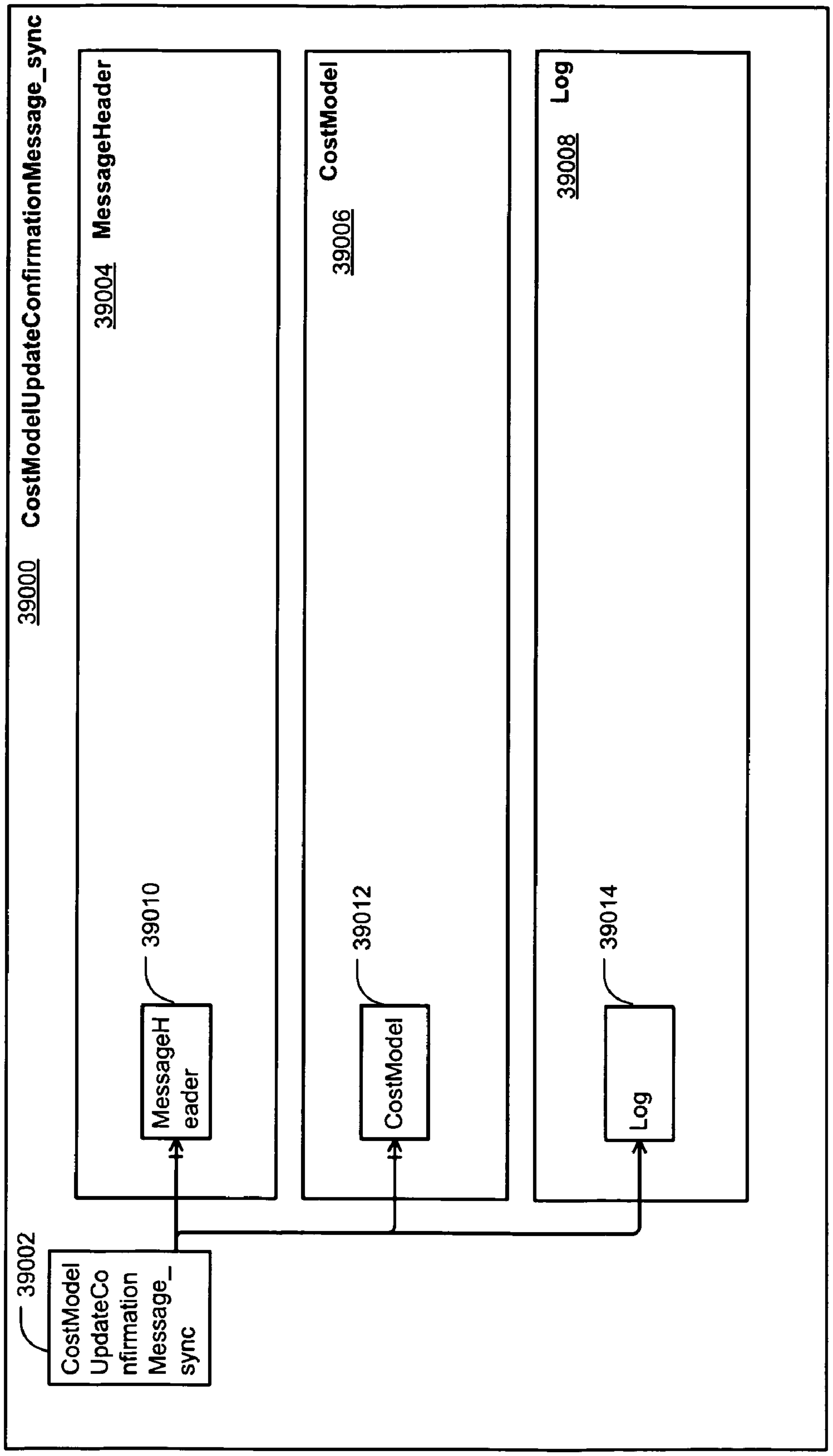
FIG. 39 shows an exemplary CostModelUpdateConfirmationMessage_sync Message Data Type.

Additionally, FIG. 39 illustrates one example logical configuration of CostModelUpdateConfirmationMessage_sync message 39000. Specifically, this figure depicts the arrangement and hierarchy of various components such as one or more levels of packages, entities, and datatypes, shown here as 39000 through 39014. As described above, packages may be used to represent hierarchy levels. Entities are discrete business elements that are used during a business transaction. Data types are used to type object entities and interfaces with a structure. For example, CostModelUpdateConfirmationMessage_sync message 39000 includes, among other things, CostModel 39006. Accordingly, heterogeneous applications may communicate using this consistent message configured as such.

Figure 40:
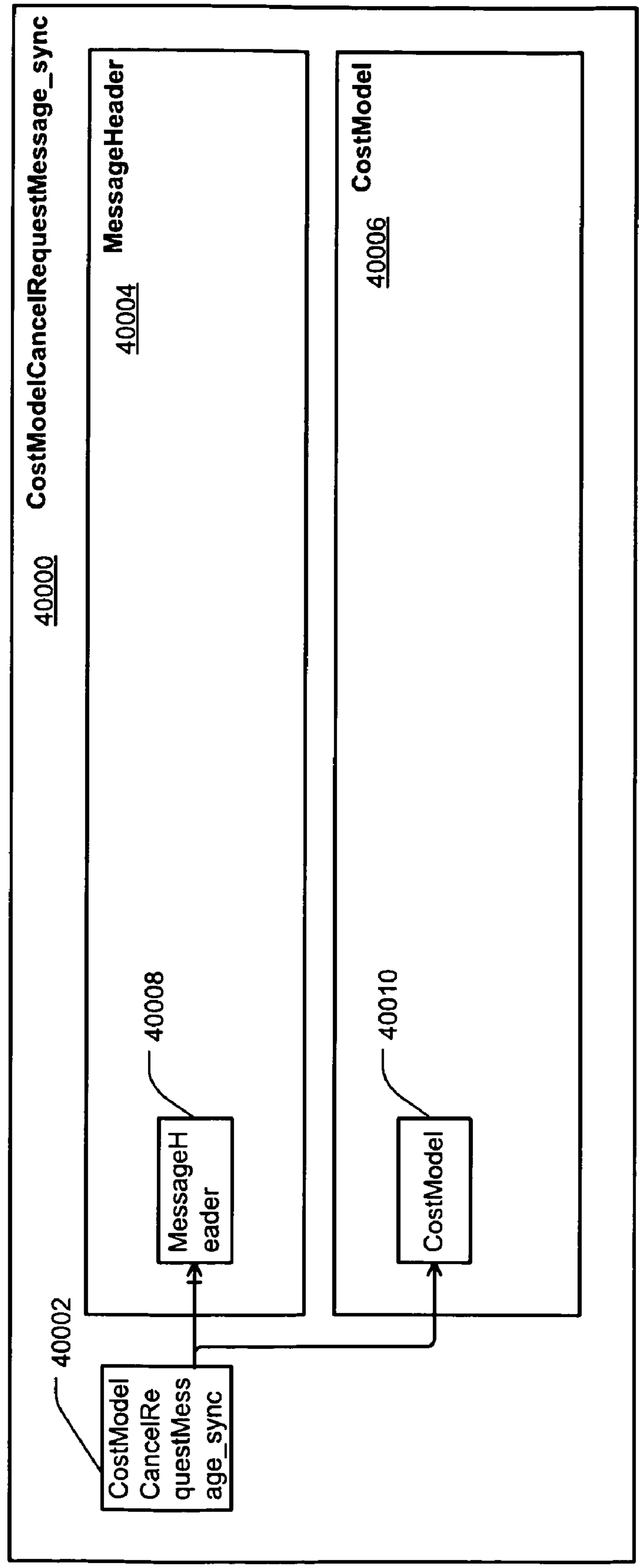
FIG. 40 shows an exemplary CostModelCancelRequestMessage_sync Message Data Type.

Additionally, FIG. 40 illustrates one example logical configuration of CostModelCancelRequestMessage_sync message 40000. Specifically, this figure depicts the arrangement and hierarchy of various components such as one or more levels of packages, entities, and datatypes, shown here as 40000 through 40010. As described above, packages may be used to represent hierarchy levels. Entities are discrete business elements that are used during a business transaction. Data types are used to type object entities and interfaces with a structure. For example, CostModelCancelRequestMessage_sync message 40000 includes, among other things, CostModel 40006. Accordingly, heterogeneous applications may communicate using this consistent message configured as such.

Figure 41:
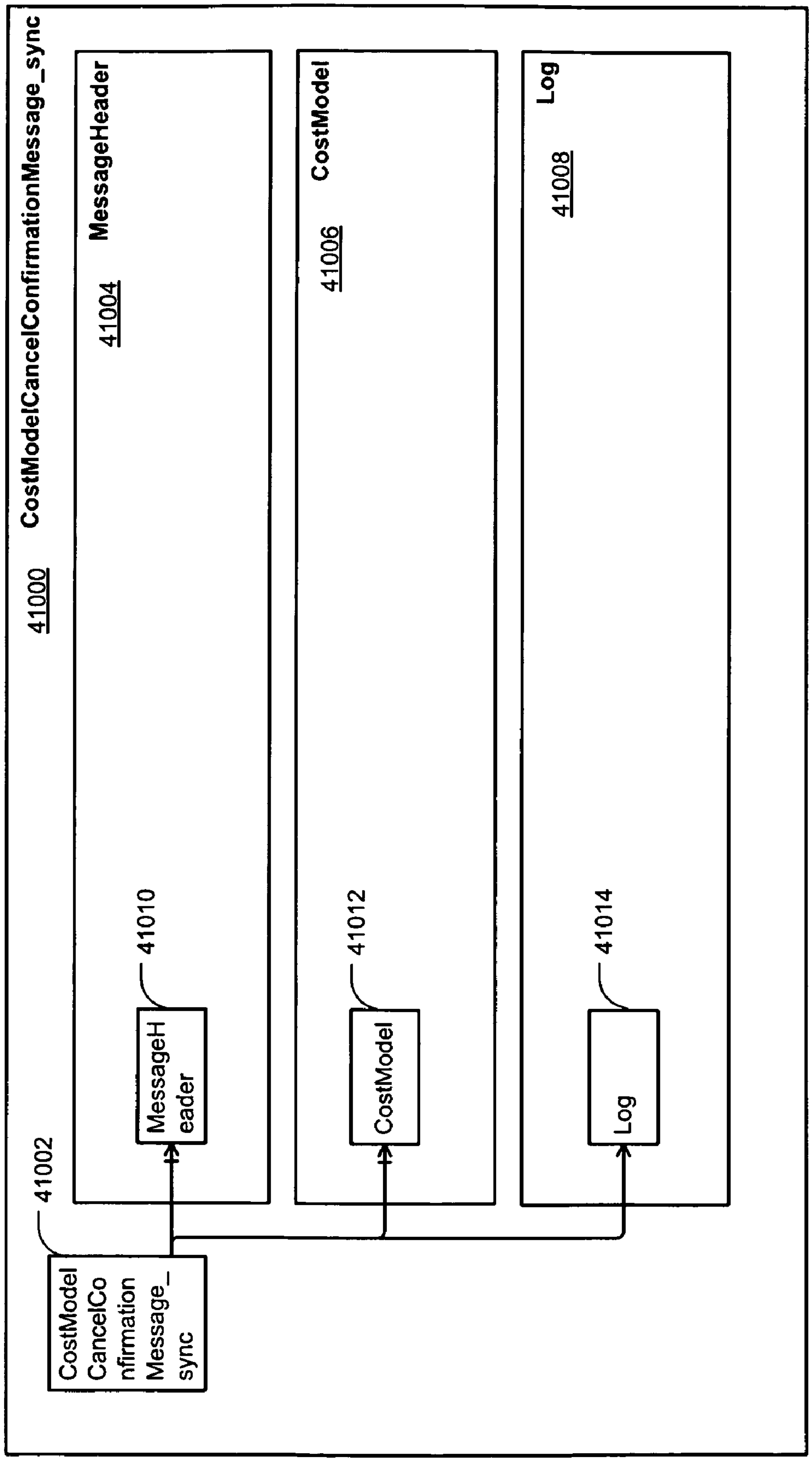
FIG. 41 shows an exemplary CostModelCancelConfirmationMessage_sync Message Data Type.

Additionally, FIG. 41 illustrates one example logical configuration of CostModelCancelConfirmationMessage_sync message 41000. Specifically, this figure depicts the arrangement and hierarchy of various components such as one or more levels of packages, entities, and datatypes, shown here as 41000 through 41014. As described above, packages may be used to represent hierarchy levels. Entities are discrete business elements that are used during a business transaction. Data types are used to type object entities and interfaces with a structure. For example, CostModelCancelConfirmationMessage_sync message 41000 includes, among other things, CostModel 41006. Accordingly, heterogeneous applications may communicate using this consistent message configured as such.

Figures 1, 42:
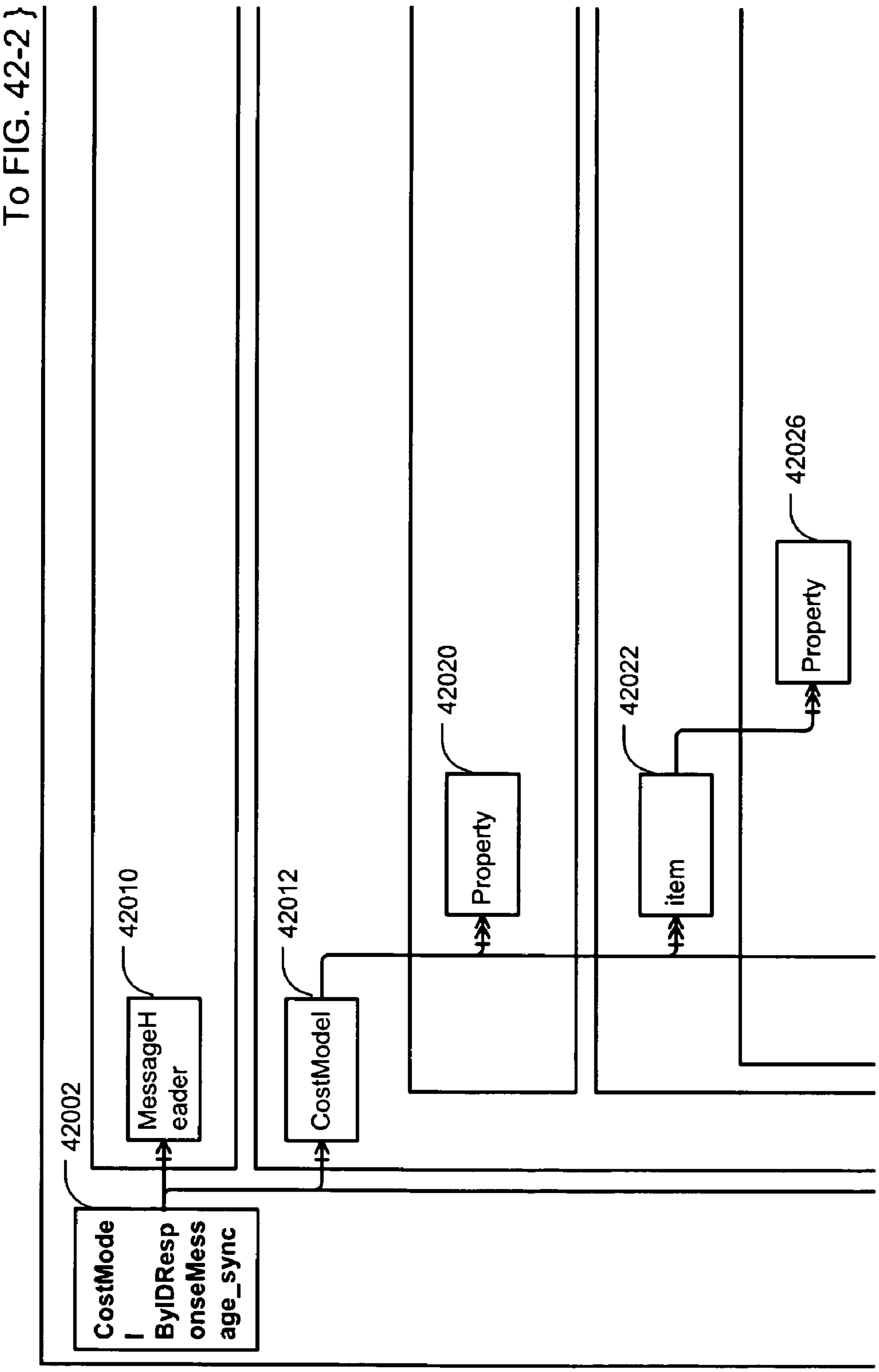
Figures 2, 42:
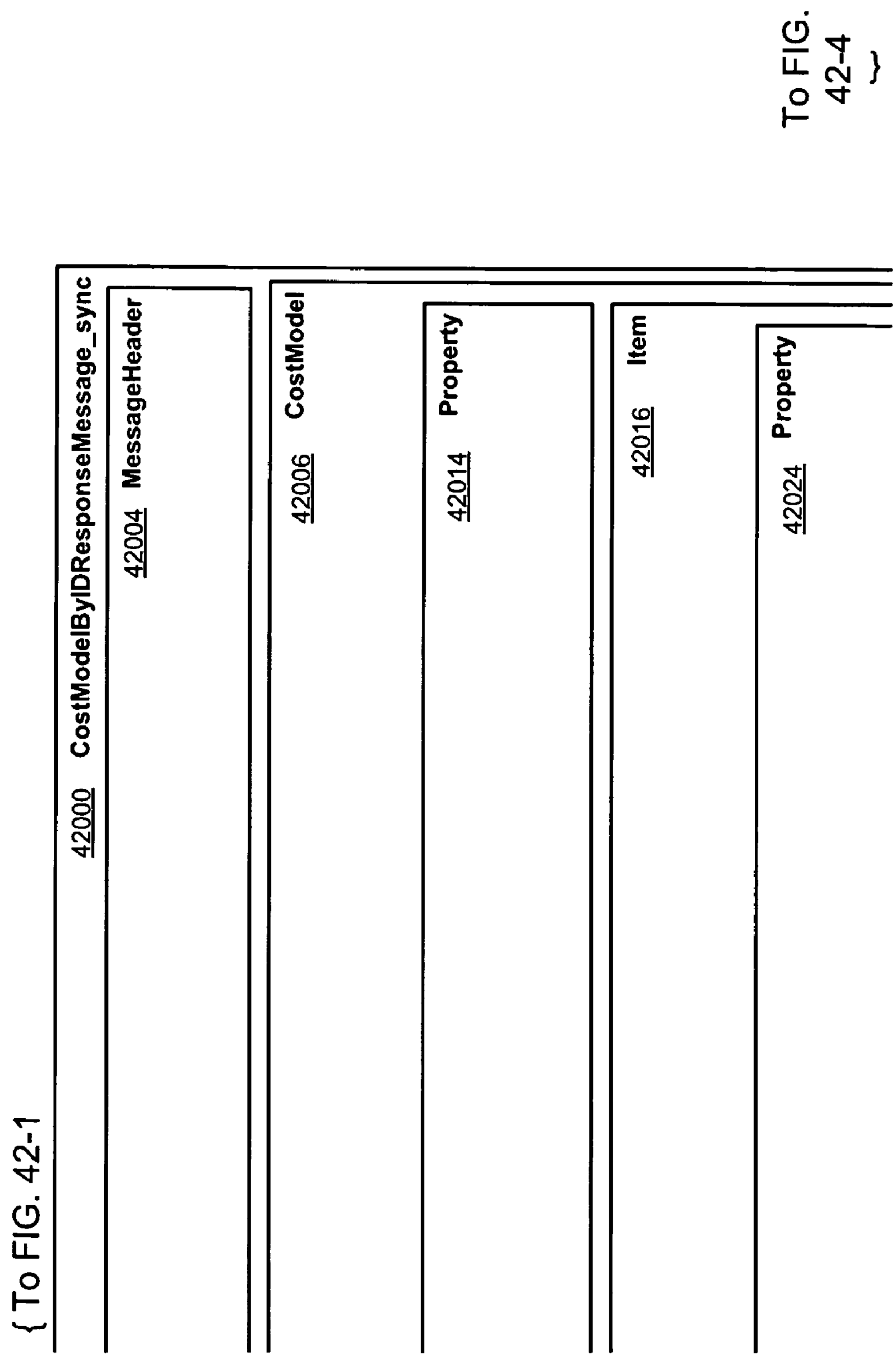
Figures 3, 42:
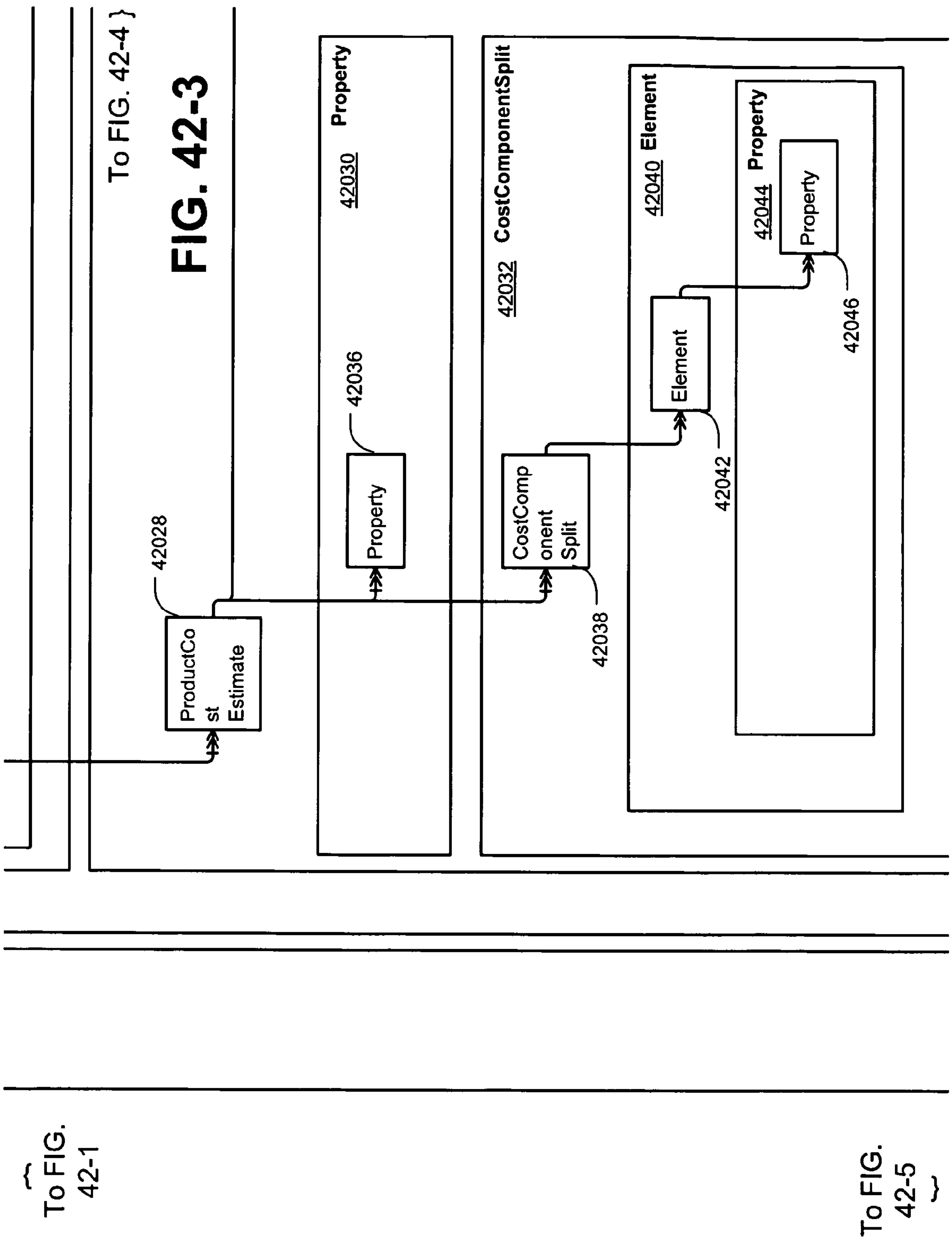
Figures 4, 42:
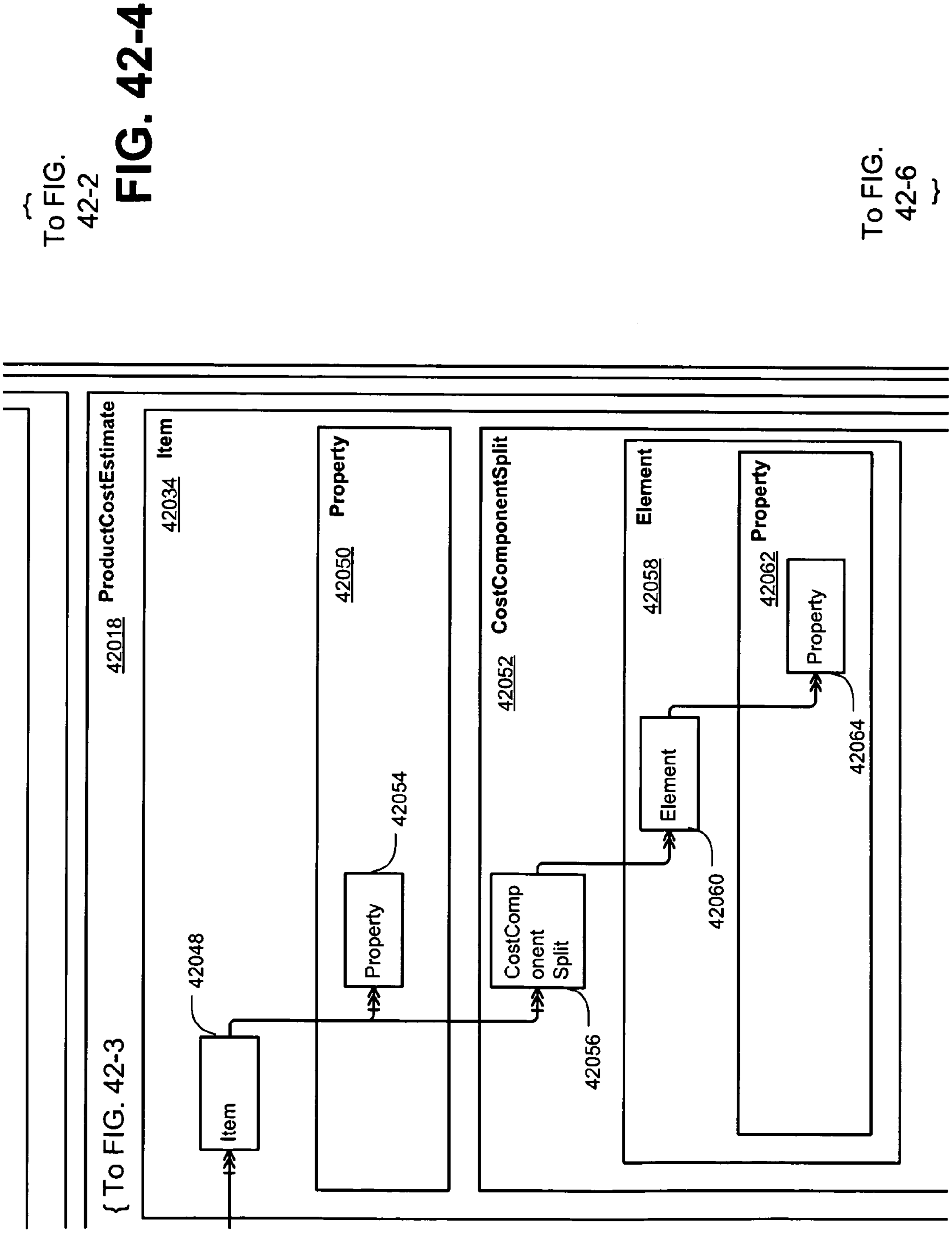
Figures 5, 42:
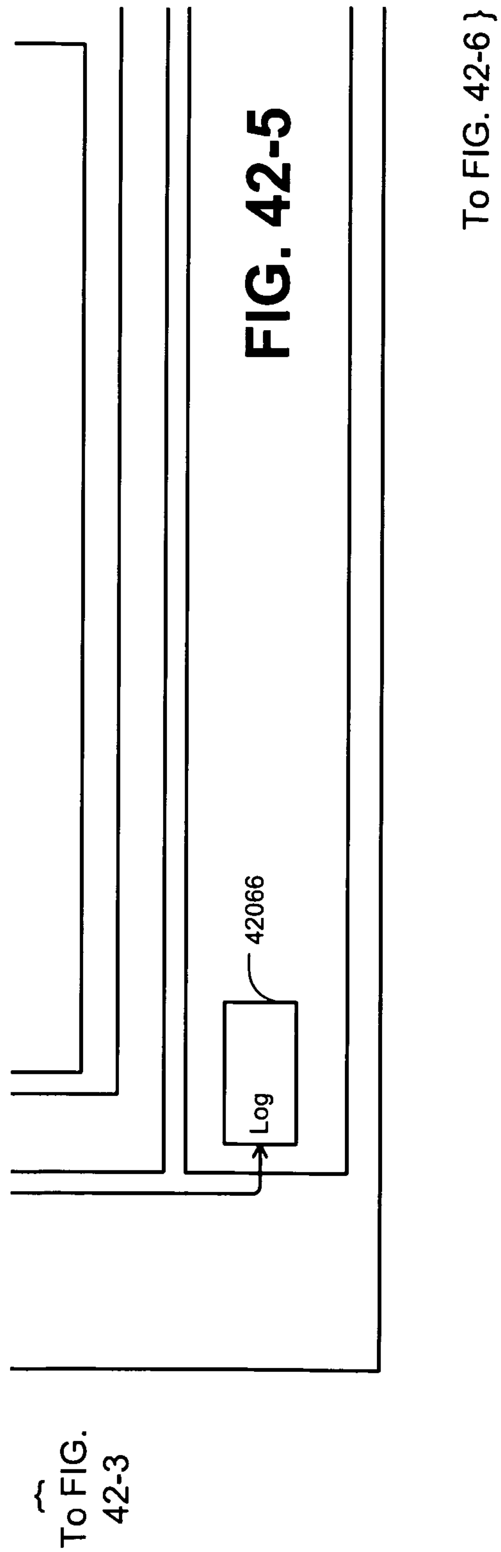
Figures 6, 42:
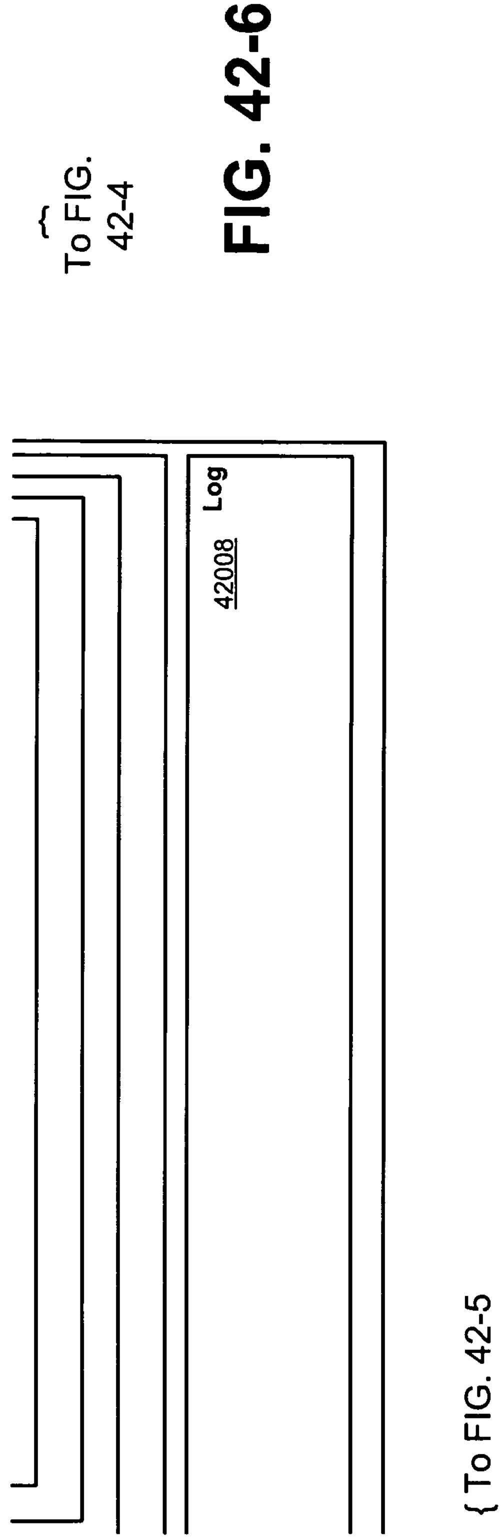

Additionally, FIGS. 42-1 to 42-6 illustrate one example logical configuration of CostModelByIDResponseMessage_sync message 42000. Specifically, these figures depict the arrangement and hierarchy of various components such as one or more levels of packages, entities, and datatypes, shown here as 42000 through 42066. As described above, packages may be used to represent hierarchy levels. Entities are discrete business elements that are used during a business transaction. Data types are used to type object entities and interfaces with a structure. For example, CostModelByIDResponseMessage_sync message 42000 includes, among other things, CostModel 42006. Accordingly, heterogeneous applications may communicate using this consistent message configured as such.

Figure 43:
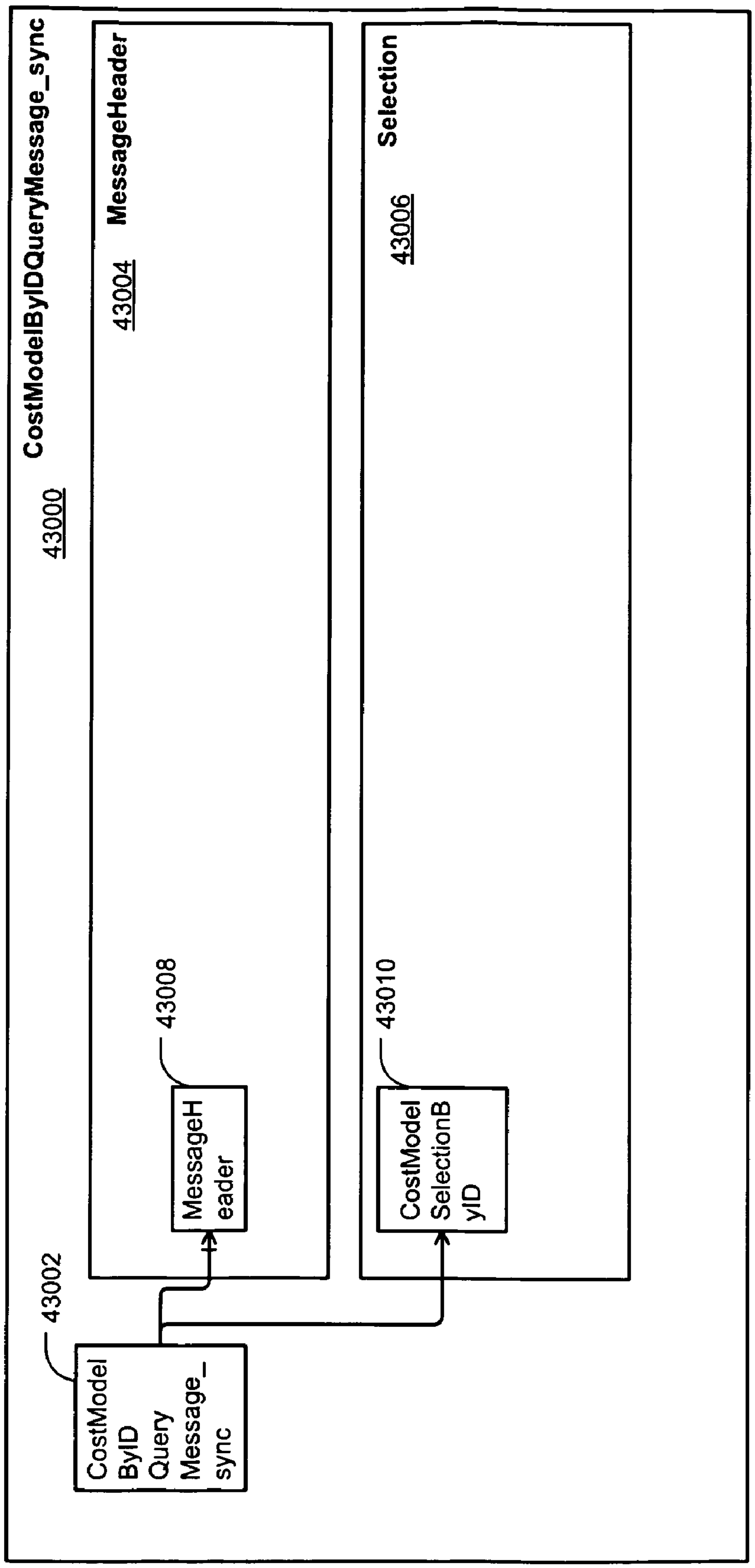
FIG. 43 shows an exemplary CostModelByIDQueryMessage_sync Message Data Type.

Additionally, FIG. 43 illustrates one example logical configuration of CostModelByIDQueryMessage_sync message 43000. Specifically, this figure depicts the arrangement and hierarchy of various components such as one or more levels of packages, entities, and datatypes, shown here as 43000 through 43010. As described above, packages may be used to represent hierarchy levels. Entities are discrete business elements that are used during a business transaction. Data types are used to type object entities and interfaces with a structure. For example, CostModelByIDQueryMessage_sync message 43000 includes, among other things, Selection 43006. Accordingly, heterogeneous applications may communicate using this consistent message configured as such.

Figure 44:
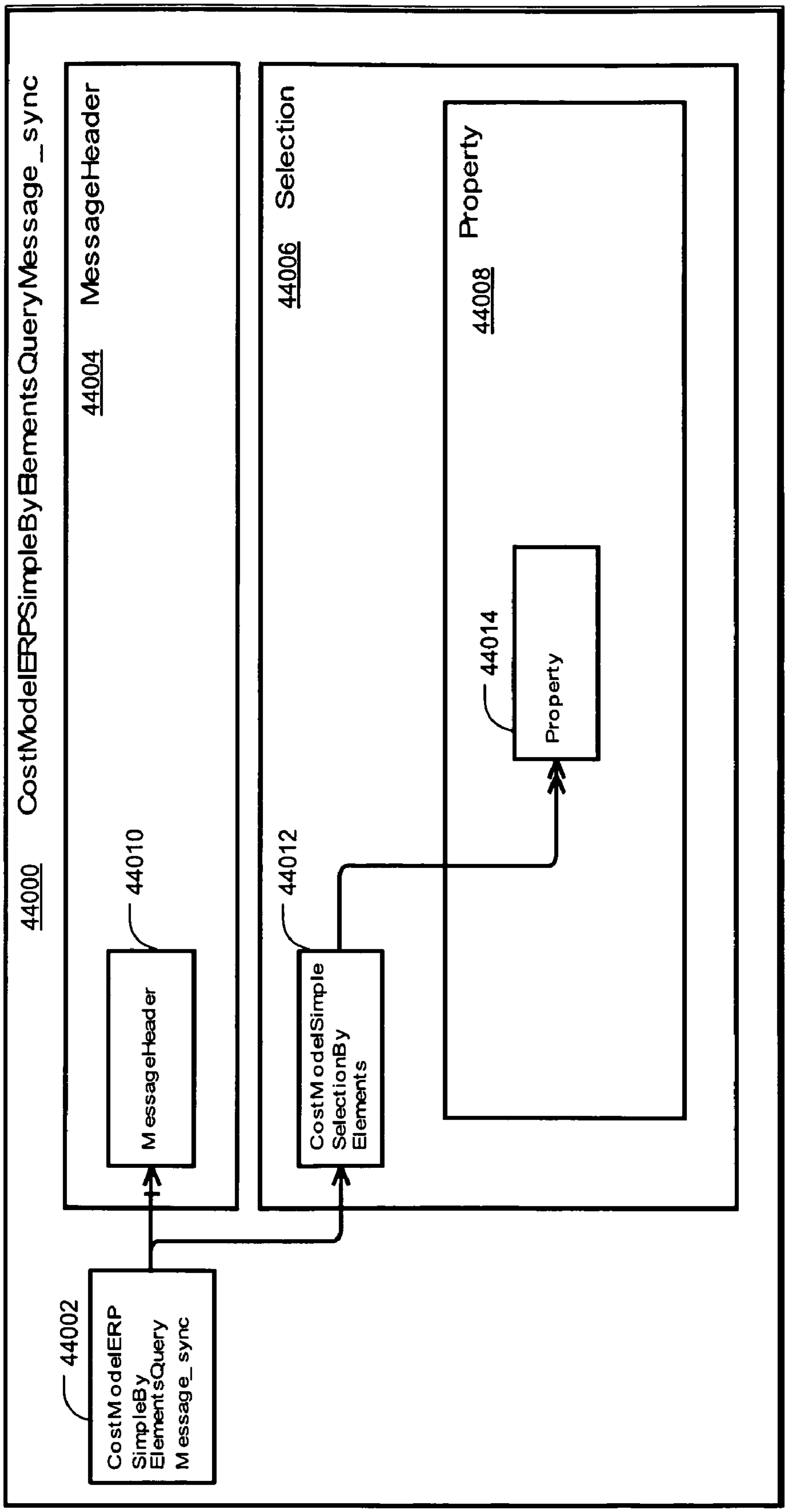
FIG. 44 shows an exemplary CostModelERPSimpleByElementsQueryMessage_sync Message Data Type.

Additionally, FIG. 44 illustrates one example logical configuration of CostModelERPSimpleByElementsQueryMessage_sync message 44000. Specifically, this figure depicts the arrangement and hierarchy of various components such as one or more levels of packages, entities, and datatypes, shown here as 44000 through 44014. As described above, packages may be used to represent hierarchy levels. Entities are discrete business elements that are used during a business transaction. Data types are used to type object entities and interfaces with a structure. For example, CostModelERPSimpleByElementsQueryMessage_sync message 44000 includes, among other things, Selection 44006. Accordingly, heterogeneous applications may communicate using this consistent message configured as such.

Figure 45:
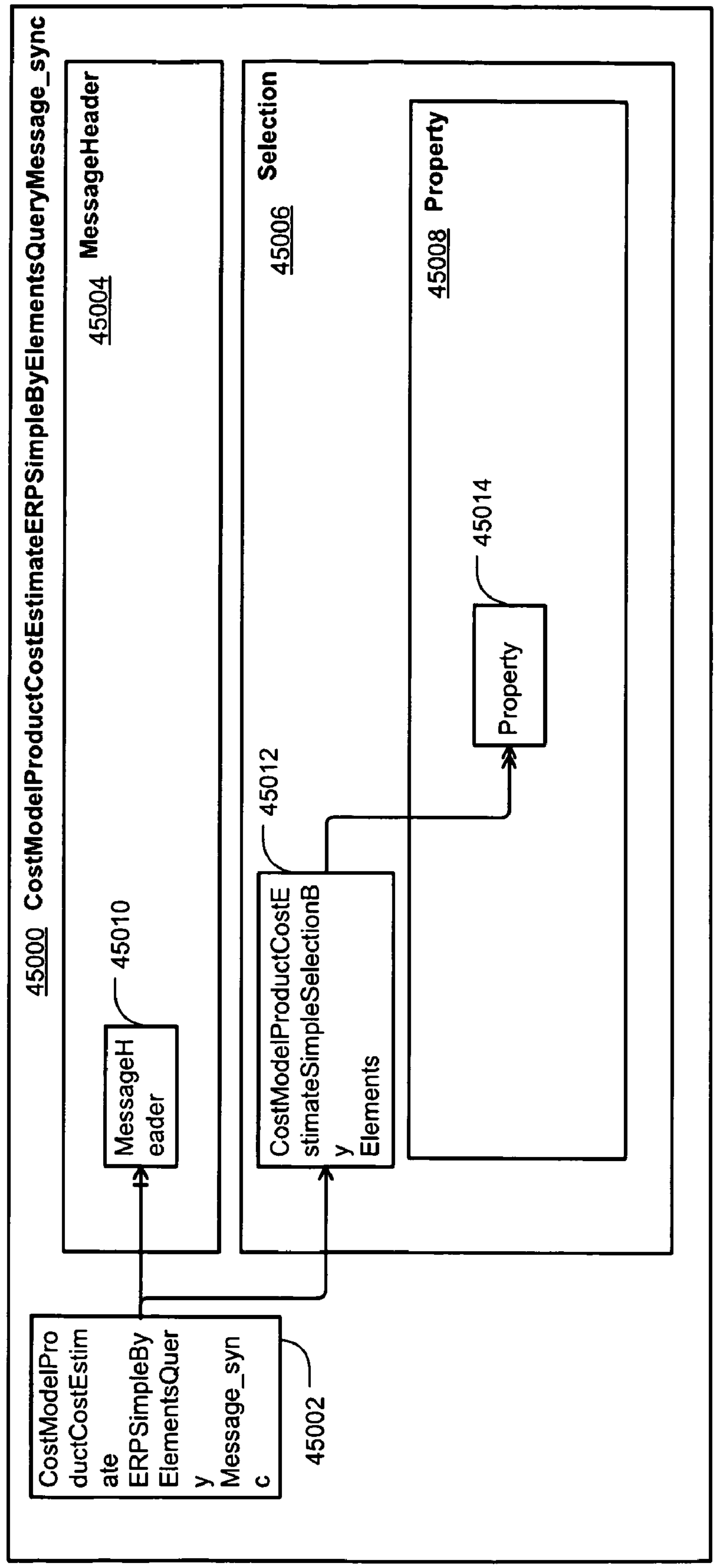
FIG. 45 shows an exemplary CostModelERPSimpleByElementsResponseMessage_sync Message Data Type.

Additionally, FIG. 45 illustrates one example logical configuration of CostModelProductCostEstimateERPSimpleByElementsQueryMessage_sync message 45000. Specifically, this figure depicts the arrangement and hierarchy of various components such as one or more levels of packages, entities, and datatypes, shown here as 45000 through 45014. As described above, packages may be used to represent hierarchy levels. Entities are discrete business elements that are used during a business transaction. Data types are used to type object entities and interfaces with a structure. For example, CostModelProductCostEstimateERPSimpleByElementsQueryMessage_sync message 45000 includes, among other things, Selection 45006. Accordingly, heterogeneous applications may communicate using this consistent message configured as such.

Figure 46:
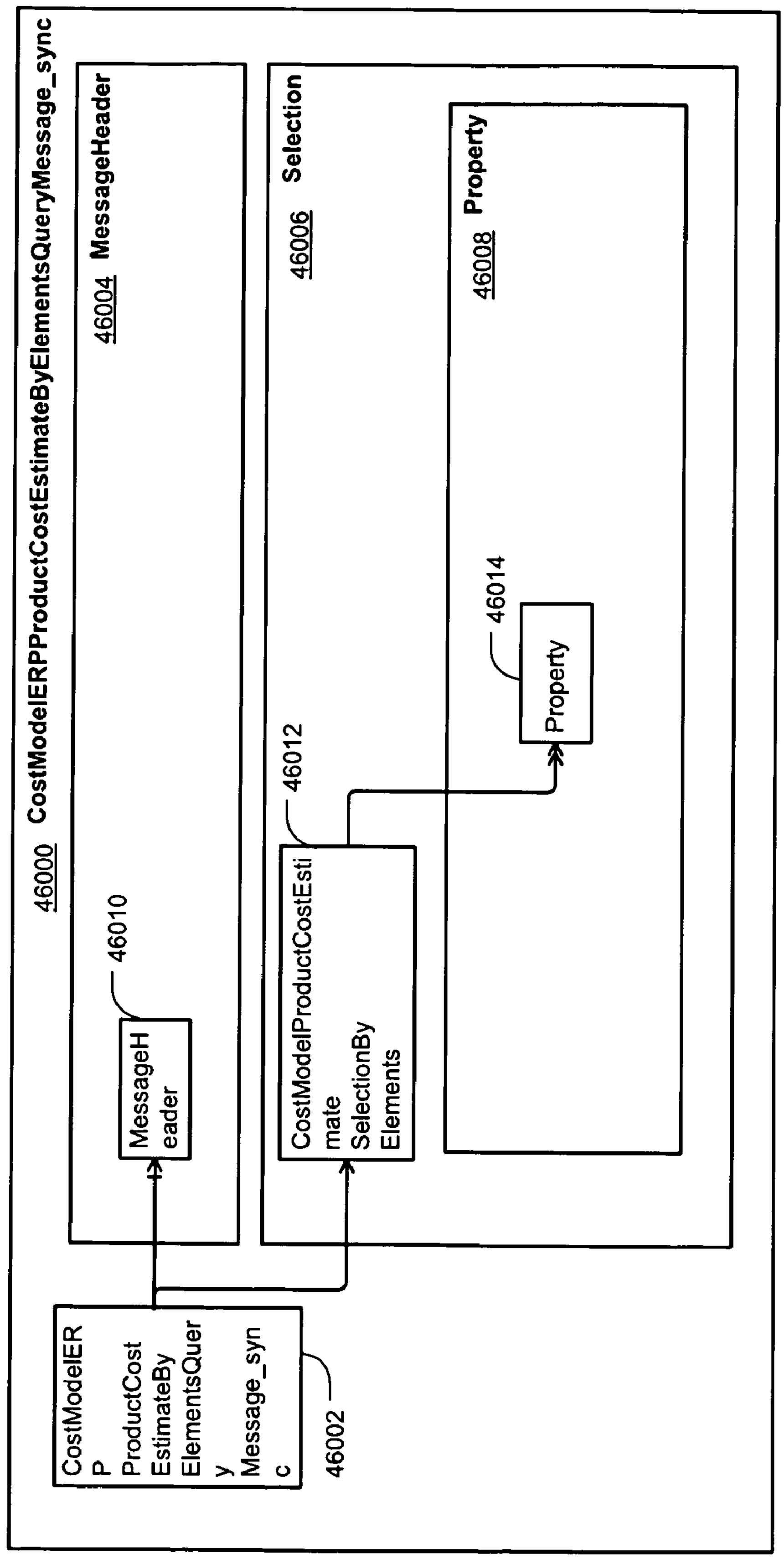
FIG. 46 shows an exemplary CostModelERPProductCostEstimateByProductCostEstimateElementsQueryMessage_sync Message Data Type.

Additionally, FIG. 46 illustrates one example logical configuration of CostModelERPProductCostEstimateByElementsQueryMessage_sync message 46000. Specifically, this figure depicts the arrangement and hierarchy of various components such as one or more levels of packages, entities, and datatypes, shown here as 46000 through 46014.

As described above, packages may be used to represent hierarchy levels. Entities are discrete business elements that are used during a business transaction. Data types are used to type object entities and interfaces with a structure. For example, CostModelERPProductCostEstimateByElementsQueryMessage_sync message 46000 includes, among other things, Selection 46006. Accordingly, heterogeneous applications may communicate using this consistent message configured as such.

Figure 47:
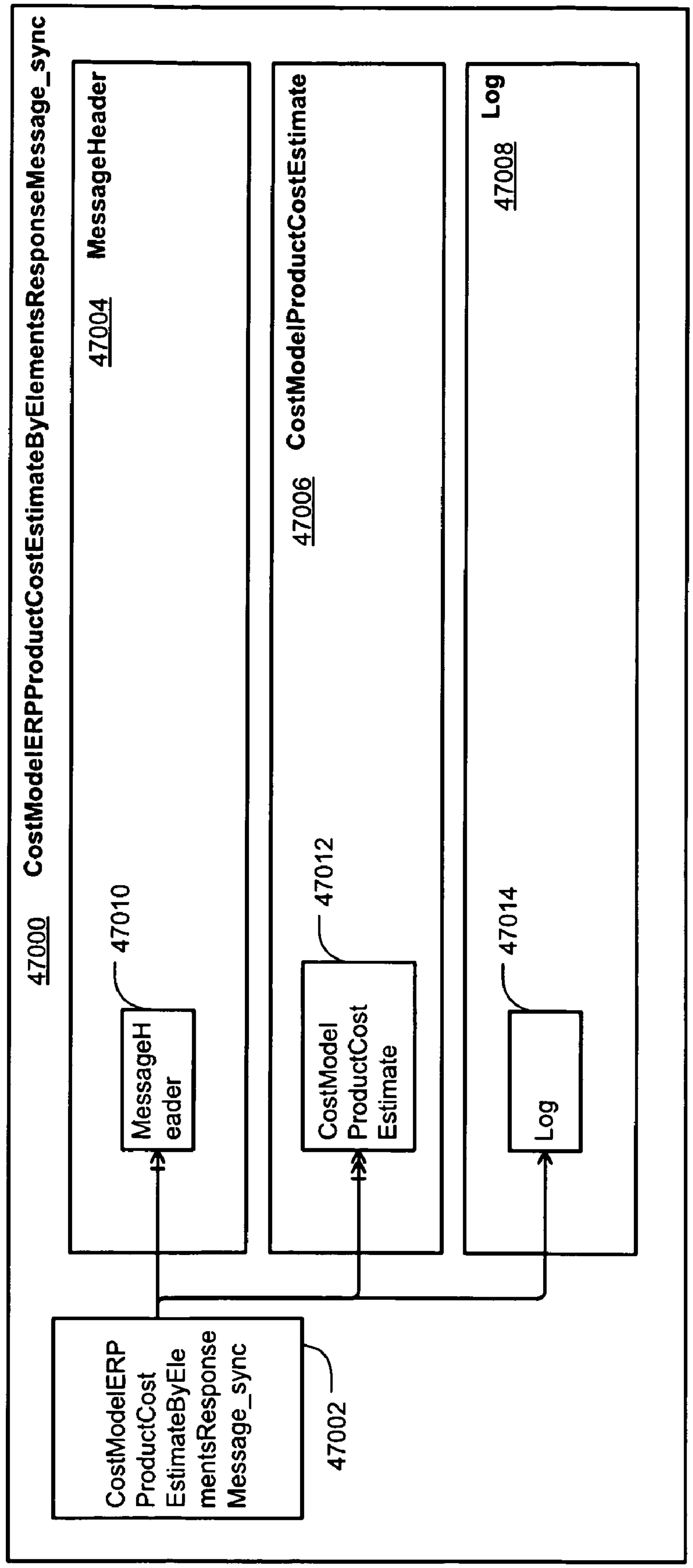
FIG. 47 shows an exemplary CostModelERPProductCostEstimateByProductCostEstimateElementsResponseMessage_sync Message Data Type.

Additionally, FIG. 47 illustrates one example logical configuration of CostModelERPProductCostEstimateByElementsResponseMessage_sync message 47000. Specifically, this figure depicts the arrangement and hierarchy of various components such as one or more levels of packages, entities, and datatypes, shown here as 47000 through 47014. As described above, packages may be used to represent hierarchy levels. Entities are discrete business elements that are used during a business transaction. Data types are used to type object entities and interfaces with a structure. For example, CostModelERPProductCostEstimateByElementsResponseMessage_sync message 47000 includes, among other things, CostModelProductCostEstimate 47006. Accordingly, heterogeneous applications may communicate using this consistent message configured as such.

Figures 1, 48:
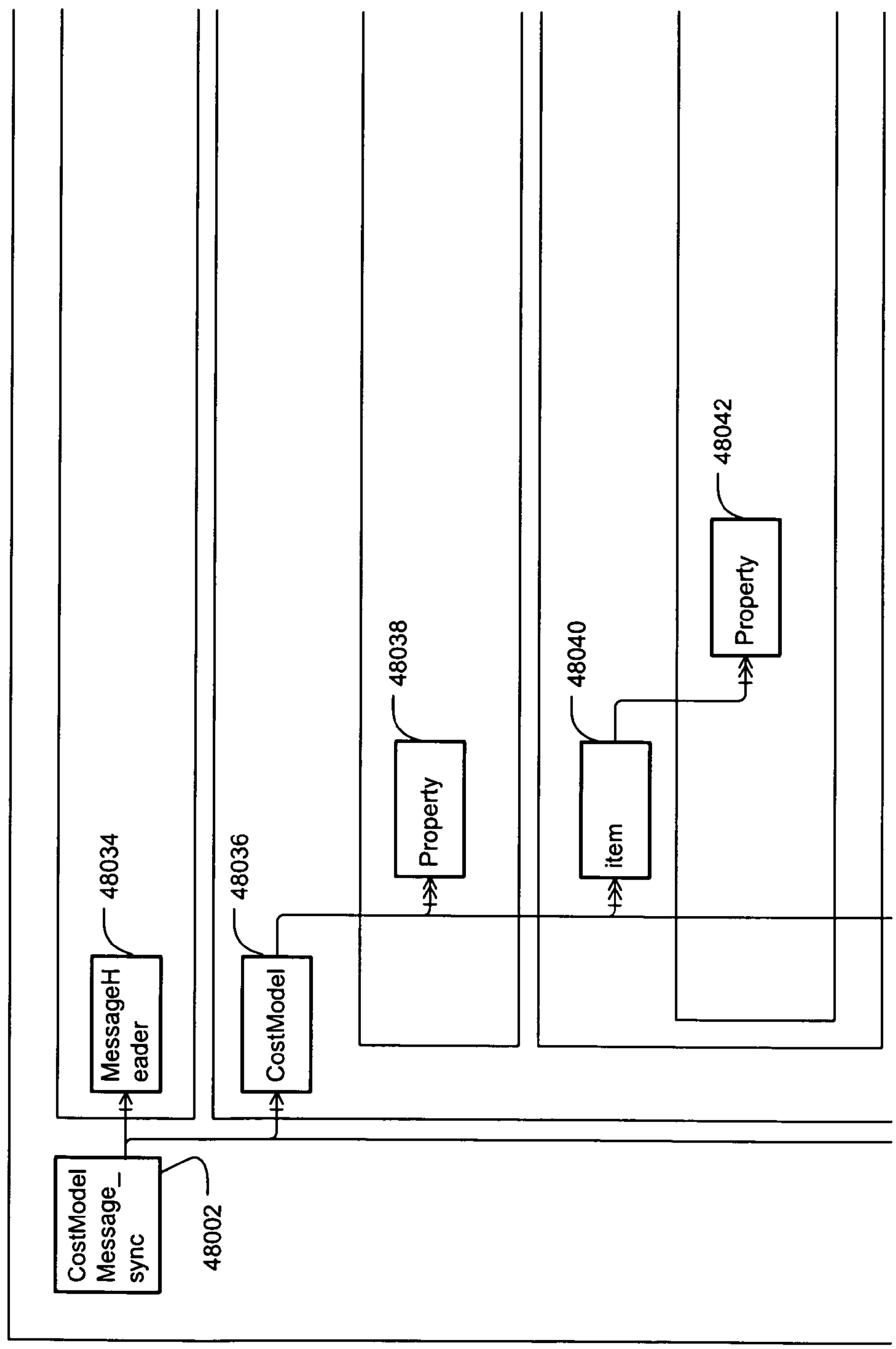
Figures 2, 48:
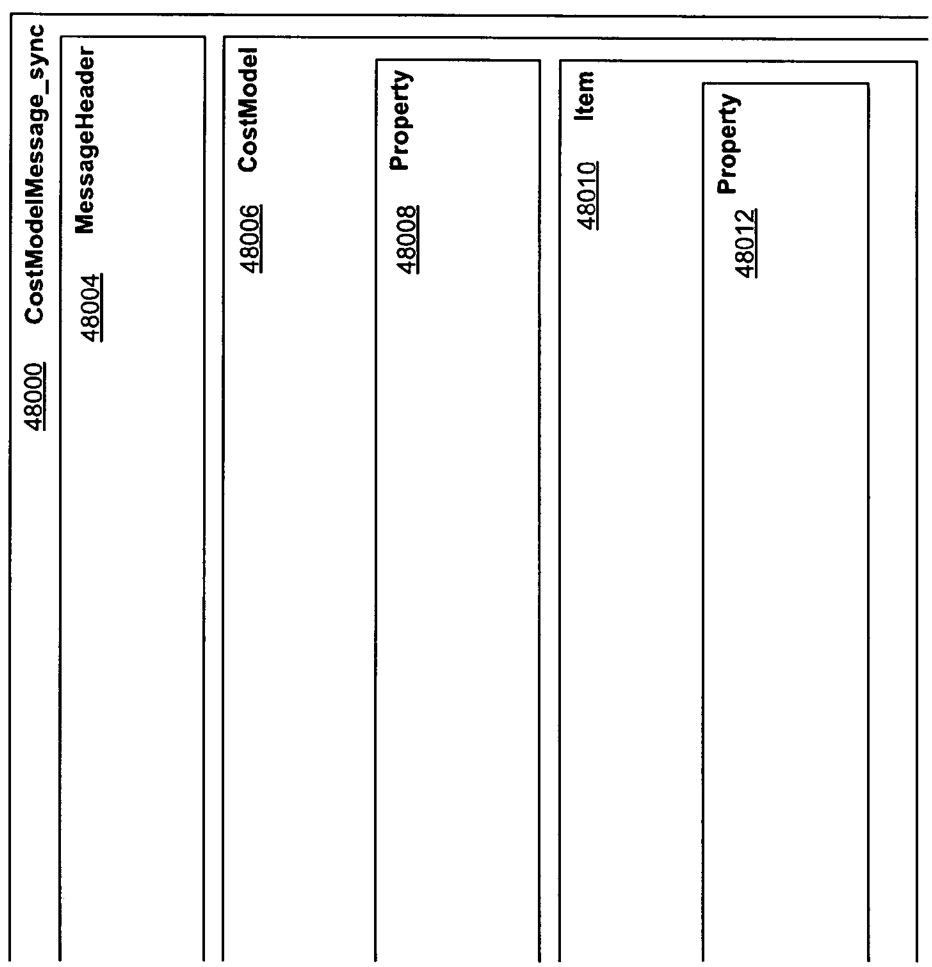
Figures 3, 48:
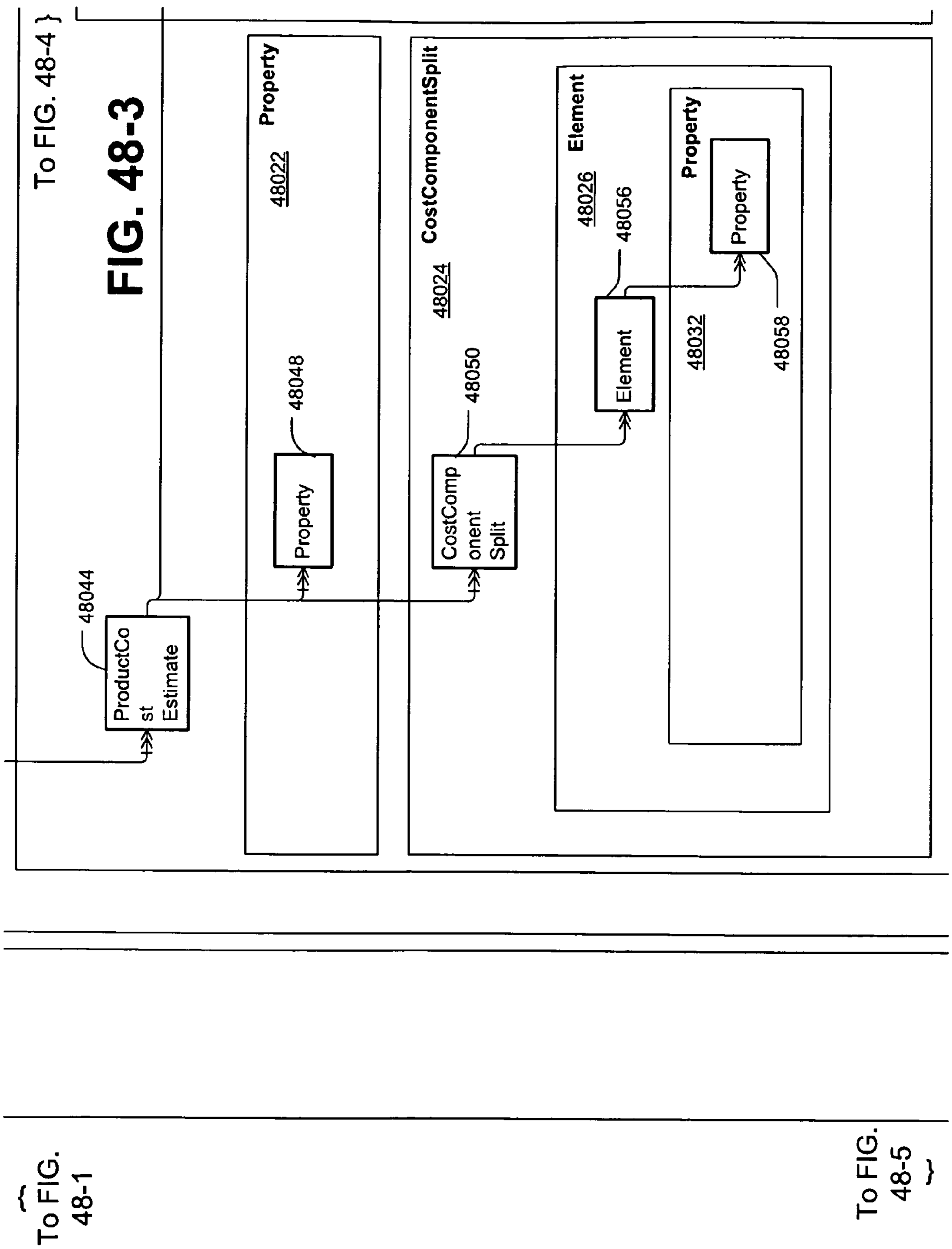
Figures 4, 48:
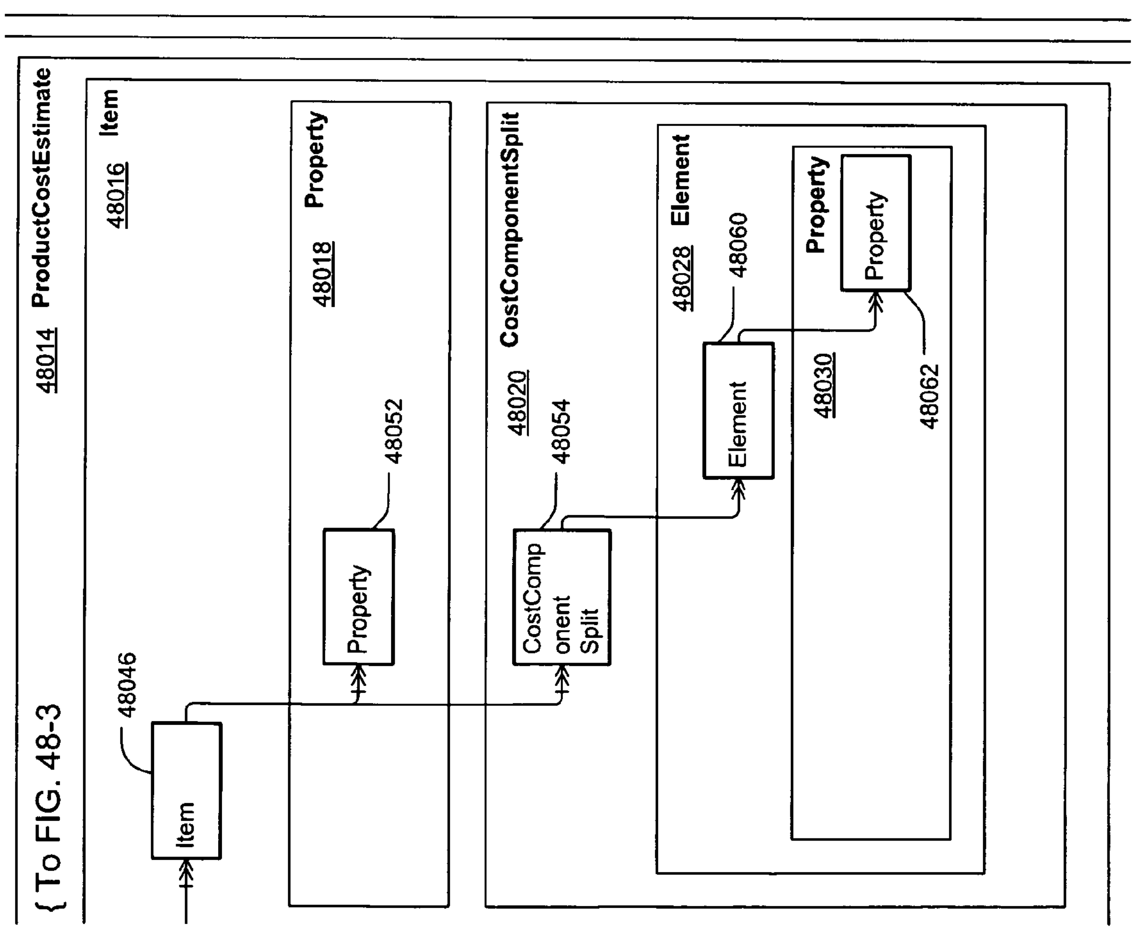
Figures 5, 48:
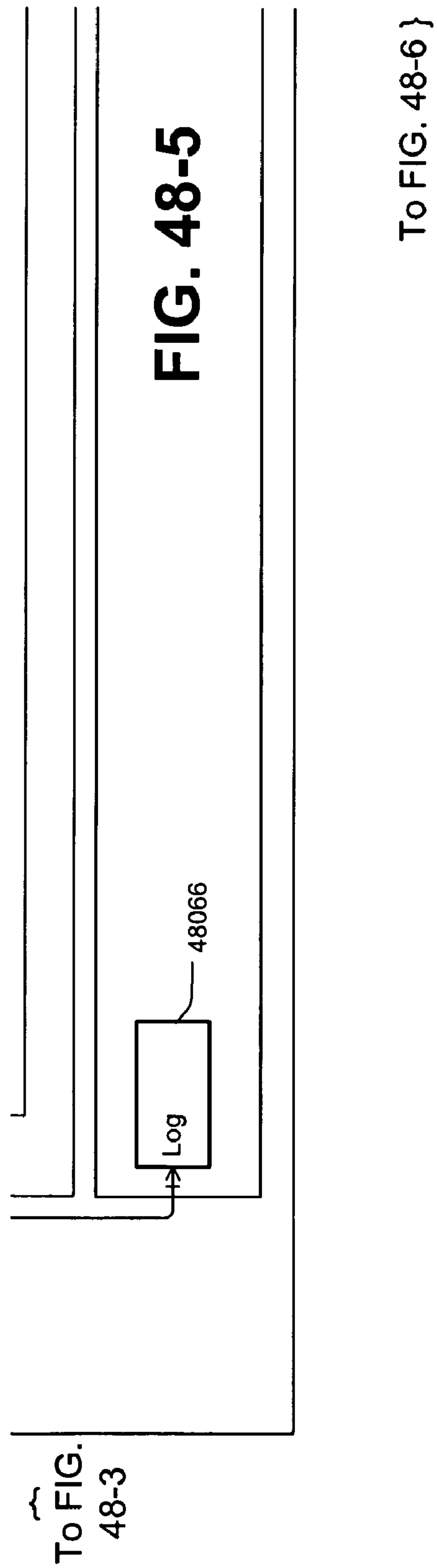
Figures 6, 48:
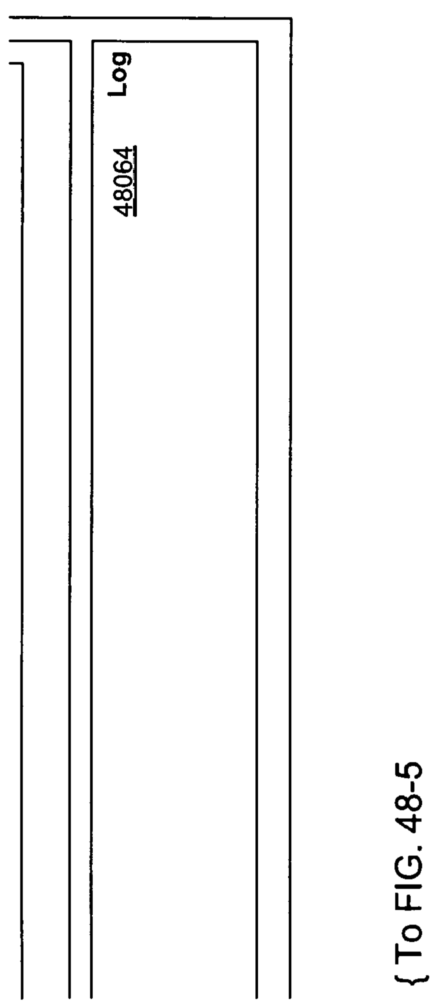

Additionally, FIGS. 48-1 to 48-6 illustrate one example logical configuration of CostModelMessage_sync message 48000. Specifically, these figures depict the arrangement and hierarchy of various components such as one or more levels of packages, entities, and datatypes, shown here as 48000 through 48066. As described above, packages may be used to represent hierarchy levels. Entities are discrete business elements that are used during a business transaction. Data types are used to type object entities and interfaces with a structure. For example, CostModelMessage_sync message 48000 includes, among other things, CostModel 48006. Accordingly, heterogeneous applications may communicate using this consistent message configured as such.

FIGS. 49-1 through 49-2 illustrate one example logical configuration of a CostModelCreateRequestMessage_sync 49000 element structure. Specifically, these figures depict the arrangement and hierarchy of various components such as one or more levels of packages, entities, and datatypes, shown here as 49000 through 49054. As described above, packages may be used to represent hierarchy levels. Entities are discrete business elements that are used during a business transaction. Data types are used to type object entities and interfaces with a structure. For example, the CostModelCreateRequestMessage_sync 49000 includes, among other things, a CostModelCreateRequestMessage_sync 49002. Accordingly, heterogeneous applications may communicate using this consistent message configured as such.

FIGS. 50-1 through 50-2 illustrate one example logical configuration of a CostModelCreateConfirmationMessage_sync 50000 element structure. Specifically, these figures depict the arrangement and hierarchy of various components such as one or more levels of packages, entities, and datatypes, shown here as 50000 through 50068. As described above, packages may be used to represent hierarchy levels. Entities are discrete business elements that are used during a business transaction. Data types are used to type object entities and interfaces with a structure. For example, the CostModelCreateConfirmationMessage_sync 50000 includes, among other things, a CostModelCreateConfirmationMessage_sync 50002. Accordingly, heterogeneous applications may communicate using this consistent message configured as such.

FIGS. 51-1 through 51-6 illustrate one example logical configuration of a CostModelUpdateRequestMessage_sync 51000 element structure. Specifically, these figures depict the arrangement and hierarchy of various components such as one or more levels of packages, entities, and datatypes, shown here as 51000 through 51198. As described above, packages may be used to represent hierarchy levels. Entities are discrete business elements that are used during a business transaction. Data types are used to type object entities and interfaces with a structure. For example, the CostModelUpdateRequestMessage_sync 51000 includes, among other things, a CostModelUpdateRequestMessage_sync 51002. Accordingly, heterogeneous applications may communicate using this consistent message configured as such.

Figures 3, 35:
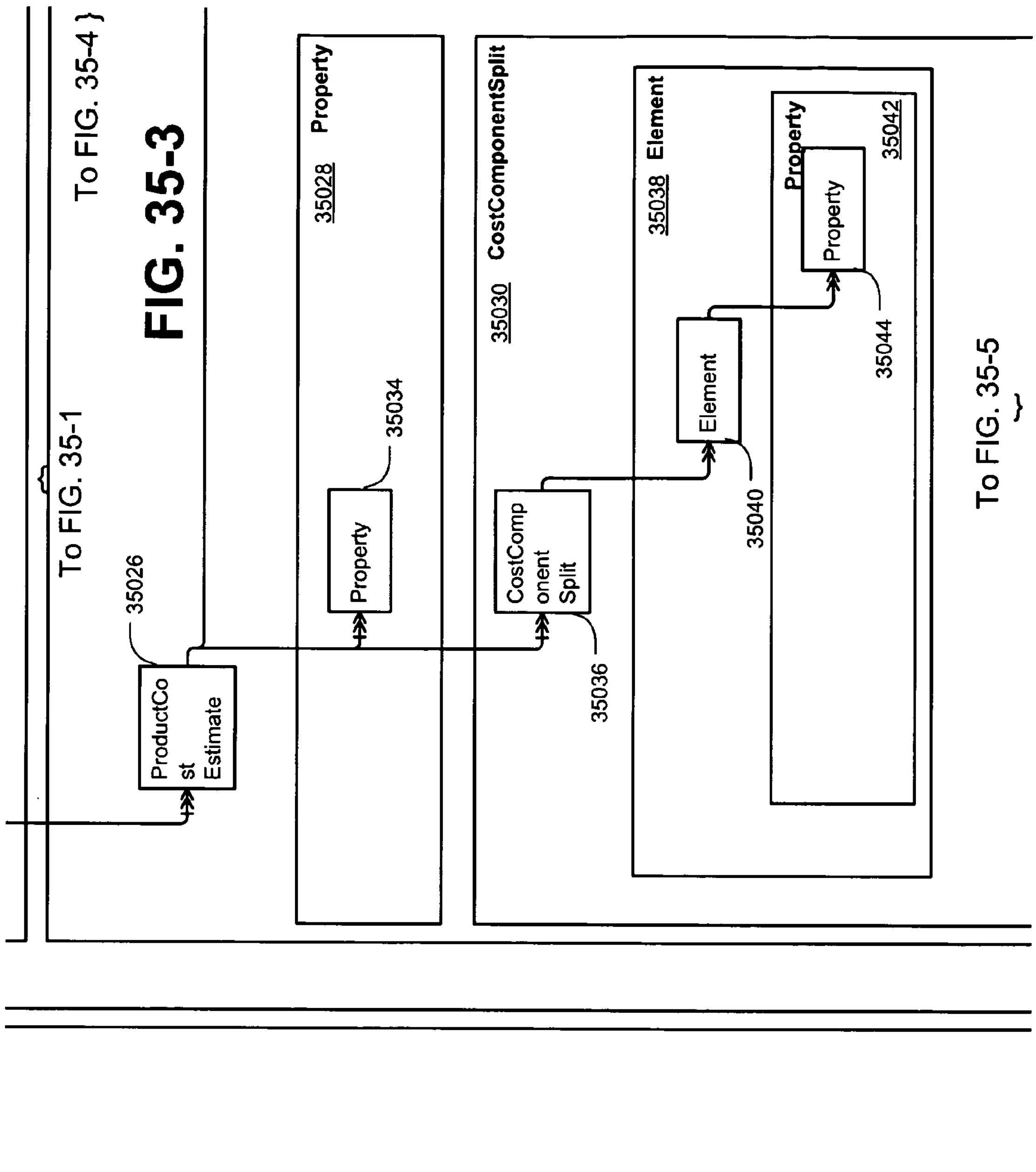
Figures 4, 35:
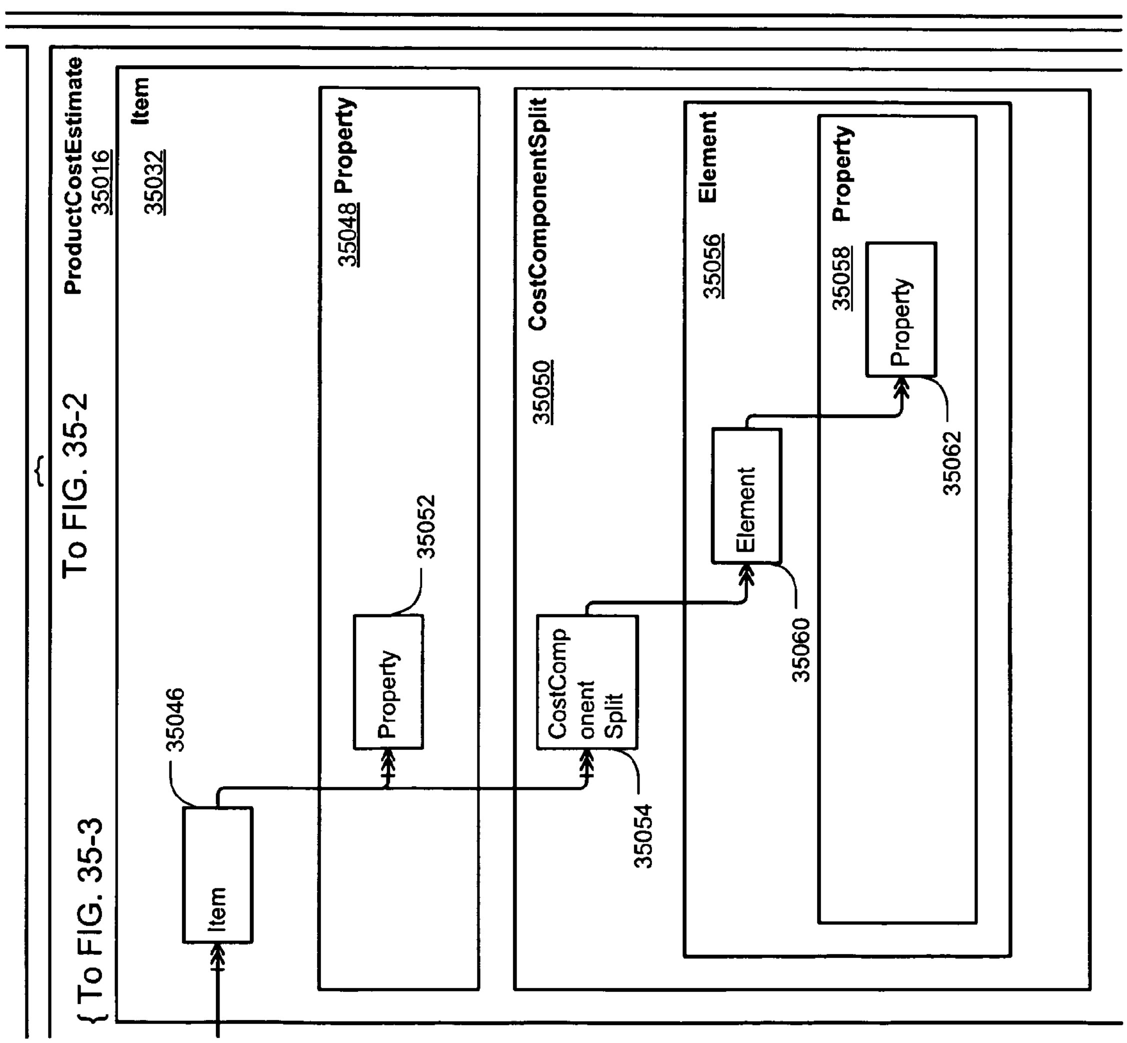
Figures 5, 35:
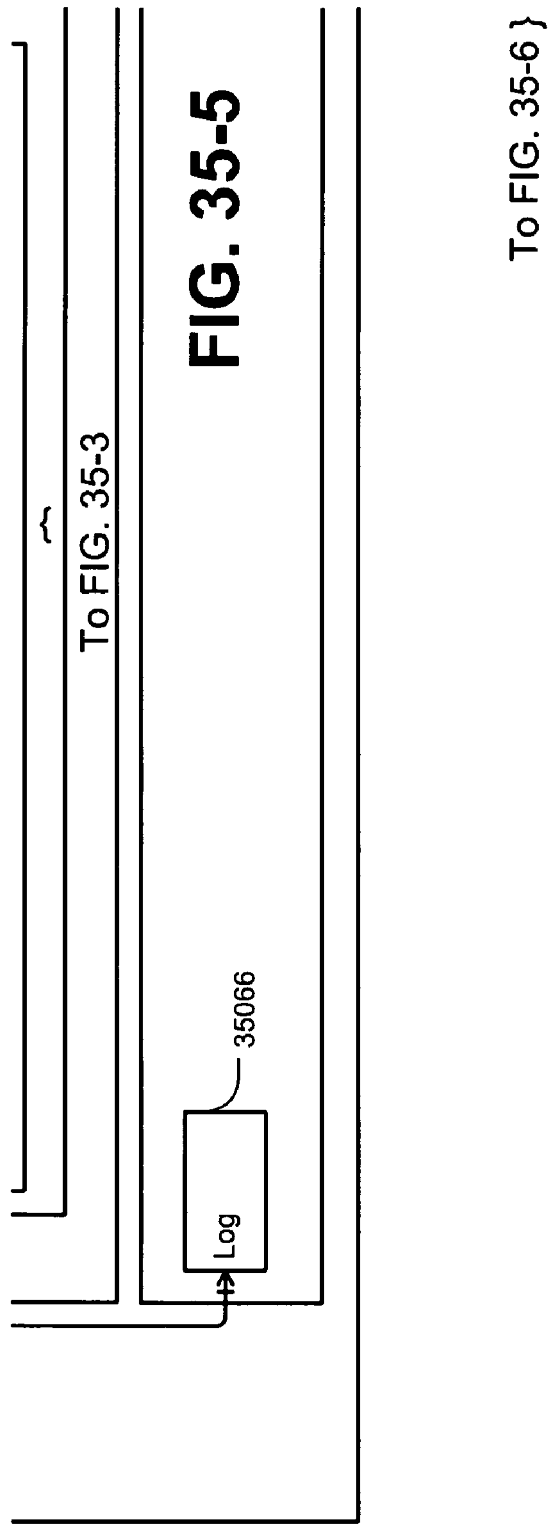
Figures 6, 35:
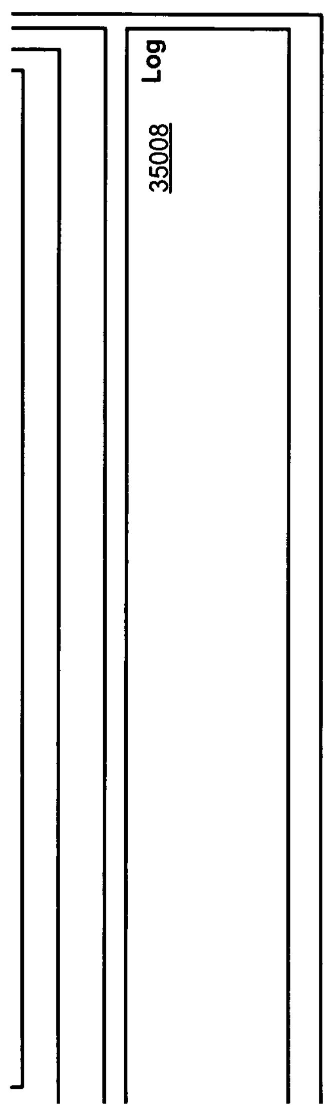

FIGS. 52-1 through 52-5 illustrate one example logical configuration of a CostModelUpdateConfirmationMesage_sync 52000 element structure. Specifically, these figures depict the arrangement and hierarchy of various components such as one or more levels of packages, entities, and datatypes, shown here as 52000 through 52152. As described above, packages may be used to represent hierarchy levels. Entities are discrete business elements that are used during a business transaction. Data types are used to type object entities and interfaces with a structure. For example, the CostModelUpdateConfirmationMesage_sync 52000 includes, among other things, a CostModelUpdateConfirmationMessage_sync 52002. Accordingly, heterogeneous applications may communicate using this consistent message configured as such.

FIG. 53 illustrates one example logical configuration of a CostModelCancelRequestMessage_sync 53000 element structure. Specifically, this figure depicts the arrangement and hierarchy of various components such as one or more levels of packages, entities, and datatypes, shown here as 53000 through 53030. As described above, packages may be used to represent hierarchy levels. Entities are discrete business elements that are used during a business transaction. Data types are used to type object entities and interfaces with a structure. For example, the CostModelCancelRequestMessage_sync 53000 includes, among other things, a CostModelCancelRequestMessage_sync 53002. Accordingly, heterogeneous applications may communicate using this consistent message configured as such.

FIGS. 54-1 through 54-2 illustrate one example logical configuration of a CostModelCancelConfirmationMessage_sync 54000 element structure. Specifically, these figures depict the arrangement and hierarchy of various components such as one or more levels of packages, entities, and datatypes, shown here as 54000 through 54062. As described above, packages may be used to represent hierarchy levels. Entities are discrete business elements that are used during a business transaction. Data types are used to type object entities and interfaces with a structure. For example, the CostModelCancelConfirmationMessage_sync 54000 includes, among other things, a CostModelUpdateConfirmationMessage_sync 54002. Accordingly, heterogeneous applications may communicate using this consistent message configured as such.

FIG. 55 illustrates one example logical configuration of a CostModelByIDQueryMessage_sync 55000 element structure. Specifically, this figure depicts the arrangement and hierarchy of various components such as one or more levels of packages, entities, and datatypes, shown here as 55000 through 55030. As described above, packages may be used to represent hierarchy levels. Entities are discrete business elements that are used during a business transaction. Data types are used to type object entities and interfaces with a structure.

For example, the CostModelByIDQueryMessage_sync 55000 includes, among other things, a CostModelByIDQueryMessage_sync 55002. Accordingly, heterogeneous applications may communicate using this consistent message configured as such.

FIGS. 56-1 through 56-10 illustrate one example logical configuration of a CostModelByIDResponseMessage_sync 56000 element structure. Specifically, these figures depict the arrangement and hierarchy of various components such as one or more levels of packages, entities, and datatypes, shown here as 56000 through 56320. As described above, packages may be used to represent hierarchy levels. Entities are discrete business elements that are used during a business transaction. Data types are used to type object entities and interfaces with a structure. For example, the CostModelByIDResponseMessage_sync 56000 includes, among other things, a CostModelByIDResponseMessage_sync 56002. Accordingly, heterogeneous applications may communicate using this consistent message configured as such.

The CostModelERPProductCostEstimateByElementsQueryResponse_sync message is a query to and response from Financial Analytics to provide all CostModelProductCostEstimates of a specific type that correspond to the selected elements. In the context of the composite Product Cost Model with Product Design Cost Estimate the interface Find CostModel provides service operations to query CostModels and their nodes. The CostModelERPProductCostEstimateByElementsQueryResponse_sync operation includes various message types, namely a CostModelERPSimpleByElementsResponse_sync and a CostModelERPProductCostEstimateByElementsQuery_sync. The structure of the CostModelERPProductCostEstimateByElementsQuery_sync message type is specified by a CostModelERPProductCostEstimateByElementsQueryMessage_sync message data type.

The operation includes various message types, namely a CostModelERPProductCostEstimateByElementsQuery_sync and a CostModelERPProductCostEstimateByElementsResponse_sync. The structure of the CostModelERPProductCostEstimateByElementsResponse_sync message type is specified by a CostModelERPProductCostEstimateByElementsResponseMessage_sync message data type.

FIGS. 57-1 through 57-2 show a CostModelERPSimpleByElementsQueryMessage_sync 57000 package. The CostModelERPSimpleByElementsQueryMessage_sync 57000 package is a CostModelERPSimpleByElementsQueryMessage_sync 57004 data type. The CostModelERPSimpleByElementsQueryMessage_sync 57000 package includes a CostModelERPSimpleByElementsQueryMessage_sync 57002 entity. The CostModelERPSimpleByElementsQueryMessage_sync 57000 package includes various packages, namely a MessageHeader 57006 and a Selection 57014. The CostModelERPSimpleByElementsQuery_sync is a request to Financial Analytics to return basic information on all CostModels that correspond to the selected elements.

The MessageHeader 57006 package is a BusinessDocumentMessageHeader 57012 data type. The MessageHeader 57006 package includes a MessageHeader 57008 entity. The MessageHeader 57008 entity has a cardinality of 0..1 57010 meaning that for each instance of the MessageHeader 57006 package there may be one MessageHeader 57008 entity.

The Selection 57014 package is a CostModProdCostEstERPSimpleByElementsQuerySelectionByElements 57020 data type. The Selection 57014 package includes a CostModelSimpleSelectionByElements 57016 entity. The Selection 57014 package includes a Property 57034 package. The CostModelSimpleSelectionByElements 57016 entity has a cardinality of 1 57018 meaning that for each instance of the Selection 57014 package there is one CostModelSimpleSelectionByElements 57016 entity. The CostModelSimpleSelectionByElements 57016 entity includes various attributes, namely a PropertyDefinitionClassID 57022 and a StatusCode 57028.

The PropertyDefinitionClassID 57022 attribute is a PropertyDefinitionClassID 57026 data type. The PropertyDefinitionClassID 57022 attribute has a cardinality of 1 57024 meaning that for each instance of the CostModelSimpleSelectionByElements 57016 entity there is one PropertyDefinitionClassID 57022 attribute. The StatusCode 57028 attribute is a CostModelStatusCode 57032 data type. The StatusCode 57028 attribute has a cardinality of 0..1 57030 meaning that for each instance of the CostModelSimpleSelectionByElements 57016 entity there may be one StatusCode 57028 attribute.

The Property 57034 package is a CostModProdCostEstERPSimpleByElementsQuerySelectionByElementsProperty 57040 data type. The Property 57034 package includes a Property 57036 entity. The Property 57034 package includes a Figure/QueryMessage package. The Property 57036 entity has a cardinality of 1..n 57038 meaning that for each instance of the Property 57034 package there are one or more Property 57036 entities. The Property 57036 entity includes various attributes, namely a PropertyID 57042 and a PropertyValue 57048.

The PropertyID 57042 attribute is a PropertyID 57046 data type. The PropertyID 57042 attribute has a cardinality of 1 57044 meaning that for each instance of the Property 57036 entity there is one PropertyID 57042 attribute. The PropertyValue 57048 attribute is a PropertyValue 57052 data type. The PropertyValue 57048 attribute has a cardinality of 0..1 57050 meaning that for each instance of the Property 57036 entity there may be one PropertyValue 57048 attribute.

FIGS. 58-1 through 58-2 illustrate one example logical configuration of a CostModelERPSimpleByElementsResponseMessage_sync 58000 element structure. Specifically, these figures depict the arrangement and hierarchy of various components such as one or more levels of packages, entities, and datatypes, shown here as 58000 through 58052. As described above, packages may be used to represent hierarchy levels. Entities are discrete business elements that are used during a business transaction. Data types are used to type object entities and interfaces with a structure. For example, the CostModelERPSimpleByElementsResponseMessage_sync 58000 includes, among other things, a CostModelERPSimpleByElementsResponseMessage_sync 58002. Accordingly, heterogeneous applications may communicate using this consistent message configured as such.

FIGS. 59-1 through 59-2 show a CostModelERPProductCostEstimateByProductCostEstimateElementsQueryMessage_sync 59000 package. The CostModelERPProductCostEstimateByProductCostEstimateElementsQueryMessage_sync 59000 package is a CostModelERPProductCostEstimateByProductCostEstimateElementsQueryMessage_sync 59004 data type. The CostModelERPProductCostEstimateByProductCostEstimateElementsQueryMessage_sync 59000 package includes a CostModelERPProductCostEstimateByProductCostEstimateElementsQueryMessage_sync 59002 entity. The CostModelERPProductCostEstimateByProductCostEstimateElementsQueryMessage_sync 59000 package includes various packages, namely a MessageHeader 59006 and a Selection 59014. A CostModelProductCostEstimateERPByElementsQuery_sync is a request to Financial Analytics to return basic information on all CostModelProductCostEstimates that correspond to the selected product cost estimate elements.

The MessageHeader 59006 package is a BusinessDocumentMessageHeader 59012 data type. The MessageHeader 59006 package includes a MessageHeader 59008 entity. The MessageHeader 59008 entity has a cardinality of 0..1 59010 meaning that for each instance of the MessageHeader 59006 package there may be one MessageHeader 59008 entity.

The Selection 59014 package is a CostModProdCostEstERPByProdCostEstElementsQuerySelectionByElements 59020 data type. The Selection 59014 package includes a CostModelProductCostEstimateSelectionByElements 59016 entity. The Selection 59014 package includes a ProductCostEstimateProperty 59040 package. The CostModelProductCostEstimateSelectionByElements 59016 entity has a cardinality of 1 59018 meaning that for each instance of the Selection 59014 package there is one CostModelProductCostEstimateSelectionByElements 59016 entity. The CostModelProductCostEstimateSelectionByElements 59016 entity includes various attributes, namely a CostModelUUID 59022, a PropertyDefinitionClassID 59028 and a TypeCode 59034.

The CostModelUUID 59022 attribute is a UUID 59026 data type. The CostModelUUID 59022 attribute has a cardinality of 0..1 59024 meaning that for each instance of the CostModelProductCostEstimateSelectionByElements 59016 entity there may be one CostModelUUID 59022 attribute. The PropertyDefinitionClassID 59028 attribute is a PropertyDefinitionClassID 59032 data type. The PropertyDefinitionClassID 59028 attribute has a cardinality of 1 59030 meaning that for each instance of the CostModelProductCostEstimateSelectionByElements 59016 entity there is one PropertyDefinitionClassID 59028 attribute. The TypeCode 59034 attribute is a CostModelProductCostEstimateTypeCode 59038 data type. The TypeCode 59034 attribute has a cardinality of 1 59036 meaning that for each instance of the CostModelProductCostEstimateSelectionByElements 59016 entity there is one TypeCode 59034 attribute.

The ProductCostEstimateProperty 59040 package is a CostModProdCostEstERPByProdCostEstElementsQueryProdCostEstProperties 59046 data type. The ProductCostEstimateProperty 59040 package includes a ProductCostEstimateProperty 59042 entity. The ProductCostEstimateProperty 59040 package includes a Figure/QueryMessage package. The ProductCostEstimateProperty 59042 entity has a cardinality of 1..n 59044 meaning that for each instance of the ProductCostEstimateProperty 59040 package there are one or more ProductCostEstimateProperty 59042 entities. The ProductCostEstimateProperty 59042 entity includes various attributes, namely a PropertyID 59048 and a PropertyValue 59054.

The PropertyID 59048 attribute is a PropertyID 59052 data type. The PropertyID 59048 attribute has a cardinality of 1 59050 meaning that for each instance of the ProductCostEstimateProperty 59042 entity there is one PropertyID 59048 attribute. The PropertyValue 59054 attribute is a PropertyValue 59058 data type. The PropertyValue 59054 attribute has a cardinality of 0..1 59056 meaning that for each instance of the ProductCostEstimateProperty 59042 entity there may be one PropertyValue 59054 attribute.

FIGS. 60-1 through 60-2 show a CostModelERPProductCostEstimateByProductCostEstimateElementsResponse Message_sync 60000 package. The CostModelERPProductCostEstimateByProductCostEstimateElementsResponseMessage_sync 60000 package is a CostModelERPProductCostEstimateByProductCostEstimateElementsResponse Message_sync 60004 data type. The CostModelERPProductCostEstimateByProductCostEstimateElementsResponseMessage_sync 60000 package includes various entities, namely a CostModelERPProductCostEstimateByProductCostEstimateElementsResponseMessage_sync 60002 and a Figure/ResponseMessage. The CostModelERPProductCostEstimateByProductCostEstimateElementsResponseMessage_sync 60000 package includes various packages, namely a MessageHeader 60006, a CostModelProductCostEstimate 60038 and a Log 60064.

CostModelProductCostEstimateERPByElementsResponse_sync is a response to Financial Analytics to a CostModelProductCostEstimateERPSimpleByElementsQuery_sync.

The MessageHeader 60006 package is a BusinessDocumentMessageHeader 60012 data type. The MessageHeader 60006 package includes various entities, namely a MessageHeader 60008 and a CostModel 60014. The MessageHeader 60008 entity has a cardinality of 0..1 60010 meaning that for each instance of the MessageHeader 60006 package there may be one MessageHeader 60008 entity.

The CostModel 60014 entity has a cardinality of 0..n 60016 meaning that for each instance of the MessageHeader 60006 package there may be one or more CostModel 60014 entities. The CostModel 60014 entity includes various attributes, namely a UUID 60020, a PropertyDefinitionClassID 60026 and a Name 60032. The UUID 60020 attribute is a UUID 60024 data type. The UUID 60020 attribute has a cardinality of 1 60022 meaning that for each instance of the CostModel 60014 entity there is one UUID 60020 attribute.

The PropertyDefinitionClassID 60026 attribute is a PropertyDefinitionClassID 60030 data type. The PropertyDefinitionClassID 60026 attribute has a cardinality of 1 60028 meaning that for each instance of the CostModel 60014 entity there is one PropertyDefinitionClassID 60026 attribute. The Name 60032 attribute is a CostModelName 60036 data type. The Name 60032 attribute has a cardinality of 0..1 60034 meaning that for each instance of the CostModel 60014 entity there may be one Name 60032 attribute.

The CostModelProductCostEstimate 60038 package is a CostModProdCostEstERPByProdCostEstElementsQueryProdCostEst 60044 data type. The CostModelProductCostEstimate 60038 package includes a ProductCostEstimate 60040 entity. The ProductCostEstimate 60040 entity has a cardinality of 1..n 60042 meaning that for each instance of the CostModelProductCostEstimate 60038 package there are one or more ProductCostEstimate 60040 entities. The ProductCostEstimate 60040 entity includes various attributes, namely a UUID 60046, an ID 60052 and a Name 60058.

The UUID 60046 attribute is a UUID 60050 data type. The UUID 60046 attribute has a cardinality of 1 60048 meaning that for each instance of the ProductCostEstimate 60040 entity there is one UUID 60046 attribute. The ID 60052 attribute is a CostModelProductCostEstimateID 60056 data type. The ID 60052 attribute has a cardinality of 1 60054 meaning that for each instance of the ProductCostEstimate 60040 entity there is one ID 60052 attribute. The Name 60058 attribute is a CostModelProductCostEstimateName 60062 data type. The Name 60058 attribute has a cardinality of 0..1

60060 meaning that for each instance of the ProductCostEstimate 60040 entity there may be one Name 60058 attribute.

The Log 60064 package is a Log 60070 data type. The Log 60064 package includes a Log 60066 entity. The Log 60066 entity has a cardinality of 1 60068 meaning that for each instance of the Log 60064 package there is one Log 60066 entity.

FIGS. 61-1 through 61-10 illustrate one example logical configuration of a CostModelMessage 61000 element structure. Specifically, these figures depict the arrangement and hierarchy of various components such as one or more levels of packages, entities, and datatypes, shown here as 61000 through 61320. As described above, packages may be used to represent hierarchy levels. Entities are discrete business elements that are used during a business transaction. Data types are used to type object entities and interfaces with a structure. For example, the CostModelMessage 61000 includes, among other things, a CostModelMessage 61002. Accordingly, heterogeneous applications may communicate using this consistent message configured as such. The abstract message data type CostModelMessage_sync includes the cost model in the business document and the business information that is relevant for sending a business document in a message. It includes the packages Message Header, CostModel, and Log.

The following table shows which packages and entities of the abstract message data type CostModelMessage_sync are used in the above mentioned concrete message data types:

| | Message Data Type | | |
|---|---|---|---|
| Package/Entity | CCostModelCreateRequest_sync | CostModelCreateConfirmation_sync | CCostModelUpdateRequest_sync |
| Message Header | | | |
| CostModel | | | |
| Property | n | | n |
| Item | | | n |
| Property | | | n |
| ProductCostEstimate | | | n |
| Property | | | n |
| CostComponentSplit | | | |
| Element | | | |
| Property | | | |
| Item | | | n |
| Property | | | n |
| CostComponentSplit | | | |
| Element | | | |
| Property | | | |
| Log | | | |

| | Message Data Type | |
|---|---|---|
| Package/Entity | CostModelUpdateConfirmation_sync | Package/EntityCCostModelCancelRequest_sync |
| Message Header | | |
| CostModel | | |
| Property | | |
| Item | | |
| Property | | |
| ProductCostEstimate | | |
| Property | | |
| CostComponentSplit | | |
| Element | | |
| Property | | |
| Item | | |
| Property | | |
| CostComponentSplit | | |
| Element | | |
| Property | | |
| Log | | |

| | Message Data Type | |
|---|---|---|
| Package/Entity | CostModelCancelConfirmation_sync | CostModelByIDResponse_sync |
| Message Header | | |
| CostModel | | |
| Property | | n |
| Item | | n |
| Property | | n |
| ProductCostEstimate | | n |
| Property | | n |
| CostComponentSplit | | n |
| Element | | |
| Property | | |
| Item | | n |
| Property | | n |
| CostComponentSplit | | n |
| Element | | |
| Property | | |
| Log | | |

Message Data Type CostModelMessage_sync

The message data type CostModelMessage_sync, provides the structure for the message types CostModelCreateRequest_sync, CostModelCreateConfirmation_sync, CostModelUpdateRequest_sync, CostModelUpdateConfirmation_sync, CostModelCancelRequest_sync, CostModelCancelConfirmation_sync, CostModelByIDResponse_sync, and the interfaces that are based on them.

A MessageHeader groups together the business information from the perspective of the sending application to identify the business document in a message, to provide information about the sender, and to provide any information about the recipient. The MessageHeader can be divided up into the entities SenderParty and RecipientParty. It is a GDT of type BusinessDocumentMessageHeader. The MessageHeader can include the elements ID, ReferenceID, and CreationDateTime. The MessageID can be set by the sending application. With the ReferencedMessageID, reference can be made in the current BusinessDocument to a previous BusinessDocument.

The CostModel package groups the CostModel with its packages. It includes an entity CostModel. It can include the packages Property, Item and ProductCostEstimate. A Cost Model represents the cost simulation consisting of cost estimates with various cost sources such as resources, activities, and overhead cost surcharges. The CostModel groups information on all entities that contribute to the costs of an existing product or a product in the design phase. The elements located at this node can include UUID, ID, PropertyDefinitionClassID, ChangeStateID, SystemAdministrativeData, StatusCode, and Name. UUID is a unique identifier of a CostModel and it can be optional. It is a GDT of type UUID. ID is a readable identifier of a CostModel and it can be optional. It is a GDT of type CostModelID. PropertyDefinitionClassID is an identifier for a class defining properties. It is a GDT of type PropertyDefinitionClassID. A ChangeStateID is a unique identifier for a change state and it can be optional. It is a GDT of type ChangeStateID. SystemAdministrativeData is administrative data that is stored in a system. This data includes system users and change dates/times. SystemAdministrativeData can be optional. It is a GDT of type SystemAdministrativeData. StatusCode is a coded representation of the status of a CostModel and it can be optional. It is a GDT of type CostModelStatusCode. Name is the name of the CostModel and it can be optional. It is a GDT of type CostModelName.

A Property package groups information on the properties of a CostModel. It can include an entity Property. A CostModelProperty can be a specific property of a CostModel and its value. The elements which can be located at this node are ID and Value. ID is an identifier for a property of a CostModel and is a GDT of type PropertyID. Value specifies a value that is assigned to a property and it can be optional. It is a GDT of type PropertyValue.

An Item package groups information on the items of a CostModel. It includes an entity Item. It includes the package Property. A CostModelItem represents an item of a CostModel. It is related to a product the costs of which can be simulated within the CostModel for different production quantities. This product is represented by the CostModelProductCostEstimate the CostModelItem refers to. The elements that can be located directly at this node can include UUID, CostModelProductCostEstimateUUID, and CostModelProductCostEstimateTypeCode. UUID is a unique identifier of a CostModelItem and it can be optional. It is a GDT of type UUID. CostModelProductCostEstimateUUID is a unique identifier of the CostModelProductCostEstimate the CostModelItem refers to. It is a GDT of type UUID. CostModelProductCostEstimateTypeCode is a coded representation of the type of the CostModelProductCostEstimate the CostModelItem refers to. It is a GDT of type CostModelProductCostEstimateTypeCode.

A Property package groups information on the properties of a CostModelItem. It includes an entity Property. A CostModelItemProperty can be a specific property of a CostModelItem and its value. The elements that can be located directly at this node can include ID and Value. ID is an identifier for a property of a CostModelItem and it is a GDT of type PropertyID. Value specifies a value that is assigned to a property and it can be optional. It is a GDT of type PropertyValue.

A ProductCostEstimate package groups information on the properties of a CostModelProductCostEstimate. It can include the entity ProductCostEstimate. It can include the packages Property, CostComponentSplit, and Item. A CostModelProductCostEstimate is an estimate of the costs of a product or a semi-finished product within a CostModel. The elements that can be located directly at this node can include UUID, ID, and TypeCode. UUID is a unique identifier for a CostModelProductCostEstimate and it can be optional. It is a GDT of type UUID. ID is a readable identifier for a CostModelProductCostEstimate and it can be optional. It is a GDT of type CostModelProductCostEstimateID. TypeCode is a coded representation of the type of a CostModelProductCostEstimate. It is a GDT of type CostModelProductCostEstimateTypeCode.

A Property package groups information on the properties of a CostModelProductCostEstimate. It includes an entity Property. A CostModelProductCostEstimateProperty can be a specific property of a CostModelProductCostEstimate and its value. The elements that can be located directly at this node can include ID and value. ID is an identifier for a property of a CostModelProductCostEstimate. It is a GDT of type PropertyID. Value specifies a value that is assigned to a property and it can be optional. It is a GDT of type PropertyValue.

A CostComponentSplit package groups information on the CostComponentSplit of a CostModelProductCostEstimate. It includes an entity CostComponentSplit. It includes the package Element. A CostModelProductEstimateCostComponentSplit is a split of values related to a CostModelProductCostEstimate according to cost components. The elements that can be located directly at this node can include CategoryCode and TypeCode. CategoryCode is a coded representation of the category of a CostComponentSplit within a CostModel. It is a GDT of type CostComponentSplitCategoryCode. TypeCode is a coded representation of the type of a CostComponentSplit within a CostModel and it is a GDT of type CostComponentSplitTypeCode. CostModelProductCostEstimateCostComponentSplitElement includes information on the values related to a CostModelProductCostEstimate for a specific cost component. It can include an entity Element. It can include the package Property. CostModelProductCostEstimateCostComponentSplitElement includes information on the values related to a CostModelProductCostEstimate for a specific cost component. The elements that can be located directly at this node can include ID. ID is an identifier for an element of a cost component split and it is a GDT of type CostModelCostComponentSplitElementID.

A Property package groups information on the properties of an element of a cost component split. It includes the entity Property. A CostModelProductCostEstimateCostComponentSplitElementProperty can be a specific property related to a CostModelProductCostEstimate, i.e. a cost component or a cumulative value. The elements that can be located directly at this node can include ID and value. ID is an identifier for a property of a CostComponentSplit and it is a GDT of type PropertyID. Value specifies a value that is assigned to a property and it is a GDT of type PropertyValue.

An Item package groups information on an item of a CostModelProductCostEstimate. It can include the entity Item. It can include the packages Reference, Property and CostComponentSplit. A CostModelProductCostEstimateItem is an item of a CostModelProductCostEstimate. It represents an entity that contributes to the total costs of the CostModelProductCostEstimate. The elements that can be located directly at this node can include UUID, CostModelCostSourceUUID, CostModelCostSourceTypeCode, CostModelProductCostEstimateUUID, and CostModelProductCostEstimateTypeCode. UUID is a unique identifier for a CostModelProductCostEstimateItem and it can be optional. It is a GDT of type UUID. CostModelCostSourceUUID is a unique identifier for the CostModelCostSource the CostModelProductCostEstimateItem refers to and it can be optional. CostModelCostSourceUUID is a GDT of type UUID.

CostModelCostSourceTypeCode is a coded representation of the type of the CostModelCostSource the CostModelProductCostEstimateItem refers to and it can be optional. CostModelCostSourceTypeCode is a GDT of type CostModelCostSourceTypeCode.

CostModelProductCostEstimateUUID is a unique identifier for the CostModelProductCostEstimate CostModelCostSource the CostModelProductCostEstimateItem refers to and it can be optional. CostModelProductCostEstimateUUID is a GDT of type UUID. CostModelProductCostEstimateTypeCode is a coded representation of the type of the CostModelProductCostEstimate the CostModelProductCostEstimateItem refers to and it can be optional. CostModelProductCostEstimateTypeCode is a GDT of type CostModelProductCostEstimateTypeCode. A CostModelProductCostEstimateItem refers either to a CostModelCostSource or to another CostModelProductCostEstimate. Therefore, within an entity CostModelProductCostEstimateItem, either the CostModelCostSourceUUID and the CostModelCostSourceTypeCode or the CostModelProductCostEstimateID and the CostModelProductCostEstimateTypeCode can be provided.

A Property package groups information on the properties of a CostModelProductCostEstimateItem. It includes an entity Property. A CostModelProductCostEstimateItemProperty can be a specific property of a CostModelProductCostEstimateItem and its value. The elements that can be located directly at this node can include ID and Value. ID is an identifier for a property of a CostModelProductCostEstimateItem and it is a GDT of type PropertyID. Value specifies a value that is assigned to a property and it can be optional. Value is a GDT of type PropertyValue.

A CostComponentSplit package groups information on the CostComponentSplit of a CostModelProductCostEstimate. It includes an entity CostComponentSplit. It includes the package Element. A Log is a sequence of messages that result when an application executes a task. An entity Log is a GDT of type Log.

Message Data Type CostModelCreateRequestMessage_sync

This message data type is derived from the abstract message data type CostModelMessage_sync. This abstract message data type can include the cost model in the business document and the business information that is relevant for sending a business document in a message. It can include the packages Message Header and CostModel. A MessageHeader groups together the business information from the perspective of the sending application to identify the business document in a message, to provide information about the sender, and to provide any information about the recipient. The MessageHeader can be divided up into the entities SenderParty and RecipientParty. It is a GDT of type BusinessDocumentMessageHeader. The MessageHeader can include the elements ID, ReferenceID, and CreationDateTime. The MessageID can be set by the sending application. With the ReferencedMessageID, reference can be made in the current BusinessDocument to a previous BusinessDocument.

The CostModel package groups the CostModel with its packages. It can include an entity, CostModel. It can include the package, Property. The elements for CostModel that can be located directly at this node can be PropertyDefinitionClassID, StatusCode, and Name. StatusCode and Name can be optional. A Property package groups information on the properties of a CostModel. It can include an entity Property.

Message Data Type CostModelCreateConfirmationMessage_sync

This message data type is derived from the abstract message data type CostModelMessage_sync. This abstract message data type includes the cost model in the business document and the business information that is relevant for sending a business document in a message. It can include the packages Message Header, CostModel and Log. A MessageHeader groups together the business information from the perspective of the sending application to identify the business document in a message, to provide information about the sender, and to provide any information about the recipient. The MessageHeader can be divided up into the entities SenderParty and RecipientParty. It is a GDT of type BusinessDocumentMessageHeader. The MessageHeader can include the elements ID, ReferenceID, and CreationDateTime. The MessageID can be set by the sending application. With the ReferencedMessageID, reference can be made in the current BusinessDocument to a previous BusinessDocument.

The CostModel package groups the CostModel with its packages. It can include an entity, CostModel. The elements that can be located directly at this node can include UUID, ID, PropertyDefinitionClassID, ChangeStateID, SystemAdministrativeData, StatusCode, and Name. SystemAdministrativeData, StatusCode, and Name can be optional. A Log is a sequence of messages that result when an application executes a task. An entity Log is a GDT of type Log.

Message Data Type CostModelUpdateRequestMessage_sync

This message data type is derive from the abstract message data type CcostModelMessage_sync. This abstract message data type includes the cost model in the business document and the business information that is relevant for sending a business document in a message. It can include the packages Message Header and CostModel. A MessageHeader groups together the business information form the perspective of the sending application to identify the business document in a message, to provide information about the sender, and to provide any information about the recipent. The MessageHeader can be divided up into the entities SenderParty and RecipientParty. It is a GDT of type BusinessDocumentMessageHeader. The MessageHeader can include the elements ID, ReferenceID, and CreationDateTime. The MessageID can be set by the sending application. With the ReferenceMessageId, reference can be made in the current BusinessDocument to a previous BusinessDocument.

The CostModel package groups the CostModel with its package. It can include an entity, CostModel. It can include the packages Property, Item,and ProductCostEstimate. The elements that can be located directly at this node can include UUID, PropertyDefinitionClassID, ChangeStateID, StatusCode, and Name. StatusCode and Name can be optional. The element ChangeStateID is used to verify that the state of the business object instance in can be filled with the value of ChangeStateID provided by the last of the following successful outgoing messages: CostModelCreateConfirmation_sycn, CostModelUpdateConfirmation_sync, and CostModelByIdQueryResponse_sync. A Property package groups information on the properties of a CostModel. It can include an entity Property.

An Item package groups information on the items of a CostModel. It can include an Item entity and can include a Property package. The elements that can be located directly at this node can include UUID, CostModelProductCostEstimateUUID, and CostModelProductCostEstimateTypeCode. UUID can be optional. The element UUID can be provided to update already existing nodes. The element UUID can be initial for new nodes. If nodes exist in the backend that are not listed in the message they can be deleted. A Property package groups information on the properties of a CostModelItem. It includes an entity Property.

A ProductCostEstimate package groups information on the properties of a CostModelProductCostEstimate. It can include a ProductCostEstimate entity and can include Property and Item packages. The elements that can be located directly at ProductCost estimate node can include UUID and TypeCode. UUID can be optional. The element UUID can be provided to update already existing nodes. The element UUID can be initial for new nodes. If nodes exist in the backend that are not listed in the message they can be deleted.

A Property package groups information on the properties of a CostModelProductCostEstimate. It includes an entity Property. An Item package groups information on an item of a CostModelProductCostEstimate. It can include an Item entity and can include Reference and Property packages. The elements that can be located directly at an Item node can include UUID, CostModelCostSourceUUID, CostModelCostSourceTypeCode, CostModelProductCostEstimateUUID, and CostModelProductCostEstimateTypeCode. CostModelCostSourceUUID, CostModelCostSourceTypeCode, CostModelProductCostEstimateUUID, and CostModelProductCostEstimateTypeCode can be optional. A CostModelProductCostEstimateItem refers either to a CostModelCostSource or to another CostModelProductCostEstimate. Therefore, within an entity CostModelProductCostEstimateItem, either the CostModelCostSourceUUID and the CostModelCostSourceTypeCode or the CostModelProductCostEstimateID and the CostModelProductCostEstimateTypeCode can be provided. The element UUID can be provided to update already existing nodes. The element UUID can be initial for new nodes. If nodes exist in the backend that are not listed in the message they can be deleted. A Property package groups information on the properties of a CostModelProductCostEstimateItem. It includes an entity Property.

Message Data Type CostModelUpdateConfirmationMessage_sync

CostModelUpdateConfirmationMessage_sync message data type is derived from the abstract message data type CostModelMessage_sync. This abstract message data type includes the cost model in the business document and the business information that is relevant for sending a business document in a message. It can include the packages Message Header, CostModel, and Log. A MessageHeader groups together the business information from the perspective of the sending application to identify the business document in a message, to provide information about the sender, and to provide any information about the recipient. The CostModel package groups the CostModel with its packages. It can include a CostModel entity. The elements that can be located directly at a CostModel node can include Name, StatusCode, SystemAdministrativeData, ChangeStateID, PropertyDefinitionClassID, ID, and UUID. SystemAdministrativeData, StatusCode, and Name can be optional. A Log is a sequence of messages that result when an application executes a task. An entity Log is a GDT of type Log.

Message Data Type CostModelCancelRequestMessage_sync

CostModelCancelRequestMessage_sync message data type is derived from the abstract message data type CostModelMessage_sync. This abstract message data type includes the cost model in the business document and the business information that is relevant for sending a business document in a message. It can include the packages Message Header and CostModel. A MessageHeader groups together the business information from the perspective of the sending application to identify the business document in a message, to provide information about the sender, and to provide any information about the recipient. The CostModel package include a CostModel entity. The elements that can be located directly at a CostModel node can include UUID and PropertyDefinitionClassID.

Message Data Type CostModelCancelConfirmationMessage_sync

CostModelCancelConfirmationMessage_sync message data type is derived from the abstract message data type CostModelMessage_sync. This abstract message data type includes the cost model in the business document and the business information that is relevant for sending a business document in a message. It can include the packages Message Header, CostModel, and Log. A MessageHeader groups together the business information from the perspective of the sending application to identify the business document in a message, to provide information about the sender, and to provide any information about the recipient. The CostModel package groups the CostModel with its packages. It can include a CostModel entity. The elements that can be located directly at a CostModel node can include UUID, ID, PropertyDefinitionClassID, SystemAdministrativeData, StatusCode, and Name. SystemAdministrativeData, StatusCode, and Name can be optional. A Log is a sequence of messages that result when an application executes a task. An entity Log is a GDT of type Log.

Message Data Type CostModelByIDResponseMessage_sync

CostModelByIDResponseMessage_sync message data type is derived from the abstract message data type CostModelMessage_sync. A MessageHeader groups together the business information from the perspective of the sending application to identify the business document in a message, to provide information about the sender, and to provide any information about the recipient. The CostModel package groups the CostModel with its packages. It can include a CostModel entity. It can include the packages Property, Item, and ProductCostEstimate. The elements that can be located directly at a CostModel node can include UUID, ID, PropertyDefinitionClassID, ChangeStateID, SystemAdministrativeData, StatusCode, and Name. SystemAdministrativeData, StatusCode, and Name can be optional.

A Property package groups information on the properties of a CostModel. It can include an entity Property. An Item package groups information on the items of a CostModel. It can includes an Item entity and can include Property and ProductCostEstimateReference packages. The elements that can be located directly at an Item node can include UUID, CostModelProductCostEstimateUUID, and CostModelProductCostEstimateTypeCode. UUID can be optional. A Property package groups information on the properties of a CostModelItem. It includes an entity Property. A ProductCostEstimate package groups information on the properties of a CostModelProductCostEstimate. It can include a ProductCostEstimate entity. It can include the packages Property, CostComponentSplit, and Item. The elements that can be located directly at a ProductCostEstimate node can include UUID, ID, and TypeCode. A Property package groups information on the properties of a CostModelProductCostEstimate. It includes an entity Property.

A CostComponentSplit package groups information on the CostComponentSplit of a CostModelProductCostEstimate. It includes an entity CostComponentSplit. It includes the package Element. An Item package groups information on an item of a CostModelProductCostEstimate. It can include an Item entity. It can include the packages Reference, Property, and CostComponentSplit. The elements that can be located directly at an Item node can include UUID, CostModelCostSourceUUID, CostModelCostSourceTypeCode, CostModelProductCostEstimateUUID, and CostModelProductCostEstimateTypeCode. CostModelCostSourceUUID, CostModelCostSourceTypeCode, CostModelProductCostEstimateUUID, and CostModelProductCostEstimateTypeCode can be optional. A CostModelProductCostEstimateItem refers either to a CostModelCostSource or to another CostModelProductCostEstimate. Therefore, within an entity CostModelProductCostEstimateItem, either the CostModelCostSourceUUID and the CostModelCostSourceTypeCode or the CostModelProductCostEstimateID and the CostModelProductCostEstimateTypeCode can be provided.

A Property package groups information on the properties of a CostModelProductCostEstimateItem. It includes an entity Property. A CostComponentSplit package groups information on the CostComponentSplit of a CostModelProductCostEstimate. It includes an entity CostComponentSplit. It includes the package Element. A Log is a sequence of messages that result when an application executes a task. An entity Log is a GDT of type Log.

Message Data Type CostModelByIDQueryMessage_sync

The message data type CostModelByIDQueryMessage_sync includes the Selection included in the business document and the business information that is relevant for sending a business document in a message. It can include the packages MessageHeader and Selection. A MessageHeader groups together the business information from the perspective of the sending application to identify the business document in a message, to provide information about the sender, and to provide any information about the recipient. The Selection package collects all the selection criteria of the CostModel within this message data type. It can include a CostModelSelectionByID entity. The CostModelSelectionByID includes the unique identifier to select a CostModel. The selection criteria element located at CostModelSelectionByID can include CostModelUUID and PropertyDefinitionClassID. CostModelUUID is the unique identifier of a CostModel and is a GDT of type UUID. PropertyDefinitionClassID is an identifier for a class defining properties and is a GDT of type PropertyDefinitionClassID.

CurrentAccountContract Interfaces

The CurrentAccountContract interfaces provide the basic service operations used to create and maintain current account contracts. These services can be used in multiple consumer scenarios, one of which is the creation and maintenance of credit facility contracts. Credit facilities in banks or financial institutions define superordinated credit lines for their customers for the purpose of structured financing.

Figure 62:
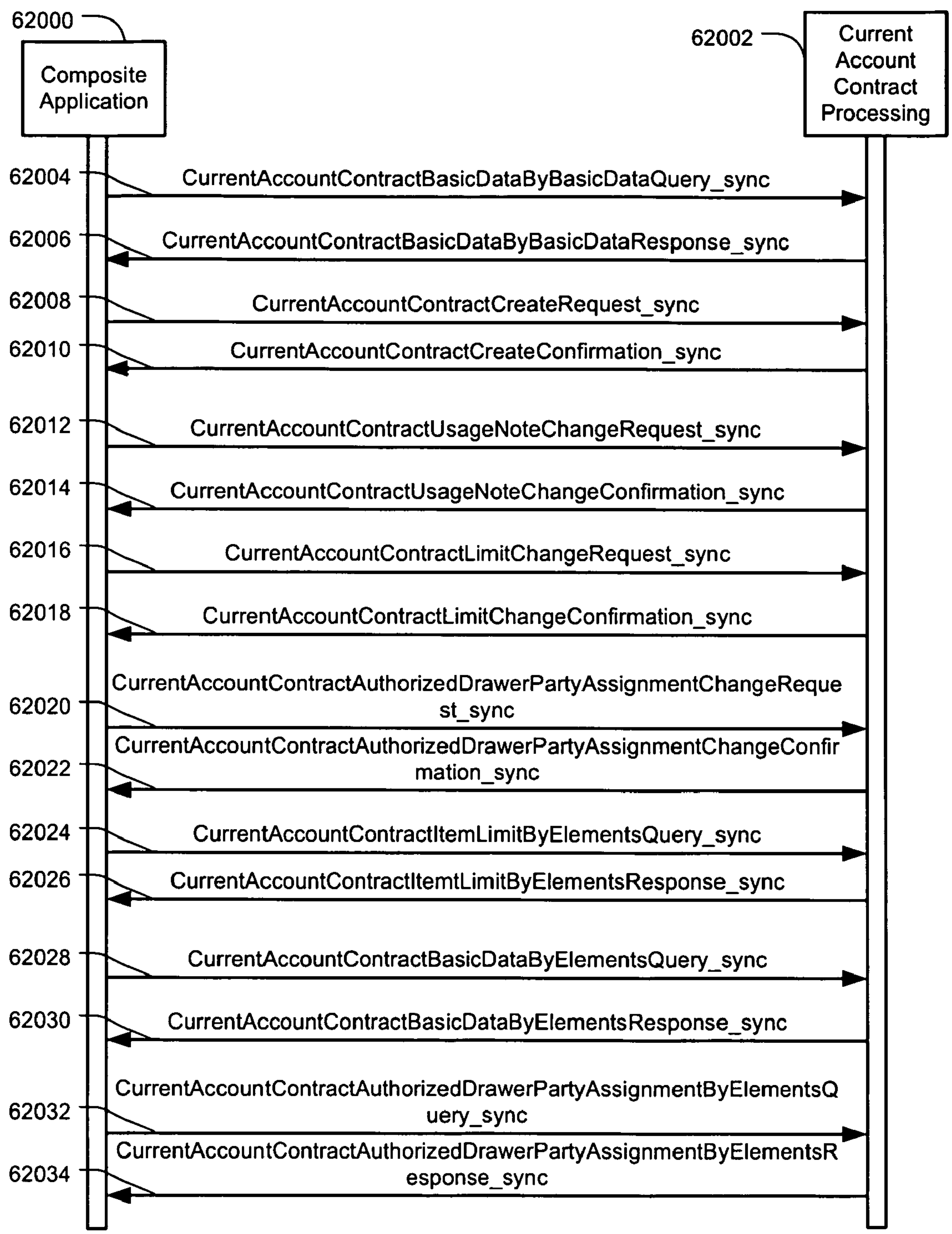
FIG. 62 shows an exemplary CurrentAccountContract Message Choreography.

The message choreography of FIG. 62 describes a possible logical sequence of messages that can be used to realize a CurrentAccountContract business scenario.

A "Composite Application" system 62000 can query current account contracts using a CurrentAccountContractBasicDataByBasicDataQuery_sync message 62004 as shown, for example, in FIG. 62. A "Current Account Contract Processing" system 62002 can respond to the query using a CurrentAccountContractBasicDataByBasicDataResponse_sync message 62006 as shown, for example, in FIG. 62.

The "Composite Application" system 62000 can request the creation of a current account contract using a CurrentAccountContractCreateRequest_sync message 62008 as shown, for example, in FIG. 62. The "Current Account Contract Processing" system 62002 can confirm the request using a CurrentAccountContractCreateConfirmation_sync message 62010 as shown, for example, in FIG. 62.

The "Composite Application" system 62000 can request to change the usage note of a current account contract using a CurrentAccountContractUsageNoteChangeRequest_sync message 62012 as shown, for example, in FIG. 62. The "Current Account Contract Processing" system 62002 can confirm the request using a CurrentAccountContractUsageNoteChangeConfirmation_sync message 62014 as shown, for example, in FIG. 62.

The "Composite Application" system 62000 can request to change the limit of a current account contract using a CurrentAccountContractLimitChangeRequest_sync message 62016 as shown, for example, in FIG. 62. The "Current Account Contract Processing" system 62002 can confirm the request using a CurrentAccountContractLimitChangeConfirmation_sync message 62018 as shown, for example, in FIG. 62.

The "Composite Application" system 62000 can request (e.g., to Bank Account Contract Processing) to change the assignment of authorized drawer(s) for a current account contract using a CurrentAccountContractAuthorizedDrawerPartyAssignmentChangeRequest_sync message 62020 as shown, for example, in FIG. 62. The "Current Account Contract Processing" system 62002 can confirm the request using a CurrentAccountContractAuthorizedDrawerPartyAssignmentChangeConfirmation_sync message 62022 as shown, for example, in FIG. 62.

The "Composite Application" system 62000 can query information on the limit(s) of a current account contract using a CurrentAccountContractItemLimitByElementsQuery_sync message 62024 as shown, for example, in FIG. 62. The "Current Account Contract Processing" system 62002 can confirm the request using a CurrentAccountContractItemLimitByElementsResponse_sync message 62026 as shown, for example, in FIG. 62.

The "Composite Application" system 62000 can query information on the basic data of a current account contract using a CurrentAccountContractBasicDataByElements Query_sync message 62028 as shown, for example, in FIG. 62. The "Current Account Contract Processing" system 62002 can confirm the request using a CurrentAccountContractBasicDataByElementsResponse_sync message 62030 as shown, for example, in FIG. 62.

The "Composite Application" system 62000 can query information of authorized drawer assignments for a current account contract using a CurrentAccountContractAuthorizedDrawerPartyAssignmentByElementsQuery_sync message 62032 as shown, for example, in FIG. 62. The "Current Account Contract Processing" system 62002 can confirm the request using a CurrentAccountContractAuthorizedDrawerPartyAssignmentByElementsResponse_sync message 62034 as shown, for example, in FIG. 62.

A CurrentAccountContractCreateRequest_sync is a request to Bank Account Contract Processing to create a CurrentAccountContract. The structure of the message type CurrentAccountContractCreateRequest_sync is specified by the message data type CurrentAccountContractCreateRequestMessage_sync.

A CurrentAccountContractCreateConfirmation_sync is the confirmation to a CurrentAccountContractCreateRequest_sync. The structure of the message type CurrentAccountContractCreateConfirmation_sync is specified by the message data type CurrentAccountContractCreateConfirmationMessage_sync.

A CurrentAccountContractUsageNoteChangeRequest_sync is a request to Bank Account Contract Processing to change the usage note of a CurrentAccountContract. The structure of the message type CurrentAccountContractUsageNoteChangeRequest_sync is specified by the message data type CurrentAccountContractUsageNoteChange RequestMessage_sync.

A CurrentAccountContractUsageNoteChange Confirmation_sync is the confirmation to a CurrentAccountContractUsageNoteChangeRequest_sync. The structure of the message type CurrentAccountContractUsageNoteChangeConfirmation_sync is specified by the message data type CurrentAccountContractUsageNoteChangeConfirmationMessage_sync.

A CurrentAccountContractItemLimitChangeRequest_sync is a request to Bank Account Contract Processing to change a limit of a CurrentAccountContract. The structure of the message type CurrentAccountContractItemLimitChangeRequest_sync is specified by the message data type CurrentAccountContractItemLimitChangeRequestMessage_sync.

A CurrentAccountContractItemLimitChangeConfirmation_sync is the confirmation to a CurrentAccountContractItemLimitChangeRequest_sync. The structure of the message type CurrentAccountContractItemLimitChangeConfirmation_sync is specified by the message data type CurrentAccountContractItemLimitChangeConfirmationMessage_sync.

A CurrentAccountContractAuthorizedDrawerPartyAssignmentChangeRequest_sync is a request to Bank Account Contract Processing for changing the assignment of authorized drawer(s) for a CurrentAccountContract. The structure of the message type CurrentAccountContractAuthorizedDrawerPartyAssignmentChangeRequest_sync is specified by the message data type CurrentAccountContractAuthorizedDrawerPartyAssignmentChangeRequestMessage_sync.

A CurrentAccountContractAuthorizedDrawerPartyAssignmentChangeConfirmation_sync is the confirmation to a CurrentAccountContractAuthorizedDrawerPartyAssignmentChangeRequest_sync. The structure of the message type CurrentAccountContractAuthorizedDrawerPartyAssignmentChangeConfirmation_sync is specified by the message data type CurrentAccountContractAuthorizedDrawerPartyAssignmentChangeConfirmation Message_sync.

A CurrentAccountContractItemLimitByElements Query_sync is an inquiry to Bank Account Contract Processing for the information on limit(s) of a CurrentAccountContract. The structure of the message type CurrentAccountContractItemLimitByElementsQuery_sync is specified by the message data type CurrentAccountContractItemLimitByElementsMessage_sync.

A CurrentAccountContractItemLimitByElementsResponse_sync is the response to a CurrentAccountContractItemLimitByElementsQuery_sync. The structure of the message type CurrentAccountContractItemLimitByElementsResponse_sync is specified by the message data type CurrentAccountContractItemLimitByElementsResponseMessage_sync.

A CurrentAccountContractBasicDataByElementsQuery_sync is an inquiry to Bank Account Contract Processing for information on basic data of a CurrentAccountContract. The structure of the message type CurrentAccountContractBasicDataByElementsQuery_sync is specified by the message data type CurrentAccountContractBasicDataByElementsQueryMessage_sync.

A CurrentAccountContractBasicDataByElementsResponse_sync is the response to a CurrentAccountContractBasicDataByElementsQuery. The structure of the message type CurrentAccountContractBasicDataByElementsResponse_sync is specified by the message data type CurrentAccountContractBasicDataByElementsResponseMessage_sync.

A CurrentAccountContractAuthorizedDrawerPartyAssignmentByElementsQuery_sync is an inquiry to Bank Account Contract Processing for information of authorized drawer assignments for a CurrentAccountContract. The structure of the message type CurrentAccountContractAuthorizedDrawerPartyAssignmentByElementsQuery_sync is specified by the message data type CurrentAccountContractAuthorizedDrawerPartyAssignmentByElementsQueryMessage_sync.

A CurrentAccountContractAuthorizedDrawerPartyAssignmentByElementsResponse_sync is the response to a CurrentAccountContractAuthorizedDrawerPartyAssignmentByElementsQuery_sync. The structure of the message type CurrentAccountContractAuthorizedDrawerPartyAssignmentByElementsResponse_sync is specified by the message data type CurrentAccountContractAuthorizedDrawerPartyAssignmentByElementsResponseMessage_sync A CurrentAccountContractBasicDataByBasicDataQuery_sync is an inquiry to Bank Account Contract Processing for a list of Bank Accounts. The structure of the message type CurrentAccountContractBasicDataByBasicDataQuery_sync is specified by the message data type CurrentAccountContractBasicDataByBasicDataQueryMessage_sync.

A CurrentAccountContractBasicDataByBasicDataResponse_sync is the response to a CurrentAccountContractBasicDataByBasicDataQuery_sync. The structure of the message type CurrentAccountContractBasicDataByBasicDataResponse_sync is specified by the message data type CurrentAccountContractBasicDataByBasicDataResponseMessage_sync.

The service interface(s) in Bank Account Contract Processing include ManageCurrentAccountContractIn and QueryCurrentAccountContractIn. The following operations belong to ManageCurrentAccountContractIn: CreateCurrentAccountContract, ReadCurrentAccountContractBasicData, ReadCurrentAccountContractAuthorizedDrawerPartyAssignment, ReadCurrentAccountContractLimit, ChangeCurrentAccountContractUsageNote, ChangeCurrentAccountContractAuthorizedDrawerPartyAssignment, and ChangeCurrentAccountContractLimit. The following operations belong to QueryCurrentAccountContractIn: FindCurrentAccountContractByBasicData.

Figure 63:
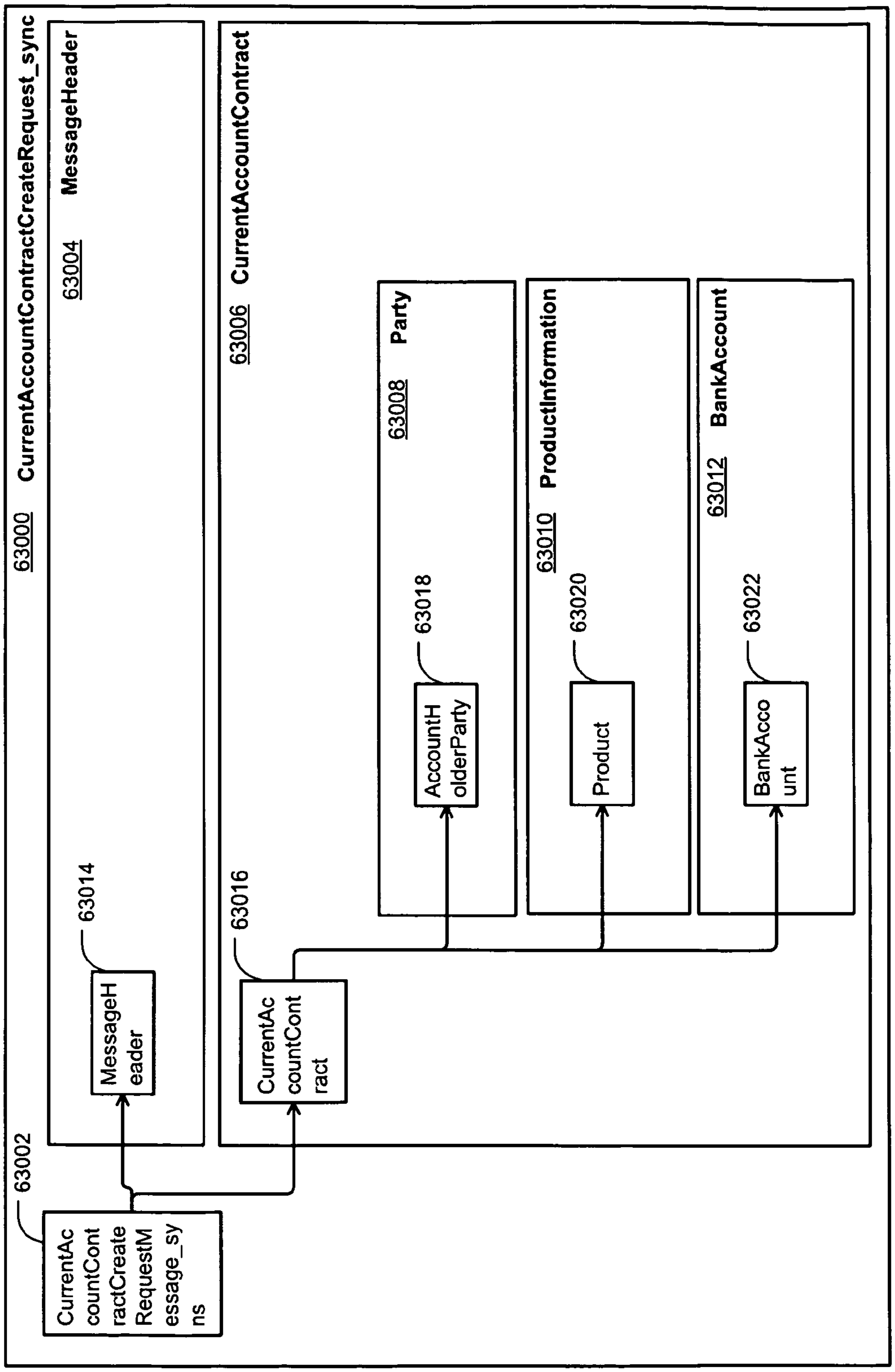
FIG. 63 shows an exemplary CurrentAccountContractCreateRequestMessage_sync Message Data Type.

FIG. 63 illustrates one example logical configuration of CurrentAccountContractCreateRequest_sync message 63000. Specifically, this figure depicts the arrangement and hierarchy of various components such as one or more levels of packages, entities, and datatypes, shown here as 63000 through 63022. As described above, packages may be used to represent hierarchy levels. Entities are discrete business elements that are used during a business transaction. Data types are used to type object entities and interfaces with a structure. For example, CurrentAccountContractCreateRequest_sync message 63000 includes, among other things, CurrentAccountContract 63006. Accordingly, heterogeneous applications may communicate using this consistent message configured as such.

Figure 64:
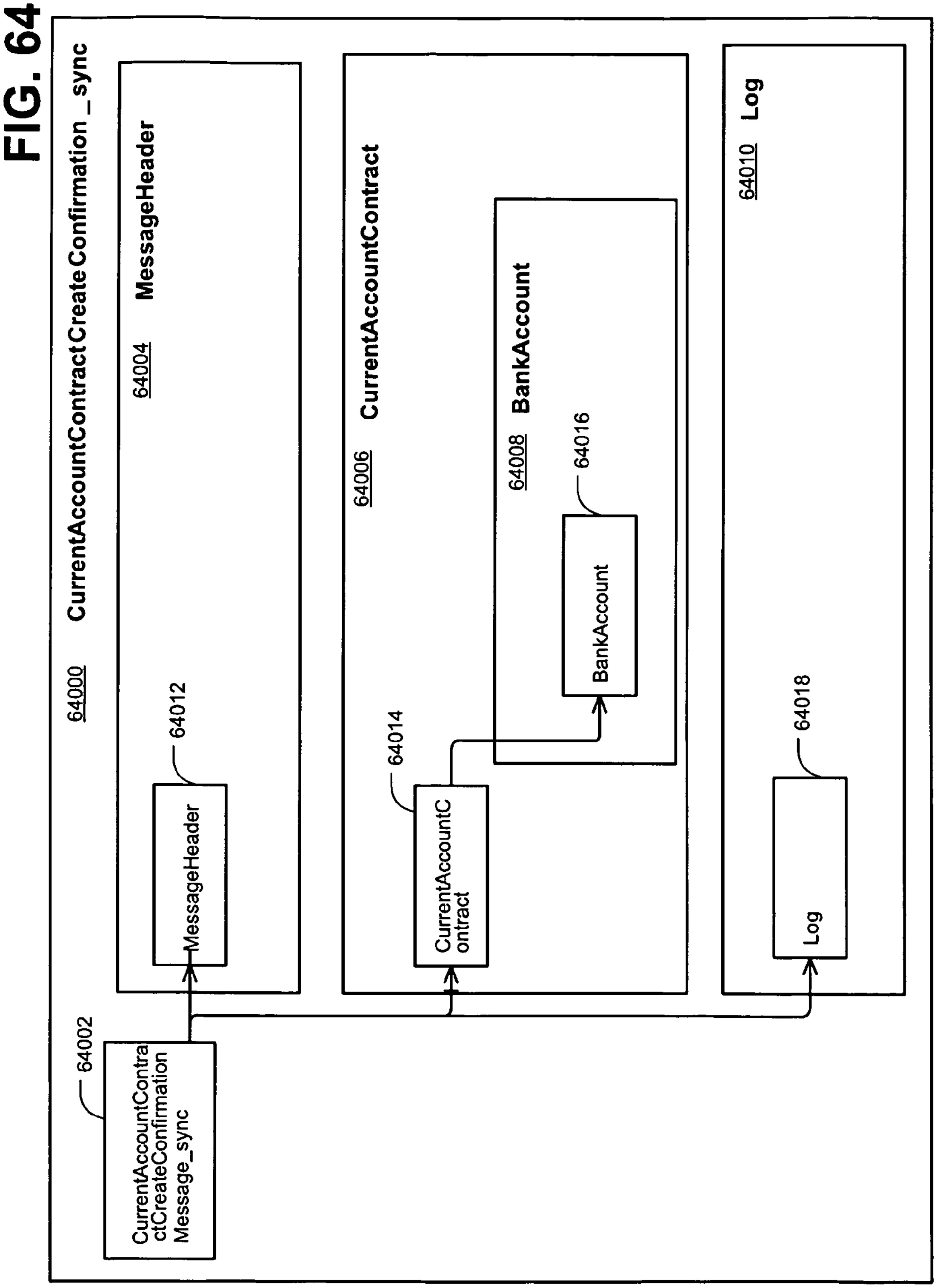
FIG. 64 shows an exemplary CurrentAccountContractCreateConfirmationMessage_sync Message Data Type.

Additionally, FIG. 64 illustrates one example logical configuration of CurrentAccountContractCreateConfirmation_sync message 64000. Specifically, this figure depicts the arrangement and hierarchy of various components such as one or more levels of packages, entities, and datatypes, shown here as 64000 through 64018. As described above, packages may be used to represent hierarchy levels. Entities are discrete business elements that are used during a business transaction. Data types are used to type object entities and interfaces with a structure. For example, CurrentAccountContractCreateConfirmation_sync message 64000 includes, among other things, CurrentAccountContract 64006. Accordingly, heterogeneous applications may communicate using this consistent message configured as such.

Figure 65:
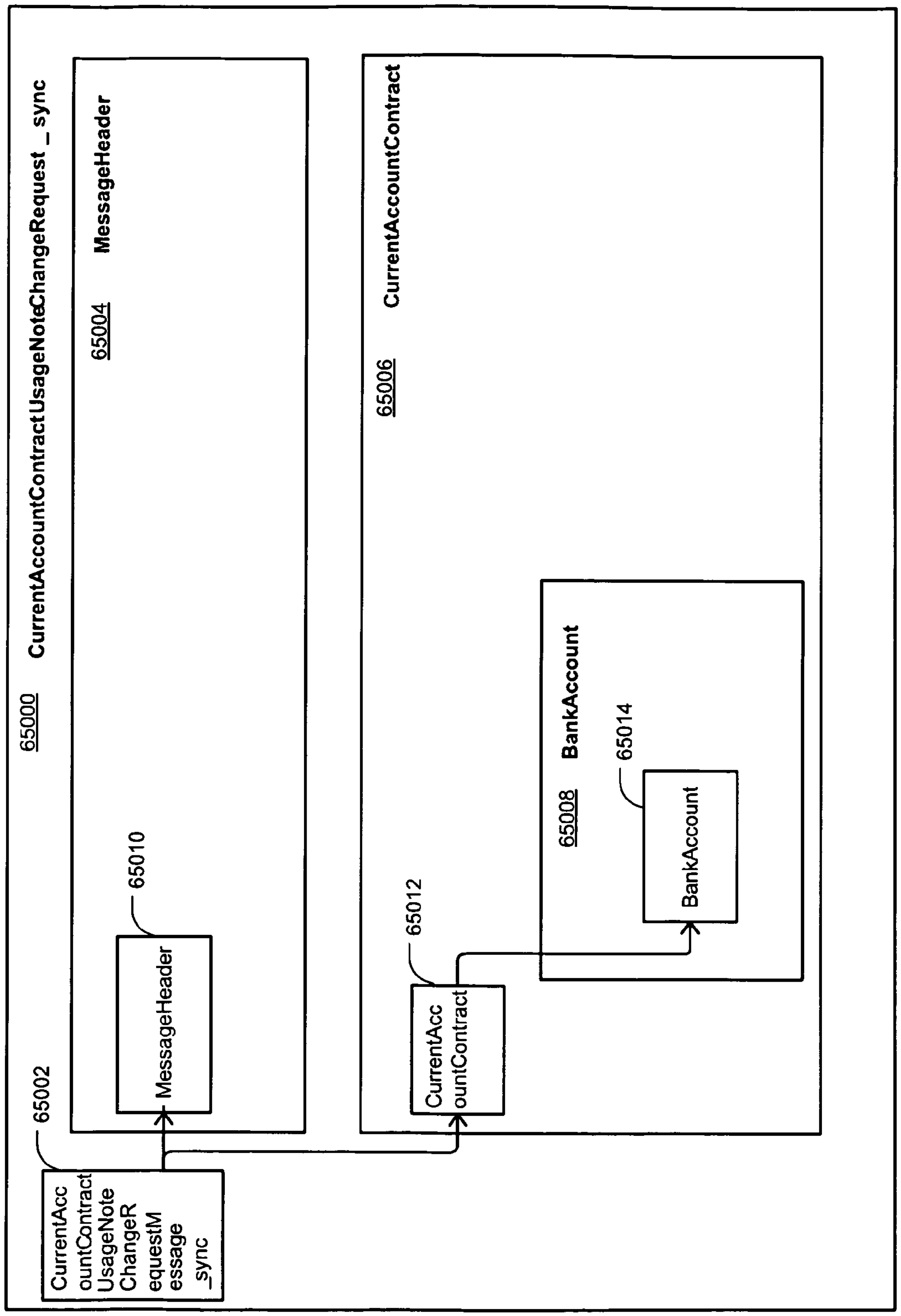
FIG. 65 shows an exemplary CurrentAccountContractUsageNoteChangeRequestMessage_sync Message Data Type.

Additionally, FIG. 65 illustrates one example logical configuration of CurrentAccountContractUsageNoteChangeRequest_sync message 65000. Specifically, this figure depicts the arrangement and hierarchy of various components such as one or more levels of packages, entities, and datatypes, shown here as 65000 through 65014. As described above, packages may be used to represent hierarchy levels. Entities are discrete business elements that are used during a business transaction. Data types are used to type object entities and interfaces with a structure. For example, CurrentAccountContractUsageNoteChangeRequest_sync message 65000 includes, among other things, CurrentAccountContract 65006. Accordingly, heterogeneous applications may communicate using this consistent message configured as such.

Figure 66:
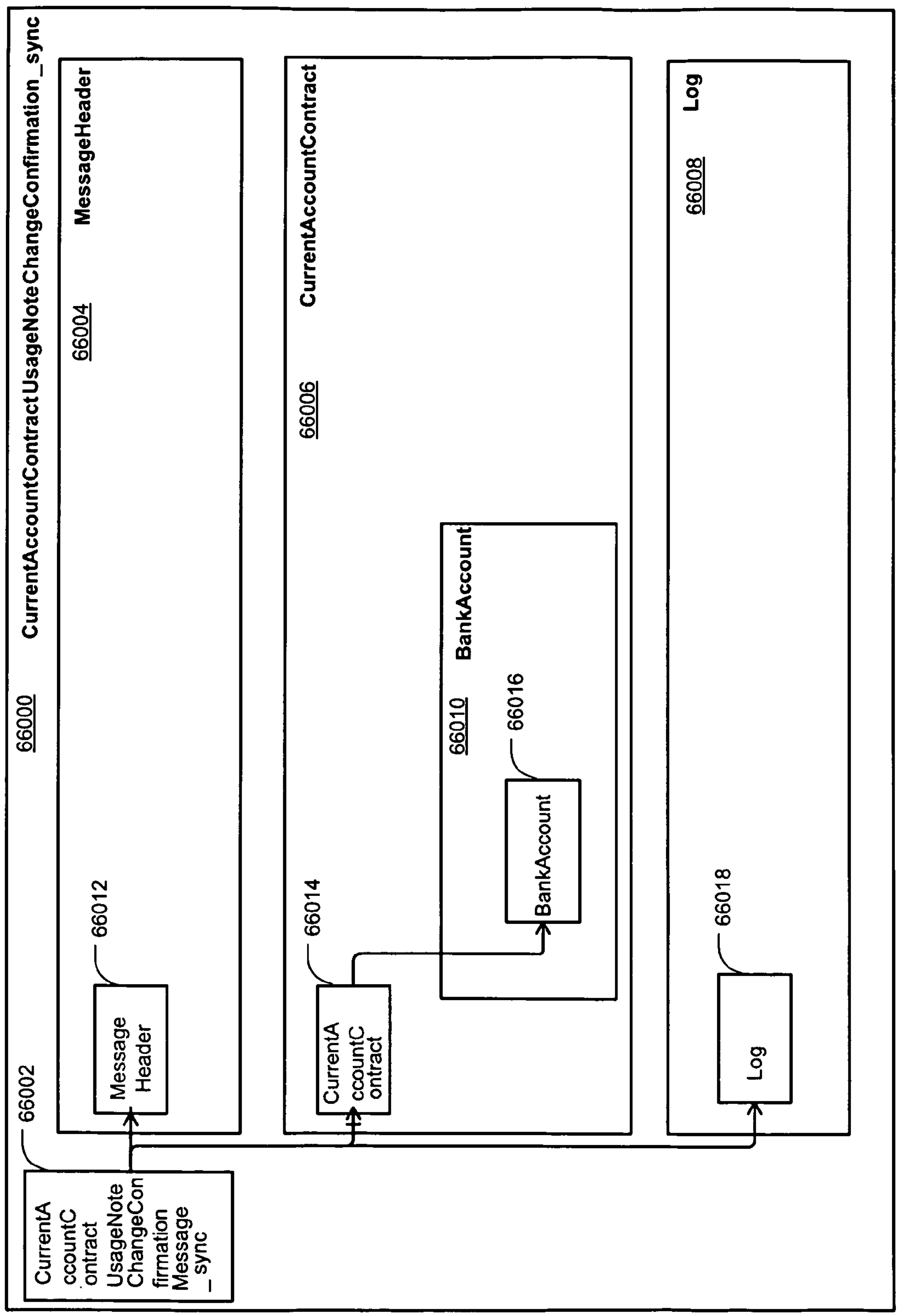
FIG. 66 shows an exemplary CurrentAccountContractUsageNoteChangeConfirmationMessage_sync Message Data Type.

Additionally, FIG. 66 illustrates one example logical configuration of CurrentAccountContractUsageNoteChange Confirmation_sync message 66000. Specifically, this figure depicts the arrangement and hierarchy of various components such as one or more levels of packages, entities, and datatypes, shown here as 66000 through 66018. As described above, packages may be used to represent hierarchy levels. Entities are discrete business elements that are used during a business transaction. Data types are used to type object entities and interfaces with a structure. For example, CurrentAccountContractUsageNoteChangeConfirmation_sync message 66000 includes, among other things, CurrentAccountContract 66006. Accordingly, heterogeneous applications may communicate using this consistent message configured as such.

Figure 67:
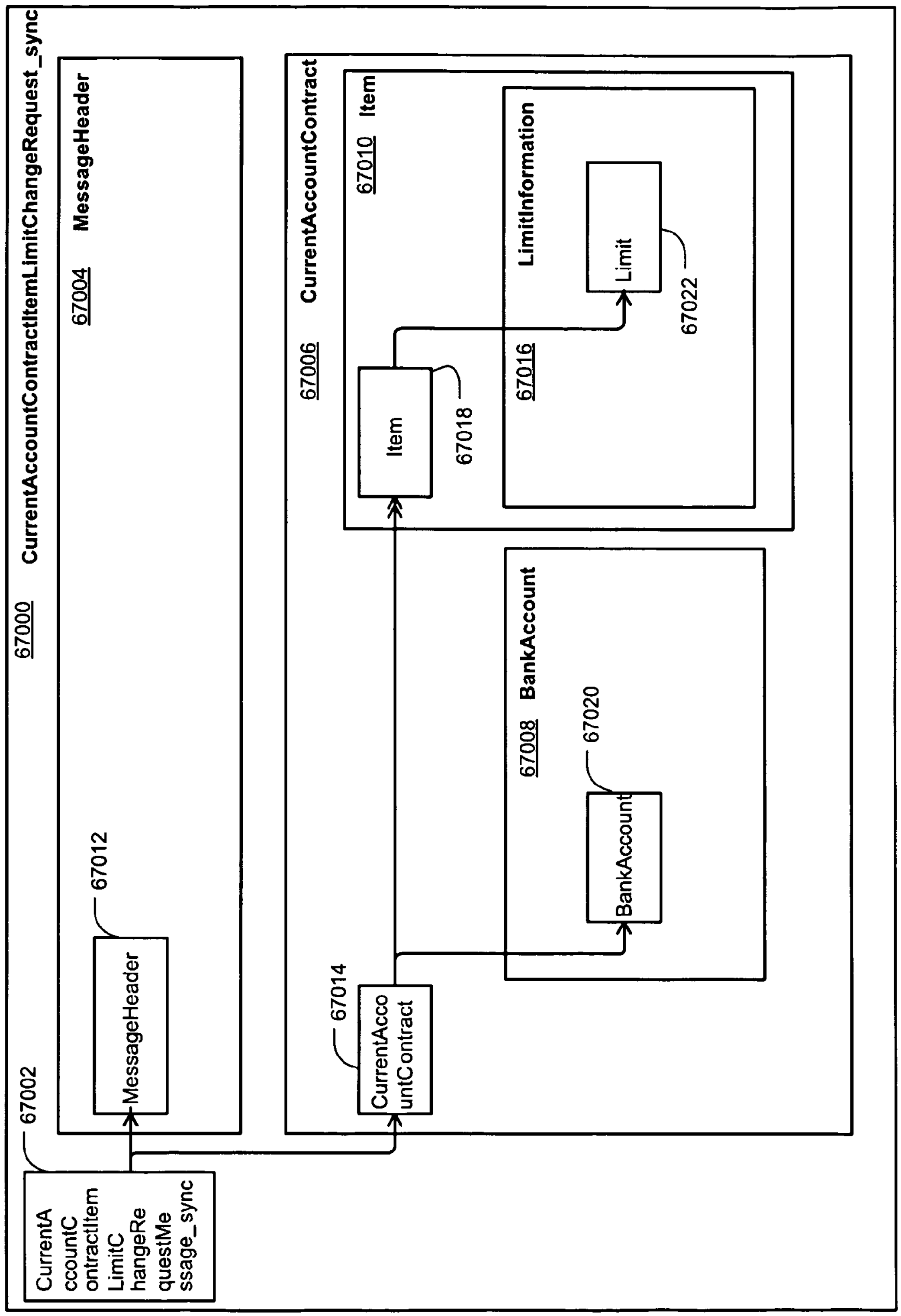
FIG. 67 shows an exemplary CurrentAccountContractItemLimitChangeRequestMessage_sync Message Data Type.

Additionally, FIG. 67 illustrates one example logical configuration of CurrentAccountContractItemLimitChange Request_sync message 67000. Specifically, this figure depicts the arrangement and hierarchy of various components such as one or more levels of packages, entities, and datatypes, shown here as 67000 through 67022. As described above, packages may be used to represent hierarchy levels. Entities are discrete business elements that are used during a business transaction. Data types are used to type object entities and interfaces with a structure. For example, CurrentAccountContractItemLimitChangeRequest_sync message 67000 includes, among other things, CurrentAccountContract 67006. Accordingly, heterogeneous applications may communicate using this consistent message configured as such.

Figure 68:
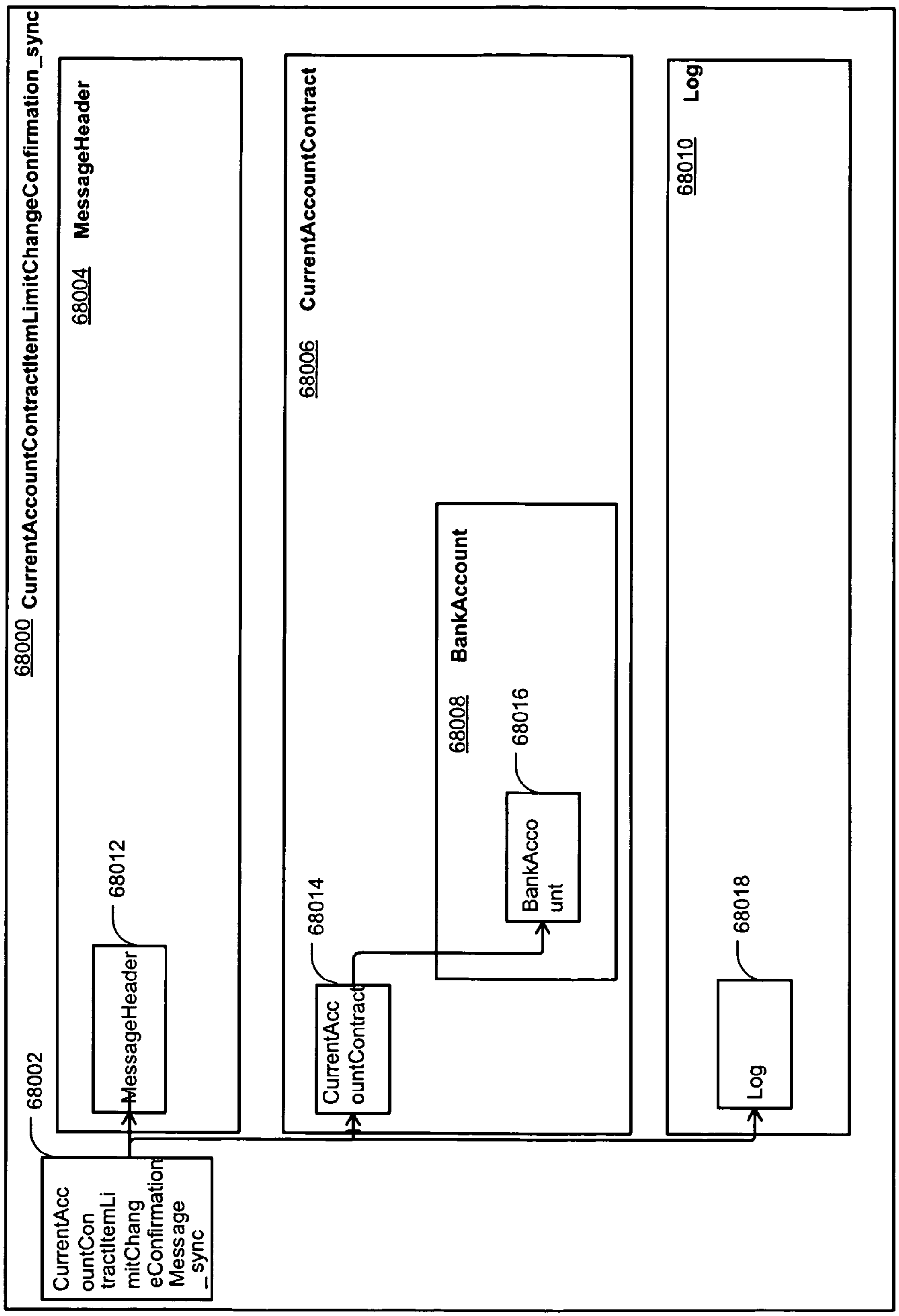
FIG. 68 shows an exemplary CurrentAccountContractItemLimitChangeConfirmationMessage_sync Message Data Type.

Additionally, FIG. 68 illustrates one example logical configuration of CurrentAccountContractItemLimitChangeConfirmation_sync message 68000. Specifically, this figure depicts the arrangement and hierarchy of various components such as one or more levels of packages, entities, and datatypes, shown here as 68000 through 68018. As described above, packages may be used to represent hierarchy levels. Entities are discrete business elements that are used during a business transaction. Data types are used to type object entities and interfaces with a structure. For example, CurrentAccountContractItemLimitChangeConfirmation_sync message 68000 includes, among other things, CurrentAccountContract 68006. Accordingly, heterogeneous applications may communicate using this consistent message configured as such.

Figure 69:
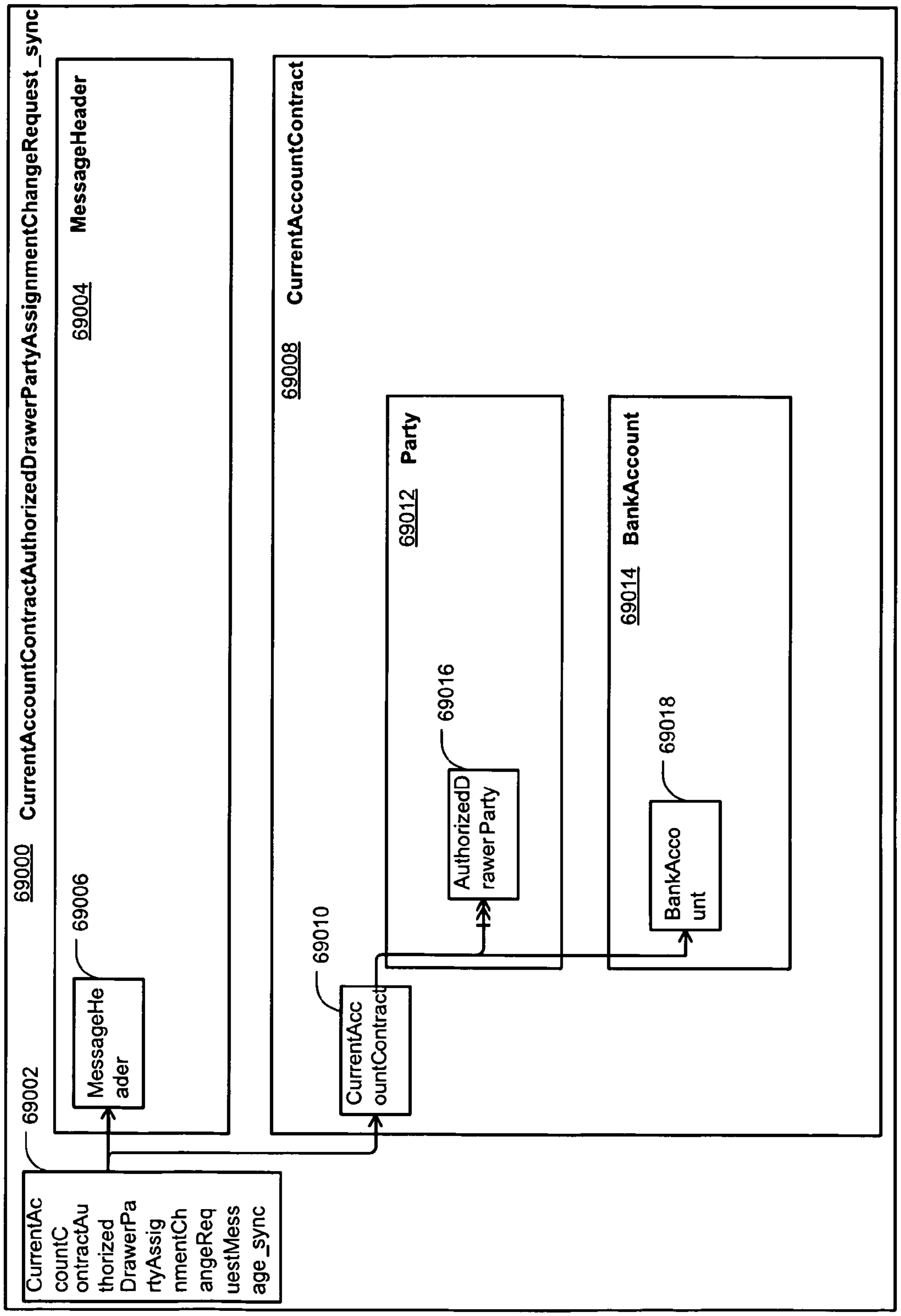
FIG. 69 shows an exemplary CurrentAccountContractAuthorizedDrawerPartyAssignmentChangeRequestMessage_sync Message Data Type.

Additionally, FIG. 69 illustrates one example logical configuration of CurrentAccountContractAuthorizedDrawerPartyAssignmentChangeRequest_sync message 69000. Specifically, this figure depicts the arrangement and hierarchy of various components such as one or more levels of packages, entities, and datatypes, shown here as 69000 through 69018. As described above, packages may be used to represent hierarchy levels. Entities are discrete business elements that are used during a business transaction. Data types are used to type object entities and interfaces with a structure. For example, CurrentAccountContractAuthorizedDrawerPartyAssignmentChangeRequest_sync message 69000 includes, among other things, CurrentAccountContract 69008. Accordingly, heterogeneous applications may communicate using this consistent message configured as such.

Figure 70:
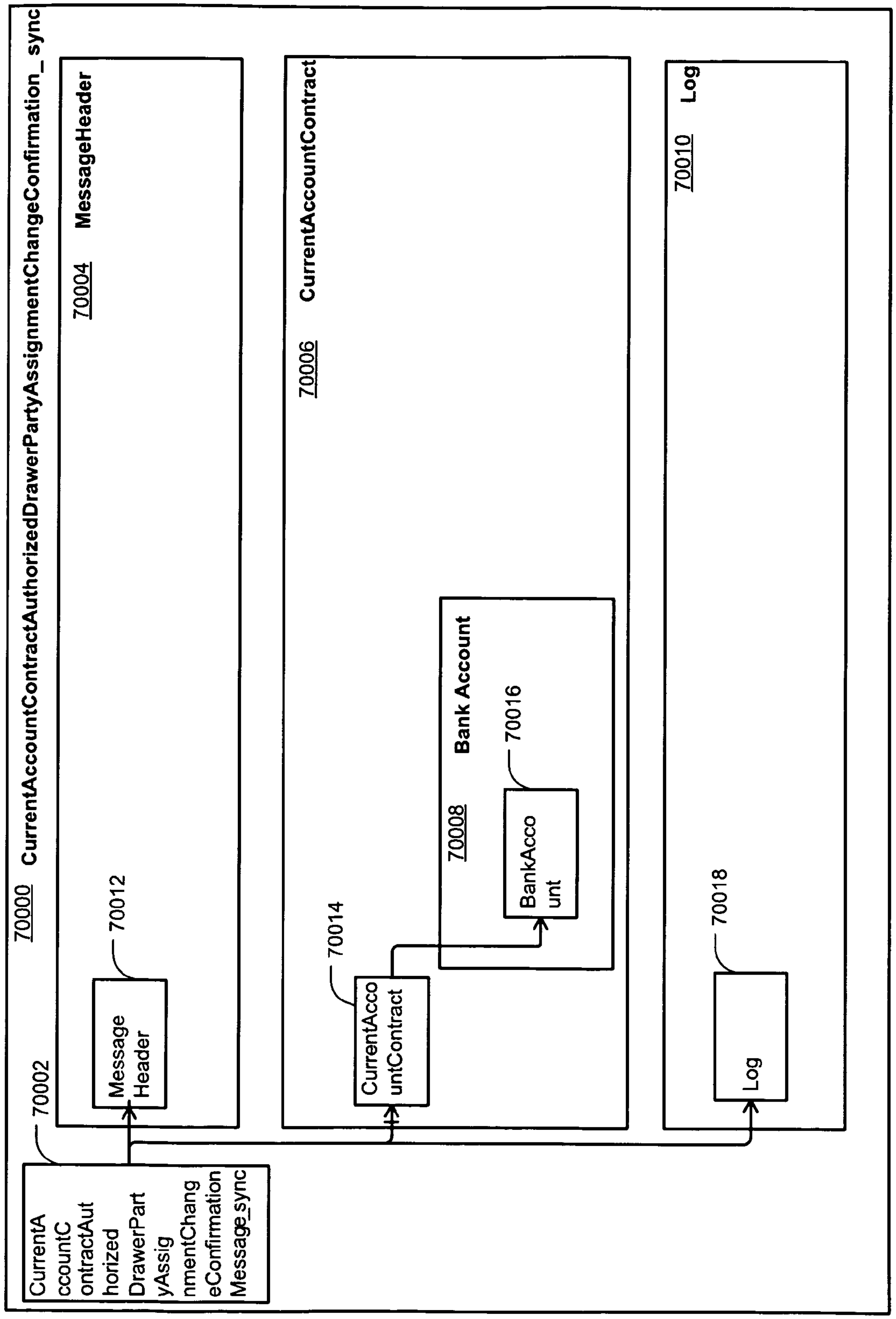
FIG. 70 shows an exemplary CurrentAccountContractAuthorizedDrawerPartyAssignmentChangeConfirmationMessage_sync Message Data Type.

Additionally, FIG. 70 illustrates one example logical configuration of CurrentAccountContractAuthorizedDrawerPartyAssignmentChangeConfitmation_sync message 70000. Specifically, this figure depicts the arrangement and hierarchy of various components such as one or more levels of packages, entities, and datatypes, shown here as 70000 through 70018. As described above, packages may be used to represent hierarchy levels. Entities are discrete business elements that are used during a business transaction. Data types are used to type object entities and interfaces with a structure. For example, CurrentAccountContractAuthorizedDrawerPartyAssignmentChangeConfirmation_sync message 70000 includes, among other things, CurrentAccountContract 70006. Accordingly, heterogeneous applications may communicate using this consistent message configured as such.

Figure 71:
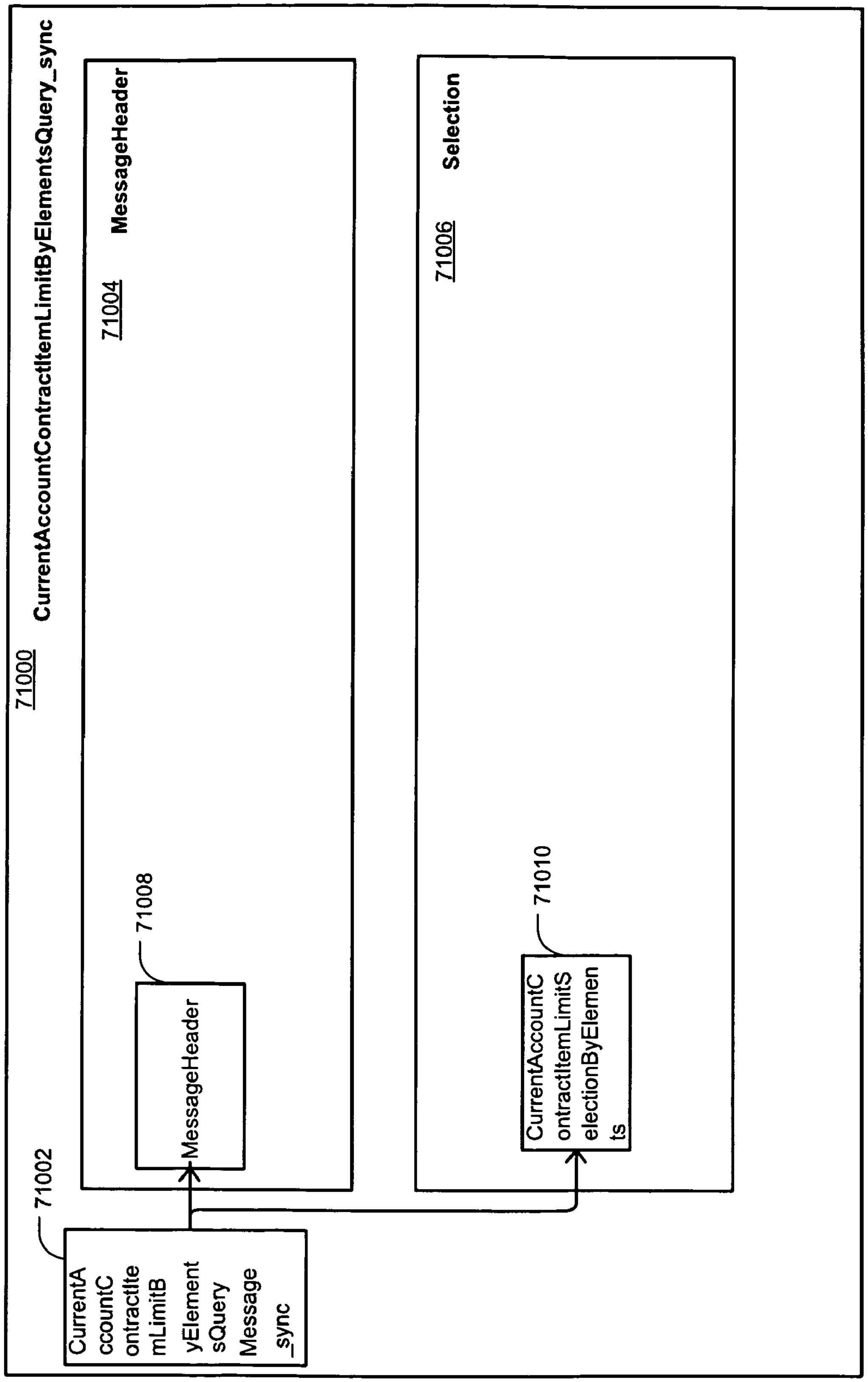
FIG. 71 shows an exemplary CurrentAccountContractItemLimitByElementsQueryMessage_sync Message Data Type.

Additionally, FIG. 71 illustrates one example logical configuration of CurrentAccountContractItemLimitByElementsQuery_sync message 71000. Specifically, this figure depicts the arrangement and hierarchy of various components such as one or more levels of packages, entities, and datatypes, shown here as 71000 through 71010. As described above, packages may be used to represent hierarchy levels. Entities are discrete business elements that are used during a business transaction. Data types are used to type object entities and interfaces with a structure. For example, CurrentAccountContractItemLimitByElementsQuery_sync message 71000 includes, among other things, Selection 71006. Accordingly, heterogeneous applications may communicate using this consistent message configured as such.

Figure 72:
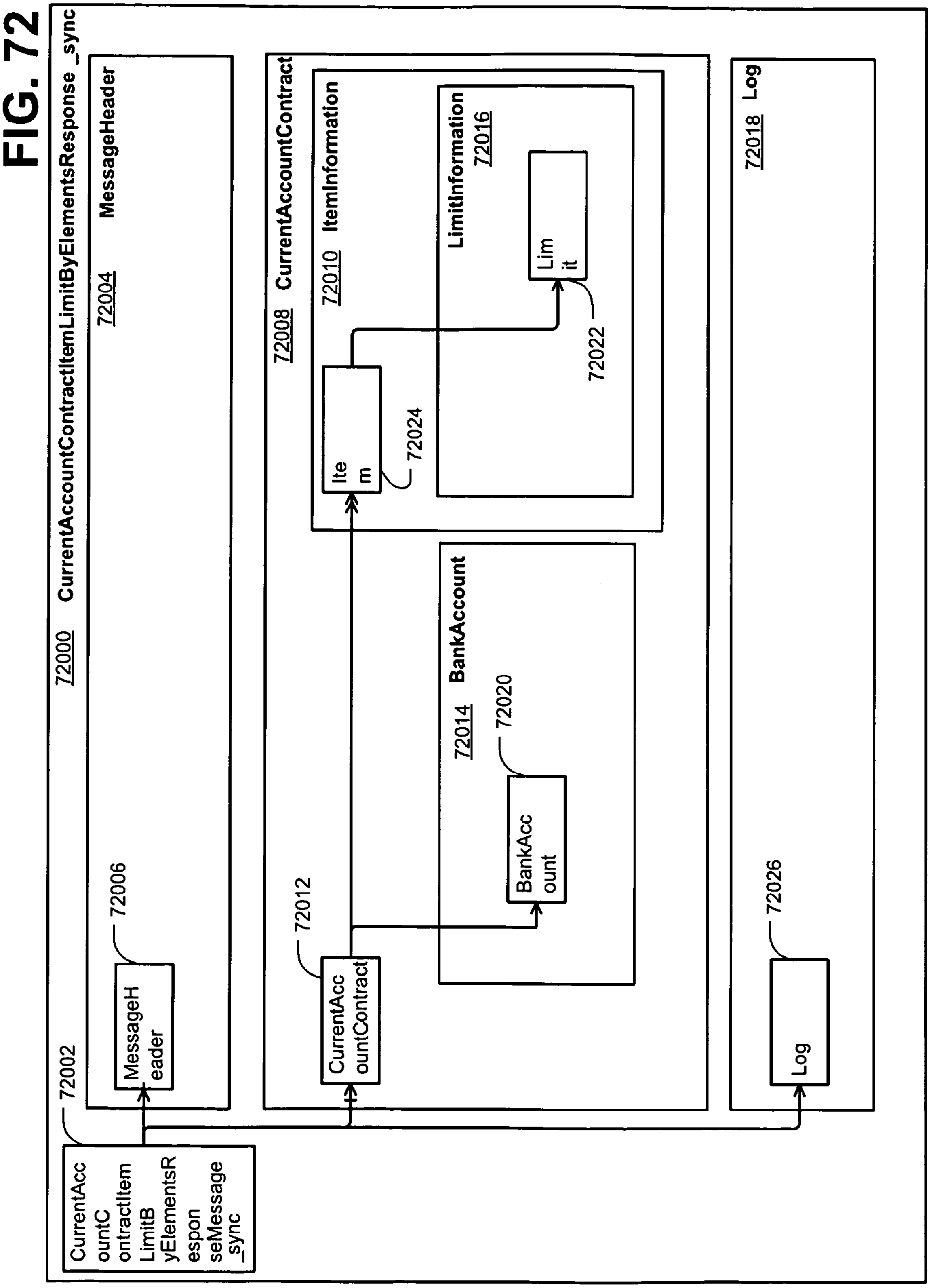
FIG. 72 shows an exemplary CurrentAccountContractItemLimitByElementsResponseMessage_sync Message Data Type.

Additionally, FIG. 72 illustrates one example logical configuration of CurrentAccountContractItemLimitByElementsResponse_sync message 72000. Specifically, this figure depicts the arrangement and hierarchy of various components such as one or more levels of packages, entities, and datatypes, shown here as 72000 through 72026. As described above, packages may be used to represent hierarchy levels. Entities are discrete business elements that are used during a business transaction. Data types are used to type object entities and interfaces with a structure. For example, CurrentAccountContractItemLimitByElementsResponse_sync message 72000 includes, among other things, CurrentAccountContract 72008. Accordingly, heterogeneous applications may communicate using this consistent message configured as such.

Figure 73:
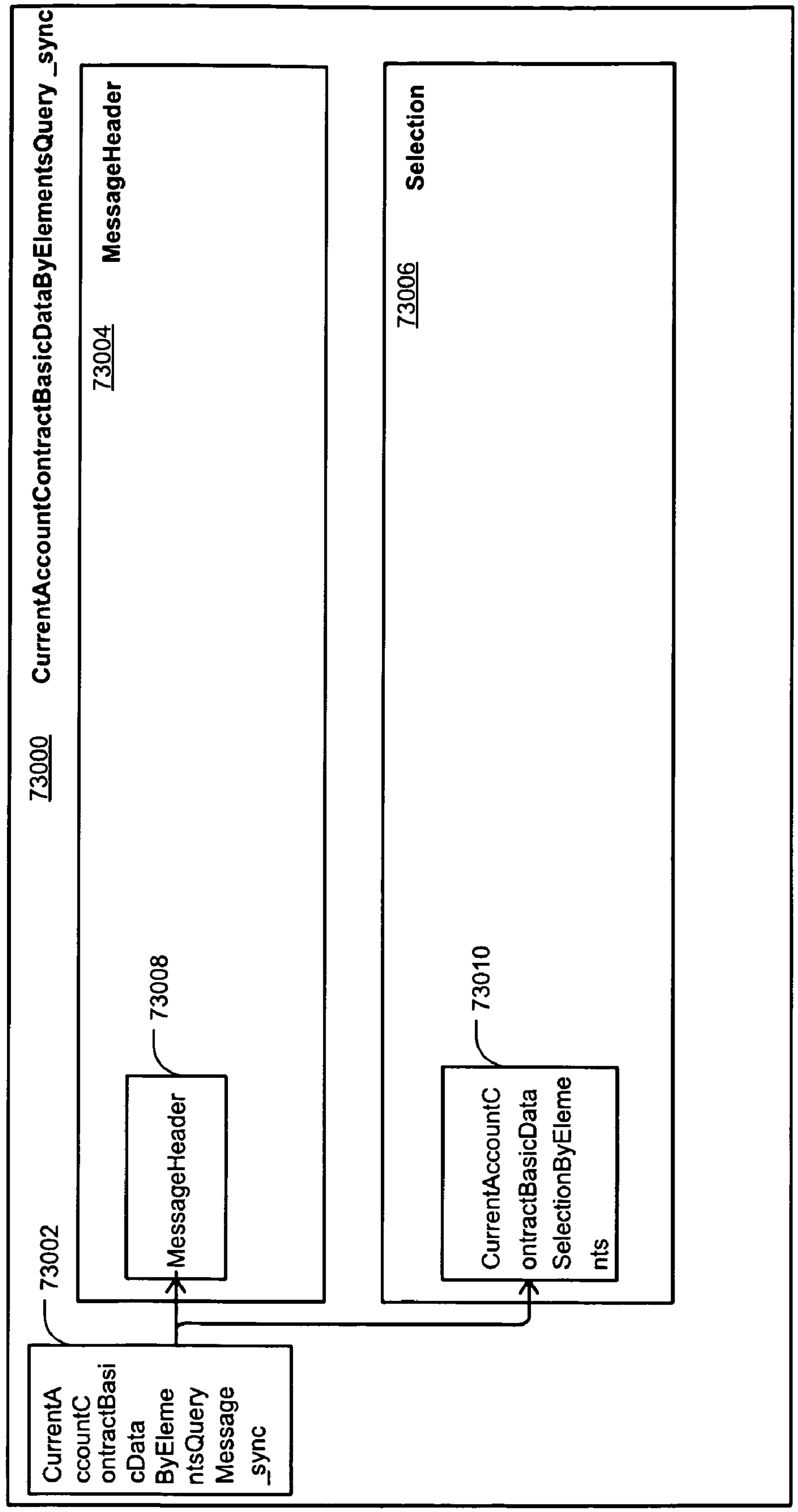
FIG. 73 shows an exemplary CurrentAccountContractBasicDataByElementsQueryMessage_sync Message Data Type.

Additionally, FIG. 73 illustrates one example logical configuration of CurrentAccountContractBasicDataByElementsQuery_sync message 73000. Specifically, this figure depicts the arrangement and hierarchy of various components such as one or more levels of packages, entities, and datatypes, shown here as 73000 through 73010. As described above, packages may be used to represent hierarchy levels. Entities are discrete business elements that are used during a business transaction. Data types are used to type object entities and interfaces with a structure. For example, CurrentAccountContractBasicDataByElementsQuery_sync message 73000 includes, among other things, Selection 73006. Accordingly, heterogeneous applications may communicate using this consistent message configured as such.

Figure 74:
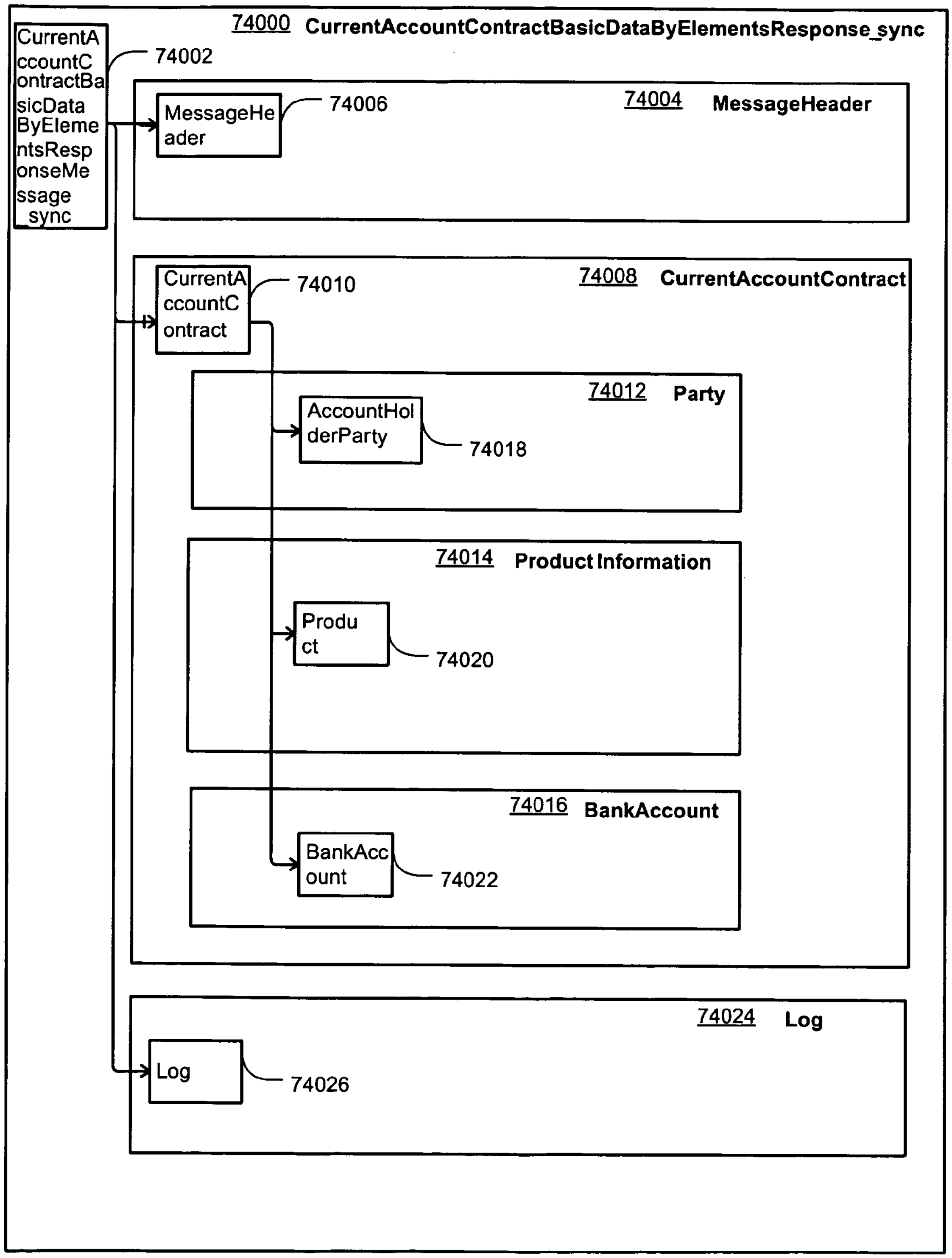
FIG. 74 shows an exemplary CurrentAccountContractBasicDataByElementsResponseMessage_sync Message Data Type.

Additionally, FIG. 74 illustrates one example logical configuration of CurrentAccountContractBasicDataByElementsResponse_sync message 74000. Specifically, this figure depicts the arrangement and hierarchy of various components such as one or more levels of packages, entities, and datatypes, shown here as 74000 through 74026. As described above, packages may be used to represent hierarchy levels. Entities are discrete business elements that are used during a business transaction. Data types are used to type object entities and interfaces with a structure. For example, CurrentAccountContractBasicDataByElementsResponse_sync message 74000 includes, among other things, CurrentAccountContract 74008. Accordingly, heterogeneous applications may communicate using this consistent message configured as such.

Figure 75:
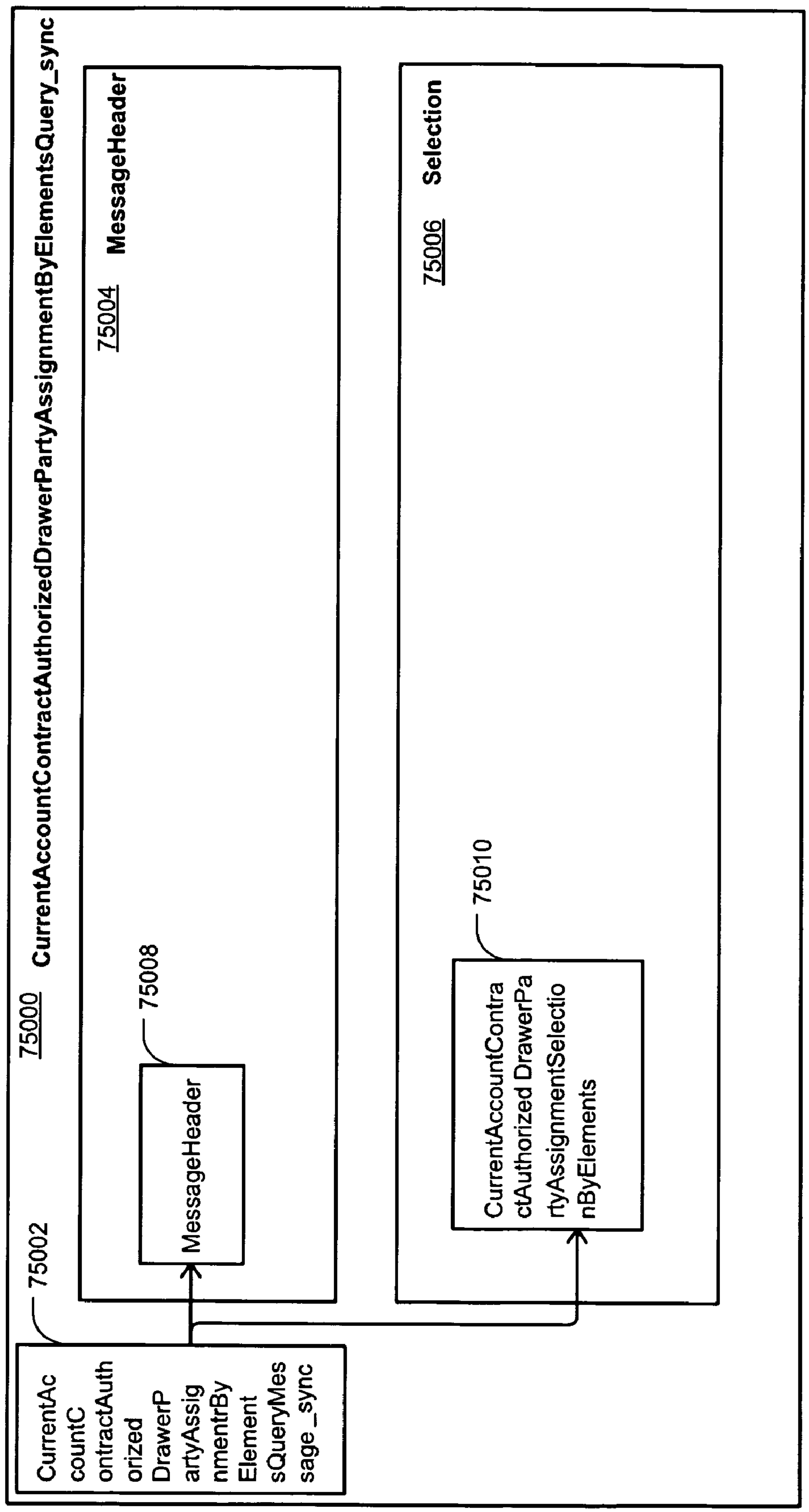
FIG. 75 shows an exemplary CurrentAccountContractAuthorizedDrawerPartyAssignmentByElementsQueryMessage_sync Message Data Type.

Additionally, FIG. 75 illustrates one example logical configuration of CurrentAccountContractAuthorizedDrawerPartyAssignmentByElementsQuery_sync message 75000. Specifically, this figure depicts the arrangement and hierarchy of various components such as one or more levels of packages, entities, and datatypes, shown here as 75000 through 75010. As described above, packages may be used to represent hierarchy levels. Entities are discrete business elements that are used during a business transaction. Data types are used to type object entities and interfaces with a structure. For example, CurrentAccountContractAuthorizedDrawerPartyAssignmentByElementsQuery_sync message 75000 includes, among other things, Selection 75006. Accordingly, heterogeneous applications may communicate using this consistent message configured as such.

Figure 76:
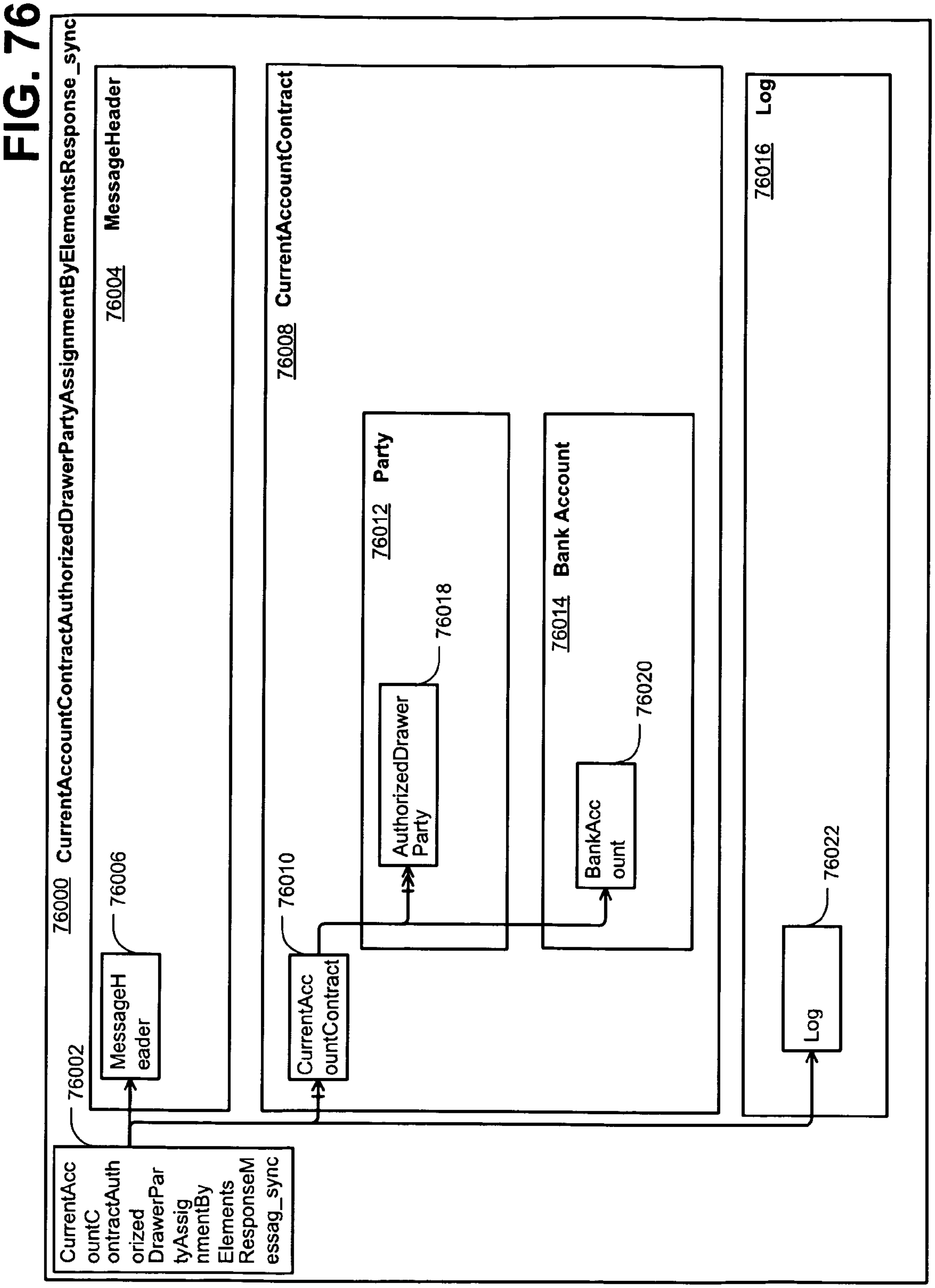
FIG. 76 shows an exemplary CurrentAccountContractAuthorizedDrawerPartyAssignmentByElementsResponseMessage_sync Message Data Type.

Additionally, FIG. 76 illustrates one example logical configuration of CurrentAccountContractAuthorizedDrawerPartyAssignmentByElementsResponse_sync message 76000. Specifically, this figure depicts the arrangement and hierarchy of various components such as one or more levels of packages, entities, and datatypes, shown here as 76000 through 76022. As described above, packages may be used to represent hierarchy levels. Entities are discrete business elements that are used during a business transaction. Data types are used to type object entities and interfaces with a structure. For example, CurrentAccountContractAuthorizedDrawerPartyAssignmentByElementsResponse_sync message 76000 includes, among other things, CurrentAccountContract 76008. Accordingly, heterogeneous applications may communicate using this consistent message configured as such.

Figure 77:
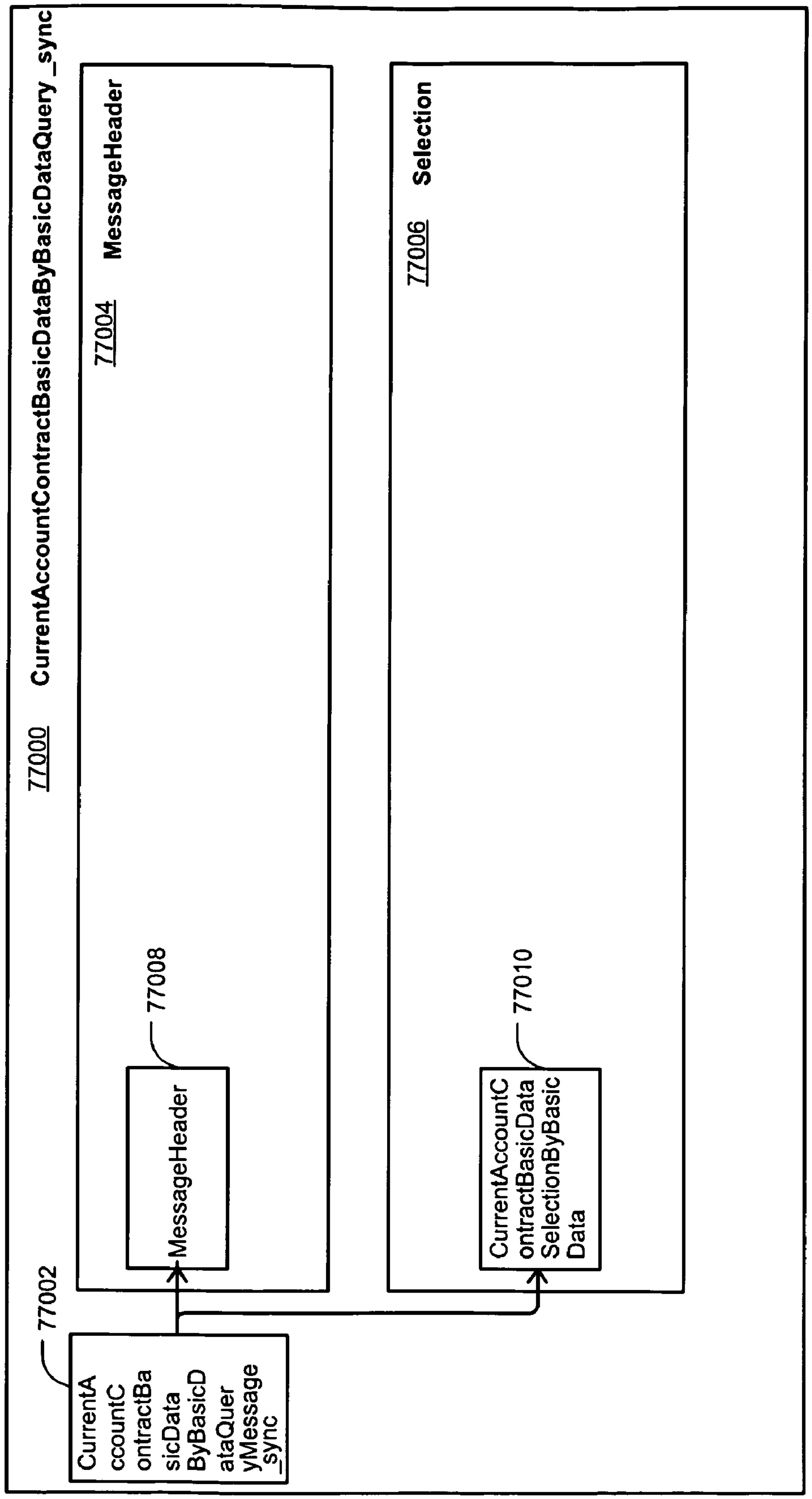
FIG. 77 shows an exemplary CurrentAccountContractBasicDataByBasicDataQueryMessage_sync Message Data Type.

Additionally, FIG. 77 illustrates one example logical configuration of CurrentAccountContractBasicDataByBasicDataQuery_sync message 77000. Specifically, this figure depicts the arrangement and hierarchy of various components such as one or more levels of packages, entities, and datatypes, shown here as 77000 through 77010. As described above, packages may be used to represent hierarchy levels. Entities are discrete business elements that are used during a business transaction. Data types are used to type object entities and interfaces with a structure. For example, CurrentAccountContractBasicDataByBasicDataQuery_sync message 77000 includes, among other things, Selection 77006. Accordingly, heterogeneous applications may communicate using this consistent message configured as such.

Figure 78:
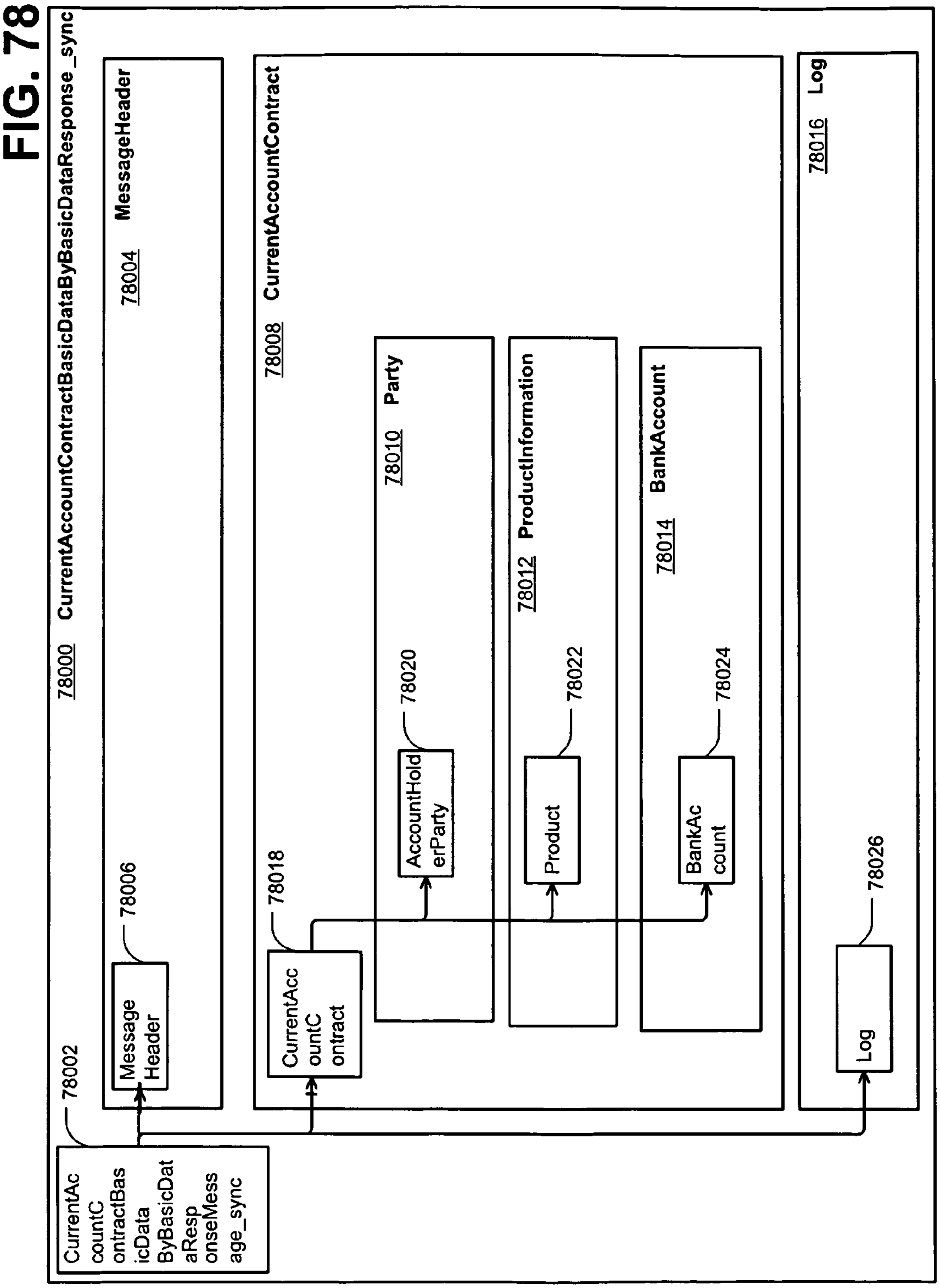
FIG. 78 shows an exemplary CurrentAccountContractBasicDataByBasicDataResponseMessage_sync Message Data Type.

Additionally, FIG. 78 illustrates one example logical configuration of CurrentAccountContractBasicDataByBasicDataResponse_sync message 78000. Specifically, this figure depicts the arrangement and hierarchy of various components such as one or more levels of packages, entities, and datatypes, shown here as 78000 through 78026. As described above, packages may be used to represent hierarchy levels. Entities are discrete business elements that are used during a business transaction. Data types are used to type object entities and interfaces with a structure. For example, CurrentAccountContractBasicDataByBasicDataResponse_sync message 78000 includes, among other things, CurrentAccountContract 78006. Accordingly, heterogeneous applications may communicate using this consistent message configured as such.

FIGS. 79-1 through 79-2 illustrate one example logical configuration of a CurrentAccountContractCreateRequest_sync 79000 element structure. Specifically, these figures depict the arrangement and hierarchy of various components such as one or more levels of packages, entities, and datatypes, shown here as 79000 through 79058. As described above, packages may be used to represent hierarchy levels. Entities are discrete business elements that are used during a business transaction. Data types are used to type object entities and interfaces with a structure. For example, the CurrentAccountContractCreateRequest_sync 79000 includes, among other things, a CurrentAccountContractCreateRequestMessage_sync 79002. Accordingly, heterogeneous applications may communicate using this consistent message configured as such.

FIGS. 80-1 through 80-2 illustrate one example logical configuration of a CurrentAccountContractCreateConfirmation_sync 80000 element structure. Specifically, these figures depict the arrangement and hierarchy of various components such as one or more levels of packages, entities, and datatypes, shown here as 80000 through 80050. As described above, packages may be used to represent hierarchy levels. Entities are discrete business elements that are used during a business transaction. Data types are used to type object entities and interfaces with a structure. For example, the CurrentAccountContractCreateConfirmation_sync 80000 includes, among other things, a CurrentAccountContractCreateConfirmation_sync 80002. Accordingly, heterogeneous applications may communicate using this consistent message configured as such.

FIGS. 81-1 through 81-2 illustrate one example logical configuration of a CurrentAccountContractUsageNoteChangeRequest_sync 81000 element structure. Specifically, these figures depict the arrangement and hierarchy of various components such as one or more levels of packages, entities, and datatypes, shown here as 81000 through 81048. As described above, packages may be used to represent hierarchy levels. Entities are discrete business elements that are used during a business transaction. Data types are used to type object entities and interfaces with a structure. For example, the CurrentAccountContractUsageNoteChangeRequest_sync 81000 includes, among other things, a CurrentAccountContractUsageNoteChangeRequestMessage_sync 81002. Accordingly, heterogeneous applications may communicate using this consistent message configured as such.

FIGS. 82-1 through 82-2 illustrate one example logical configuration of a CurrentAccountContractUsageNoteChangeConfirmation_sync 82000 element structure. Specifically, these figures depict the arrangement and hierarchy of various components such as one or more levels of packages, entities, and datatypes, shown here as 82000 through 82050. As described above, packages may be used to represent hierarchy levels. Entities are discrete business elements that are used during a business transaction. Data types are used to type object entities and interfaces with a structure. For example, the CurrentAccountContractUsageNoteChangeConfirmation_sync 82000 includes, among other things, a CurrentAccountContractUsageNoteChangeConfirmationMessage_sync 82002. Accordingly, heterogeneous applications may communicate using this consistent message configured as such.

FIGS. 83-1 through 83-3 illustrate one example logical configuration of a CurrentAccountContractItemLimitChangeRequest_sync 83000 element structure. Specifically, these figures depict the arrangement and hierarchy of various components such as one or more levels of packages, entities, and datatypes, shown here as 83000 through 83074. As described above, packages may be used to represent hierarchy levels. Entities are discrete business elements that are used during a business transaction. Data types are used to type object entities and interfaces with a structure. For example, the CurrentAccountContractItemLimitChangeRequest_sync 83000 includes, among other things, a CurrentAccountContractItemLimitChangeRequestMessage_sync 83002. Accordingly, heterogeneous applications may communicate using this consistent message configured as such.

FIGS. 84-1 through 84-2 illustrate one example logical configuration of a CurrentAccountContractLimitsChangeConfirmation_sync 84000 element structure. Specifically, these figures depict the arrangement and hierarchy of various components such as one or more levels of packages, entities, and datatypes, shown here as 84000 through 84050. As described above, packages may be used to represent hierarchy levels. Entities are discrete business elements that are used during a business transaction. Data types are used to type object entities and interfaces with a structure. For example, the CurrentAccountContractLimitsChangeConfirmation_sync 84000 includes, among other things, a CurrentAccountContractLimitsChangeConfirmation_sync 84002. Accordingly, heterogeneous applications may communicate using this consistent message configured as such.

FIGS. 85-1 through 85-2 illustrate one example logical configuration of a CurrentAccountContractAuthorizedDrawerPartyAssignmentChangeRequest_sync 85000 element structure. Specifically, these figures depict the arrangement and hierarchy of various components such as one or more levels of packages, entities, and datatypes, shown here as 85000 through 85074. As described above, packages may be used to represent hierarchy levels. Entities are discrete business elements that are used during a business transaction. Data types are used to type object entities and interfaces with a structure. For example, the CurrentAccountContractAuthorizedDrawerPartyAssignmentChangeRequest_sync 85000 includes, among other things, a CurrentAccountContractAuthorizedDrawerPartyAssignmentChangeRequest_sync 85002. Accordingly, heterogeneous applications may communicate using this consistent message configured as such.

FIGS. 86-1 through 86-2 illustrate one example logical configuration of a CurrentAccountContractAuthorizedDrawerPartyAssignmentChangeConfirmation_sync 86000 element structure. Specifically, these figures depict the arrangement and hierarchy of various components such as one or more levels of packages, entities, and datatypes, shown here as 86000 through 86050. As described above, packages may be used to represent hierarchy levels. Entities are discrete business elements that are used during a business transaction. Data types are used to type object entities and interfaces with a structure. For example, the CurrentAccountContractAuthorizedDrawerPartyAssignmentChangeConfirmation_sync 86000 includes, among other things, a CurrentAccountContractAuthorizedDrawerPartyAssignmentChangeConfirmation_sync 86002. Accordingly, heterogeneous applications may communicate using this consistent message configured as such.

FIGS. 87-1 through 87-2 illustrate one example logical configuration of a CurrentAccountContractItemLimitByElementsQuery_sync 87000 element structure. Specifically, these figures depict the arrangement and hierarchy of various components such as one or more levels of packages, entities, and datatypes, shown here as 87000 through 87036. As described above, packages may be used to represent hierarchy levels. Entities are discrete business elements that are used during a business transaction. Data types are used to type object entities and interfaces with a structure. For example, the CurrentAccountContractItemLimitByElementsQuery_sync 87000 includes, among other things, a CurrentAccountContractItemLimitByElementsQueryMessage_sync 87002. Accordingly, heterogeneous applications may communicate using this consistent message configured as such.

FIGS. 88-1 through 88-2 illustrate one example logical configuration of a CurrentAccountContractItemLimitByElementsResponse_sync 88000 element structure. Specifically, these figures depict the arrangement and hierarchy of various components such as one or more levels of packages, entities, and datatypes, shown here as 88000 through 88064. As described above, packages may be used to represent hierarchy levels. Entities are discrete business elements that are used during a business transaction. Data types are used to type object entities and interfaces with a structure. For example, the CurrentAccountContractItemLimitByElementsResponse_sync 88000 includes, among other things, a CurrentAccountContractItemLimitByElementsResponseMessage_sync 88002. Accordingly, heterogeneous applications may communicate using this consistent message configured as such.

FIGS. 89-1 through 89-2 illustrate one example logical configuration of a CurrentAccountContractBasicDataByElementsQuery_sync 89000 element structure. Specifically, these figures depict the arrangement and hierarchy of various components such as one or more levels of packages, entities, and datatypes, shown here as 89000 through 89036. As described above, packages may be used to represent hierarchy levels. Entities are discrete business elements that are used during a business transaction. Data types are used to type object entities and interfaces with a structure. For example, the CurrentAccountContractBasicDataByElementsQuery_sync 89000 includes, among other things, a CurrentAccountContractBasicDataByElementsQueryMessage_sync 89002. Accordingly, heterogeneous applications may communicate using this consistent message configured as such.

FIGS. 90-1 through 90-2 illustrate one example logical configuration of a CurrentAccountContractBasicDataByElementsResponse_sync 90000 element structure. Specifically, these figures depict the arrangement and hierarchy of various components such as one or more levels of packages, entities, and datatypes, shown here as 90000 through 90072. As described above, packages may be used to represent hierarchy levels. Entities are discrete business elements that are used during a business transaction. Data types are used to type object entities and interfaces with a structure. For example, the CurrentAccountContractBasicDataByElementsResponse_sync 90000 includes, among other things, a CurrentAccountContractBasicDataByElementsResponseRequestMessage_sync 90002. Accordingly, heterogeneous applications may communicate using this consistent message configured as such.

FIGS. 91-1 through 91-2 illustrate one example logical configuration of a CurrentAccountContractAuthorizedDrawerPartyAssignmentByElementsQuery_sync 91000 element structure. Specifically, these figures depict the arrangement and hierarchy of various components such as one or more levels of packages, entities, and datatypes, shown here as 91000 through 91036. As described above, packages may be used to represent hierarchy levels. Entities are discrete business elements that are used during a business transaction. Data types are used to type object entities and interfaces with a structure. For example, the CurrentAccountContractAuthorizedDrawerPartyAssignmentByElementsQuery_sync 91000 includes, among other things, a CurrentAccountContractAuthorizedDrawerPartyAssignmentByElementsQuery_sync 91002. Accordingly, heterogeneous applications may communicate using this consistent message configured as such.

FIGS. 92-1 through 92-2 illustrate one example logical configuration of a CurrentAccountContractAuthorizedDrawerByElementsResponse_sync 92000 element structure. Specifically, these figures depict the arrangement and hierarchy of various components such as one or more levels of packages, entities, and datatypes, shown here as 92000 through 92074. As described above, packages may be used to represent hierarchy levels. Entities are discrete business elements that are used during a business transaction. Data types are used to type object entities and interfaces with a structure. For example, the CurrentAccountContractAuthorizedDrawerByElementsResponse_sync 92000 includes, among other things, a CurrentAccountContractAuthorizedDrawerByElementsResponseMessage_sync 92002. Accordingly, heterogeneous applications may communicate using this consistent message configured as such.

FIGS. 93-1 through 93-2 illustrate one example logical configuration of a CurrentAccountContractBasicDataByBasicDataQuery_sync 93000 element structure. Specifically, these figures depict the arrangement and hierarchy of various components such as one or more levels of packages, entities, and datatypes, shown here as 93000 through 93060. As described above, packages may be used to represent hierarchy levels. Entities are discrete business elements that are used during a business transaction. Data types are used to type object entities and interfaces with a structure. For example, the CurrentAccountContractBasicDataByBasicDataQuery_sync 93000 includes, among other things, a CurrentAccountContractBasicDataByBasicDataQueryMessage_sync 93002. Accordingly, heterogeneous applications may communicate using this consistent message configured as such.

FIGS. 94-1 through 94-3 illustrate one example logical configuration of a CurrentAccountContractBasicDataByBasicDataResponse_sync 94000 element structure. Specifically, these figures depict the arrangement and hierarchy of various components such as one or more levels of packages, entities, and datatypes, shown here as 94000 through 94084. As described above, packages may be used to represent hierarchy levels. Entities are discrete business elements that are used during a business transaction. Data types are used to type object entities and interfaces with a structure. For example, the CurrentAccountContractBasicDataByBasicDataResponse_sync 94000 includes, among other things, a CurrentAccountContractBasicDataByBasicDataResponseMessage_sync 94002. Accordingly, heterogeneous applications may communicate using this consistent message configured as such.

FIGS. 95-1 through 95-4 illustrate one example logical configuration of a CurrentAccountContractCreatedInformationMessage 95000 element structure. Specifically, these figures depict the arrangement and hierarchy of various components such as one or more levels of packages, entities, and datatypes, shown here as 95000 through 95132. As described above, packages may be used to represent hierarchy levels. Entities are discrete business elements that are used during a business transaction. Data types are used to type object entities and interfaces with a structure. For example, the CurrentAccountContractCreatedInformationMessage 95000 includes, among other things, a CurrentAccountContractCreatedInformationMessage 95002. Accordingly, heterogeneous applications may communicate using this consistent message configured as such.

FIGS. 96-1 through 96-4 illustrate one example logical configuration of a CurrentAccountContractCreatedBulkInformation 96000 element structure. Specifically, these figures depict the arrangement and hierarchy of various components such as one or more levels of packages, entities, and datatypes, shown here as 96000 through 96150. As described above, packages may be used to represent hierarchy levels. Entities are discrete business elements that are used during a business transaction. Data types are used to type object entities and interfaces with a structure. For example, the CurrentAccountContractCreatedBulkInformation 96000 includes, among other things, a CurrentAccountContractCreatedBulkInformationMessage 96002. Accordingly, heterogeneous applications may communicate using this consistent message configured as such.

FIGS. 97-1 through 97-2 illustrate one example logical configuration of a CurrentAccountContractReactivatedInformationMessage 97000 element structure. Specifically, these figures depict the arrangement and hierarchy of various components such as one or more levels of packages, entities, and datatypes, shown here as 97000 through 97046. As described above, packages may be used to represent hierarchy levels. Entities are discrete business elements that are used during a business transaction. Data types are used to type object entities and interfaces with a structure. For example, the CurrentAccountContractReactivatedInformationMessage 97000 includes, among other things, a CurrentAccountContractReactivatedInformationMessage 97002. Accordingly, heterogeneous applications may communicate using this consistent message configured as such.

FIGS. 98-1 through 98-2 illustrate one example logical configuration of a CurrentAccountContractReactivatedBulkInformationMessage 98000 element structure. Specifically, these figures depict the arrangement and hierarchy of various components such as one or more levels of packages, entities, and datatypes, shown here as 98000 through 98062. As described above, packages may be used to represent hierarchy levels. Entities are discrete business elements that are used during a business transaction. Data types are used to type object entities and interfaces with a structure. For example, the CurrentAccountContractReactivatedBulkInformationMessage 98000 includes, among other things, a CurrentAccountContractReactivatedBulkInformationMessage 98002. Accordingly, heterogeneous applications may communicate using this consistent message configured as such.

FIGS. 99-1 through 99-2 illustrate one example logical configuration of a CurrentAccountContractCurrencyChangedInformationMessage 99000 element structure. Specifically, these figures depict the arrangement and hierarchy of various components such as one or more levels of packages, entities, and datatypes, shown here as 99000 through 99052. As described above, packages may be used to represent hierarchy levels. Entities are discrete business elements that are used during a business transaction. Data types are used to type object entities and interfaces with a structure. For example, the CurrentAccountContractCurrencyChangedInformationMessage 99000 includes, among other things, a CurrentAccountContractCurrencyChangedInformationMessage 99002. Accordingly, heterogeneous applications may communicate using this consistent message configured as such.

FIGS. 100-1 through 100-2 illustrate one example logical configuration of a CurrentAccountContractCurrencyChangedBulkInformationMessage element structure. Specifically, these figures depict the arrangement and hierarchy of various components such as one or more levels of packages, entities, and datatypes, shown here as 100000 through 100070. As described above, packages may be used to represent hierarchy levels. Entities are discrete business elements that are used during a business transaction. Data types are used to type object entities and interfaces with a structure. For example, the CurrentAccountContractCurrencyChangedBulkInformationMessage includes, among other things, a CurrentAccountContractCurrencyChangedBulkInformationMessage 100002. Accordingly, heterogeneous applications may communicate using this consistent message configured as such.

FIGS. 101-1 through 101-2 illustrate one example logical configuration of a CurrentAccountContractAccountHolderPartyChangedInformationMessage 101000 element structure. Specifically, these figures depict the arrangement and hierarchy of various components such as one or more levels of packages, entities, and datatypes, shown here as 101000 through 101056. As described above, packages may be used to represent hierarchy levels. Entities are discrete business elements that are used during a business transaction. Data types are used to type object entities and interfaces with a structure. For example, the CurrentAccountContractAccountHolderPartyChangedInformationMessage 101000 includes, among other things, a CurrentAccountContractAccountHolderPartyChangedInformationMessage 101002. Accordingly, heterogeneous applications may communicate using this consistent message configured as such.

FIGS. 102-1 through 102-2 illustrate one example logical configuration of a CurrentAccountContractHolderPartyChangedBulkInformationMessage 102000 element structure. Specifically, these figures depict the arrangement and hierarchy of various components such as one or more levels of packages, entities, and datatypes, shown here as 102000 through 102078. As described above, packages may be used to represent hierarchy levels. Entities are discrete business elements that are used during a business transaction. Data types are used to type object entities and interfaces with a structure. For example, the CurrentAccountContractHolderPartyChangedBulkInformationMessage 102000 includes, among other things, a CurrentAccountContractHolderPartyChangedBulkInformationMessage 102002. Accordingly, heterogeneous applications may communicate using this consistent message configured as such.

FIGS. 103-1 through 103-3 illustrate one example logical configuration of a CurrentAccountContractItemLimitChangedInformationMessage 103000 element structure. Specifically, these figures depict the arrangement and hierarchy of various components such as one or more levels of packages, entities, and datatypes, shown here as 103000 through 103094. As described above, packages may be used to represent hierarchy levels. Entities are discrete business elements that are used during a business transaction. Data types are used to type object entities and interfaces with a structure. For example, the CurrentAccountContractItemLimitChangedInformationMessage 103000 includes, among other things, a CurrentAccountContractItemLimitChangedInformationMessage 103002. Accordingly, heterogeneous applications may communicate using this consistent message configured as such.

FIGS. 104-1 through 104-4 illustrate one example logical configuration of a CurrentAccountContractItemLimitChangedBulkInformationMessage 104000 element structure. Specifically, these figures depict the arrangement and hierarchy of various components such as one or more levels of packages, entities, and datatypes, shown here as 104000 through 104110. As described above, packages may be used to represent hierarchy levels. Entities are discrete business elements that are used during a business transaction. Data types are used to type object entities and interfaces with a structure. For example, the CurrentAccountContractItemLimitChangedBulkInformationMessage 104000 includes, among other things, a CurrentAccountContractItemLimitChangedBulkInformationMessage 104002. Accordingly, heterogeneous applications may communicate using this consistent message configured as such.

FIGS. 105-1 through 105-2 illustrate one example logical configuration of a CurrentAccountContractProductChangedInformationMessage 105000 element structure. Specifically, these figures depict the arrangement and hierarchy of various components such as one or more levels of packages, entities, and datatypes, shown here as 105000 through 105054. As described above, packages may be used to represent hierarchy levels. Entities are discrete business elements that are used during a business transaction. Data types are used to type object entities and interfaces with a structure. For example, the CurrentAccountContractProductChangedInformationMessage 105000 includes, among other things, a CurrentAccountContractProductChangedInformationMessage 105002. Accordingly, heterogeneous applications may communicate using this consistent message configured as such.

FIGS. 106-1 through 106-2 illustrate one example logical configuration of a CurrentAccountContractProductChangedBulkInformationMessage 106000 element structure. Specifically, these figures depict the arrangement and hierarchy of various components such as one or more levels of packages, entities, and datatypes, shown here as 106000 through 106072. As described above, packages may be used to represent hierarchy levels. Entities are discrete business elements that are used during a business transaction. Data types are used to type object entities and interfaces with a structure. For example, the CurrentAccountContractProductChangedBulkInformationMessage 106000 includes, among other things, a CurrentAccountContractProductChangedBulkInformationMessage 106002. Accordingly, heterogeneous applications may communicate using this consistent message configured as such.

FIGS. 107-1 through 107-2 illustrate one example logical configuration of a CurrentAccountContractCancelledInformationMessage 107000 element structure. Specifically, these figures depict the arrangement and hierarchy of various components such as one or more levels of packages, entities, and datatypes, shown here as 107000 through 107048. As described above, packages may be used to represent hierarchy levels. Entities are discrete business elements that are used during a business transaction. Data types are used to type object entities and interfaces with a structure. For example, the CurrentAccountContractCancelledInformationMessage 107000 includes, among other things, a CurrentAccountContractCancelledInformationMessage 107002. Accordingly, heterogeneous applications may communicate using this consistent message configured as such.

FIGS. 108-1 through 108-2 illustrate one example logical configuration of a CurrentAccountContractCancelledBulkInformationMessage 108000 element structure. Specifically, these figures depict the arrangement and hierarchy of various components such as one or more levels of packages, entities, and datatypes, shown here as 108000 through 108064. As described above, packages may be used to represent hierarchy levels. Entities are discrete business elements that are used during a business transaction. Data types are used to type object entities and interfaces with a structure. For example, the CurrentAccountContractCancelledBulkInformationMessage 108000 includes, among other things, a CurrentAccountContractCancelledBulkInformationMessage 108002. Accordingly, heterogeneous applications may communicate using this consistent message configured as such.

Message Data Type CurrentAccountContractCreateRequestMessage_sync

The message data type CurrentAccountContractCreateRequestMessage_sync groups together the business information that is relevant for sending a business document in a message and the CurrentAccountContract in the business document. It includes the following packages: MessageHeader and CurrentAccountContract. A MessageHeader package groups together the business information that is relevant for sending a business document in a message. It includes the MessageHeader entity. A MessageHeader groups together the business information from the perspective of the sending application to identify the business document in a message. It is of type GDT: BasicBusinessDocumentMessageHeader. The MessageHeader includes the ID and ReferenceID elements. The MessageID can be set by the sending application. With the ReferencedMessageID, reference can be made in the current BusinessDocument to a previous BusinessDocument.

The CurrentAccountContract package groups together the CurrentAccountContract and its packages. It includes the following packages: Party, ProductInformation, and BankAccount. It includes the CurrentAccountContract entity. A Current Account Contract is a contractual agreement between a Credit Institute and Customer, which is based on the customer's request for opening a bank account of the type Current Account. A current account offers banking facilities such as cheque book, cash card, guarantee card and automated payments (standing orders, direct debits, etc.). CurrentAccountContract can include the StartDate and UsageNote elements. StartDate may be of type GDT: Date, with a qualifier of "Start", and is the begin date of the CurrentAccountContract. UsageNote may be based on GDT: MEDIUM_Note. UsageNote is a comment on the usage of current account of the CurrentAccountContract.

A Party package groups together business parties (along with their relevant assignments) involved in the CurrentAccountContract. It includes the AccountHolderParty entity. An AccountHolderParty is a party which legally holds a BankAccount. In the context of this message type, the AccountHolderParty specifies the holder of a BankAccount that is associated to the CurrentAccountContract. AccountHolderParty may be based on GDT: BusinessTransactionDocumentParty.

The ProductInformation package groups together product related information in the CurrentAccountContract. It includes the Product entity. A Product describes upon which product the CurrentAccountContract is based. Product may be of type GDT: BusinessTransactionDocumentProduct. A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also be used as an alternative key in the identification of CurrentAccountContract. The BankAccount entity may be of GDT: BusinessTransactionDocumentBankAccount, and includes the identifying information of a bank account associated with the CurrentAccountContract. One of the following combinations can be used for external identification of a BankAccount (and also its associated CurrentAccountContract, therefore the elements are subject to the combination chosen): BankAccountStandardID, CountryCode, BankRoutingID (with associated BankRoutingTypeCode) and BankAccountInternalID, BankInternalID and BankAccountInternalID.

Message Data Type CurrentAccountContractCreateConfirmationMessage_sync

The message data type CurrentAccountContractCreateConfirmationMessage_sync groups together the business information that is relevant for sending a business document in a message, the CurrentAccountContract object in the business document, and the Log object for error messages. It includes the MessageHeader, CurrentAccountContract, and Log packages. The CurrentAccountContract package groups together the CurrentAccountContract and its BankAccount package. CurrentAccountContract includes the CurrentAccountContract entity. A CurrentAccountContract is a contractual agreement between a Credit Institute and Customer, which is based on the customer's request for opening a bank account of the type Current Account. CurrentAccountContract includes ID and StartDate elements. ID may be based on GDT: BankAccountContractID.

ID is the unique identifier of the CurrentAccountContract. StartDate may be based on GDT: Date, with a qualifier of Start. StartDate is the start date of the CurrentAccountContract. A BankAccount package groups together bank account related information in the CurrentAccountContract. It includes the BankAccount entity. A BankAccount is an account that holds funds within a bank and is subject to additional deposits and withdrawals. A BankAccount can be identified by different combinations of its elements. The BankAccount entity is also used as an alternative key in the identification of CurrentAccountContract. BankAccount may be based on GDT: BusinessTransactionDocumentBankAccount. BankAccount includes the identifying information of a bank account associated with the CurrentAccountContract. One of the following combinations can be used for external identification of a BankAccount (and also its associated CurrentAccountContract; therefore the elements are subject to the combination chosen): BankAccountStandardID; CountryCode, BankRoutingID (with associated BankRoutingTypeCode) and BankAccountInternalID; or BankInternalID and BankAccountInternalID. A Log package includes the information used for passing the confirmation message in the CurrentAccountContract and it includes the Log entity.

Message Data Type CurrentAccountContractUsageNoteChangeRequestMessage_sync

The message data type CurrentAccountContractUsageNoteChangeRequestMessage_sync groups together the business information that is relevant for sending a business document in a message and the CurrentAccountContract object in the business document. It includes the MessageHeader and CurrentAccountContract packages. The CurrentAccountContract package groups together the CurrentAccountContract and its packages. It includes the BankAccount package and the CurrentAccountContract entity. A Current Account Contract is a contractual agreement between a Credit Institute and Customer, which is based on the customer's request for opening a bank account of the type Current Account. A current account offers banking facilities such as cheque book, cash card, guarantee card and automated payments (standing orders, direct debits, etc.).

CurrentAccountContract includes the following elements: ID, UsageNote, and ChangeValidityStartDate. ID may be based on GDT: BankAccountContractID. ID is the unique identifier of the CurrentAccountContract. UsageNote may be based on GDT: MEDIUM_Note. UsageNote is a changed comment on the usage of current account of the CurrentAccountContract. ChangeValidityStartDate may be based on GDT: Date and Qualifier:Start. ChangeValidityStartDate specifies the start date from which the UsageNote change is valid.

A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also be used as an alternative key in the identification of CurrentAccountContract. BankAccount may be based on GDT: BusinessTransactionDocumentBankAccount. BankAccount includes the identifying information of a bank account associated with the CurrentAccountContract. In some implementations, one of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; or BankInternalID and BankAccountInternalID.

Message Data Type CurrentAccountContractUsageNoteChangeConfirmationMessage_sync

The message data type CurrentAccountContractUsageNoteChangeConfirmationMessage_sync groups together the business information that is relevant for sending a business document in a message, the CurrentAccountContract object in the business document, and the Log object for error messages. It includes the following packages: MessageHeader, CurrentAccountContract, and Log.

The CurrentAccountContract package groups together the CurrentAccountContract and its packages. It includes the BankAccount package and the CurrentAccountContract entity. A Current Account Contract is a contractual agreement between a Credit Institute and Customer, which is based on the customer's request for opening a bank account of the type Current Account. A current account offers banking facilities such as cheque book, cash card, guarantee card and automated payments (standing orders, direct debits, etc.).

CurrentAccountContract includes the ID and StartDate elements. ID may be based on GDT: BankAccountContractID. ID is the unique identifier of the CurrentAccountContract. StartDate may be based on GDT: Date, with a qualifier of "Start". StartDate is the start date of the CurrentAccountContract.

A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also used as an alternative key in the identification of CurrentAccountContract. BankAccount may be based on GDT: BusinessTransactionDocumentBankAccount and may include the identifying information of a bank account associated with the CurrentAccountContract. In some implementations, one of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; or BankInternalID and BankAccountInternalID.

Message Data Type CurrentAccountContractItemLimitChangeRequestMessage_sync

The message data type CurrentAccountContractItemLimitChangeRequestMessage_sync groups together the business information that is relevant for sending a business document in a message and the CurrentAccountContract object in the business document. It includes the MessageHeader and CurrentAccountContract packages. The CurrentAccountContract package groups together the CurrentAccountContract and its packages. It includes the Item and BankAccount packages. It includes the CurrentAccountContract entity. A Current Account Contract is a contractual agreement between a Credit Institute and Customer, which is based on the customer's request for opening a bank account of the type Current Account. A current account offers banking facilities such as cheque book, cash card, guarantee card and automated payments (standing orders, direct debits, etc.).

CurrentAccountContract includes the following elements: ID, StartDate, and ChangeValidityStartDate. ID may be based on GDT: BankAccountContractID. ID is the unique identifier of the CurrentAccountContract. StartDate may be based on GDT: Date, with a qualifier of "Start". StartDate is the start date of the CurrentAccountContract. ChangeValidityStartDate may be based on GDT: Date, with a qualifier of "Start". ChangeValidityStartDate specifies the start date from which the limit change is valid. ChangeValidityStartDate includes the itemListCompleteTransmissionIndicator attribute, which may be based on GDT: Indicator, with a qualifier of "CompleteTransmission", which specifies whether the transmitted list of items is transmitted in its entirety or not.

A BankAccount package groups together bank account related information in the CurrentAccountContract. It includes the BankAccount entity. A BankAccount is an account that holds funds within a bank and is subject to additional deposits and withdrawals. A BankAccount can be identified by different combinations of its elements. The BankAccount entity can also be used as an alternative key in the identification of CurrentAccountContract. BankAccount may be based on GDT: BusinessTransactionDocumentBankAccount, and includes the identifying information of a bank account associated with the CurrentAccountContract. One of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; or BankInternalID and BankAccountInternalID.

An Item package groups CurrentAccountContractItem information together with its Limit Information package. The Limit Information package groups together limit related information of Bank Account of a CurrentAccountContract. It includes the Limit entity. Limit is a maximum preset amount for a BankAccount for a specific period of time. In some implementations, the BankAccountLimit is agreed under the terms of a BankAccountContract. It includes the following elements: ActionCode and BankAccountLimit. ActionCode may be based on GDT: ActionCode. The ActionCode is a coded representation of an instruction to the recipient of a message about how to process a transmitted Limit element. BankAccountLimit may be based on GDT: BankAccountLimit. Limit is a maximum preset amount for a BankAccount for a specific period of time. In the context of this message type, this specifies the new values for the limit of the CurrentAccountContract.

In some implementations, a maximum of one BankAccountLimit can be specified with a given BankAccountLimitTypeCode for a CurrentAccountContract. Therefore, the BankAccountLimitTypeCode can also serve as the key for addressing a limit item of a CurrentAccountContract (also for error/success entries in Log entity of confirmation message type). In some implementations, the semantics of ActionCode in combination with ChangeValidityStartDate are as follows: a 01 Create value indicates that a new Limit can be created and can be valid from ChangeValidityStartDate; a 02 Change value indicates that an Existing Limit continues to be valid up to ChangeValidityStartDate and that a New Limit can come into effect from ChangeValidityStartDate; a 03 Delete value indicates that Limit can be valid up to ChangeValidityStartDate, and that Limit might not exist from ChangeValidityStartDate.

Message Data Type CurrentAccountContractItemLimitChangeConfirmation Message_sync The message data type CurrentAccountContractItemLimitChangeConfirmationMessage_sync groups together the business information that is relevant for sending a business document in a message, the CurrentAccountContract object in the business document, and the Log object for error messages. It includes the following packages: MessageHeader, CurrentAccountContract, and Log. The CurrentAccountContract package groups together the CurrentAccountContract and its packages. It includes the BankAccount package and the CurrentAccountContract entity. A Current Account Contract is a contractual agreement between a Credit Institute and Customer, which is based on the customer's request for opening a bank account of the type Current Account. A current account offers banking facilities such as cheque book, cash card, guarantee card and automated payments (standing orders, direct debits, etc.).

CurrentAccountContract includes the following elements: ID and StartDate. ID may be based on GDT: BankAccountContractID. ID is a possibly unique identifier of the CurrentAccountContract. StartDate may be based on GDT: Date, with a qualifier of "Start". StartDate is the start date of the CurrentAccountContract.

A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also be used as an alternative key in the identification of CurrentAccountContract. BankAccount may be based on GDT: BusinessTransactionDocumentBankAccount, and includes the identifying information of a bank account associated with the CurrentAccountContract.

In some implementations, one of the following combinations can be used for external identification of a BankAccount (and also its associated CurrentAccountContract, therefore the elements are subject to the combination chosen): BankAccountStandardID (International Bank Account Number), CountryCode, BankRoutingID (with associated BankRoutingTypeCode) and BankAccountInternalID; or BankInternalID and BankAccountInternalID. A Log package includes the information used for passing the confirmation message in the CurrentAccountContract. It includes the Log entity.

Message Data Type CurrentAccountContractAuthorizedDrawerPartyAssignmentChangeRequest Message_sync The message data type CurrentAccountContractAuthorizedDrawerPartyAssignmentChangeRequestMessage_sync groups together the business information that is relevant for sending a business document in a message and the CurrentAccountContract object in the business document. It includes the following packages: MessageHeader and CurrentAccountContract. The CurrentAccountContract package groups together the CurrentAccountContract and its packages. It includes the following packages: Party and BankAccount. It includes the CurrentAccountContract entity. A Current Account Contract is a contractual agreement between a Credit Institute and Customer, which is based on the customer's request for opening a bank account of the type Current Account. A current account offers banking facilities such as cheque book, cash card, guarantee card and automated payments (standing orders, direct debits, etc.). CurrentAccountContract includes the following elements: ID, StartDate, and ChangeValidityStartDate. ID may be based on GDT:

BankAccountContractID. ID is the unique identifier of the CurrentAccountContract. StartDate may be based on GDT: Date, with a qualifier of "Start". StartDate is the start date of the CurrentAccountContract. ChangeValidityStartDate may be based on GDT: Date, with a qualifier of "Start".

ChangeValidityStartDate specifies the start date from which the limit change is valid. CurrentAccountContract includes the authorizedDrawerPartyListCompleteTransmissionIndicator attribute, which may be based on GDT: Indicator, with a qualifier of CompleteTransmission, which specifies whether the transmitted list of AuthorizedDrawerParty(s) is transmitted in its entirety or not. A Party package groups together business parties (along with their relevant assignments) involved in the CurrentAccountContract. It includes the AuthorizedDrawerParty entity.

An AuthorizedDrawerParty is a party which has authorization to withdraw money from a BankAccount. AuthorizedDrawerParty might not necessarily be the same as AccountHolderParty. In the context of this message type, the authorizedDrawerParty entity specifies the authorized drawer of a BankAccount that is associated with the CurrentAccountContract, and AuthorizedDrawerParty entity includes Authorized Drawer Party information that can be changed for a CurrentAccountContract. AuthorizedDrawerParty includes the ActionCode and InternalID elements. ActionCode, which may be based on GDT: ActionCode, is a coded representation of an instruction to the recipient of a message about how to process a transmitted AuthorizedParty element. InternalID, which may be based on GDT: PartyInternalID, is an Internal Identifier of the Authorized Drawer Party. The semantics of ActionCode in combination with the ChangeValidityStartDate are as follows: A value of "01 Create" indicates that a new assignment of AuthorizedDrawer can be created and can be valid from ChangeValidityStartDate; a value of "02 Change" indicates that an existing assignment of AuthorizedDrawer continues to be valid up to ChangeValidityStartDate and that a new assignment of AuthorizedDrawer can come into effect from ChangeValidityStartDate; and a value of "03 Delete" indicates that an assignment of AuthorizedDrawer can be valid up to ChangeValidityStartDate and that the assignment of AuthorizedDrawer might not exist from ChangeValidityStartDate.

A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also be used as an alternative key in the identification of CurrentAccountContract. BankAccount, which may be based on GDT: BusinessTransactionDocumentBankAccount, includes the identifying information of a bank account associated with the CurrentAccountContract. One of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; or BankInternalID and BankAccountInternalID.

Message Data Type CurrentAccountContractAuthorizedDrawerPartyAssignmentChangeConfirmationMessage_sync The message data type CurrentAccountContractAuthorizedDrawerPartyAssignmentConfirmationMessage_sync groups together the business information that is relevant for sending a business document in a message, the CurrentAccountContract object in the business document, and the Log object for error messages. It includes the following packages: MessageHeader, CurrentAccountContract, and Log.

The CurrentAccountContract package groups together the CurrentAccountContract and its BankAccount package. It includes the CurrentAccountContract entity. CurrentAccountContract can be a Bank Account Contract that is a contractual agreement between a Credit Institute and Customer, which is based on the customer's request for opening a bank account and includes among other information, the bank account type, account holder/authorized drawer(s), general terms and conditions. CurrentAccountContract includes the ID and StartDate elements. ID, which may be based on GDT: BankAccountContractID, is the unique identifier of the CurrentAccountContract. StartDate, which may be based on GDT: Date, with a qualifier of "Start", is the start date of the CurrentAccountContract. A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also be used as an alternative key in the identification of CurrentAccountContract. BankAccount, which may be based on GDT: BusinessTransactionDocumentBankAccount, includes the identifying information of a bank account associated with the CurrentAccountContract. One of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; or BankInternalID and BankAccountInternalID.

A Log package includes the information used for passing the confirmation message in the CurrentAccountContract. It includes the Log entity.

Message Data Type CurrentAccountContractItemLimitByElementsQueryMessage_sync

The message data type CurrentAccountContractItemLimitByElementsQueryMessage_sync groups together the business information that is relevant for sending a business document in a message and the CurrentAccountContractLimitSelectionByID object in the business document. It includes the following packages: MessageHeader and Selection. A selection package groups together the CurrentAccountContractLimitSelectionByID object and its entities. It includes the information used for selecting the data. The selection package includes the CurrentAccountContractLimitsSelectionByID entity.

CurrentAccountContractLimitSelectionByElements includes the information used to query the limit information of a Bank Account. It includes the following elements: CurrentAccountContractBankAccount, CurrentAccountContractStartDate, and ValidityDate. CurrentAccountContractBankAccount, which may be based on GDT: BusinessTransactionDocumentBankAccount, includes information about the Bank Account.

CurrentAccountContractStartDate, which may be based on GDT: Date, is the start date of the CurrentAccountContract. ValidityDate, which may be based on GDT: Date, is the date at which the limits of CurrentAccountContract are valid.

Message Data Type CurrentAccountContractItemLimitByElementsResponseMessage_sync

The message data type CurrentAccountContractItemLimitByElementsResponseMessage_sync groups together the business information that is relevant for sending a business document in a message and the CurrentAccountContract object in the business document. It includes the following packages: MessageHeader, CurrentAccountContract, and Log.

The CurrentAccountContract package groups together the CurrentAccountContract and its packages. It includes the Item and BankAccount packages. It includes the CurrentAccountContract entity. A Current Account Contract is a contractual agreement between a Credit Institute and Customer, which is based on the customer's request for opening a bank account of the type Current Account. A current account offers banking facilities such as cheque book, cash card, guarantee card and automated payments (standing orders, direct debits, etc.). CurrentAccountContract includes the ID and StartDate entities. ID, which may be based on GDT: BankAccountContractID, is the unique identifier of the CurrentAccountContract. StartDate, which may be based on GDT: Date and a qualifier of "Start", is the start date of the CurrentAccountContract.

A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also be used as an alternative key in the identification of CurrentAccountContract. BankAccount, which may be based on GDT: BusinessTransactionDocumentBankAccount, includes the identifying information of a bank account associated with the CurrentAccountContract. One of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; and BankInternalID and BankAccountInternalID.

An Item package groups CurrentAccountContractItem information together with its Limit Information package. The Limit Information package groups together limit related information of Bank Account in a CurrentAccountContract. It includes the Limit element. Limit is a maximum preset amount for a BankAccount for a specific period of time. Limit is of type GDT: BankAccountLimit.

It includes the following elements: TypeCode, TypeName, TypeDescription, Amount, ValidityStartDate, and ValidityEndDate. TypeCode, which may be based on GDT: BankAccountLimitTypeCode, is a coded representation of the type of the BankAccountLimit. TypeName, which may be based on GDT: MEDIUM_Name and a qualifier of BankAccountLimit, is the name of the type of BankAccountLimit. TypeDescription, which may be based on GDT: LONG_Descritpion and a qualifier of BankAccountLimit, is the description of the type of BankAccountLimit. Amount, which may be based on GDT: Amount and a qualifier of BankAccountLimit, specifies the limit amount assigned to a particular type of the BankAccountLimit. ValidityStartDate, which may be based on GDT: GLOBAL_DateTime, specifies the validity start date and time for the limit amount. ValidityEndDate, which may be based on GDT: GLOBAL_DateTime, specifies the validity end date and time for the limit amount.

Message Data Type CurrentAccountContractBasicDataByElementsQueryMessage_sync

The message data type CurrentAccountContractBasicDataByElementsQueryMessage_sync groups together the business information that is relevant for sending a business document in a message and the CurrentAccountContractBasicDataSelectionByID object in the business document. It includes the following packages: MessageHeader and Selection. A selection package groups together the CurrentAccountContractBasicDataSelectionByID object and its entities. It includes the information used for selecting the data.

The Selection package includes the following elements for selection: CurrentAccountContractBasicDataSelectionByID. CurrentAccountContractBasicDataSelectionByElements includes the information used to query the basic data. It includes the following entities: CurrentAccountContractBankAccount, CurrentAccountContractStartDate, and ValidityDate. CurrentAccountContractBankAccount may be based on GDT: BusinessTransactionDocumentBankAccount, and includes information about the Bank Account. CurrentAccountContractStartDate, which may be based on GDT: Date and a qualifier of Start, is the start date of the CurrentAccountContract. ValidityDate, which may be based on GDT: Date, is the date at which the basic data of CurrentAccountContract are valid.

Message Data Type CurrentAccountContractBasicDataByElementsResponseMessage_sync

The message data type CurrentAccountContractBasicDataByElementsResponseMessage_sync groups together the business information that is relevant for sending a business document in a message and the CurrentAccountContract object in the business document. It includes the following packages: MessageHeader, CurrentAccountContract, and Log. The CurrentAccountContract package groups together the CurrentAccountContract and its packages. It includes the following packages: Party, ProductInformation, and BankAccount. It includes the CurrentAccountContract entity. A CurrentAccountContract is a contractual agreement between a Credit Institute and Customer, which is based on the customer's request for opening a bank account of the type Current Account. CurrentAccountContract includes the following elements: ID, StartDate, and UsageNote. ID, which may be based on GDT: BankAccountContractID, is the unique identifier of the CurrentAccountContract. StartDate, which may be based on GDT: Date with a qualifier of Start, is the start date of the CurrentAccountContract. UsageNote, which may be based on GDT: MEDIUM_Note, is a comment on the usage of current account of the CurrentAccountContract.

A Party package groups together business parties (along with their relevant assignments) involved in the CurrentAccountContract. It includes the AccountHolderParty entity. An AccountHolderParty is a party which legally holds a Bank Account. In the context of this message type, the AccountHolderParty specifies the holder of a BankAccount that is associated with the CurrentAccountContract. AccountHolderParty is of the type BusinessTransactionDocumentParty. The Product package groups together product related information in the CurrentAccountContract. It includes the Product entity. A Product describes upon which (financial) product the CurrentAccountContract is based. Product is of type GDT: BusinessTransactionDocumentProduct. A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also be used as an alternative key in the identification of CurrentAccountContract. BankAccount, which may be based on GDT: BusinessTransactionDocumentBankAccount, includes the identifying information of a bank account associated with the CurrentAccountContract. In some implementations, one of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; or BankInternalID and BankAccountInternalID.

Message Data Type CurrentAccountContractAuthorizedDrawerPartyAssignmentByElementsQueryMessage_sync The message data type CurrentAccountContractAuthorizedDrawerPartyAssignmentByElementsQueryMessage_sync groups together the business information that is relevant for sending a business document in a message and the CurrentAccountContractAuthorizedDrawerPartyAssignmentSelectionByID object in the business document. It includes the following packages: MessageHeader and Selection.

The Selection package includes the entity CurrentAccountContractAuthorizedDrawerPartyAssignmentSelectionByElements. CurrentAccountContractAuthorizedDrawerPartyAssignmentSelectionByID entity includes the following elements for selection: CurrentAccountContractBankAccount, CurrentAccountContractStartDate, and ValidityDate. CurrentAccountContractBankAccount, which may be based on GDT: BusinessTransactionDocumentBankAccount, includes information about the Bank Account. CurrentAccountContractStartDate, which may be based on GDT: Date and a qualifier of Start, is the start date of the CurrentAccountContract. ValidityDate, which may be based on GDT: Date, is the date at which the assignment(s) of AuthorizedDrawer(s) of CurrentAccountContract are valid.

Message Data Type CurrentAccountContractAuthorizedDrawerPartyAssignmentByElementsResponseMessage_sync The message data type CurrentAccountContractAuthorizedDrawerPartyAssignmentByElementsResponseMessage_sync groups together the business information that is relevant for sending a business document in a message and the CurrentAccountContract object in the business document. It includes the following packages: MessageHeader, CurrentAccountContract, and Log. The CurrentAccountContract package groups together the CurrentAccountContract and its packages. It includes the following packages: Party and BankAccount. It includes the CurrentAccountContract entity. A CurrentAccountContract is a contractual agreement between a Credit Institute and Customer, which is based on the customer's request for opening a bank account of the type Current Account. CurrentAccountContract includes the ID and StartDate elements. ID, which may be based on GDT: BankAccountContractID, is the unique identifier of the CurrentAccountContract. StartDate, which may be based on GDT: Date and a qualifier of Start, is the start date of the CurrentAccountContract.

A Party package groups together business parties (along with their relevant assignments) involved in the CurrentAccountContract. It includes the AuthorizedDrawerParty entity. An AuthorizedDrawerParty is a party which has authorization to withdraw money for the Bank Account. AuthorizedDrawerParty is not necessarily the AccountHolderParty. It includes the following elements: AuthorizedDrawerParty, ValidityStartDate, and ValidityEndDate. AuthorizedDrawerParty, which may be based on GDT: BusinessTransactionDocumentParty, is a party which has authorization to withdraw money from the BankAccount. ValidityStartDate, which may be based on GDT: Date and a qualifier of ValidityStart, specifies the validity start date for the AuthorizedDrawerParty. ValidityEndDate, which may be based on GDT: Date and a qualifier of ValidityEnd, specifies the validity end date for the AuthorizedDrawerParty.

A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity can also be used as an alternative key in the identification of CurrentAccountContract. BankAccount, which may be based on GDT: BusinessTransactionDocumentBankAccount, includes the identifying information of a bank account associated with the CurrentAccountContract. In some implementations, one of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; or BankInternalID and BankAccountInternalID.

Message Data Type CurrentAccountContractBasicDataByBasicDataQueryMessage_sync

The message data type CurrentAccountContractBasicDataByBasicDataQueryMessage_sync groups together the business information that is relevant for sending a business document in a message, and the CurrentAccountContractBasicDataSelectionByBasicData object in the business document. It includes the following packages: MessageHeader and Selection. A selection package groups together the CurrentAccountContractBasicDataSelectionByBasicData object and its entities. It includes the information used for selecting Bank Accounts.

The Selection package includes the following elements for selection: CurrentAccountContractBankAccount, CurrentAccountContractStartDate, CurrentAccountContract, ValidityDate, CurrentAccountContractAccountHolderPartyInternalID, CurrentAccountContractProductInternalID, CurrentAccountContractUsageNote, and CurrentAccountContractMaximumNumberValue. CurrentAccountContractBankAccount, which may be based on GDT:BusinessTransactionDocumentBankAccount, specifies identifying information of the BankAccount associated with the CurrentAccountContract. CurrentAccountContractStartDate, which may be based on GDT: Date and a qualifier of Start, is the specification of an exact day in the Gregorian calendar, the date where the CurrentAccountContract started. ValidityDate, which may be based on GDT: Date, is the date at which the CurrentAccountContract is valid. CurrentAccountContractAccountHolderPartyInternalID, which may be based on GDT: PartyInternalID, is a proprietary identifier for a party as account holder of the CurrentAccountContract. A party is a natural person, organization, or group in which a company has a business or intra-enterprise interest. This can be a person, organization, or group within or outside of the company. CurrentAccountContractProductInternalID, which may be based on GDT: ProductInternalID, is a proprietary identifier for a product. A product is either a tangible or intangible good, and is a part of the business activities of a company. It can be traded and contributes directly or indirectly to value added.

CurrentAccountContractUsageNote, which may be based on GDT: MEDIUM_Note, is a comment on the usage of current account of the CurrentAccountContract. CurrentAccountContractMaximumNumberValue, which may be based on GDT: NumberValue and a qualifier of Maximum, is a maximum number of elements that should be selected.

Message Data Type CurrentAccountContractBasicDataByBasicDataResponseMessage_sync The message data type CurrentAccountContractBasicDataByBasicDataResponseMessage_sync groups together the business information that is relevant for sending a business document in a message and a List of CurrentAccountContract objects in the business document. It includes the following packages: MessageHeader and CurrentAccountContract.

The CurrentAccountContract package groups together the CurrentAccountContract and its packages. It includes the following packages: BankAccount, Party, and Product. A Current Account Contract is a contractual agreement between a Credit Institute and Customer, which is based on the customer's request for opening a bank account of the type Current Account. CurrentAccountContract includes the following elements: ID, StartDate, UsageNote, MaximumNumberValue, and TotalNumberValue. ID, which may be based on GDT: BankAccountContractID, is an identifier of the CurrentAccountContract. StartDate, which may be based on GDT: Date and a qualifier of Start, specifies the StartDate of the CurrentAccountContract. UsageNote, which may be based on GDT: MEDIUM_Note, is a comment on the usage of current account of the CurrentAccountContract. MaximumNumberValue, which may be based on GDT: NumberValue and a qualifier of Maximum, is a number of hits limited by the requester. TotalNumberValue, which may be based on GDT: NumberValue and a qualifier of Total, is the number of returned values in the hit list.

The Party package groups together business parties (along with their relevant assignments) involved in the CurrentAccountContract. It includes the AccountHolderParty entity.

An AccountHolderParty is a party which legally holds a Bank Account. This information is used to identify the party and the party's address. AccountHolderParty may be based on GDT: BusinessTransactionDocumentParty. The Product package groups together product related information in the CurrentAccountContract. It includes the Product entity. A Product describes upon which (financial) product the CurrentAccountContract is based. Product may be based on GDT: BusinessTransactionDocumentProduct.

A BankAccount package groups together bank account related information in the CurrentAccountContract. It includes the BankAccount entity. A Bank Account is an account that holds funds within a bank and is subject to additional deposits and withdrawals. A BankAccount can be identified by different combinations of its elements. The BankAccount entity is also used as an alternative key in the identification of CurrentAccountContract. The BankAccount may be based on GDT: BusinessTransactionDocumentBankAccount, and includes the identifying information of a bank account associated with the CurrentAccountContract. In some implementations, one of the following combinations can be used for external identification of a BankAccount (and also its associated CurrentAccountContract, therefore the elements are subject to the combination chosen): BankAccountStandardID (International Bank Account Number); CountryCode, BankRoutingID (with associated BankRoutingTypeCode) and BankAccountInternalID; or BankInternalID and BankAccountInternalID.

CollateralAgreement and CollateralConstellation Interfaces

The Integration Scenario Loan Contract Origination describes the collateralization of loan contracts. The loan contract can be collateralized by several collaterals and a collateral can secure several loan contracts. This can lead to simple and complex collateral constellations. The CollateralAgreement, CollateralConstellation interface performs various operations, namely a RequestCollateralConstellation, a ConfirmCollateralConstellation and a QueryCollateralAgreementByParty.

The Request Collateral Constellation is a request to Collateral Agreement Processing for collateral constellation. The Request Collateral Constellation operation can be used to request the maintenance of a collateral constellation in Collateral Agreement Processing. The RequestCollateralConstellation operation includes a CollateralConstellationRequest message type. The structure of the CollateralConstellationRequest message type is specified by a CollateralConstellationRequestMessage message data type.

The Confirm Collateral Constellation is a confirmation to the CollateralConstellationRequest. The Confirm Collateral Constellation service confirms the maintenance of a Collateral Constellation. The ConfirmCollateralConstellation operation includes a CollateralConstellationConfirmation message type. The structure of the CollateralConstellationConfirmation message type is specified by a CollateralConstellationConfirmationMessage message data type.

The Query Collateral Agreement by Party is an enquiry to Collateral Agreement Processing for all collateral agreements based on party information. The Query Collateral Agreement by Party service is used to calculate a collateral constellation. The QueryCollateralAgreementByParty operation includes various message types, namely a CollateralAgreementByPartyQuery and a CollateralAgreementByPartyResponse. The structure of the CollateralAgreementByPartyQuery message type is specified by a CollateralAgreementByPartyQuery_Message message data type. The structure of the CollateralAgreementByPartyResponse message type is specified by a CollateralAgreementByPartyResponseMessage message data type.

FIGS. 109-1 through 109-27 show a CollateralConstellationRequestMessage 109000 package. The CollateralConstellationRequestMessage 109000 package is a CollateralConstellationRequestMessage 109004 data type. The CollateralConstellationRequestMessage 109000 package includes a CollateralConstellationRequestMessage 109002 entity. The CollateralConstellationRequestMessage 109000 package includes various packages, namely a MessageHeader 109006 package and a CollateralConstellation 109022 package.

The MessageHeader 109006 package is a BusinessDocumentMessageHeader 109012 data type. The MessageHeader 109006 package includes a MessageHeader 109008 entity.

The MessageHeader 109008 entity has a cardinality of 1 109010 meaning that for each instance of the MessageHeader 109006 package there is one MessageHeader 109008 entity. The MessageHeader 109008 entity includes various attributes, namely an ID 109014 attribute and a CreationDateTime 109018 attribute. The ID 109014 attribute is a BusinessDocumentMessageID 109016 data type. The CreationDateTime 109018 attribute is a DateTime 109020 data type.

The CollateralConstellation 109022 package is a ndt_CollateralConstellationRequestMessageCollateralConstellation 109028 data type. The CollateralConstellation 109022 package includes a CollateralConstellation 109024 entity. The CollateralConstellation 109022 package includes various packages, namely a CollateralAgreement 109046 package, a <Package2> 109142 package, a RealEstate 109210 package, a Receivable 109540 package, a Charge 109554 package and a Scope 109622 package.

The CollateralConstellation 109024 entity has a cardinality of 1 109026 meaning that for each instance of the CollateralConstellation 109022 package there is one CollateralConstellation 109024 entity. The Collateral Constellation is a linkage of collateral objects, collateral agreements, receivables, charges and scope. The CollateralConstellation 109024 entity includes an <Element1> 109030 attribute. The CollateralConstellation 109024 entity includes an <Element2> 109034 subordinate entity.

The <Element1> 109030 attribute is a <GDTforElement1> 109032 data type. The <Element2> 109034 entity includes various attributes, namely a <Element2.1> 109038 attribute and a <Element2.2> 109042 attribute. The <Element2.1> 109038 attribute is a <GDTforElement2.1> 109040 data type. The <Element2.2> 109042 attribute is a <GDTforElement2.2> 109044 data type.

The CollateralAgreement 109046 package is a ndt_CollateralConstellationRequestMessageCollateralConstellationRequestCollateralAgreement 109052 data type. The CollateralAgreement 109046 package includes a CollateralAgreement 109048 entity. The CollateralAgreement 109046 package includes various packages, namely a FreeAmount 109108 package and a LandCharge 109134 package.

The CollateralAgreement 109048 entity has a cardinality of 0..n 109050 meaning that for each instance of the CollateralAgreement 109046 package there may be one or more CollateralAgreement 109048 entities. The Collateral Agreement is an agreement between a collateral giver and a lender, wherein the collateral giver issues a guarantee or assigns, transfers or pledges a collateral object in security interests for collateralizing a receivable. The CollateralAgreement 109048 entity includes various attributes, namely an ID 109054 attribute, an InternalID 109060 attribute, a TypeCode 109066 attribute, a ValidityStartDate 109072 attribute, a ValidityEndDate 109078 attribute, an AssessmentValueAmount 109084 attribute, an AssessmentDate 109090 attribute, a Description 109096 attribute and a WidePurposeOfDeclarationIndicator 109102 attribute.

The ID 109054 attribute is an IdentityID 109058 data type. The ID 109054 attribute has a cardinality of 0..1 1109056 meaning that for each instance of the CollateralAgreement 109048 entity there may be one ID 109054 attribute. The InternalID 109060 attribute is a BusinessTransactionDocumentID 109064 data type. The InternalID 109060 attribute has a cardinality of 0..1 109062 meaning that for each instance of the CollateralAgreement 109048 entity there may be one InternalID 109060 attribute.

The TypeCode 109066 attribute is a pdt_CollateralAgreementTypeCode 109070 data type. The TypeCode 109066 attribute has a cardinality of 0..1 109068 meaning that for each instance of the CollateralAgreement 109048 entity there may be one TypeCode 109066 attribute. The ValidityStartDate 109072 attribute is a Date 109076 data type. The ValidityStartDate 109072 attribute has a cardinality of 0..1 109074 meaning that for each instance of the CollateralAgreement 109048 entity there may be one ValidityStartDate 109072 attribute.

The ValidityEndDate 109078 attribute is a Date 109082 data type. The ValidityEndDate 109078 attribute has a cardinality of 0..1 109080 meaning that for each instance of the CollateralAgreement 109048 entity there may be one ValidityEndDate 109078 attribute. The AssessmentValueAmount 109084 attribute is an Amount 109088 data type. The AssessmentValueAmount 109084 attribute has a cardinality of 0..1 109086 meaning that for each instance of the CollateralAgreement 109048 entity there may be one AssessmentValueAmount 109084 attribute.

The AssessmentDate 109090 attribute is a Date 109094 data type. The AssessmentDate 109090 attribute has a cardinality of 0..1 109092 meaning that for each instance of the CollateralAgreement 109048 entity there may be one AssessmentDate 109090 attribute. The Description 109096 attribute is a SHORT_DESCRIPTION 109100 data type. The Description 109096 attribute has a cardinality of 0..1 109098 meaning that for each instance of the CollateralAgreement 109048 entity there may be one Description 109096 attribute. The WidePurposeOfDeclarationIndicator 109102 attribute is an Indicator 109106 data type. The WidePurposeOfDeclarationIndicator 109102 attribute has a cardinality of 0..1 109104 meaning that for each instance of the CollateralAgreement 109048 entity there may be one WidePurposeOfDeclarationIndicator 109102 attribute.

The FreeAmount 109108 package is a ndt_CollateralConstellationRequestMessageCollateralConstellationRequestCollateralAgreement FreeAmount 109114 data type. The FreeAmount 109108 package includes a FreeAmount 109110 entity.

The FreeAmount 109110 entity has a cardinality of 0..n 109112 meaning that for each instance of the FreeAmount 109108 package there may be one or more FreeAmount 109110 entities. The FreeAmount shows the user the amount of the object value which is not yet charged. This means, the amount of the object value can still be used to collateralize receivables. The FreeAmount 109110 entity includes various attributes, namely a PortionID 109116 attribute, a RiskMethodCode 109122 attribute and an Amount 109128 attribute.

The PortionID 109116 attribute is a CapacitySplitID 109120 data type. The PortionID 109116 attribute has a cardinality of 0..1 109118 meaning that for each instance of the FreeAmount 109110 entity there may be one PortionID 109116 attribute. The RiskMethodCode 109122 attribute is a RiskLevelCode 109126 data type. The RiskMethodCode 109122 attribute has a cardinality of 0..1 109124 meaning that for each instance of the FreeAmount 109110 entity there may be one RiskMethodCode 109122 attribute. The Amount 109128 attribute is an Amount 109132 data type. The Amount 109128 attribute has a cardinality of 0..1 109130 meaning that for each instance of the FreeAmount 109110 entity there may be one Amount 109128 attribute.

The LandCharge 109134 package is a ndt_CollateralConstellationRequestMessageCollateralConstellationRequestCollateralAgreement LandCharge 109140 data type. The LandCharge 109134 package includes a LandCharge 109136 entity. The LandCharge 109136 entity has a cardinality of 0..1 109138 meaning that for each instance of the LandCharge 109134 package there may be one LandCharge 109136 entity. The LandCharge is the legal right on a real estate, which can be used to secure the payment of a sum of money, for example, the repayment of a mortgage loan. It gives the lender (collateral taker) the right to payment from the income or proceeds of sale of the real estate, in priority to other claims against the borrower. Land charges are abstract collateral agreements, meaning they can exist without an obligation.

The <Package2> 109142 package includes a <Entity3> 109144 entity. Land charges are abstract collateral agreements, meaning they can exist without an obligation. The <Entity3> 109144 entity includes a <Element2> 109148 subordinate entity. The <Element2> 109148 entity includes various attributes, namely a CollectivityIndicator 109150 attribute, a CertificateExistIndicator 109156 attribute, a CertificateID 109162 attribute, a RegisterRecordSerialID 109168 attribute, an InterestRatePercent 109174 attribute, an InterestIncedentalPaymentPercent 109180 attribute, an InterestPaymentFrequencyNumberValue 109186 attribute, an InterestPaymentFrequencyCode 109192 attribute, an InterestCalculationStartDate 109198 attribute and an InterestCapitalisationYearsNumberValue 109204 attribute.

The CollectivityIndicator 109150 attribute is an Indicator 109154 data type. The CollectivityIndicator 109150 attribute has a cardinality of 0..1 109152 meaning that for each instance of the <Element2> 109148 entity there may be one CollectivityIndicator 109150 attribute. The CertificateExistIndicator 109156 attribute is an Indicator 109160 data type. The CertificateExistIndicator 109156 attribute has a cardinality of 0..1 109158 meaning that for each instance of the <Element2> 109148 entity there may be one CertificateExistIndicator 109156 attribute.

The CertificateID 109162 attribute is a BusinessTransactionDocumentID 109166 data type. The CertificateID 109162 attribute has a cardinality of 0..1 109164 meaning that for each instance of the <Element2> 109148 entity there may be one CertificateID 109162 attribute. The RegisterRecordSerialID 109168 attribute is a SerialID 109172 data type. The RegisterRecordSerialID 109168 attribute has a cardinality of 0..1 109170 meaning that for each instance of the <Element2> 109148 entity there may be one RegisterRecordSerialID 109168 attribute.

The InterestRatePercent 109174 attribute is a Percentage 109178 data type. The InterestRatePercent 109174 attribute has a cardinality of 0..1 109176 meaning that for each instance of the <Element2> 109148 entity there may be one InterestRatePercent 109174 attribute. The InterestIncedentalPaymentPercent 109180 attribute is a Percentage 109184 data type. The InterestIncedentalPaymentPercent 109180 attribute has a cardinality of 0..1 109182 meaning that for each instance of the <Element2> 109148 entity there may be one InterestIncedentalPaymentPercent 109180 attribute.

The InterestPaymentFrequencyNumberValue 109186 attribute is a NumberValue 109190 data type. The InterestPaymentFrequencyNumberValue 109186 attribute has a cardinality of 0..1 109188 meaning that for each instance of the <Element2> 109148 entity there may be one InterestPaymentFrequencyNumberValue 109186 attribute. The InterestPaymentFrequencyCode 109192 attribute is an InterestPaymentFrequencyCode 109196 data type. The InterestPaymentFrequencyCode 109192 attribute has a cardinality of 0..1 109194 meaning that for each instance of the <Element2> 109148 entity there may be one InterestPaymentFrequencyCode 109192 attribute.

The InterestCalculationStartDate 109198 attribute is a Date 109202 data type. The InterestCalculationStartDate 109198 attribute has a cardinality of 0..1 109200 meaning that for each instance of the <Element2> 109148 entity there may be one InterestCalculationStartDate 109198 attribute. The InterestCapitalisationYearsNumberValue 109204 attribute is a NumberValue 109208 data type. The InterestCapitalisationYearsNumberValue 109204 attribute has a cardinality of 0..1 109206 meaning that for each instance of the <Element2> 109148 entity there may be one InterestCapitalisationYearsNumberValue 109204 attribute.

The RealEstate 109210 package is a ndt_CollateralConstellationRequestMessageCollateralConstellationRealEstateObject 109216 data type. The RealEstate 109210 package includes a RealEstateObject 109212 entity. The RealEstate 109210 package includes various packages, namely an Address 109314 package, a Location 109328 package, a Land 109396 package, a Building 109452 package and an OwnerParty 109496 package.

The RealEstateObject 109212 entity has a cardinality of 0..n 109214 meaning that for each instance of the RealEstate 109210 package there may be one or more RealEstateObject 109212 entities. The RealEstateObject can include any piece of land, along with the buildings built on the piece of land and all other accessories, fixtures in the building that add to the monetary value of the building. The RealEstateObject 109212 entity includes various attributes, namely an ID 109218 attribute, an InternalID 109224 attribute, a CategoryCode 109230 attribute, a TypeCode 109236 attribute, an UtilizationCode 109242 attribute, a Description 109248 attribute, a MarketValueAmount 109254 attribute, a NominalValueAmount 109260 attribute, an UnusedValueAmount 109266 attribute, a LendingRatePercent 109272 attribute, a LendingAmount 109278 attribute, a LendingLimitAmount 109284 attribute, a LendingRangeAmount 109290 attribute, a SafetyDiscountCode 109296 attribute, a SafetyDiscountPercent 109302 attribute and a SafetyDiscountAmount 109308 attribute.

The ID 109218 attribute is a BusinessTransactionDocumentID 109222 data type. The ID 109218 attribute has a cardinality of 0..1 109220 meaning that for each instance of the RealEstateObject 109212 entity there may be one ID 109218 attribute. The InternalID 109224 attribute is a BusinessTransactionDocumentID 109228 data type. The InternalID 109224 attribute has a cardinality of 0..1 109226 meaning that for each instance of the RealEstateObject 109212 entity there may be one InternalID 109224 attribute.

The CategoryCode 109230 attribute is a pdt_RealEstateObjectCategoryCode 109234 data type. The CategoryCode 109230 attribute has a cardinality of 0..1 109232 meaning that for each instance of the RealEstateObject 109212 entity there may be one CategoryCode 109230 attribute. The TypeCode 109236 attribute is a pdt_RealEstateObjectTypeCode 109240 data type. The TypeCode 109236 attribute has a cardinality of 0..1 109238 meaning that for each instance of the RealEstateObject 109212 entity there may be one TypeCode 109236 attribute.

The UtilizationCode 109242 attribute is a pdt_RealEstateObjectUtilizationCode 109246 data type. The UtilizationCode 109242 attribute has a cardinality of 0..1 109244 meaning that for each instance of the RealEstateObject 109212 entity there may be one UtilizationCode 109242 attribute. The Description 109248 attribute is a SHORT_DESCRIPTION 109252 data type. The Description 109248 attribute has a cardinality of 0..1 109250 meaning that for each instance of the RealEstateObject 109212 entity there may be one Description 109248 attribute.

The MarketValueAmount 109254 attribute is an Amount 109258 data type. The MarketValueAmount 109254 attribute has a cardinality of 0..1 109256 meaning that for each instance of the RealEstateObject 109212 entity there may be one MarketValueAmount 109254 attribute. The NominalValueAmount 109260 attribute is an Amount 109264 data type. The NominalValueAmount 109260 attribute has a cardinality of 0..1 109262 meaning that for each instance of the RealEstateObject 109212 entity there may be one NominalValueAmount 109260 attribute.

The UnusedValueAmount 109266 attribute is an Amount 109270 data type. The UnusedValueAmount 109266 attribute has a cardinality of 0..1 109268 meaning that for each instance of the RealEstateObject 109212 entity there may be one UnusedValueAmount 109266 attribute. The LendingRatePercent 109272 attribute is a Percent 109276 data type. The LendingRatePercent 109272 attribute has a cardinality of 0..1 109274 meaning that for each instance of the RealEstateObject 109212 entity there may be one LendingRatePercent 109272 attribute.

The LendingAmount 109278 attribute is an Amount 109282 data type. The LendingAmount 109278 attribute has a cardinality of 0..1 109280 meaning that for each instance of the RealEstateObject 109212 entity there may be one LendingAmount 109278 attribute. The LendingLimitAmount 109284 attribute is an Amount 109288 data type. The LendingLimitAmount 109284 attribute has a cardinality of 0..1 109286 meaning that for each instance of the RealEstateObject 109212 entity there may be one LendingLimitAmount 109284 attribute.

The LendingRangeAmount 109290 attribute is an Amount 109294 data type. The LendingRangeAmount 109290 attribute has a cardinality of 0..1 109292 meaning that for each instance of the RealEstateObject 109212 entity there may be one LendingRangeAmount 109290 attribute. The SafetyDiscountCode 109296 attribute is a pdt_RealEstateObjectSafetyDiscountCode 109300 data type. The SafetyDiscountCode 109296 attribute has a cardinality of 0..1 109298 meaning that for each instance of the RealEstateObject 109212 entity there may be one SafetyDiscountCode 109296 attribute.

The SafetyDiscountPercent 109302 attribute is a Percent 109306 data type. The SafetyDiscountPercent 109302 attribute has a cardinality of 0..1 109304 meaning that for each instance of the RealEstateObject 109212 entity there may be one SafetyDiscountPercent 109302 attribute. The SafetyDiscountAmount 109308 attribute is an Amount 109312 data type. The SafetyDiscountAmount 109308 attribute has a cardinality of 0..1 109310 meaning that for each instance of the RealEstateObject 109212 entity there may be one SafetyDiscountAmount 109308 attribute.

The Address 109314 package is a ndt_CollateralConstellationRequestMessageCollateralConstellationRealEstateObjectAddress 109320 data type. The Address 109314 package includes an Address 109316 entity. The Address 109316 entity has a cardinality of 0..1 109318 meaning that for each instance of the Address 109314 package there may be one Address 109316 entity. The Address contains structured information about all types of addresses. This Address information includes details about the addressee, the postal address, and the physical location and communication connections. The Address 109316 entity includes an Address 109322 attribute. The Address 109322 attribute is a PhysicalAddress 109326 data type. The Address 109322 attribute has a cardinality of 0..1 109324 meaning that for each instance of the Address 109316 entity there may be one Address 109322 attribute.

The Location 109328 package is a ndt_CollateralConstellationRequestMessageCollateralConstellationRealEstateObjectLocation 109334 data type. The Location 109328 package includes a Location 109330 entity. The Location 109330 entity has a cardinality of 0..1 109332 meaning that for each instance of the Location 109328 package there may be one Location 109330 entity. The Location 109330 entity includes various attributes, namely a MacroLocationCode 109336 attribute, a MicroLocationCode 109342 attribute, a TransportConnectionCode 109348 attribute, an EnvironmentalConditionCode 109354 attribute, a FloodZoneIndicator 109360 attribute, an EarthQuakeZoneIndicator 109366 attribute, an ArchitecturalConservationAreaIndicator 109372 attribute, a HistoricSiteIndicator 109378 attribute, a ValueImpairingFactorsIndicator 109384 attribute and a ValueImpairingFactorDescription 109390 attribute.

The MacroLocationCode 109336 attribute is a pdt_RealEstateObjectLocationCode 109340 data type. The MacroLocationCode 109336 attribute has a cardinality of 0..1 109338 meaning that for each instance of the Location 109330 entity there may be one MacroLocationCode 109336 attribute. The MicroLocationCode 109342 attribute is a pdt_RealEstateObjectLocationCode 109346 data type. The MicroLocationCode 109342 attribute has a cardinality of 0..1 109344 meaning that for each instance of the Location 109330 entity there may be one MicroLocationCode 109342 attribute.

The TransportConnectionCode 109348 attribute is a pdt_RealEstateObjectTransportConnectionCode 109352 data type. The TransportConnectionCode 109348 attribute has a cardinality of 0..1 109350 meaning that for each instance of the Location 109330 entity there may be one TransportConnectionCode 109348 attribute. The EnvironmentalConditionCode 109354 attribute is a pdt_RealEstateObjectEnvironmentalConditionCode 109358 data type. The EnvironmentalConditionCode 109354 attribute has a cardinality of 0..1 109356 meaning that for each instance of the Location 109330 entity there may be one EnvironmentalConditionCode 109354 attribute.

The FloodZoneIndicator 109360 attribute is an Indicator 109364 data type. The FloodZoneIndicator 109360 attribute has a cardinality of 0..1 109362 meaning that for each instance of the Location 109330 entity there may be one FloodZoneIndicator 109360 attribute. The EarthQuakeZoneIndicator 109366 attribute is an Indicator 109370 data type. The EarthQuakeZoneIndicator 109366 attribute has a cardinality of 0..1 109368 meaning that for each instance of the Location 109330 entity there may be one EarthQuakeZoneIndicator 109366 attribute.

The ArchitecturalConservationAreaIndicator 109372 attribute is an Indicator 109376 data type. The ArchitecturalConservationAreaIndicator 109372 attribute has a cardinality of 0..1 109374 meaning that for each instance of the Location 109330 entity there may be one ArchitecturalConservationAreaIndicator 109372 attribute. The HistoricSiteIndicator 109378 attribute is an Indicator 109382 data type. The HistoricSiteIndicator 109378 attribute has a cardinality of 0..1 109380 meaning that for each instance of the Location 109330 entity there may be one HistoricSiteIndicator 109378 attribute.

The ValueImpairingFactorsIndicator 109384 attribute is an Indicator 109388 data type. The ValueImpairingFactorsIndicator 109384 attribute has a cardinality of 0..1 109386 meaning that for each instance of the Location 109330 entity there may be one ValueImpairingFactorsIndicator 109384 attribute. The ValueImpairingFactorDescription 109390 attribute is a SHORT_DESCRIPTION 109394 data type. The ValueImpairingFactorDescription 109390 attribute has a cardinality of 0..1 109392 meaning that for each instance of the Location 109330 entity there may be one ValueImpairingFactorDescription 109390 attribute.

The Land 109396 package is a ndt_CollateralConstellationRequestMessageCollateralConstellationRealEstate ObjectLand 109402 data type. The Land 109396 package includes a Land 109398 entity. The Land 109398 entity has a cardinality of 0..1 109400 meaning that for each instance of the Land 109396 package there may be one Land 109398 entity. The Land 109398 entity includes various attributes, namely a LandAreaMeasure 109404 attribute, a RentedLandAreaMeasure 109410 attribute, a LandCostAmount 109416 attribute, a LandCostBaseCode 109422 attribute, a DevelopmentLandCostAmount 109428 attribute, a DevelopmentLandCostBaseCode 109434 attribute, an AdditionalLandCostAmount 109440 attribute and an AdditionalLandCostBaseCode 109446 attribute.

The LandAreaMeasure 109404 attribute is a Measure 109408 data type. The LandAreaMeasure 109404 attribute has a cardinality of 0..1 109406 meaning that for each instance of the Land 109398 entity there may be one LandAreaMeasure 109404 attribute. The RentedLandAreaMeasure 109410 attribute is a Measure 109414 data type. The RentedLandAreaMeasure 109410 attribute has a cardinality of 0..1 109412 meaning that for each instance of the Land 109398 entity there may be one RentedLandAreaMeasure 109410 attribute.

The LandCostAmount 109416 attribute is an Amount 109420 data type. The LandCostAmount 109416 attribute has a cardinality of 0..1 109418 meaning that for each instance of the Land 109398 entity there may be one LandCostAmount 109416 attribute. The LandCostBaseCode 109422 attribute is a pdt_RealEstateObjectLandCostBaseCode 109426 data type. The LandCostBaseCode 109422 attribute has a cardinality of 0..1 109424 meaning that for each instance of the Land 109398 entity there may be one LandCostBaseCode 109422 attribute.

The DevelopmentLandCostAmount 109428 attribute is an Amount 109432 data type. The DevelopmentLandCostAmount 109428 attribute has a cardinality of 0..1 109430 meaning that for each instance of the Land 109398 entity there may be one DevelopmentLandCostAmount 109428 attribute. The DevelopmentLandCostBaseCode 109434 attribute is a pdt_RealEstateObjectLandCostBaseCode 109438 data type. The DevelopmentLandCostBaseCode 109434 attribute has a cardinality of 0..1 109436 meaning that for each instance of the Land 109398 entity there may be one DevelopmentLandCostBaseCode 109434 attribute.

The AdditionalLandCostAmount 109440 attribute is an Amount 109444 data type. The AdditionalLandCostAmount 109440 attribute has a cardinality of 0..1 109442 meaning that for each instance of the Land 109398 entity there may be one AdditionalLandCostAmount 109440 attribute. The AdditionalLandCostBaseCode 109446 attribute is a pdt_RealEstateObjectLandCostBaseCode 109450 data type. The AdditionalLandCostBaseCode 109446 attribute has a cardinality of 0..1 109448 meaning that for each instance of the Land 109398 entity there may be one AdditionalLandCostBaseCode 109446 attribute.

The Building 109452 package is a ndt_CollateralConstellationRequestMessageCollateralConstellationRealEstateObjectBuilding 109458 data type. The Building 109452 package includes a Building 109454 entity. The Building 109454 entity has a cardinality of 0..1 109456 meaning that for each instance of the Building 109452 package there may be one Building 109454 entity. The Building 109454 entity includes various attributes, namely a UsableAreaMeasure 109460 attribute, a UsableVolumeMeasure 109466 attribute, a ResidentialAreaMeasure 109472 attribute, a SecondaryAreaMeasure 109478 attribute, an OtherAreaMeasure 109484 attribute and a NumberOfBuildingPartsNumberValue 109490 attribute.

The UsableAreaMeasure 109460 attribute is a Measure 109464 data type. The UsableAreaMeasure 109460 attribute has a cardinality of 0..1 109462 meaning that for each instance of the Building 109454 entity there may be one UsableAreaMeasure 109460 attribute. The UsableVolumeMeasure 109466 attribute is a Measure 109470 data type. The UsableVolumeMeasure 109466 attribute has a cardinality of 0..1 109468 meaning that for each instance of the Building 109454 entity there may be one UsableVolumeMeasure 109466 attribute.

The ResidentialAreaMeasure 109472 attribute is a Measure 109476 data type. The ResidentialAreaMeasure 109472 attribute has a cardinality of 0..1 109474 meaning that for each instance of the Building 109454 entity there may be one ResidentialAreaMeasure 109472 attribute. The SecondaryAreaMeasure 109478 attribute is a Measure 109482 data type. The SecondaryAreaMeasure 109478 attribute has a cardinality of 0..1 109480 meaning that for each instance of the Building 109454 entity there may be one SecondaryAreaMeasure 109478 attribute.

The OtherAreaMeasure 109484 attribute is a Measure 109488 data type. The OtherAreaMeasure 109484 attribute has a cardinality of 0..1 109486 meaning that for each instance of the Building 109454 entity there may be one OtherAreaMeasure 109484 attribute. The NumberOfBuildingPartsNumberValue 109490 attribute is a NumberValue 109494 data type. The NumberOfBuildingPartsNumberValue 109490 attribute has a cardinality of 0..1 109492 meaning that for each instance of the Building 109454 entity there may be one NumberOfBuildingPartsNumberValue 109490 attribute.

The OwnerParty 109496 package is a ndt_CollateralConstellationRequestMessageCollateralConstellationRealEstateObjectOwnerParty 109502 data type. The OwnerParty 109496 package includes an OwnerParty 109498 entity. The OwnerParty 109498 entity has a cardinality of 0..n 109500 meaning that for each instance of the OwnerParty 109496 package there may be one or more OwnerParty 109498 entities. The OwnerParty 109498 entity includes various attributes, namely an ID 109504 attribute, a FunctionCode 109510 attribute, an OwnershipNumeratorNumberValue 109516 attribute, an OwnershipDenominatorNumberValue 109522 attribute, an OwnershipStartDate 109528 attribute and an OwnershipEndDate 109534 attribute.

The ID 109504 attribute is a BusinessTransactionDocumentID 109508 data type. The ID 109504 attribute has a cardinality of 0..1 109506 meaning that for each instance of the OwnerParty 109498 entity there may be one ID 109504 attribute. The FunctionCode 109510 attribute is a pdt_RealEstateObjectOwnerFunctionCode 109514 data type. The FunctionCode 109510 attribute has a cardinality of 0..1 109512 meaning that for each instance of the OwnerParty 109498 entity there may be one FunctionCode 109510 attribute.

The OwnershipNumeratorNumberValue 109516 attribute is a NumberValue 109520 data type. The OwnershipNumeratorNumberValue 109516 attribute has a cardinality of 0..1 109518 meaning that for each instance of the OwnerParty 109498 entity there may be one OwnershipNumeratorNumberValue 109516 attribute. The OwnershipDenominatorNumberValue 109522 attribute is a NumberValue 109526 data type. The OwnershipDenominatorNumberValue 109522 attribute has a cardinality of 0..1 109524 meaning that for each instance of the OwnerParty 109498 entity there may be one OwnershipDenominatorNumberValue 109522 attribute.

The OwnershipStartDate 109528 attribute is a Date 109532 data type. The OwnershipStartDate 109528 attribute has a cardinality of 0..1 109530 meaning that for each instance of the OwnerParty 109498 entity there may be one OwnershipStartDate 109528 attribute. The OwnershipEndDate 109534 attribute is a Date 109538 data type. The OwnershipEndDate 109534 attribute has a cardinality of 0..1 109536 meaning that for each instance of the OwnerParty 109498 entity there may be one OwnershipEndDate 109534 attribute.

The Receivable 109540 package is a ndt_CollateralConstellationRequestMessageCollateralConstellationReceivable 109546 data type. The Receivable 109540 package includes a Receivable 109542 entity. The Receivable 109542 entity has a cardinality of 0..1 109544 meaning that for each instance of the Receivable 109540 package there may be one Receivable 109542 entity. The Receivable is a liability of credit commitment granted by any financial institution. The Receivable 109542 entity includes an ID 109548 attribute. The ID 109548 attribute is a BusinessTransactionDocumentId 109552 data type. The ID 109548 attribute has a cardinality of 0..1 109550 meaning that for each instance of the Receivable 109542 entity there may be one ID 109548 attribute.

The Charge 109554 package is a ndt_CollateralConstellationRequestMessageCollateralConstellationCharge 109560 data type. The Charge 109554 package includes a Charge 109556 entity. The Charge 109556 entity has a cardinality of 0..n 109558 meaning that for each instance of the Charge 109554 package there may be one or more Charge 109556 entities. The Charge is the part of a collateral agreement that defines the properties of the relationship to a collateral object. The Charge 109556 entity includes various attributes, namely an ID 109562 attribute, a RealEstateObjectReferenceID 109568 attribute, a CollateralAgreementReferenceID 109574 attribute, a Description 109580 attribute, a RankingOrderNumberValue 109586 attribute, a SequenceNumberValue 109592 attribute, a RegistrationNumber 109598 attribute, a RegistrationDate 109604 attribute, an AssetAmount 109610 attribute and an AssetPercent 109616 attribute.

The ID 109562 attribute is a BusinessTransactionDocumentID 109566 data type. The ID 109562 attribute has a cardinality of 0..1 109564 meaning that for each instance of the Charge 109556 entity there may be one ID 109562 attribute. The RealEstateObjectReferenceID 109568 attribute is a BusinessTransactionDocumentID 109572 data type. The RealEstateObjectReferenceID 109568 attribute has a cardinality of 0..1 109570 meaning that for each instance of the Charge 109556 entity there may be one RealEstateObjectReferenceID 109568 attribute.

The CollateralAgreementReferenceID 109574 attribute is a BusinessTransactionDocumentID 109578 data type. The CollateralAgreementReferenceID 109574 attribute has a cardinality of 0..1 109576 meaning that for each instance of the Charge 109556 entity there may be one CollateralAgreementReferenceID 109574 attribute. The Description 109580 attribute is a SHORT_DESCRIPTION 109584 data type. The Description 109580 attribute has a cardinality of 0..1 109582 meaning that for each instance of the Charge 109556 entity there may be one Description 109580 attribute.

The RankingOrderNumberValue 109586 attribute is a NumberValue 109590 data type. The RankingOrderNumberValue 109586 attribute has a cardinality of 0..1 109588 meaning that for each instance of the Charge 109556 entity there may be one RankingOrderNumberValue 109586 attribute. The SequenceNumberValue 109592 attribute is a NumberValue 109596 data type. The SequenceNumberValue 109592 attribute has a cardinality of 0..1 109594 meaning that for each instance of the Charge 109556 entity there may be one SequenceNumberValue 109592 attribute.

The RegistrationNumber 109598 attribute is a BusinessTransactionDocumentID 109602 data type. The RegistrationNumber 109598 attribute has a cardinality of 0..1 109600 meaning that for each instance of the Charge 109556 entity there may be one RegistrationNumber 109598 attribute. The RegistrationDate 109604 attribute is a Date 109608 data type. The RegistrationDate 109604 attribute has a cardinality of 0..1 109606 meaning that for each instance of the Charge 109556 entity there may be one RegistrationDate 109604 attribute.

The AssetAmount 109610 attribute is an Amount 109614 data type. The AssetAmount 109610 attribute has a cardinality of 0..1 109612 meaning that for each instance of the Charge 109556 entity there may be one AssetAmount 109610 attribute. The AssetPercent 109616 attribute is a Percent 109620 data type. The AssetPercent 109616 attribute has a cardinality of 0..1 109618 meaning that for each instance of the Charge 109556 entity there may be one AssetPercent 109616 attribute.

The Scope 109622 package is a ndt_CollateralConstellationRequestMessageCollateralConstellationScope 109628 data type. The Scope 109622 package includes a Scope 109624 entity. The Scope 109624 entity has a cardinality of 0..n 109626 meaning that for each instance of the Scope 109622 package there may be one or more Scope 109624 entities. The Scope is part of a collateral agreement that defines the properties of the relationship to a receivable. The Scope 109624 entity includes various attributes, namely an ID 109630 attribute, a CollateralAgreementReferenceID 109636 attribute, a ValidityFromDate 109642 attribute, a ValidityToDate 109648 attribute, a ReceivableCollateralizationPriorityNumberValue 109654 attribute, an AgreementRankingClassNumberValue 109660 attribute, a SecuredReceivableAmount 109666 attribute and a SecuredReceivablePercent 109672 attribute.

The ID 109630 attribute is a BusinessTransactionDocumentID 109634 data type. The ID 109630 attribute has a cardinality of 0..1 109632 meaning that for each instance of the Scope 109624 entity there may be one ID 109630 attribute. The CollateralAgreementReferenceID 109636 attribute is a BusinessTransactionDocumentID 109640 data type. The CollateralAgreementReferenceID 109636 attribute has a cardinality of 0..1 109638 meaning that for each instance of the Scope 109624 entity there may be one CollateralAgreementReferenceID 109636 attribute.

The ValidityFromDate 109642 attribute is a Date 109646 data type. The ValidityFromDate 109642 attribute has a cardinality of 0..1 109644 meaning that for each instance of the Scope 109624 entity there may be one ValidityFromDate 109642 attribute. The ValidityToDate 109648 attribute is a Date 109652 data type. The ValidityToDate 109648 attribute has a cardinality of 0..1 109650 meaning that for each instance of the Scope 109624 entity there may be one ValidityToDate 109648 attribute.

The ReceivableCollateralizationPriorityNumberValue 109654 attribute is a NumberValue 109658 data type. The ReceivableCollateralizationPriorityNumberValue 109654 attribute has a cardinality of 0..1 109656 meaning that for each instance of the Scope 109624 entity there may be one ReceivableCollateralizationPriorityNumberValue 109654 attribute.

The AgreementRankingClassNumberValue 109660 attribute is a NumberValue 109664 data type. The AgreementRankingClassNumberValue 109660 attribute has a cardinality of 0..1 109662 meaning that for each instance of the Scope 109624 entity there may be one AgreementRankingClassNumberValue 109660 attribute. The SecuredReceivableAmount 109666 attribute is an Amount 109670 data type. The SecuredReceivableAmount 109666 attribute has a cardinality of 0..1 109668 meaning that for each instance of the Scope 109624 entity there may be one SecuredReceivableAmount 109666 attribute.

The SecuredReceivablePercent 109672 attribute is a Percent 109676 data type. The SecuredReceivablePercent 109672 attribute has a cardinality of 0..1 109674 meaning that for each instance of the Scope 109624 entity there may be one SecuredReceivablePercent 109672 attribute.

FIGS. 110-1 through 110-8 show a CollateralConstellationConfirmation 110000 element structure and package. The CollateralConstellationConfirmation 110000 package is a CollateralConstellationRequestMessage 110004 data type. The CollateralConstellationConfirmation 110000 package includes a CollateralConstellationConfirmation 110002 entity. The CollateralConstellationConfirmation 110000 package includes various packages, namely a MessageHeader 110006 package and a CollateralConstellation 110020 package. The MessageHeader 110006 package includes a MessageHeader 110008 entity.

The MessageHeader 110008 entity includes various attributes, namely an ID 110010 attribute, and a CreationDateTime 110014 attribute. The ID 110010 attribute has a cardinality of 1 110012 meaning that for each instance of the MessageHeader 110008 entity there is one ID 110010 attribute. The CreationDateTime 110014 attribute has a cardinality of 1 110016 meaning that for each instance of the MessageHeader 110008 entity there is one CreationDateTime 110014 attribute.

The CollateralConstellation 110020 package is a ndt_CollateralConstellationConfirmationMessageCollateralConstellation 110026 data type. The CollateralConstellation 110020 package includes various entities, namely a CollateralConstellation 110022 entity and a log 110128 entity.

The CollateralConstellation 110022 entity has a cardinality of 1 110024 meaning that for each instance of the CollateralConstellation 110020 package there is one CollateralConstellation 110022 entity. The CollateralConstellation 110022 entity includes an ID 110036 attribute. The CollateralConstellation 110022 entity includes various subordinate entities, namely a <Element2> 110030 entity, a Receivable 110042 entity, a RealEstate 110058 entity, a CollateralAgreement 110074 entity, a Charge 110090 entity and a Scope 110106 entity.

The ID 110036 attribute is a ndt_CollateralConstellationConfirmationMessageCollateralConstellation 110040 data type. The ID 110036 attribute has a cardinality of 1 110038 meaning that for each instance of the CollateralConstellation 110022 entity there is one ID 110036 attribute.

The Receivable 110042 entity has a cardinality of 1 110044 meaning that for each instance of the CollateralConstellation 110022 entity there is one Receivable 110042 entity. A Receivable is a liability of credit commitment granted by any financial institution. The Receivable 110042 entity includes various attributes, namely an ID 110048 attribute and a ReferenceID 110052 attribute. The ID 110048 attribute has a cardinality of 1 110050 meaning that for each instance of the Receivable 110042 entity there is one ID 110048 attribute.

The ReferenceID 110052 attribute is a BusinessTransactionDocumentID 110056 data type. The ReferenceID 110052 attribute has a cardinality of 1..n 110054 meaning that for each instance of the Receivable 110042 entity there are one or more ReferenceID 110052 attributes.

The RealEstate 110058 entity has a cardinality of 1..n 110060 meaning that for each instance of the CollateralConstellation 110022 entity there are one or more RealEstate 110058 entities. A real estate object comprises of any piece of land, along with the buildings built on the piece of land and all other accessories, fixtures in the building that add to the monetary value of the building. The RealEstate 110058 entity includes various attributes, namely an ID 110064 attribute and a ReferenceID 110068 attribute. The ID 110064 attribute has a cardinality of 1..n 110066 meaning that for each instance of the RealEstate 110058 entity there are one or more ID 110064 attributes.

The ReferenceID 110068 attribute is a BusinessTransactionDocumentID 110072 data type. The ReferenceID 110068 attribute has a cardinality of 1..n 110070 meaning that for each instance of the RealEstate 110058 entity there are one or more ReferenceID 110068 attributes.

The CollateralAgreement 110074 entity has a cardinality of 1..n 110076 meaning that for each instance of the CollateralConstellation 110022 entity there are one or more CollateralAgreement 110074 entities. A Collateral Agreement is an agreement between a collateral giver and a lender, wherein the collateral giver issues a guarantee or assigns, transfers or pledges a collateral object in security interests for collateralizing a receivable. The CollateralAgreement 110074 entity includes various attributes, namely an ID 110080 attribute and a ReferenceID 110084 attribute. The ID 110080 attribute has a cardinality of 1..n 110082 meaning that for each instance of the CollateralAgreement 110074 entity there are one or more ID 110080 attributes.

The ReferenceID 110084 attribute is a BusinessTransactionDocumentID 110088 data type. The ReferenceID 110084 attribute has a cardinality of 1..n 110086 meaning that for each instance of the CollateralAgreement 110074 entity there are one or more ReferenceID 110084 attributes.

The Charge 110090 entity has a cardinality of 1..n 110092 meaning that for each instance of the CollateralConstellation 110022 entity there are one or more Charge 110090 entities. A charge is the part of a collateral agreement that defines the properties of the relationship to a collateral object. The Charge 110090 entity includes various attributes, namely an ID 110096 attribute and a ReferenceID 110100 attribute. The ID 110096 attribute has a cardinality of 1..n 110098 meaning that for each instance of the Charge 110090 entity there are one or more ID 110096 attributes.

The ReferenceID 110100 attribute is a BusinessTransactionDocumentID 110104 data type. The ReferenceID 110100 attribute has a cardinality of 1..n 110102 meaning that for each instance of the Charge 110090 entity there are one or more ReferenceID 110100 attributes.

The Scope 110106 entity has a cardinality of 1..n 110108 meaning that for each instance of the CollateralConstellation 110022 entity there are one or more Scope 110106 entities. A Scope is part of a collateral agreement that defines the properties of the relationship to a receivable. The Scope 110106 entity includes various attributes, namely an ID 110112 attribute and a ReferenceID 110116 attribute. The ID 110112 attribute has a cardinality of 1..n 110114 meaning that for each instance of the Scope 110106 entity there are one or more ID 110112 attributes.

The ReferenceID 110116 attribute is a BusinessTransactionDocumentID 110120 data type. The ReferenceID 110116 attribute has a cardinality of 1..n 110118 meaning that for each instance of the Scope 110106 entity there are one or more ReferenceID 110116 attributes. The log 110128 entity has a cardinality of 1 110130 meaning that for each instance of the CollateralConstellation 110020 package there is one log 110128 entity.

FIGS. 111-1 through 111-24 show a CollateralAgreementByPartyResponse 111000 package. The CollateralAgreementByPartyResponse 111000 package is a CollateralAgreementByPartyResponse 111004 data type. The CollateralAgreementByPartyResponse 111000 package includes a CollateralAgreementByPartyResponse 111002 entity. The CollateralAgreementByPartyResponse 111000 package includes various packages, namely a MessageHeader 111006 package and a CollateralConstellation 111022 package.

The MessageHeader 111006 package is a BusinessDocumentMessageHeader 111012 data type. The MessageHeader 111006 package includes a MessageHeader 111008 entity. The MessageHeader 111008 entity has a cardinality of 1 111010 meaning that for each instance of the MessageHeader 111006 package there is one MessageHeader 111008 entity. The MessageHeader 111008 entity includes various attributes, namely an ID 111014 attribute and a CreationDateTime 111018 attribute. The ID 111014 attribute is a BusinessDocumentMessageID 111016 data type. The CreationDateTime 111018 attribute is a DateTime 111020 data type.

The CollateralConstellation 111022 package is a ndt_CollateralConstellationRequestMessageCollateralConstellation 111028 data type. The CollateralConstellation 111022 package includes various entities, namely a CollateralConstellation 111024 entity and a Log 111598 entity. The CollateralConstellation 111022 package includes a CollateralAgreementByParty 111046 package.

The CollateralConstellation 111024 entity has a cardinality of 1 111026 meaning that for each instance of the CollateralConstellation 111022 package there is one CollateralConstellation 111024 entity. A Collateral Constellation is a linkage of collateral objects, collateral agreements, receivables, charges and scope. The CollateralConstellation 111024 entity includes a <Element1> 111030 attribute. The CollateralConstellation 111024 entity includes a <Element2> 111034 subordinate entity. The <Element1> 111030 attribute is a <GDTforElement1> 111032 data type. The <Element2> 111034 entity includes various attributes, namely a <Element2.1> 111038 attribute and a <Element2.2> 111042 attribute. The <Element2.1> 111038 attribute is a <GDTforElement2.1> 111040 data type. The <Element2.2> 111042 attribute is a <GDTforElement2.2> 111044 data type. The Log 111598 entity has a cardinality of 1 111600 meaning that for each instance of the CollateralConstellation 111022 package there is one Log 111598 entity.

The CollateralAgreementByParty 111046 package is a t_CollateralAgreementByParty-ResponseMessageCollateralAgreementByParty 111052 data type. The CollateralAgreementByParty 111046 package includes various entities, namely a CollateralAgreementByParty 111048 entity, a RealEstateObject 111116 entity, a Receivable 111446 entity and a RealEstateCharge 111460 entity. The CollateralAgreementByParty 111046 package includes various packages, namely a RealEstateObject 111114 package and a RealEstateCharge 111458 package.

The CollateralAgreementByParty 111048 entity has a cardinality of 0..n 111050 meaning that for each instance of the CollateralAgreementByParty 111046 package there may be one or more CollateralAgreementByParty 111048 entities.

The RealEstateObject 111116 entity has a cardinality of 0..n 111118 meaning that for each instance of the CollateralAgreementByParty 111046 package there may be one or more RealEstateObject 111116 entities. A real estate object comprises of any piece of land, along with the buildings built on the piece of land and all other accessories, fixtures in the building that add to the monetary value of the building. The RealEstateObject 111116 entity includes various attributes, namely an ID 111122 attribute, an InternalID 111128 attribute, a CategoryCode 111134 attribute, a TypeCode 111140 attribute, a UtilizationCode 111146 attribute, a Description 111152 attribute, a MarketValueAmount 111158 attribute, a NominalValueAmount 111164 attribute, an UnusedValueAmount 111170 attribute, a LendingRatePercent 111176 attribute, a LendingAmount 111182 attribute, a LendingLimitAmount 111188 attribute, a LendingRangeAmount 111194 attribute, a SafetyDiscountCode 111200 attribute, a SafetyDiscountPercent 111206 attribute and a SafetyDiscountAmount 111212 attribute.

The ID 111122 attribute is a BusinessTransactionDocumentID 111126 data type. The ID 111122 attribute has a cardinality of 0..1 111124 meaning that for each instance of the RealEstateObject 111116 entity there may be one ID 111122 attribute. The InternalID 111128 attribute is a BusinessTransactionDocumentID 111132 data type. The InternalID 111128 attribute has a cardinality of 0..1 111130 meaning that for each instance of the RealEstateObject 111116 entity there may be one InternalID 111128 attribute.

The CategoryCode 111134 attribute is a pdt_RealEstateObjectCategoryCode 111138 data type. The CategoryCode 111134 attribute has a cardinality of 0..1 111136 meaning that for each instance of the RealEstateObject 111116 entity there may be one CategoryCode 111134 attribute. The TypeCode 111140 attribute is a pdt_RealEstateObjectTypeCode 111144 data type. The TypeCode 111140 attribute has a cardinality of 0..1 111142 meaning that for each instance of the RealEstateObject 111116 entity there may be one TypeCode 111140 attribute.

The UtilizationCode 111146 attribute is a pdt_RealEstateObjectUtilizationCode 111150 data type. The UtilizationCode 111146 attribute has a cardinality of 0..1 11148 meaning that for each instance of the RealEstateObject 111116 entity there may be one UtilizationCode 111146 attribute. The Description 111152 attribute is a SHORT_DESCRIPTION 111156 data type. The Description 111152 attribute has a cardinality of 0..1 111154 meaning that for each instance of the RealEstateObject 111116 entity there may be one Description 111152 attribute.

The MarketValueAmount 111158 attribute is an Amount 111162 data type. The MarketValueAmount 111158 attribute has a cardinality of 0..1 111160 meaning that for each instance of the RealEstateObject 111116 entity there may be one MarketValueAmount 111158 attribute. The NominalValueAmount 111164 attribute is an Amount 111168 data type. The NominalValueAmount 111164 attribute has a cardinality of 0..1 111166 meaning that for each instance of the RealEstateObject 111116 entity there may be one NominalValueAmount 111164 attribute.

The UnusedValueAmount 111170 attribute is an Amount 111174 data type. The UnusedValueAmount 111170 attribute has a cardinality of 0..1 111172 meaning that for each instance of the RealEstateObject 111116 entity there may be one UnusedValueAmount 111170 attribute. The LendingRatePercent 111176 attribute is a Percent 111180 data type. The LendingRatePercent 111176 attribute has a cardinality of 0..1 111178 meaning that for each instance of the RealEstateObject 111116 entity there may be one LendingRatePercent 111176 attribute.

The LendingAmount 111182 attribute is an Amount 111186 data type. The LendingAmount 111182 attribute has a cardinality of 0..1 111184 meaning that for each instance of the RealEstateObject 111116 entity there may be one LendingAmount 111182 attribute. The LendingLimitAmount 111188 attribute is an Amount 111192 data type. The LendingLimitAmount 111188 attribute has a cardinality of 0..1 111190 meaning that for each instance of the RealEstateObject 111116 entity there may be one LendingLimitAmount 111188 attribute.

The LendingRangeAmount 111194 attribute is an Amount 111198 data type. The LendingRangeAmount 111194 attribute has a cardinality of 0..1 111196 meaning that for each instance of the RealEstateObject 111116 entity there may be one LendingRangeAmount 111194 attribute. The SafetyDiscountCode 111200 attribute is a pdt_RealEstateObjectSafetyDiscountCode 111204 data type. The SafetyDiscountCode 111200 attribute has a cardinality of 0..1 111202 meaning that for each instance of the RealEstateObject 111116 entity there may be one SafetyDiscountCode 111200 attribute.

The SafetyDiscountPercent 111206 attribute is a Percent 111210 data type. The SafetyDiscountPercent 111206 attribute has a cardinality of 0..1 111208 meaning that for each instance of the RealEstateObject 111116 entity there may be one SafetyDiscountPercent 111206 attribute. The SafetyDiscountAmount 111212 attribute is an Amount 111216 data type. The SafetyDiscountAmount 111212 attribute has a cardinality of 0..1 111214 meaning that for each instance of the RealEstateObject 111116 entity there may be one SafetyDiscountAmount 111212 attribute.

The Receivable 111446 entity has a cardinality of 0..1 111448 meaning that for each instance of the CollateralAgreementByParty 111046 package there may be one Receivable 111446 entity. The Receivable 111446 entity includes an ID 111452 attribute. The ID 111452 attribute is a BusinessTransactionDocumentId 111456 data type. The ID 111452 attribute has a cardinality of 0..1 111454 meaning that for each instance of the Receivable 111446 entity there may be one ID 111452 attribute. The RealEstateCharge 111460 entity has a cardinality of 0..n 111462 meaning that for each instance of the CollateralAgreementByParty 111046 package there may be one or more RealEstateCharge 111460 entities. A RealEstateCharge is the part of a collateral agreement that defines the properties of the relationship to a RealEstate object.

The RealEstateObject 111114 package is a ndt_CollateralAgreementByPartyResponseMessageRealEstateObject 111120 data type. The RealEstateObject 111114 package includes various entities, namely a RealEstateObject 111116 entity and a Receivable 111446 entity. The RealEstateObject 111114 package includes various packages, namely an Address 111218 package, a Location 111232 package, a Land 111300 package, a Building 111356 package, an OwnerParty 111400 package and a Receivable 111444 package.

The RealEstateObject 111116 entity has a cardinality of 0..n 111118 meaning that for each instance of the RealEstateObject 111114 package there may be one or more RealEstateObject 111116 entities. A real estate object comprises of any piece of land, along with the buildings built on the piece of land and all other accessories, fixtures in the building that add to the monetary value of the building. The RealEstateObject 111116 entity includes various attributes, namely an ID 111122 attribute, an InternalID 111128 attribute, a CategoryCode 111134 attribute, a TypeCode 111140 attribute, a UtilizationCode 111146 attribute, a Description 111152 attribute, a MarketValueAmount 111158 attribute, a NominalValueAmount 111164 attribute, an UnusedValueAmount 111170 attribute, a LendingRatePercent 111176 attribute, a LendingAmount 111182 attribute, a LendingLimitAmount 111188 attribute, a LendingRangeAmount 111194 attribute, a SafetyDiscountCode 111200 attribute, a SafetyDiscountPercent 111206 attribute and a SafetyDiscountAmount 111212 attribute.

The ID 111122 attribute is a BusinessTransactionDocumentID 111126 data type. The ID 111122 attribute has a cardinality of 0..1 111124 meaning that for each instance of the RealEstateObject 111116 entity there may be one ID 111122 attribute. The InternalID 111128 attribute is a BusinessTransactionDocumentID 111132 data type. The InternalID 111128 attribute has a cardinality of 0..1 111130 meaning that for each instance of the RealEstateObject 111116 entity there may be one InternalID 111128 attribute.

The CategoryCode 111134 attribute is a pdt_RealEstateObjectCategoryCode 111138 data type. The CategoryCode 111134 attribute has a cardinality of 0..1 111136 meaning that for each instance of the RealEstateObject 111116 entity there may be one CategoryCode 111134 attribute. The TypeCode 111140 attribute is a pdt_RealEstateObjectTypeCode 111144 data type. The TypeCode 111140 attribute has a cardinality of 0..1 111142 meaning that for each instance of the RealEstateObject 111116 entity there may be one TypeCode 111140 attribute.

The UtilizationCode 111146 attribute is a pdt_RealEstateObjectUtilizationCode 111150 data type. The UtilizationCode 111146 attribute has a cardinality of 0..1 111148 meaning that for each instance of the RealEstateObject 111116 entity there may be one UtilizationCode 111146 attribute. The Description 111152 attribute is a SHORT_DESCRIPTION 111156 data type. The Description 111152 attribute has a cardinality of 0..1 111154 meaning that for each instance of the RealEstateObject 111116 entity there may be one Description 111152 attribute.

The MarketValueAmount 111158 attribute is an Amount 111162 data type. The MarketValueAmount 111158 attribute has a cardinality of 0..1 111160 meaning that for each instance of the RealEstateObject 111116 entity there may be one MarketValueAmount 111158 attribute. The NominalValueAmount 111164 attribute is an Amount 111168 data type. The NominalValueAmount 111164 attribute has a cardinality of 0..1 111166 meaning that for each instance of the RealEstateObject 111116 entity there may be one NominalValueAmount 111164 attribute.

The UnusedValueAmount 111170 attribute is an Amount 111174 data type. The UnusedValueAmount 111170 attribute has a cardinality of 0..1 111172 meaning that for each instance of the RealEstateObject 111116 entity there may be one UnusedValueAmount 111170 attribute. The LendingRatePercent 111176 attribute is a Percent 111180 data type. The LendingRatePercent 111176 attribute has a cardinality of 0..1 111178 meaning that for each instance of the RealEstateObject 111116 entity there may be one LendingRatePercent 111176 attribute.

The LendingAmount 111182 attribute is an Amount 111186 data type. The LendingAmount 111182 attribute has a cardinality of 0..1 111184 meaning that for each instance of the RealEstateObject 111116 entity there may be one LendingAmount 111182 attribute. The LendingLimitAmount 111188 attribute is an Amount 111192 data type. The LendingLimitAmount 111188 attribute has a cardinality of 0..1 111190 meaning that for each instance of the RealEstateObject 111116 entity there may be one LendingLimitAmount 111188 attribute.

The LendingRangeAmount 111194 attribute is an Amount 111198 data type. The LendingRangeAmount 111194 attribute has a cardinality of 0..1 111196 meaning that for each instance of the RealEstateObject 111116 entity there may be one LendingRangeAmount 111194 attribute. The SafetyDiscountCode 111200 attribute is a pd_RealEstateObjectSafetyDiscountCode 111204 data type. The SafetyDiscountCode 111200 attribute has a cardinality of 0..1 111202 meaning that for each instance of the RealEstateObject 111116 entity there may be one SafetyDiscountCode 111200 attribute.

The SafetyDiscountPercent 111206 attribute is a Percent 111210 data type. The SafetyDiscountPercent 111206 attribute has a cardinality of 0..1 111208 meaning that for each instance of the RealEstateObject 111116 entity there may be one SafetyDiscountPercent 111206 attribute. The SafetyDiscountAmount 111212 attribute is an Amount 111216 data type. The SafetyDiscountAmount 111212 attribute has a cardinality of 0..1 111214 meaning that for each instance of the RealEstateObject 111116 entity there may be one SafetyDiscountAmount 111212 attribute.

The Receivable 111446 entity has a cardinality of 0..1 111448 meaning that for each instance of the RealEstateObject 111114 package there may be one Receivable 111446 entity. The Receivable 111446 entity includes an ID 111452 attribute. The ID 111452 attribute is a BusinessTransactionDocumentId 111456 data type. The ID 111452 attribute has a cardinality of 0..1 111454 meaning that for each instance of the Receivable 111446 entity there may be one ID 111452 attribute.

The Address 111218 package is a ndt_CollateralConstellationRequestMessageCollateralConstellationRealEstateObjectAddress 111224 data type. The Address 111218 package includes an Address 111220 entity. The Address 111220 entity has a cardinality of 0..1 111222 meaning that for each instance of the Address 111218 package there may be one Address 111220 entity. An Address contains structured information about all types of addresses. This information includes details about the addressee, the postal address, and the physical location and communication connections. The Address 111220 entity includes an Address 111226 attribute. The Address 111226 attribute is a PhysicalAddress 111230 data type. The Address 111226 attribute has a cardinality of 0..1 111228 meaning that for each instance of the Address 111220 entity there may be one Address 111226 attribute.

The Location 111232 package is a ndt_CollateralConstellationRequestMessageCollateralConstellationRealEstateObjectLocation 111238 data type. The Location 111232 package includes a Location 111234 entity. The Location 111234 entity has a cardinality of 0..1 111236 meaning that for each instance of the Location 111232 package there may be one Location 111234 entity. The Location 111234 entity includes various attributes, namely a MacroLocationCode 111240 attribute, a MicroLocationCode 111246 attribute, a TransportConnectionCode 111252 attribute, an EnvironmentalConditionCode 111258 attribute, a FloodZoneIndicator 111264 attribute, an EarthQuakeZoneIndicator 111270 attribute, an ArchitecturalConservationAreaIndicator 111276 attribute, a HistoricSiteIndicator 111282 attribute, a ValueImpairingFactorsIndicator 111288 attribute and a ValueImpairingFactorDescription 111294 attribute.

The MacroLocationCode 111240 attribute is a pdt_RealEstateObjectLocationCode 111244 data type. The MacroLocationCode 111240 attribute has a cardinality of 0..1 111242 meaning that for each instance of the Location 111234 entity there may be one MacroLocationCode 111240 attribute. The MicroLocationCode 111246 attribute is a pdt_RealEstateObjectLocationCode 111250 data type. The MicroLocationCode 111246 attribute has a cardinality of 0..1 111248 meaning that for each instance of the Location 111234 entity there may be one MicroLocationCode 111246 attribute.

The TransportConnectionCode 111252 attribute is a pdt_RealEstateObjectTransportConnectionCode 111256 data type. The TransportConnectionCode 111252 attribute has a cardinality of 0..1 111254 meaning that for each instance of the Location 111234 entity there may be one TransportConnectionCode 111252 attribute. The EnvironmentalConditionCode 111258 attribute is a pdt_RealEstateObjectEnvironmentalConditionCode 111262 data type. The EnvironmentalConditionCode 111258 attribute has a cardinality of 0..1 111260 meaning that for each instance of the Location 111234 entity there may be one EnvironmentalConditionCode 111258 attribute.

The FloodZoneIndicator 111264 attribute is an Indicator 111268 data type. The FloodZoneIndicator 111264 attribute has a cardinality of 0..1 111266 meaning that for each instance of the Location 111234 entity there may be one FloodZoneIndicator 111264 attribute. The EarthQuakeZoneIndicator 111270 attribute is an Indicator 111274 data type. The EarthQuakeZoneIndicator 111270 attribute has a cardinality of 0..1 111272 meaning that for each instance of the Location 111234 entity there may be one EarthQuakeZoneIndicator 111270 attribute.

The ArchitecturalConservationAreaIndicator 111276 attribute is an Indicator 111280 data type. The ArchitecturalConservationAreaIndicator 111276 attribute has a cardinality of 0..1 111278 meaning that for each instance of the Location 111234 entity there may be one ArchitecturalConservationAreaIndicator 111276 attribute. The HistoricSiteIndicator 111282 attribute is an Indicator 111286 data type. The HistoricSiteIndicator 111282 attribute has a cardinality of 0..1 111284 meaning that for each instance of the Location 111234 entity there may be one HistoricSiteIndicator 111282 attribute.

The ValueImpairingFactorsIndicator 111288 attribute is an Indicator 111292 data type. The ValueImpairingFactorsIndicator 111288 attribute has a cardinality of 0..1 111290 meaning that for each instance of the Location 111234 entity there may be one ValueImpairingFactorsIndicator 111288 attribute. The ValueImpairingFactorDescription 111294 attribute is a SHORT_DESCRIPTION 111298 data type. The ValueImpairingFactorDescription 111294 attribute has a cardinality of 0..1 111296 meaning that for each instance of the Location 111234 entity there may be one ValueImpairingFactorDescription 111294 attribute.

The Land 111300 package is a ndt_CollateralConstellationRequestMessageCollateralConstellationRealEstateObjectLand 111306 data type. The Land 111300 package includes a Land 111302 entity. The Land 111302 entity has a cardinality of 0..1 111304 meaning that for each instance of the Land 111300 package there may be one Land 111302 entity. The Land 111302 entity includes various attributes, namely a LandAreaMeasure 111308 attribute, a RentedLandAreaMeasure 111314 attribute, a LandCostAmount 111320 attribute, a LandCostBaseCode 111326 attribute, a DevelopmentLandCostAmount 111332 attribute, a DevelopmentLandCostBaseCode 111338 attribute, an AdditionalLandCostAmount 111344 attribute and an AdditionalLandCostBaseCode 111350 attribute.

The LandAreaMeasure 111308 attribute is a Measure 111312 data type. The LandAreaMeasure 111308 attribute has a cardinality of 0..1 111310 meaning that for each instance of the Land 111302 entity there may be one LandAreaMeasure 111308 attribute. The RentedLandAreaMeasure 111314 attribute is a Measure 111318 data type. The RentedLandAreaMeasure 111314 attribute has a cardinality of 0..1

111316 meaning that for each instance of the Land 111302 entity there may be one RentedLandAreaMeasure 111314 attribute.

The LandCostAmount 111320 attribute is an Amount 111324 data type. The LandCostAmount 111320 attribute has a cardinality of 0..1 111322 meaning that for each instance of the Land 111302 entity there may be one LandCostAmount 111320 attribute. The LandCostBaseCode 111326 attribute is a pdt_RealEstateObjectLandCostBaseCode 111330 data type. The LandCostBaseCode 111326 attribute has a cardinality of 0..1 111328 meaning that for each instance of the Land 111302 entity there may be one LandCostBaseCode 111326 attribute.

The DevelopmentLandCostAmount 111332 attribute is an Amount 111336 data type. The DevelopmentLandCostAmount 111332 attribute has a cardinality of 0..1 111334 meaning that for each instance of the Land 111302 entity there may be one DevelopmentLandCostAmount 111332 attribute. The DevelopmentLandCostBaseCode 111338 attribute is a pdt_RealEstateObjectLandCostBaseCode 111342 data type. The DevelopmentLandCostBaseCode 111338 attribute has a cardinality of 0..1 111340 meaning that for each instance of the Land 111302 entity there may be one DevelopmentLandCostBaseCode 111338 attribute.

The AdditionalLandCostAmount 111344 attribute is an Amount 111348 data type. The AdditionalLandCostAmount 111344 attribute has a cardinality of 0..1 111346 meaning that for each instance of the Land 111302 entity there may be one AdditionalLandCostAmount 111344 attribute. The AdditionalLandCostBaseCode 111350 attribute is a pdt_RealEstateObjectLandCostBaseCode 111354 data type. The AdditionalLandCostBaseCode 111350 attribute has a cardinality of 0..1 111352 meaning that for each instance of the Land 111302 entity there may be one AdditionalLandCostBaseCode 111350 attribute.

The Building 111356 package is a ndt_CollateralConstellationRequestMessageCollateralConstellationRealEstateObjectBuilding 111362 data type. The Building 111356 package includes a Building 111358 entity. The Building 111358 entity has a cardinality of 0..1 111360 meaning that for each instance of the Building 111356 package there may be one Building 111358 entity. The Building 111358 entity includes various attributes, namely a UsableAreaMeasure 111364 attribute, a UsableVolumeMeasure 111370 attribute, a ResidentialAreaMeasure 111376 attribute, a SecondaryAreaMeasure 111382 attribute, an OtherAreaMeasure 111388 attribute and a NumberOfBuildingPartsNumberValue 111394 attribute.

The UsableAreaMeasure 111364 attribute is a Measure 111368 data type. The UsableAreaMeasure 111364 attribute has a cardinality of 0..1 111366 meaning that for each instance of the Building 111358 entity there may be one UsableAreaMeasure 111364 attribute. The UsableVolumeMeasure 111370 attribute is a Measure 111374 data type. The UsableVolumeMeasure 111370 attribute has a cardinality of 0..1 111372 meaning that for each instance of the Building 111358 entity there may be one UsableVolumeMeasure 111370 attribute.

The ResidentialAreaMeasure 111376 attribute is a Measure 111380 data type. The ResidentialAreaMeasure 111376 attribute has a cardinality of 0..1 111378 meaning that for each instance of the Building 111358 entity there may be one ResidentialAreaMeasure 111376 attribute. The SecondaryAreaMeasure 111382 attribute is a Measure 111386 data type. The SecondaryAreaMeasure 111382 attribute has a cardinality of 0..1 111384 meaning that for each instance of the Building 111358 entity there may be one SecondaryAreaMeasure 111382 attribute.

The OtherAreaMeasure 111388 attribute is a Measure 111392 data type. The OtherAreaMeasure 111388 attribute has a cardinality of 0..1 111390 meaning that for each instance of the Building 111358 entity there may be one OtherAreaMeasure 111388 attribute. The NumberOfBuildingPartsNumberValue 111394 attribute is a NumberValue 111398 data type. The NumberOfBuildingPartsNumberValue 111394 attribute has a cardinality of 0..1 111396 meaning that for each instance of the Building 111358 entity there may be one NumberOfBuildingPartsNumberValue 111394 attribute.

The OwnerParty 111400 package is a ndt_CollateralConstellationRequestMessageCollateralConstellationRealEstateObjectOwnerParty 111406 data type. The OwnerParty 111400 package includes an OwnerParty 111402 entity.

The OwnerParty 111402 entity has a cardinality of 0..n 111404 meaning that for each instance of the OwnerParty 111400 package there may be one or more OwnerParty 111402 entities. The OwnerParty 111402 entity includes various attributes, namely an ID 111408 attribute, a FunctionCode 111414 attribute, an OwnershipNumeratorNumberValue 111420 attribute, an OwnershipDenominatorNumberValue 111426 attribute, an OwnershipStartDate 111432 attribute and an OwnershipEndDate 111438 attribute.

The ID 111408 attribute is a BusinessTransactionDocumentID 111412 data type. The ID 111408 attribute has a cardinality of 0..1 111410 meaning that for each instance of the OwnerParty 111402 entity there may be one ID 111408 attribute. The FunctionCode 111414 attribute is a pdt_RealEstateObjectOwnerFunctionCode 111418 data type. The FunctionCode 111414 attribute has a cardinality of 0..1 111416 meaning that for each instance of the OwnerParty 111402 entity there may be one FunctionCode 111414 attribute.

The OwnershipNumeratorNumberValue 111420 attribute is a NumberValue 111424 data type. The OwnershipNumeratorNumberValue 111420 attribute has a cardinality of 0..1 111422 meaning that for each instance of the OwnerParty 111402 entity there may be one OwnershipNumeratorNumberValue 111420 attribute. The OwnershipDenominatorNumberValue 111426 attribute is a NumberValue 111430 data type. The OwnershipDenominatorNumberValue 111426 attribute has a cardinality of 0..1 111428 meaning that for each instance of the OwnerParty 111402 entity there may be one OwnershipDenominatorNumberValue 111426 attribute.

The OwnershipStartDate 111432 attribute is a Date 111436 data type. The OwnershipStartDate 111432 attribute has a cardinality of 0..1 111434 meaning that for each instance of the OwnerParty 111402 entity there may be one OwnershipStartDate 111432 attribute. The OwnershipEndDate 111438 attribute is a Date 111442 data type. The OwnershipEndDate 111438 attribute has a cardinality of 0..1 111440 meaning that for each instance of the OwnerParty 111402 entity there may be one OwnershipEndDate 111438 attribute.

The Receivable 111444 package is an ndt_CollateralConstellationRequestMessageCollateralConstellationReceivable 111450 data type. The Receivable 111444 package includes a Receivable 111446 entity. The Receivable 111446 entity has a cardinality of 0..1 111448 meaning that for each instance of the Receivable 111444 package there may be one Receivable 111446 entity. The Receivable 111446 entity includes an ID 111452 attribute. The ID 111452 attribute is a BusinessTransaction- DocumentId 111456 data type. The ID 111452 attribute has a cardinality of 0..1 111454 meaning that for each instance of the Receivable 111446 entity there may be one ID 111452 attribute.

The RealEstateCharge 111458 package is an ndt_CollateralAgreementByPartyResponseMessageRealEstateCharge 111464 data type. The RealEstateCharge 111458 package includes a RealEstateCharge 111460 entity. The RealEstateCharge 111458 package includes various packages, namely a CollateralAgreement 111466 package, a Charge 111528 package and a Log 111596 package. The RealEstateCharge 111460 entity has a cardinality of 0..n 111462 meaning that for each instance of the RealEstateCharge 111458 package there may be one or more RealEstateCharge 111460 entities. A RealEstateCharge is the part of a collateral agreement that defines the properties of the relationship to a RealEstate object.

The CollateralAgreement 111466 package is an ndt_CollateralAgreementByPartyResponseMessageRealEstateChargeCollateralAgreement 111472 data type. The CollateralAgreement 111466 package includes a CollateralAgreement 111468 entity. The CollateralAgreement 111468 entity has a cardinality of 0..n 111470 meaning that for each instance of the CollateralAgreement 111466 package there may be one or more CollateralAgreement 111468 entities. A Collateral Agreement is an agreement between a collateral giver and a lender, wherein the collateral giver issues a guarantee or assigns, transfers or pledges a collateral object in security interests for collateralizing a receivable. The CollateralAgreement 111468 entity includes various attributes, namely an ID 111474 attribute, an InternalId 111480 attribute, a TypeCode 111486 attribute, a ValidityStartDate 111492 attribute, a ValidityEndDate 111498 attribute, an AssessmentValueAmount 111504 attribute, an AssessmentDate 111510 attribute, a Description 111516 attribute and a WidePurposeOfDeclarationIndicator 111522 attribute.

The ID 111474 attribute is an IdentityID 111478 data type. The ID 111474 attribute has a cardinality of 0..1 111476 meaning that for each instance of the CollateralAgreement 111468 entity there may be one ID 111474 attribute. The InternalId 111480 attribute is a BusinessTransactionDocumentID 111484 data type. The InternalId 111480 attribute has a cardinality of 0..1 111482 meaning that for each instance of the CollateralAgreement 111468 entity there may be one InternalId 111480 attribute.

The TypeCode 111486 attribute is a pdt_CollateralAgreementTypeCode 111490 data type. The TypeCode 111486 attribute has a cardinality of 0..1 111488 meaning that for each instance of the CollateralAgreement 111468 entity there may be one TypeCode 111486 attribute. The ValidityStartDate 111492 attribute is a Date 111496 data type. The ValidityStartDate 111492 attribute has a cardinality of 0..1 111494 meaning that for each instance of the CollateralAgreement 111468 entity there may be one ValidityStartDate 111492 attribute.

The ValidityEndDate 111498 attribute is a Date 111502 data type. The ValidityEndDate 111498 attribute has a cardinality of 0..1 111500 meaning that for each instance of the CollateralAgreement 111468 entity there may be one ValidityEndDate 111498 attribute. The AssessmentValueAmount 111504 attribute is an Amount 111508 data type. The AssessmentValueAmount 111504 attribute has a cardinality of 0..1 111506 meaning that for each instance of the CollateralAgreement 111468 entity there may be one AssessmentValueAmount 111504 attribute.

The AssessmentDate 111510 attribute is a Date 111514 data type. The AssessmentDate 111510 attribute has a cardinality of 0..1 111512 meaning that for each instance of the CollateralAgreement 111468 entity there may be one AssessmentDate 111510 attribute. The Description 111516 attribute is a SHORT_DESCRIPTION 111520 data type. The Description 111516 attribute has a cardinality of 0..1 111518 meaning that for each instance of the CollateralAgreement 111468 entity there may be one Description 111516 attribute. The WidePurposeOfDeclarationIndicator 111522 attribute is an Indicator 111526 data type. The WidePurposeOfDeclarationIndicator 111522 attribute has a cardinality of 0..1 111524 meaning that for each instance of the CollateralAgreement 111468 entity there may be one WidePurposeOfDeclarationIndicator 111522 attribute.

The Charge 111528 package is a ndt_CollateralAgreementByPartyResponseMessageRealEstateChargeCharge 111534 data type. The Charge 111528 package includes a Charge 111530 entity. The Charge 111530 entity has a cardinality of 0..n 111532 meaning that for each instance of the Charge 111528 package there may be one or more Charge 111530 entities. A charge is the part of a collateral agreement that defines the properties of the relationship to a collateral object. The Charge 111530 entity includes various attributes, namely an ID 111536 attribute, a RealEstateObjectReferenceID 111542 attribute, a CollateralAgreementReferenceID 111548 attribute, a Description 111554 attribute, a RankingOrderNumberValue 111560 attribute, a SequenceNumberValue 111566 attribute, a RegistrationNumber 111572 attribute, a RegistrationDate 111578 attribute, an AssetAmount 111584 attribute and an AssetPercent 111590 attribute.

The ID 111536 attribute is a BusinessTransactionDocumentID 111540 data type. The ID 111536 attribute has a cardinality of 0..1 111538 meaning that for each instance of the Charge 111530 entity there may be one ID 111536 attribute. The RealEstateObjectReferenceID 111542 attribute is a BusinessTransactionDocumentID 111546 data type. The RealEstateObjectReferenceID 111542 attribute has a cardinality of 0..1 111544 meaning that for each instance of the Charge 111530 entity there may be one RealEstateObjectReferenceID 111542 attribute.

The CollateralAgreementReferenceID 111548 attribute is a BusinessTransactionDocumentID 111552 data type. The CollateralAgreementReferenceID 111548 attribute has a cardinality of 0..1 111550 meaning that for each instance of the Charge 111530 entity there may be one CollateralAgreementReferenceID 111548 attribute. The Description 111554 attribute is a SHORT_DESCRIPTION 111558 data type. The Description 111554 attribute has a cardinality of 0..1 111556 meaning that for each instance of the Charge 111530 entity there may be one Description 111554 attribute.

The RankingOrderNumberValue 111560 attribute is a NumberValue 111564 data type. The RankingOrderNumberValue 111560 attribute has a cardinality of 0..1 111562 meaning that for each instance of the Charge 111530 entity there may be one RankingOrderNumberValue 111560 attribute. The SequenceNumberValue 111566 attribute is a NumberValue 111570 data type. The SequenceNumberValue 111566 attribute has a cardinality of 0..1 111568 meaning that for each instance of the Charge 111530 entity there may be one SequenceNumberValue 111566 attribute.

The RegistrationNumber 111572 attribute is a BusinessTransactionDocumentID 111576 data type. The RegistrationNumber 111572 attribute has a cardinality of 0..1 111574 meaning that for each instance of the Charge 111530 entity there may be one RegistrationNumber 111572 attribute. The RegistrationDate 111578 attribute is a Date 111582 data type. The RegistrationDate 111578 attribute has a cardinality of 0..1 111580 meaning that for each instance of the Charge 111530 entity there may be one RegistrationDate 111578 attribute.

The AssetAmount 111584 attribute is an Amount 111588 data type. The AssetAmount 111584 attribute has a cardinality of 0..1 111586 meaning that for each instance of the Charge 111530 entity there may be one AssetAmount 111584 attribute. The AssetPercent 111590 attribute is a Percent 111594 data type. The AssetPercent 111590 attribute has a cardinality of 0..1 111592 meaning that for each instance of the Charge 111530 entity there may be one AssetPercent 111590 attribute.

The Log 111596 package is a Log 111602 data type. The Log 111596 package includes a Log 111598 entity. The Log 111598 entity has a cardinality of 1 111600 meaning that for each instance of the Log 111596 package there is one Log 111598 entity.

A number of implementations have been described. Nevertheless, it will be understood that various modifications may be made without departing from the spirit and scope of the disclosure. For example, processing can mean creating, updating, deleting, or some other massaging of information. Accordingly, other implementations are within the scope of the following claims.

What is claimed is:

1. A tangible computer readable medium including program code for providing message-based interfaces for creating a cost simulation, the medium comprising:

a first set of program code for receiving via a first message-based interface derived from a common business object model, where the common business object model includes business objects having relationships that enable derivation of message-based interfaces and message packages, the first message-based interface exposing at least one service as defined in a service registry and from a heterogeneous application executing in an environment of computer systems providing message-based services, a first message for requesting creation of the cost simulation consisting of cost estimates with various cost sources that includes a first message package derived from the common business object model and hierarchically organized in memory as:

a cost simulation creation request message entity; and a cost simulation package comprising a cost simulation entity and a property package, where the cost simulation entity includes a property definition class ID, and where the property package includes at least one property entity, where each of the at least one property entities includes a property entity property ID;

a second set of program code for processing the first message according to the hierarchical organization of the first message package, where processing the first message includes unpacking the first message package based on the common business object model; and a third set of program code for sending a second message to the heterogeneous application responsive to the first message, where the second message includes a second message package derived from the common business object model to provide consistent semantics with the first message package.

2. The tangible computer readable medium of claim 1, wherein the cost simulation entity further includes at least one of the following: a status code and a name.

* * * * *